US012755435B2

(12) United States Patent
Iguchi et al.

(10) Patent No.: US 12,755,435 B2
(45) Date of Patent: Oct. 6, 2026

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Noritaka Iguchi, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 483 days.

(21) Appl. No.: 18/082,019

(22) Filed: Dec. 15, 2022

(65) Prior Publication Data

US 2023/0125048 A1 Apr. 20, 2023

Related U.S. Application Data

(63) Continuation of application No. PCT/JP2021/023778, filed on Jun. 23, 2021.

(Continued)

(51) Int. Cl.
*G06T 9/00* (2006.01)

(52) U.S. Cl.
CPC .................................... *G06T 9/001* (2013.01)

(58) Field of Classification Search
None
See application file for complete search history.

(56) References Cited

U.S. PATENT DOCUMENTS

| | | | |
|---|---|---|---|
| 2014/0375638 | A1 | 12/2014 | Tomaru et al. |
| 2021/0227259 | A1 | 7/2021 | Sugio et al. |

(Continued)

FOREIGN PATENT DOCUMENTS

| | | |
|---|---|---|
| WO | 2014/020663 | 2/2014 |
| WO | 2020/075862 | 4/2020 |
| WO | 2020/100866 | 5/2020 |

OTHER PUBLICATIONS

International Search Report (ISR) issued on Sep. 28, 2021 in International (PCT) Application No. PCT/JP2021/023778.

*Primary Examiner* — Xiaolan Xu
(74) *Attorney, Agent, or Firm* — Wenderoth, Lind & Ponack, L.L.P.

(57) ABSTRACT

A three-dimensional data encoding method including: encoding tile information including information on N (N is an integer greater than or equal to 0) subspaces of a target space including three-dimensional points, and encoding point cloud data of the three-dimensional points based on the tile information; and generating a bitstream including the point cloud data encoded. The tile information includes N subspace coordinate information indicating coordinates of the N subspaces. The N subspace coordinate information each include three coordinate information each indicating a coordinate in one of three axial directions in a three-dimensional orthogonal coordinate system. When N is 1 or greater: in the encoding of the tile information, each of the three coordinate information is encoded using a first fixed length; and in the generating of the bitstream, the bitstream which includes the N subspace coordinate information encoded and first fixed length information indicating the first fixed length is generated.

10 Claims, 104 Drawing Sheets

Related U.S. Application Data

(60) Provisional application No. 63/042,698, filed on Jun. 23, 2020.

(56) References Cited

U.S. PATENT DOCUMENTS

2021/0258610 A1 8/2021 Iguchi et al.
2021/0335016 A1* 10/2021 Li ............................. G06T 9/40
2022/0124374 A1* 4/2022 Zhang .................... H04N 19/30

* cited by examiner

| | GEOMETRY INFORMATION | ATTRIBUTE INFORMATION |
|---|---|---|
| $n = 1$ | $G(1) = (x_1, y_1, z_1)$ | $A(1) = (R_1, G_1, B_1)$ |
| $n = 2$ | $G(2) = (x_2, y_2, z_2)$ | $A(2) = (R_2, G_2, B_2)$ |
| ⋮ | ⋮ | ⋮ |
| $n = N$ | $G(N) = (x_N, y_N, z_N)$ | $A(N) = (R_N, G_N, B_N)$ |

FIG. 29

EXAMPLES OF SEMANTICS OF pcc_nal_unit_type (1) if pcc_codec_type == Codec 1

0:Codec1 Goemetry
1:Codec1 AttributeX
2:Codec1 AttributeY
3:Codec1 Geom. PS
4:Codec1 AttrX. PS
5:Codec1 AttrX. PS
6:Codec1 Geometry Sequence PS
7:Codec1 AttributeX Sequence PS
8:Codec1 AttributeY Sequence PS
9:Codec1 AU Header
10:Codec1 GOF Header
11 ~:Codec1 reserved for future use (2) if pcc_codec_type == Codec 2

0:Codec2 DataA
1:Codec2 MetaDataA
2:Codec2 MetaDataB
3 ~:Codec2 reserved for future use

| | WHOLE | 1/20 |
|---|---|---|
| MEMORY | 2000 MB | 100 MB |
| REQUIRED ACTUAL TIME | 132 s | 6.6 s |
| CURRENT DECODING TIME | 149.92 s | 0.80 s |
| DISTANCE | 2200 m | 220 m |

FIG. 37

| | | | | | | | | | | | | | | | | |
|---|---|---|---|---|---|---|---|---|---|---|---|---|---|---|---|---|
| INPUT | 3 | 7 | 0 | 3 | 4 | 7 | 7 | 2 | 4 | 0 | 2 | 2 | 7 | 3 | 7 | 5 |
| OCTREE COUNTER | 0 | 1 | 2 | 3 | 4 | 5 | 6 | 7 | | | | | | | | |
| RESULT | 0 | 0 | 2 | 2 | 2 | 3 | 3 | 3 | 4 | 4 | 5 | 7 | 7 | 7 | 7 | 7 |

SEI

TILE INDEX / SLICE INDEX
AREA INFORMATION
MEMORY OFFSET (POINTER)
GLOBAL POSITION INFORMATION

```
Tile_Slice_Information_SEI{
for(Tile idx or Slice idx)
   Area Information(idx)
   Memory offset pointer(idx)
   Global position information(idx)
   other information(idx)
}
```

FIG. 53

```
TileMetaData{
  type_of_divide  1:top_view, 2:other
  if(type_of_divide == 1){  //top_view
    topview_shape    //1: square, 2:circle
    tile_overlap_flag   //1:true, 2:false
    if(tile_overlap_flag){
      type_of_overlap
    }
    independent_tile_height_flag
    if(independent_tile_height_flag){
      tile_height //1: road, flyover
    }

    tile_number

    for(tile_number){
      global_position or relative_position
      if(independent_tile_height_flag){
        tile_height
      }
    }
  }
}
```

FIG. 55

```
SliceMetaData{
    type_of_divide    1:object, 2:other
    if(type_of_divide == 1) {    //object
        slice_overlap_flag    //1:true, 2:false
        if(slice_overlap_flag){
            type_of_overlap
        }

        slice_number

        for(slice_number){
            global_position or relative_position
            slice_bounding_box_size
        }
    }
}
```

FIG. 62

```
TileMetaData{
    type_of_divide
    type_of_divide_null
    if(type_of_divide== A){
        number_of_tiles
        for(number_of_tiles){
            tile_null_flag
            if(tile_null_flag=false){
                origin_x
                origin_y
                origin_z
            }else if (tile_null_flag==true){
                //no data
            }
        }
    }else if (type_of_divide== B){
        //tile_number, origin, null_flag
        divide_information_B();
    }
}
```

FIG. 93

TILE NUMBER = 1

| | tileIdx |
|---|---|
| DEFAULT TILE | 0 |

FIG. 94

TILE NUMBER > 1

| | tileIdx |
|---|---|
| TILE 1 | 1 |
| TILE 2 | 2 |
| TILE 3 | 3 |

FIG. 101

```
TileMetaData{
  number_of_tiles
  if(number_of_tiles!=0){
    bb_bits;
    common_origin_x;
    common_origin_y;
    common_origin_z;
  }
  for(number_of_tiles){
    origin_x  (ENCODE WITH bb_bits)
    origin_y  (ENCODE WITH bb_bits)
    origin_z  (ENCODE WITH bb_bits)
    size_width  (ENCODE WITH bb_bits)
    size_height  (ENCODE WITH bb_bits)
    size_depth  (ENCODE WITH bb_bits)
  }
```

FIG. 102

```
TileMetaData{
  number_of_tiles
 if(number_of_tiles!=0){
   bb_origin_bits;
   bb_size_bits;
   common_origin_x;
   common_origin_y;
   common_origin_z;
  }
  for(number_of_tiles){
    origin_x (ENCODE WITH bb_origin_bits)
    origin_y (ENCODE WITH bb_origin_bits)
    origin_z (ENCODE WITH bb_origin_bits)
    size_width (ENCODE WITH bb_size_bits)
    size_height (ENCODE WITH bb_size_bits)
    size_depth (ENCODE WITH bb_size_bits)
  }
```

FIG. 103

```
TileMetaData{
   number_of_tiles
  if(number_of_tiles!=0){
     common_size_flag
     bb_origin_bits;
     if(common_size_flag != b 000)
        common_bb_size
     if(common_size_flag != b 111)
        bb_size_bits;
   }
   for(number_of_tiles){
      origin_x (ENCODE WITH bb_origin_bits)
      origin_y (ENCODE WITH bb_origin_bits)
      origin_z (ENCODE WITH bb_origin_bits)
      if(common_size_flag[0]==0)
         size_width (ENCODE WITH bb_size_bits)
      if(common_size_flag[1]==0)
         size_height (ENCODE WITH bb_size_bits)
      if(common_size_flag[2]==0)
         size_depth (ENCODE WITH bb_size_bits)
      }
   }
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2021/023778 filed on Jun. 23, 2021, claiming the benefit of priority of U.S. Provisional Patent Application No. 63/042,698 filed on Jun. 23, 2020, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (for example, see Patent Literature (PTL) 1).

CITATION LIST

Patent Literature

PTL 1: International Publication WO 2014/020663

SUMMARY

There has been a demand for reducing the processing amount in the encoding of three-dimensional data.

The present disclosure provides a three-dimensional data encoding method, a three-dimensional data decoding method, a three-dimensional data encoding device, or a three-dimensional data decoding device that is capable of reducing the processing amount in the encoding of three-dimensional data.

A three-dimensional data encoding method according to an aspect of the present disclosure includes: encoding tile information including information on N subspaces which are at least part of a target space in which three-dimensional points are included, and encoding point cloud data of the three-dimensional points based on the tile information, N being an integer greater than or equal to 0; and generating a bitstream including the point cloud data encoded, wherein the tile information includes N items of subspace coordinate information indicating coordinates of the N subspaces, the N items of subspace coordinate information each include three items of coordinate information each indicating a coordinate in a different one of three axial directions in a three-dimensional orthogonal coordinate system, and when N is greater than or equal to 1: (i) in the encoding of the tile information, each of the three items of coordinate information included in each of the N items of subspace coordinate information is encoded using a first fixed length; and (ii) in the generating of the bitstream, the bitstream which includes the N items of subspace coordinate information encoded and first fixed length information indicating the first fixed length is generated.

A three-dimensional data decoding method according to an aspect of the present disclosure includes: obtaining a bitstream including encoded point cloud data of three-dimensional points; and decoding tile information which is encoded and includes information on N subspaces which are at least part of a target space in which the three-dimensional points are included, and decoding the encoded point cloud data based on the tile information, N being an integer greater than or equal to 0, wherein the tile information includes N items of subspace coordinate information indicating coordinates of the N subspaces, the N items of subspace coordinate information each include three items of coordinate information each indicating a coordinate in a different one of three axial directions in a three-dimensional orthogonal coordinate system, and when N is greater than or equal to 1: (i) in the obtaining of the bitstream, the bitstream which includes the N items of subspace coordinate information which are encoded and first fixed length information indicating the first fixed length is obtained; and (ii) in the decoding of the tile information which is encoded, each of the three items of coordinate information which are encoded and included in each of the N items of subspace coordinate information which are encoded is decoded using the first fixed length.

The present disclosure can provide a three-dimensional data encoding method, a three-dimensional data decoding method, a three-dimensional data encoding device, or a three-dimensional data decoding device that is capable of reducing the processing amount in the encoding of three-dimensional data.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 29 is a diagram illustrating a semantics example of pcc_nal_unit_type according to Embodiment 3;

FIG. 37 is a diagram illustrating an example of a method of sorting counts in octree division according to Embodiment 5;

FIG. 53 is a diagram illustrating an example of syntax of tile additional information according to Embodiment 6;

FIG. 55 is a diagram illustrating an example of syntax of slice additional information according to Embodiment 6;

FIG. 62 is a diagram illustrating an example of syntax of tile additional information according to Embodiment 7;

FIG. 93 is a diagram illustrating a setting example of a tile index in a case where a tile number=1, according to Embodiment 8.

FIG. 94 is a diagram illustrating a setting example of the tile index in a case where a tile number>1, according to Embodiment 8.

FIG. 101 is a diagram illustrating a first example of the syntax of tile information according to Embodiment 9.

FIG. 102 is a diagram illustrating a second example of the syntax of tile information according to Embodiment 9.

FIG. 103 is a diagram illustrating a third example of the syntax of tile information according to Embodiment 9.

FIG. 119 is a diagram showing a structure of the server and client devices according to Embodiment 10;

FIG. 120 is a diagram illustrating a configuration of a server and a client device according to Embodiment 10;

FIG. 121 is a flowchart of a process performed by the client device according to Embodiment 10;

FIG. 122 is a diagram illustrating a configuration of a sensor information collection system according to Embodiment 10;

FIG. 123 is a diagram illustrating an example of a system according to Embodiment 10;

FIG. 124 is a diagram illustrating a variation of the system according to Embodiment 10;

FIG. 125 is a flowchart illustrating an example of an application process according to Embodiment 10;

FIG. 126 is a diagram illustrating the sensor range of various sensors according to Embodiment 10;

FIG. 127 is a diagram illustrating a configuration example of an automated driving system according to Embodiment 10;

FIG. 128 is a diagram illustrating a configuration example of a bitstream according to Embodiment 10;

FIG. 129 is a flowchart of a point cloud selection process according to Embodiment 10;

FIG. 130 is a diagram illustrating a screen example for point cloud selection process according to Embodiment 10;

Figure 131:
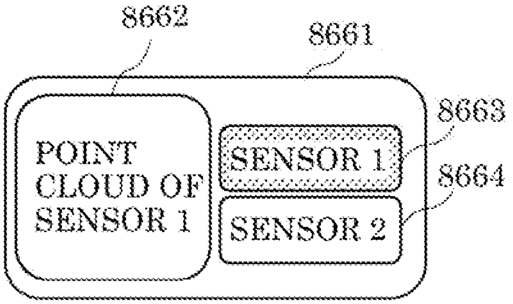
Figure 132:
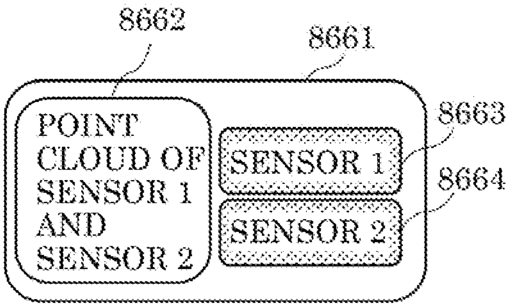

FIG. 131 is a diagram illustrating a screen example of the point cloud selection process according to Embodiment 10; and FIG. 132 is a diagram illustrating a screen example of the point cloud selection process according to Embodiment 10.

DETAILED DESCRIPTION OF THE EMBODIMENTS

A three-dimensional data encoding method according to an aspect of the present disclosure includes: encoding tile information including information on N subspaces which are at least part of a target space in which three-dimensional points are included, and encoding point cloud data of the three-dimensional points based on the tile information, N being an integer greater than or equal to 0; and generating a bitstream including the point cloud data encoded, wherein the tile information includes N items of subspace coordinate information indicating coordinates of the N subspaces, the N items of subspace coordinate information each include three items of coordinate information each indicating a coordinate in a different one of three axial directions in a three-dimensional orthogonal coordinate system, and when N is greater than or equal to 1: (i) in the encoding of the tile information, each of the three items of coordinate information included in each of the N items of subspace coordinate information is encoded using a first fixed length; and (ii) in the generating of the bitstream, the bitstream which includes the N items of subspace coordinate information encoded and first fixed length information indicating the first fixed length is generated.

Accordingly, since each of the three items of coordinate information of each of the N items of subspace coordinate information included in the tile information is encoded using the first fixed length, the processing amount in the encoding can be reduced compared to when encoding is performed using a variable length, for example.

Furthermore, for example, the tile information includes at least one item of size information indicating a size of at least one subspace among the N subspaces. In the encoding of the tile information, each of the at least one item of size information is encoded using a second fixed length. In the generating of the bitstream, the bitstream which includes the at least one item of size information encoded and second fixed length information indicating the second fixed length is generated.

Accordingly, since the size information included in the tile information is encoded using the second fixed length, the processing amount in the encoding can be further reduced compared to when encoding is performed using a variable length, for example.

Furthermore, for example, the three-dimensional data encoding method further includes: determining whether a size of each of the N subspaces matches a predetermined size. In the encoding of the tile information, size information indicating a size of a subspace that does not match the predetermined size among the N subspaces is encoded as the at least one item of size information, using the second fixed length. In the generating of the bitstream, the bitstream which includes common flag information indicating whether the size of each of the N subspaces matches the predetermined size is generated.

Accordingly, in a case the size of a subspace matches the predetermined size, even if size information indicating the size is not included in the encoded bitstream, by including common size information, which indicates whether the subspace matches the predetermined size, in the bitstream, the three-dimensional data decoding device which has obtained the bitstream can appropriately determine the size of the subspace. For this reason, for example, when many subspaces have sizes matching the predetermined size, the data amount of the bitstream to be generated can be reduced, and the processing amount in the encoding of size information can be reduced.

Furthermore, for example, the first fixed length and the second fixed length are of the same length.

Accordingly, since the information indicating each of the first fixed length and the second fixed length can be a single item of information, the data amount of the bitstream to be generated can be reduced.

Furthermore, for example, the tile information includes common origin information indicating coordinates of an origin of the target space, and, in the generating of the bitstream, the bitstream which includes the common origin information is generated.

Accordingly, even if the coordinates of the origin of the target space is not set in advance for example, the three-dimensional data decoding device that has obtained the bitstream can appropriately decode the encoded point cloud data based on the information included in the bitstream.

Furthermore, for example, in the generating of the bitstream, when N is 0, the bitstream that does not include the information on the N subspaces is generated.

Accordingly, the data amount of the bitstream to be generated can be reduced.

A three-dimensional data decoding method according to an aspect of the present disclosure includes: obtaining a bitstream including encoded point cloud data of three-dimensional points; and decoding tile information which is encoded and includes information on N subspaces which are at least part of a target space in which the three-dimensional points are included, and decoding the encoded point cloud data based on the tile information, N being an integer greater than or equal to 0, wherein the tile information includes N items of subspace coordinate information indicating coordinates of the N subspaces, the N items of subspace coordinate information each include three items of coordinate information each indicating a coordinate in a different one of three axial directions in a three-dimensional orthogonal coordinate system, and when N is greater than or equal to 1: (i) in the obtaining of the bitstream, the bitstream which includes the N items of subspace coordinate information which are encoded and first fixed length information indicating the first fixed length is obtained; and (ii) in the decoding of the tile information which is encoded, each of the three items of coordinate information which are encoded and included in each of the N items of subspace coordinate information which are encoded is decoded using the first fixed length.

Accordingly, since each of the three items of coordinate information of each of the encoded N items of subspace coordinate information included in the tile information is decoded using the first fixed length, the processing amount in the decoding can be reduced compared to when decoding is performed using a variable length, for example.

Furthermore, for example, the tile information includes at least one item of size information indicating a size of at least one subspace among the N subspaces. In the obtaining of the bitstream, the bitstream which includes the at least one item of size information which is encoded and second fixed length information indicating the second fixed length is obtained. In the decoding of the tile information which is decoded, each of the at least one item of size information which is encoded is decoded using the second fixed length.

Accordingly, since the encoded size information included in the tile information is decoded using the second fixed length, the processing amount in the decoding can be reduced compared to when decoding is performed using a variable length, for example.

Furthermore, for example, in the obtaining of the bitstream, the bitstream which includes common flag information indicating whether a size of each of the N subspaces matches a predetermined size is obtained. The three-dimensional data decoding method further includes determining whether the size of each of the N subspaces matches the predetermined size based on the common flag information. In the decoding of the tile information which is encoded, encoded size information indicating a size of a subspace that does not match the predetermined size among the N subspaces is decoded as the at least one item of size information which is encoded, using the second fixed length.

Accordingly, in a case the size of a subspace matches the predetermined size, even if size information indicating the size is not included in the encoded bitstream, as long as common size information, which indicates whether the subspace matches the predetermined size, is included in the bitstream, the size of the subspace can be appropriately determined. For this reason, for example, when many subspaces have sizes matching the predetermined size, the data amount of the bitstream to be obtained can be reduced, and the processing amount in the decoding of size information can be reduced.

Furthermore, for example, the first fixed length and the second fixed length are of the same length.

Accordingly, since the information indicating each of the first fixed length and the second fixed length can be a single item of information, the data amount of the bitstream to be obtained can be reduced.

Furthermore, for example, the tile information includes common origin information indicating coordinates of an origin of the target space, and, in the obtaining of the bitstream, the bitstream which includes the common origin information is obtained.

Accordingly, even if the coordinates of the origin of the target space is not set in advance for example, the encoded point cloud data can be appropriately decoded based on the information included in the bitstream.

Furthermore, for example, in the obtaining of the bitstream, when N is 0, the bitstream that does not include the information on the N subspaces is obtained.

Accordingly, the data amount of the bitstream to be obtained can be reduced.

Furthermore, a three-dimensional data encoding device according to an aspect of the present disclosure includes: a processor; and memory. Using the memory, the processor: encodes tile information including information on N subspaces which are at least part of a target space in which three-dimensional points are included, and encoding point cloud data of the three-dimensional points based on the tile information, N being an integer greater than or equal to 0; and generates a bitstream including the point cloud data encoded. The tile information includes N items of subspace coordinate information indicating coordinates of the N subspaces. The N items of subspace coordinate information each include three items of coordinate information each indicating a coordinate in a different one of three axial directions in a three-dimensional orthogonal coordinate system. When N is greater than or equal to 1, the processor: (i) in the encoding of the tile information, encodes, using a first fixed length, each of the three items of coordinate information included in each of the N items of subspace coordinate information; and (ii) in the generating of the bitstream, generates the bitstream which further includes the N items of subspace coordinate information encoded and first fixed length information indicating the first fixed length.

Accordingly, since each of the three items of coordinate information of each of the N items of subspace coordinate information included in the tile information is encoded using the first fixed length, the processing amount in the encoding can be reduced compared to when encoding is performed using a variable length, for example.

Furthermore, a three-dimensional data decoding device according to an aspect of the present disclosure includes: a processor; and memory. Using the memory, the processor: obtains a bitstream including encoded point cloud data of three-dimensional points; and decodes tile information which is encoded and includes information on N subspaces which are at least part of a target space in which the three-dimensional points are included, and decoding the encoded point cloud data based on the tile information, N being an integer greater than or equal to 0. The tile information includes N items of subspace coordinate information indicating coordinates of the N subspaces. The N items of subspace coordinate information each include three items of coordinate information each indicating a coordinate in a different one of three axial directions in a three-dimensional orthogonal coordinate system. When N is greater than or equal to 1, the processor: (i) in the obtaining of the bitstream, obtains the bitstream which includes the N items of subspace coordinate information which are encoded and first fixed length information indicating the first fixed length; and (ii) in the decoding of the tile information which is encoded, decodes, using the first fixed length, each of the three items of coordinate information which are encoded and included in each of the N items of subspace coordinate information which are encoded.

Accordingly, since each of the three items of coordinate information of each of the encoded N items of subspace coordinate information included in the tile information is decoded using the first fixed length, the processing amount in the decoding can be reduced compared to when decoding is performed using a variable length, for example.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims that indicate the broadest concepts will be described as optional constituent elements.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

Figure 1:
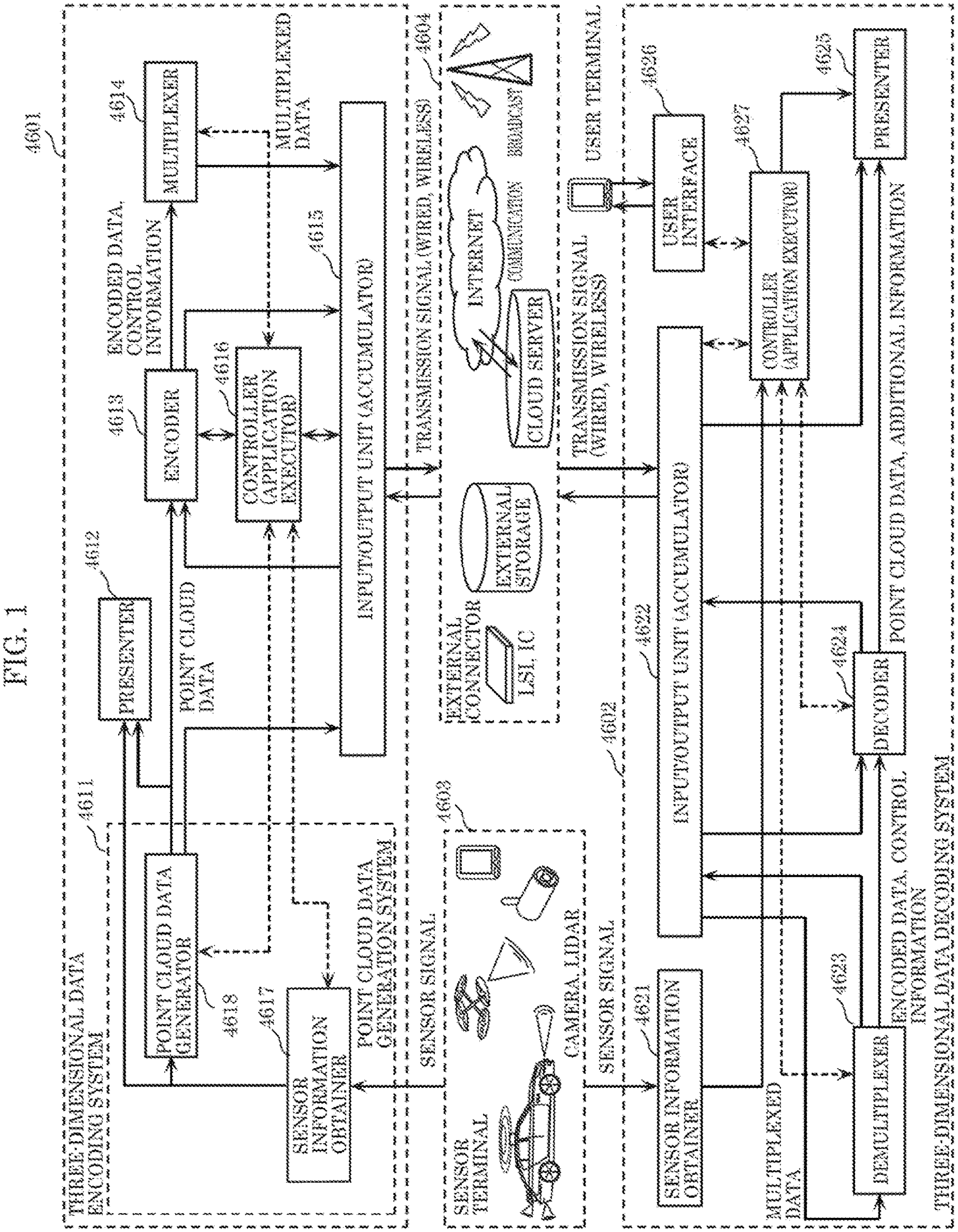
FIG. 1 is a diagram illustrating a configuration of a three-dimensional data encoding and decoding system according to Embodiment 1.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LIDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
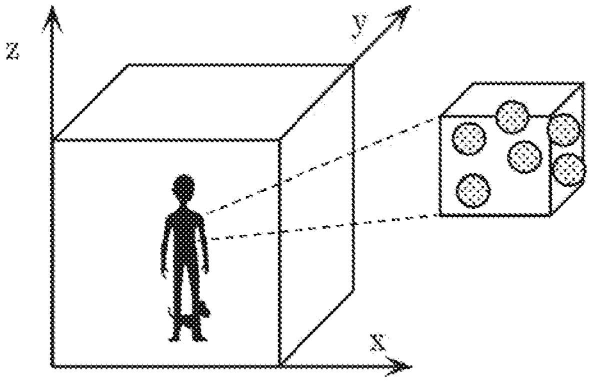
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One piece of attribute information may be associated with one piece of geometry information, or attribute information on a plurality of different types of attributes may be associated with one piece of geometry information. Alternatively, a plurality of pieces of attribute information on the same type of attribute may be associated with one piece of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
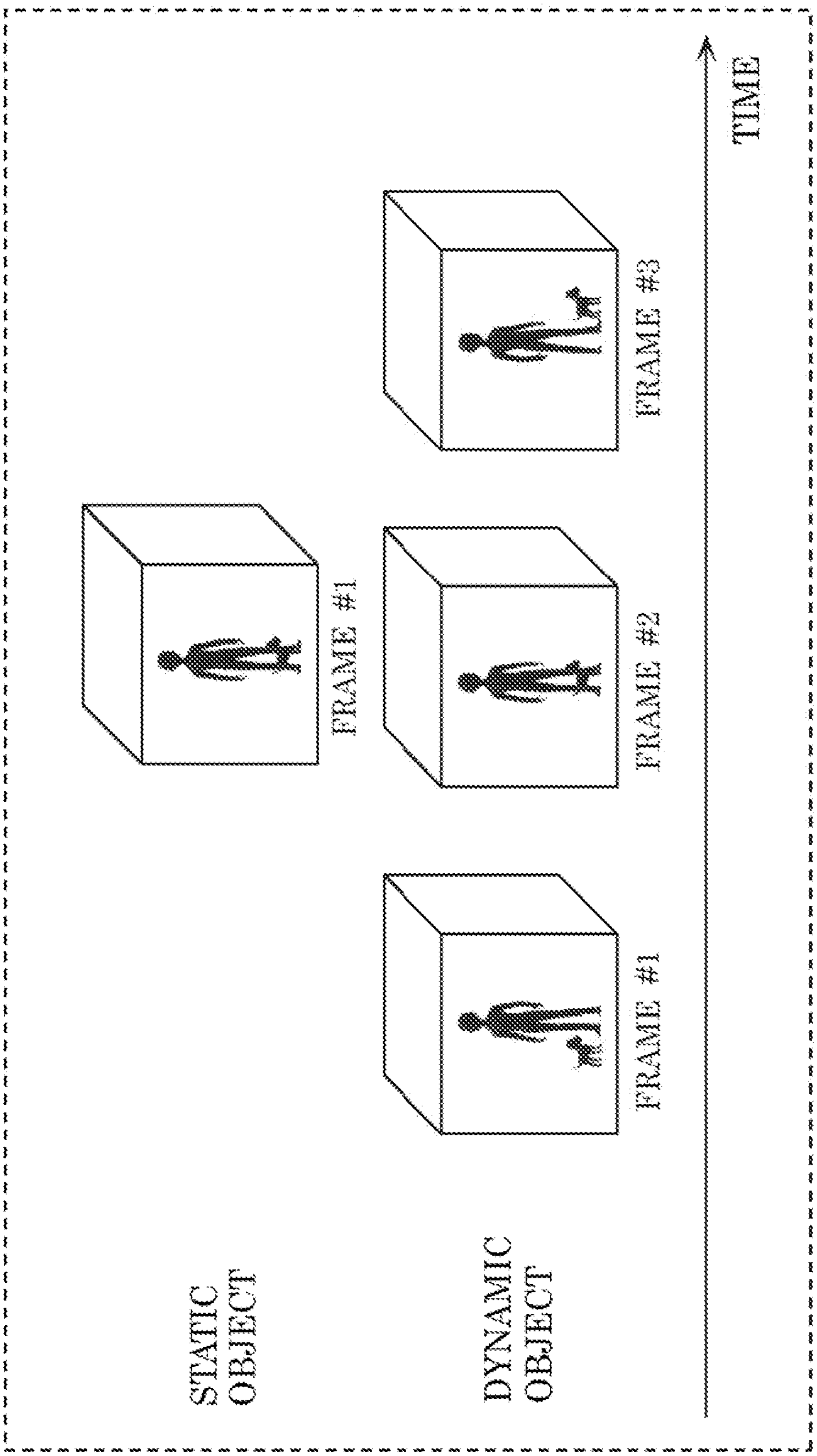
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LIDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
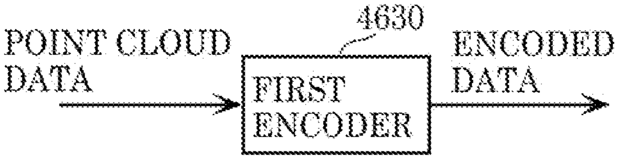
FIG. 5 is a diagram illustrating a structure of a first encoder according to Embodiment 1.
Figure 6:
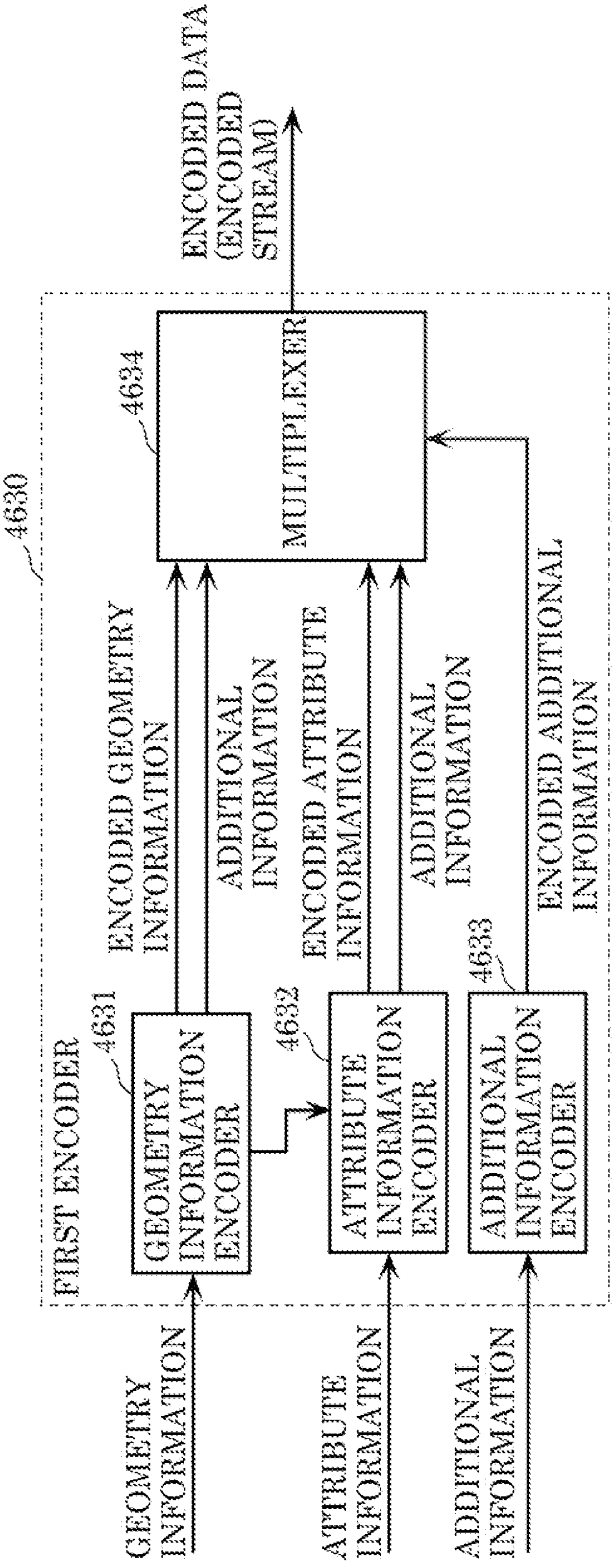
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (current node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
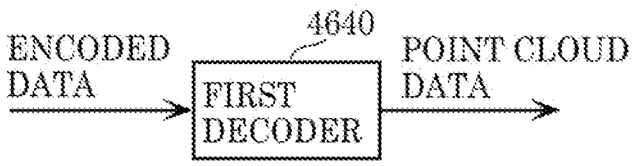
FIG. 7 is a diagram illustrating a structure of a first decoder according to Embodiment 1.
Figure 8:
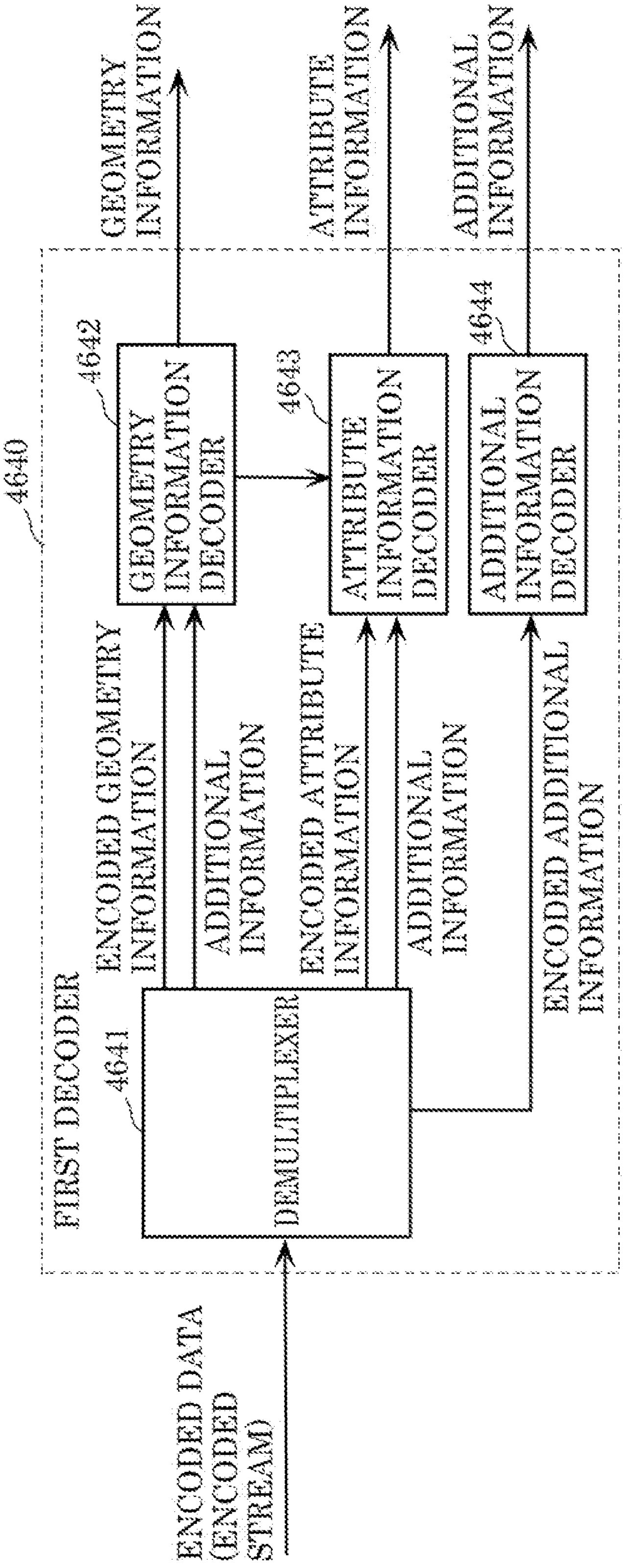
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
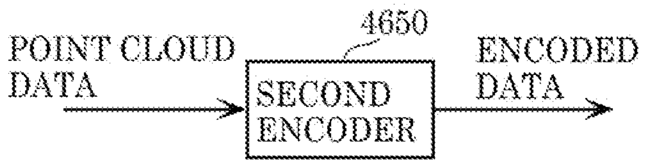
FIG. 9 is a diagram illustrating a structure of a second encoder according to Embodiment 1.
Figure 10:
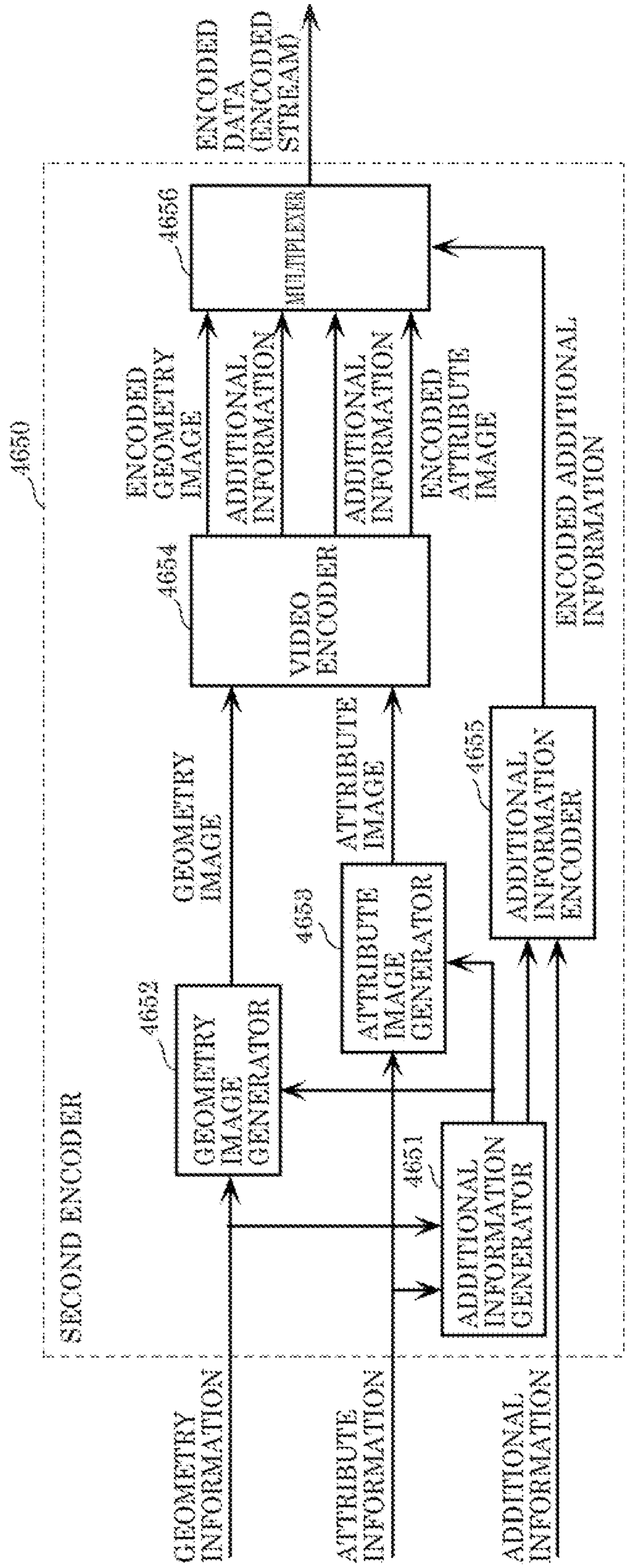
FIG. 10 is a block diagram illustrating the second encoder according to Embodiment 1.

Next, second encoder 4650, which is an example of encoder 4613 that performs encoding in the second encoding method, will be described. FIG. 9 is a diagram showing a configuration of second encoder 4650. FIG. 10 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 11:
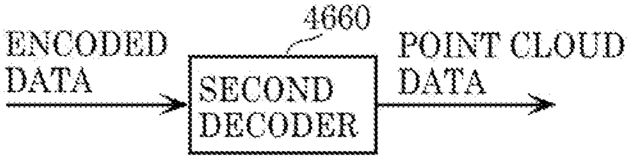
FIG. 11 is a diagram illustrating a structure of a second decoder according to Embodiment 1.
Figure 12:
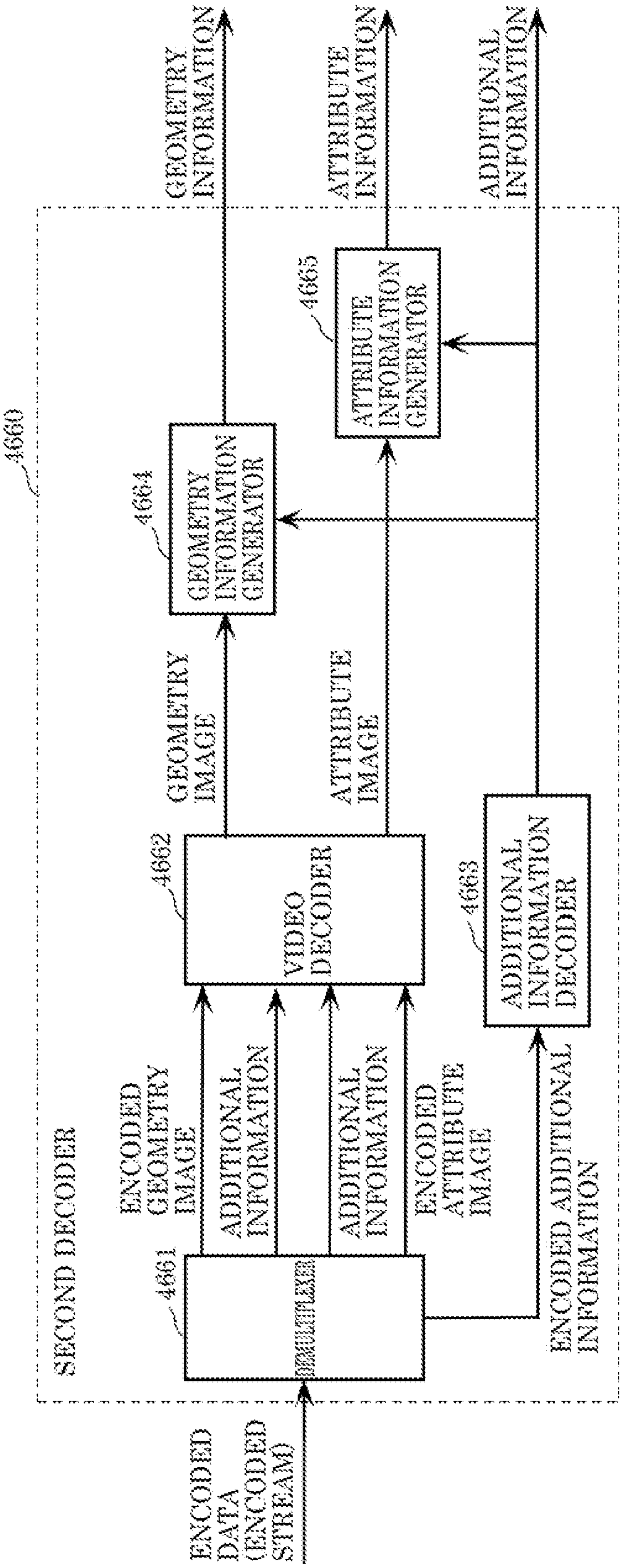
FIG. 12 is a block diagram illustrating the second decoder according to Embodiment 1.

Next, second decoder 4660, which is an example of decoder 4624 that performs decoding in the second encoding method, will be described. FIG. 11 is a diagram showing a configuration of second decoder 4660. FIG. 12 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 13:
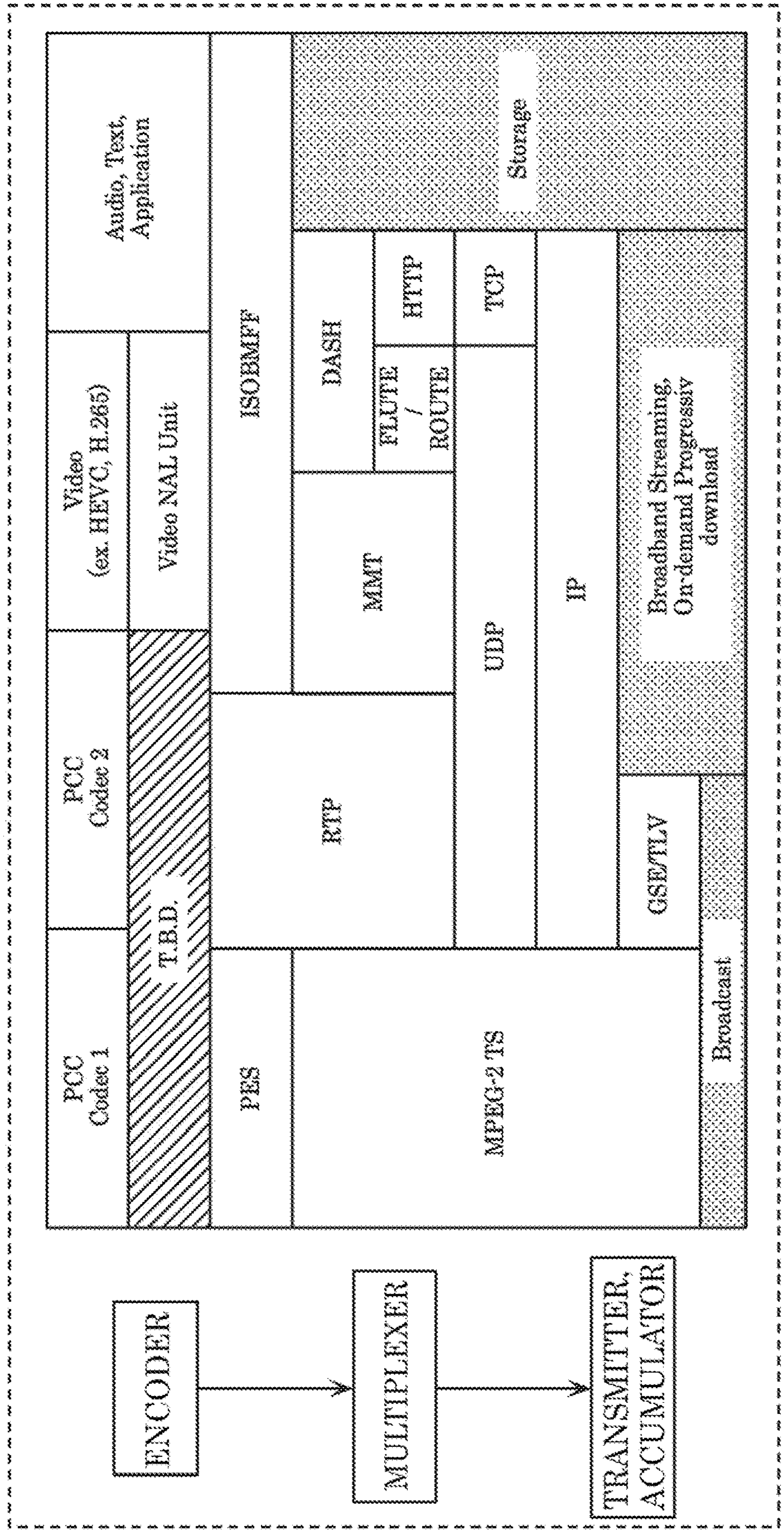
FIG. 13 is a diagram illustrating a protocol stack related to PCC encoded data according to Embodiment 1.

In the following, a problem with the PCC encoding scheme will be described. FIG. 13 is a diagram showing a protocol stack relating to PCC-encoded data. FIG. 13 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

Embodiment 2

In Embodiment 2, a method of storing the NAL unit in an ISOBMFF file will be described.

ISOBMFF is a file format standard prescribed in ISO/IEC14496-12. ISOBMFF is a standard that does not depend on any medium, and prescribes a format that allows various media, such as a video, an audio, and a text, to be multiplexed and stored.

A basic structure (file) of ISOBMFF will be described. A basic unit of ISOBMFF is a box. A box is formed by type, length, and data, and a file is a set of various types of boxes.

Figure 14:
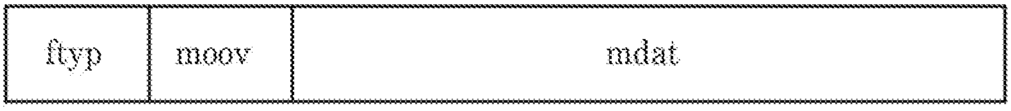
FIG. 14 is a diagram illustrating a basic structure of ISOBMFF according to Embodiment 2.

FIG. 14 is a diagram showing a basic structure (file) of ISOBMFF. A file in ISOBMFF includes boxes, such as ftyp that indicates the brand of the file by four-character code (4CC), moov that stores metadata, such as control information (signaling information), and mdat that stores data.

A method for storing each medium in the ISOBMFF file is separately prescribed. For example, a method of storing an AVC video or an HEVC video is prescribed in ISO/IEC14496-15. Here, it can be contemplated to expand the functionality of ISOBMFF and use ISOBMFF to accumulate or transmit PCC-encoded data. However, there has been no convention for storing PCC-encoded data in an ISOBMFF file. In this embodiment, a method of storing PCC-encoded data in an ISOBMFF file will be described.

Figure 15:
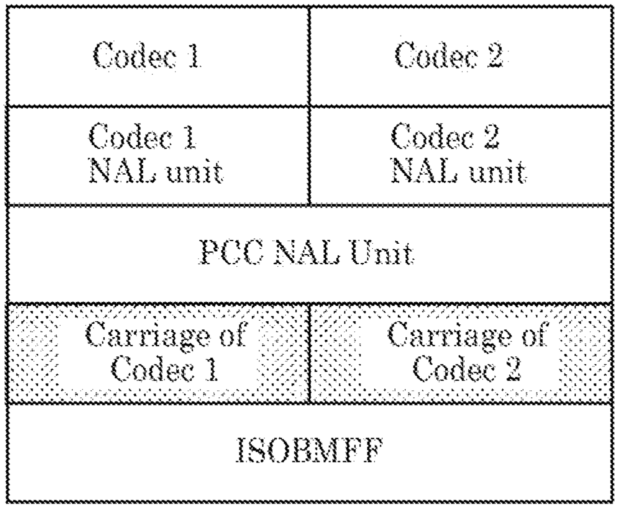
FIG. 15 is a diagram illustrating a protocol stack according to Embodiment 2.

FIG. 15 is a diagram showing a protocol stack in a case where a common PCC codec NAL unit in an ISOBMFF file. Here, a common PCC codec NAL unit is stored in an ISOBMFF file. Although the NAL unit is common to PCC codecs, a storage method for each codec (Carriage of Codec1, Carriage of Codec2) is desirably prescribed, since a plurality of PCC codecs are stored in the NAL unit.

Figure 16:
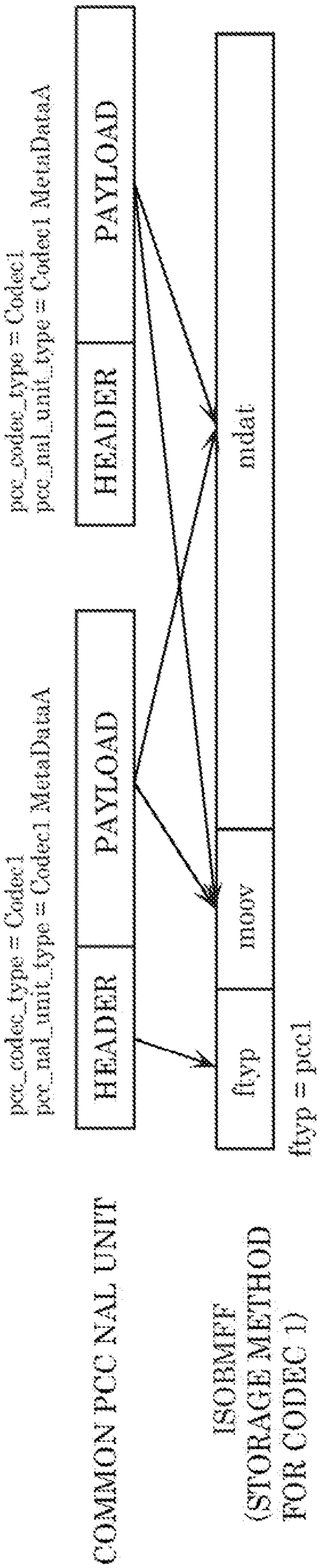
FIG. 16 is a diagram illustrating an example where a NAL unit is stored in a file for codec 1 according to Embodiment 2.
Figure 17:
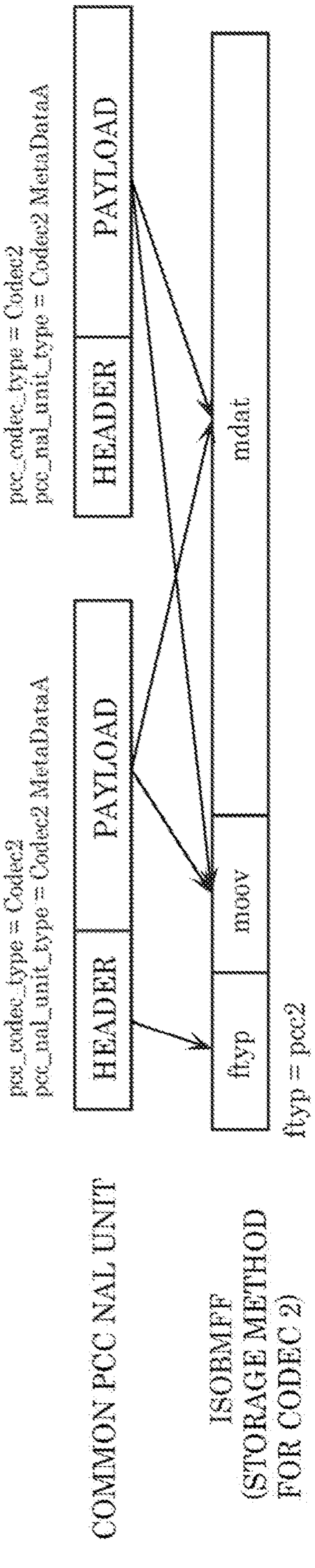
FIG. 17 is a diagram illustrating an example where a NAL unit is stored in a file for codec 2 according to Embodiment 2.

Next, a method of storing a common PCC NAL unit that supports a plurality of PCC codecs in an ISOBMFF file will be described. FIG. 16 is a diagram showing an example in which a common PCC NAL unit is stored in an ISOBMFF file for the storage method for codec 1 (Carriage of Codec1). FIG. 17 is a diagram showing an example in which a common PCC NAL unit is stored in an ISOBMFF file for the storage method for codec 2 (Carriage of Codec2).

Here, ftyp is information that is important for identification of the file format, and a different identifier of ftyp is defined for each codec. When PCC-encoded data encoded in the first encoding method (encoding scheme) is stored in the file, ftyp is set to pcc1. When PCC-encoded data encoded in the second encoding method is stored in the file, ftyp is set to pcc2.

Here, pcc1 indicates that PCC codec 1 (first encoding method) is used. pcc2 indicates that PCC codec2 (second encoding method) is used. That is, pcc1 and pcc2 indicate that the data is PCC (encoded three-dimensional data (point cloud data)), and indicate the PCC codec (first encoding method or second encoding method).

In the following, a method of storing a NAL unit in an ISOBMFF file will be described. The multiplexer analyzes the NAL unit header, and describes pcc1 in ftyp of ISOBMFF if pcc_codec_type=Codec1.

The multiplexer analyzes the NAL unit header, and describes pcc2 in ftyp of ISOBMFF if pcc_codec_type=Codec2.

If pcc_nal_unit_type is metadata, the multiplexer stores the NAL unit in moov or mdat in a predetermined manner, for example. If pcc_nal_unit_type is data, the multiplexer stores the NAL unit in moov or mdat in a predetermined manner, for example.

For example, the multiplexer may store the NAL unit size in the NAL unit, as with HEVC.

According to this storage method, the demultiplexer (a system layer) can determine whether the PCC-encoded data is encoded in the first encoding method or the second encoding method by analyzing ftyp included in the file. Furthermore, as described above, by determining whether the PCC-encoded data is encoded in the first encoding method or the second encoding method, the encoded data encoded in any one of the encoding methods can be extracted from the data including both the encoded data encoded in the encoding methods. Therefore, when transmitting the encoded data, the amount of data transmitted can be reduced. In addition, according to this storage method, different data (file) formats do not need to be set for the first encoding method and the second encoding method, and a common data format can be used for the first encoding method and the second encoding method.

Note that, when the identification information for the codec, such as ftyp of ISOBMFF, is indicated in the metadata of the system layer, the multiplexer can store a NAL unit without pcc_nal_unit_type in the ISOBMFF file.

Next, configurations and operations of the multiplexer of the three-dimensional data encoding system (three-dimensional data encoding device) according to this embodiment and the demultiplexer of the three-dimensional data decoding system (three-dimensional data decoding device) according to this embodiment will be described.

Figure 18:
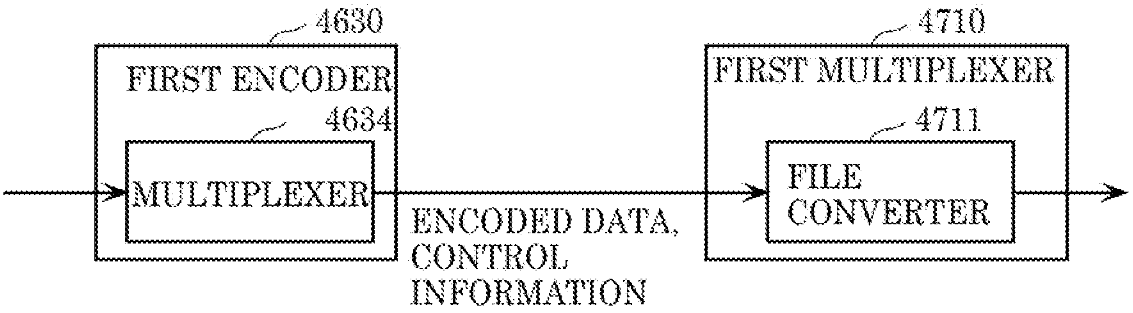
FIG. 18 is a diagram illustrating a structure of a first multiplexer according to Embodiment 2.

FIG. 18 is a diagram showing a configuration of first multiplexer 4710. First multiplexer 4710 includes file converter 4711 that generates multiplexed data (file) by storing encoded data generated by first encoder 4630 and control information (NAL unit) in an ISOBMFF file. First multiplexer 4710 is included in multiplexer 4614 shown in FIG. 1, for example.

Figure 19:
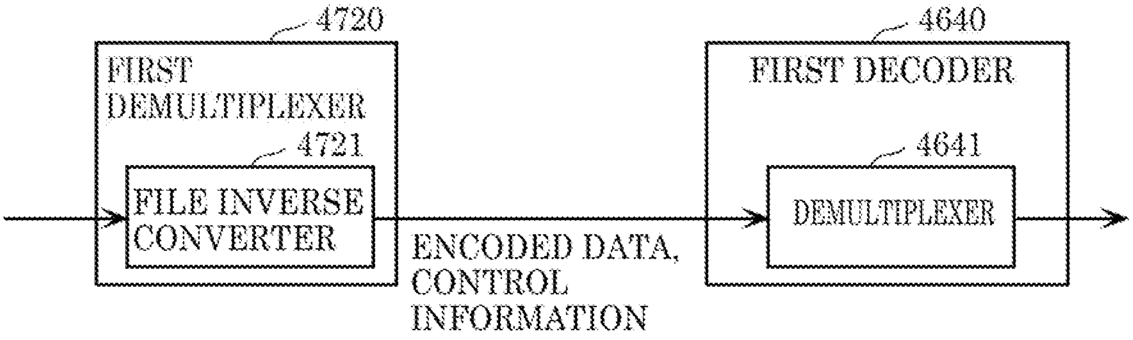
FIG. 19 is a diagram illustrating a structure of a first demultiplexer according to Embodiment 2.

FIG. 19 is a diagram showing a configuration of first demultiplexer 4720. First demultiplexer 4720 includes file inverse converter 4721 that obtains encoded data and control information (NAL unit) from multiplexed data (file) and outputs the obtained encoded data and control information to first decoder 4640. First demultiplexer 4720 is included in demultiplexer 4623 shown in FIG. 1, for example.

Figure 20:
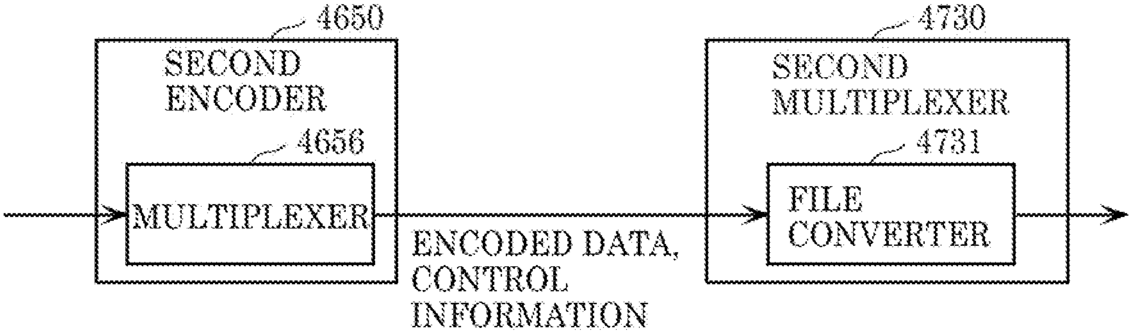
FIG. 20 is a diagram illustrating a structure of a second multiplexer according to Embodiment 2.

FIG. 20 is a diagram showing a configuration of second multiplexer 4730. Second multiplexer 4730 includes file converter 4731 that generates multiplexed data (file) by storing encoded data generated by second encoder 4650 and control information (NAL unit) in an ISOBMFF file. Second multiplexer 4730 is included in multiplexer 4614 shown in FIG. 1, for example.

Figure 21:
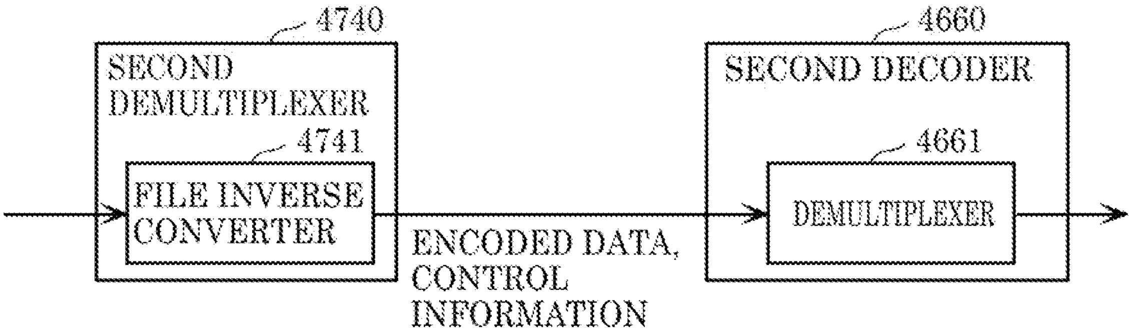
FIG. 21 is a diagram illustrating a structure of a second demultiplexer according to Embodiment 2.

FIG. 21 is a diagram showing a configuration of second demultiplexer 4740. Second demultiplexer 4740 includes file inverse converter 4741 that obtains encoded data and control information (NAL unit) from multiplexed data (file) and outputs the obtained encoded data and control information to second decoder 4660. Second demultiplexer 4740 is included in demultiplexer 4623 shown in FIG. 1, for example.

Figure 22:
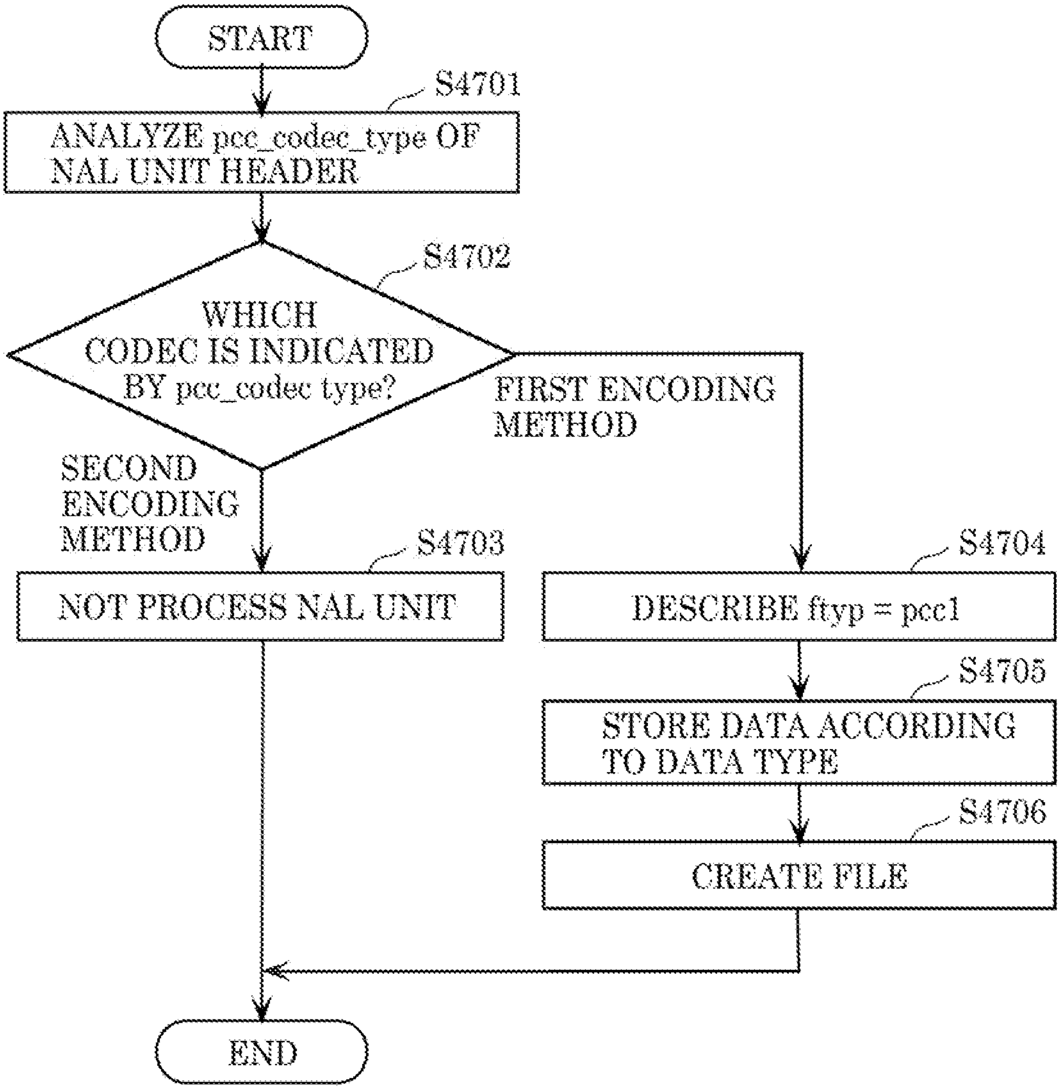
FIG. 22 is a flowchart of processing performed by the first multiplexer according to Embodiment 2.

FIG. 22 is a flowchart showing a multiplexing process by first multiplexer 4710. First, first multiplexer 4710 analyzes pcc_codec_type in the NAL unit header, thereby determining whether the codec used is the first encoding method or the second encoding method (S4701).

When pcc_codec_type represents the second encoding method (if "second encoding method" in S4702), first multiplexer 4710 does not process the NAL unit (S4703).

On the other hand, when pcc_codec_type represents the first encoding method (if "first encoding method" in S4702), first multiplexer 4710 describes pcc1 in ftyp (S4704). That is, first multiplexer 4710 describes information indicating that data encoded in the first encoding method is stored in the file in ftyp.

First multiplexer 4710 then analyzes pcc_nal_unit_type in the NAL unit header, and stores the data in a box (moov or mdat, for example) in a predetermined manner suitable for the data type represented by pcc_nal_unit_type (S4705). First multiplexer 4710 then creates an ISOBMFF file including the ftyp described above and the box described above (S4706).

Figure 23:
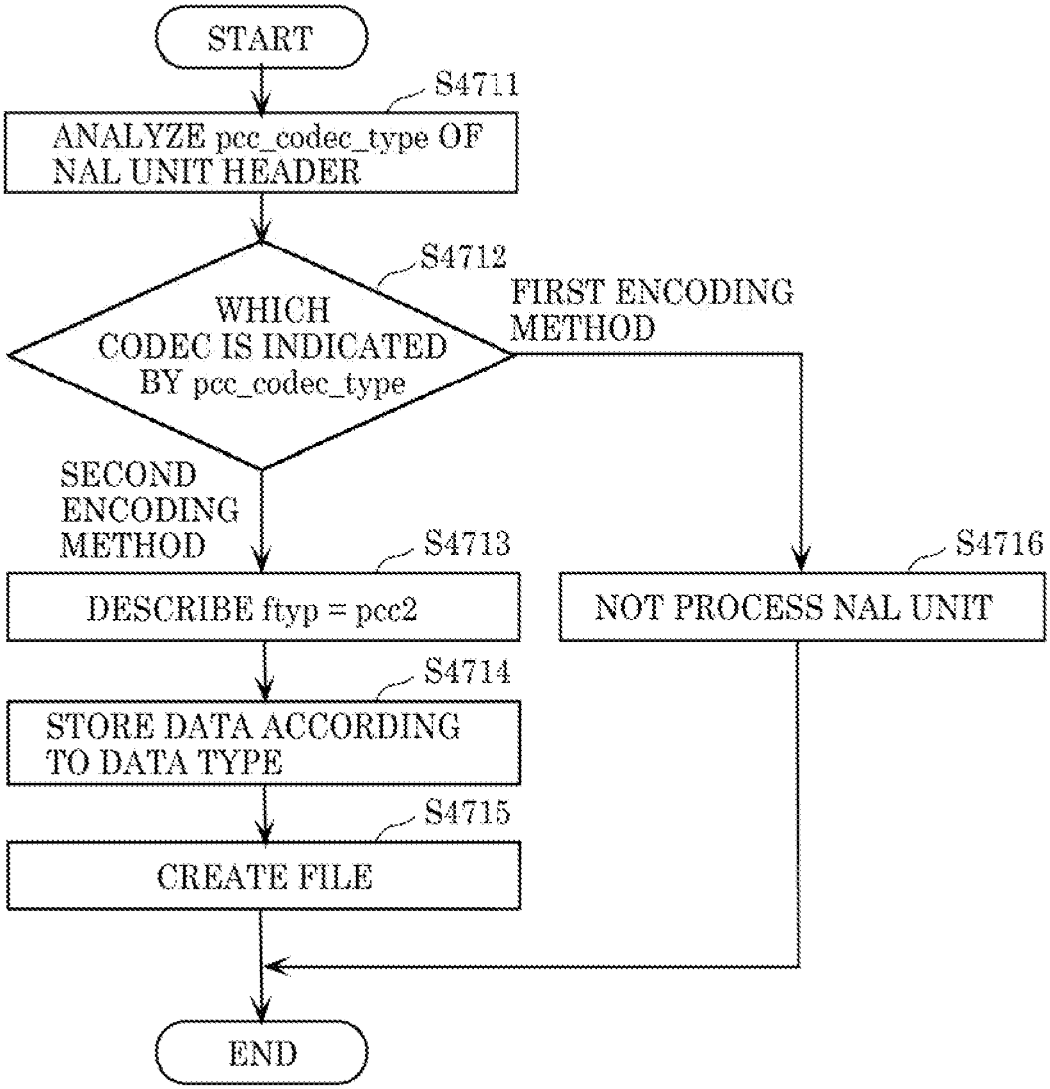
FIG. 23 is a flowchart of processing performed by the second multiplexer according to Embodiment 2.

FIG. 23 is a flowchart showing a multiplexing process by second multiplexer 4730. First, second multiplexer 4730 analyzes pcc_codec_type in the NAL unit header, thereby determining whether the codec used is the first encoding method or the second encoding method (S4711).

When pcc_codec_type represents the second encoding method (if "second encoding method" in S4712), second multiplexer 4730 describes pcc2 in ftyp (S4713). That is, second multiplexer 4730 describes information indicating that data encoded in the second encoding method is stored in the file in ftyp.

Second multiplexer 4730 then analyzes pcc_nal_unit_type in the NAL unit header, and stores the data in a box (moov or mdat, for example) in a predetermined manner suitable for the data type represented by pcc_nal_unit_type (S4714). Second multiplexer 4730 then creates an ISOBMFF file including the ftyp described above and the box described above (S4715).

On the other hand, when pcc_codec_type represents the first encoding method (if "first encoding method" in S4712), second multiplexer 4730 does not process the NAL unit (S4716).

Note that the process described above is an example in which PCC data is encoded in any one of the first encoding method and the second encoding method. First multiplexer 4710 and second multiplexer 4730 store a desired NAL unit in a file by identifying the codec type of the NAL unit. Note that, when the identification information for the PCC codec is included in a location other than the NAL unit header, first multiplexer 4710 and second multiplexer 4730 may identify the codec type (first encoding method or second encoding method) based on the identification information for the PCC codec included in the location other than the NAL unit header in step S4701 or S4711.

When storing data in a file in step S4706 or S4714, first multiplexer 4710 and second multiplexer 4730 may store the data in the file after deleting pcc_nal_unit_type from the NAL unit header.

Figure 24:
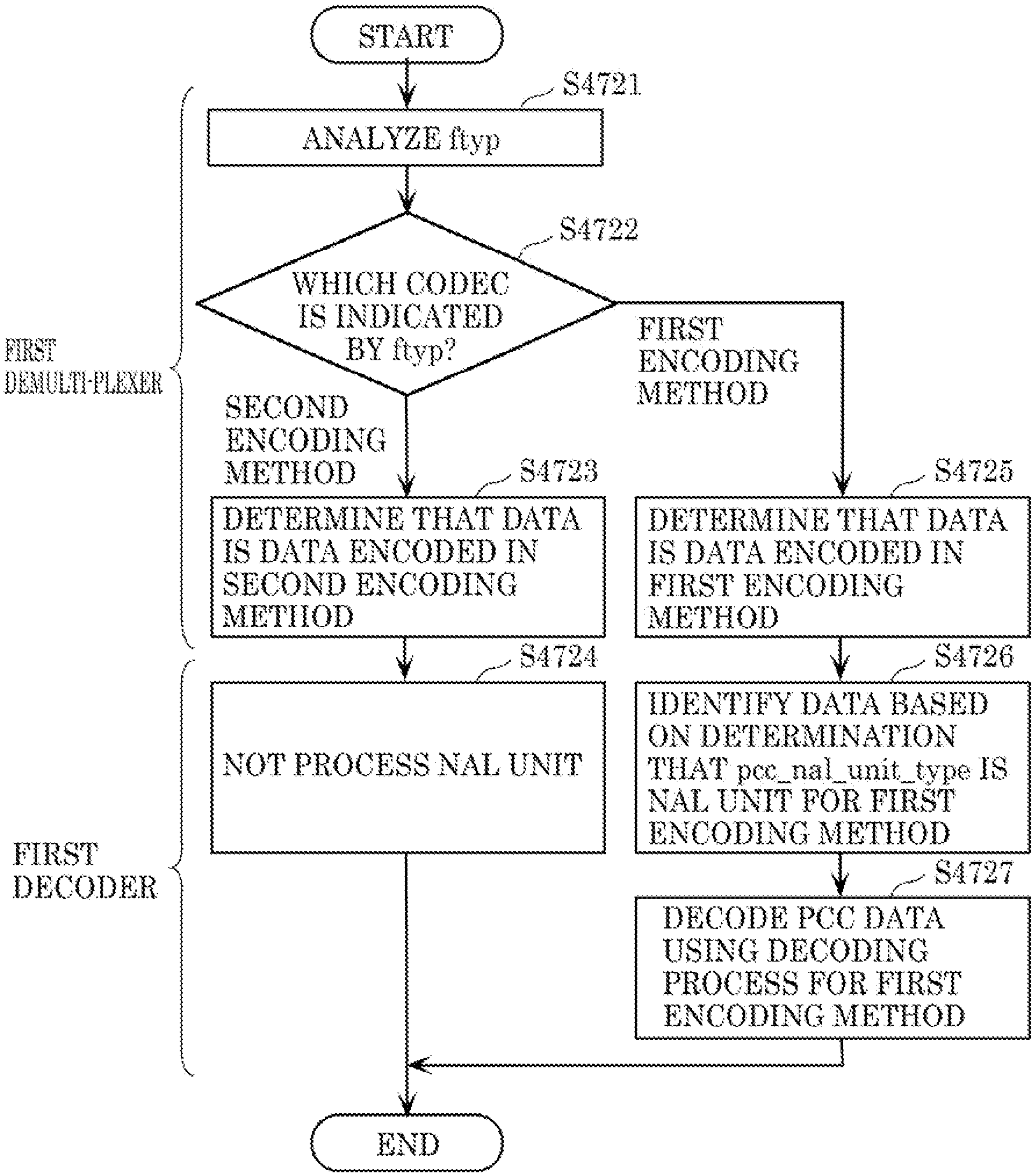
FIG. 24 is a flowchart of processing performed by the first demultiplexer and the first decoder according to Embodiment 2.

FIG. 24 is a flowchart showing a process performed by first demultiplexer 4720 and first decoder 4640. First, first demultiplexer 4720 analyzes ftyp in an ISOBMFF file (S4721). When the codec represented by ftyp is the second encoding method (pcc2) (if "second encoding method" in S4722), first demultiplexer 4720 determines that the data included in the payload of the NAL unit is data encoded in the second encoding method (S4723). First demultiplexer 4720 also transmits the result of the determination to first decoder 4640. First decoder 4640 does not process the NAL unit (S4724).

On the other hand, when the codec represented by ftyp is the first encoding method (pcc1) (if "first encoding method" in S4722), first demultiplexer 4720 determines that the data included in the payload of the NAL unit is data encoded in the first encoding method (S4725). First demultiplexer 4720 also transmits the result of the determination to first decoder 4640.

First decoder 4640 identifies the data based on the determination that pcc_nal_unit_type in the NAL unit header is the identifier of the NAL unit for the first encoding method (S4726). First decoder 4640 then decodes the PCC data using a decoding process for the first encoding method (S4727).

Figure 25:
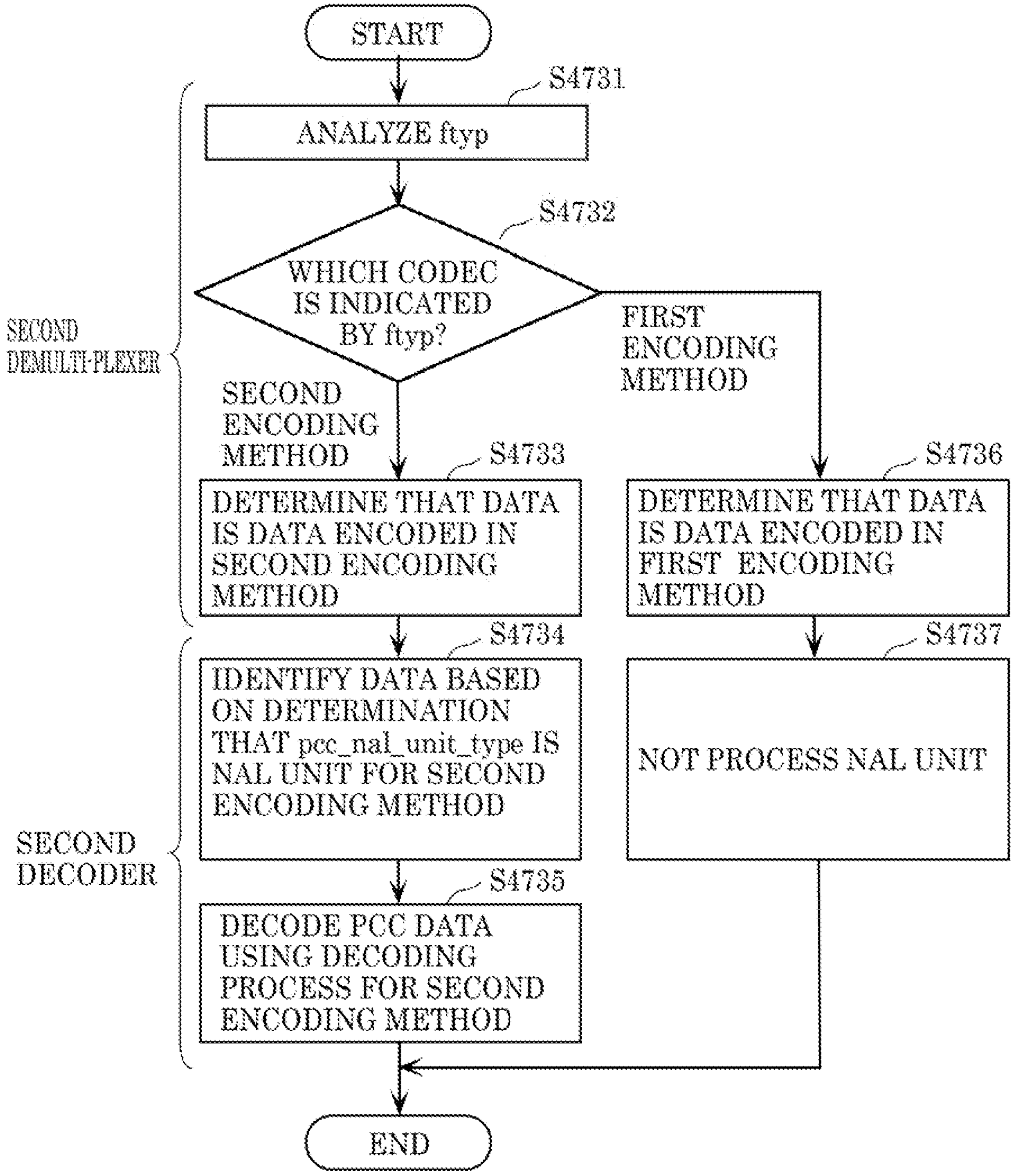
FIG. 25 is a flowchart of processing performed by the second demultiplexer and the second decoder according to Embodiment 2.

FIG. 25 is a flowchart showing a process performed by second demultiplexer 4740 and second decoder 4660. First, second demultiplexer 4740 analyzes ftyp in an ISOBMFF file (S4731). When the codec represented by ftyp is the second encoding method (pcc2) (if "second encoding method" in S4732), second demultiplexer 4740 determines that the data included in the payload of the NAL unit is data encoded in the second encoding method (S4733). Second demultiplexer 4740 also transmits the result of the determination to second decoder 4660.

Second decoder 4660 identifies the data based on the determination that pcc_nal_unit_type in the NAL unit header is the identifier of the NAL unit for the second encoding method (S4734). Second decoder 4660 then decodes the PCC data using a decoding process for the second encoding method (S4735).

On the other hand, when the codec represented by ftyp is the first encoding method (pcc1) (if "first encoding method" in S4732), second demultiplexer 4740 determines that the data included in the payload of the NAL unit is data encoded in the first encoding method (S4736). Second demultiplexer 4740 also transmits the result of the determination to second decoder 4660. Second decoder 4660 does not process the NAL unit (S4737).

As described above, for example, since the codec type of the NAL unit is identified in first demultiplexer 4720 or second demultiplexer 4740, the codec type can be identified in an early stage. Furthermore, a desired NAL unit can be input to first decoder 4640 or second decoder 4660, and an unwanted NAL unit can be removed. In this case, the process of first decoder 4640 or second decoder 4660 analyzing the identification information for the codec may be unnecessary. Note that a process of referring to the NAL unit type again and analyzing the identification information for the codec may be performed by first decoder 4640 or second decoder 4660.

Furthermore, if pcc_nal_unit_type is deleted from the NAL unit header by first multiplexer 4710 or second multiplexer 4730, first demultiplexer 4720 or second demultiplexer 4740 can output the NAL unit to first decoder 4640 or second decoder 4660 after adding pcc_nal_unit_type to the NAL unit.

Embodiment 3

In this embodiment, types of the encoded data (geometry information (geometry), attribute information (attribute), and additional information (meta data)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 26:
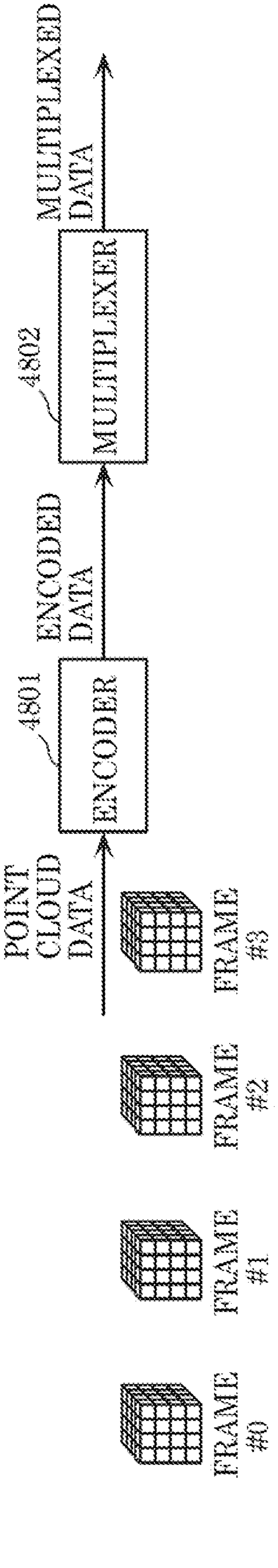
FIG. 26 is a diagram illustrating structures of an encoder and a multiplexer according to Embodiment 3.

FIG. 26 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 27:
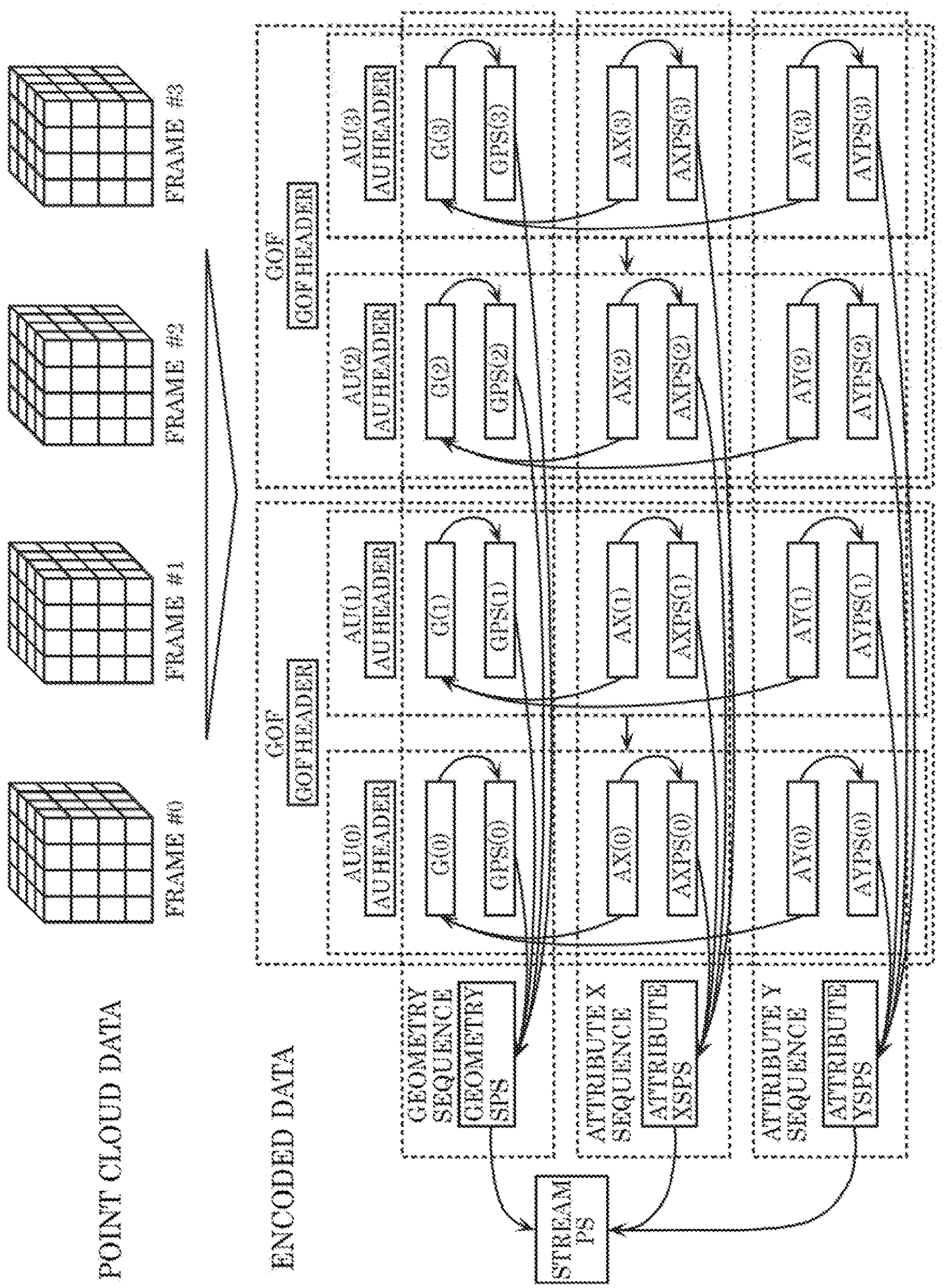
FIG. 27 is a diagram illustrating a structure example of encoded data according to Embodiment 3.

FIG. 27 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 27 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 27 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 27 shows an example in which there is one type of geometry information, and there are two types of attribute information, the present invention is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (meta data) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 28:
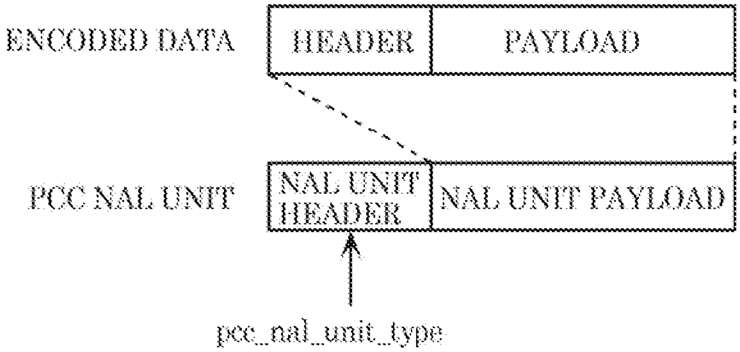
FIG. 28 is a diagram illustrating a structure example of encoded data and a NAL unit according to Embodiment 3.

For example, a data format is defined for each type of encoded data. FIG. 28 is a diagram showing an example of encoded data and a NAL unit.

For example, as shown in FIG. 28, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 29 is a diagram showing a semantics example of pcc_nal_unit_type.

As shown in FIG. 29, when pcc_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pcc_codec_type is codec 2 (Codec2: second encoding method), values of 0 to 2 of pcc_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 30:
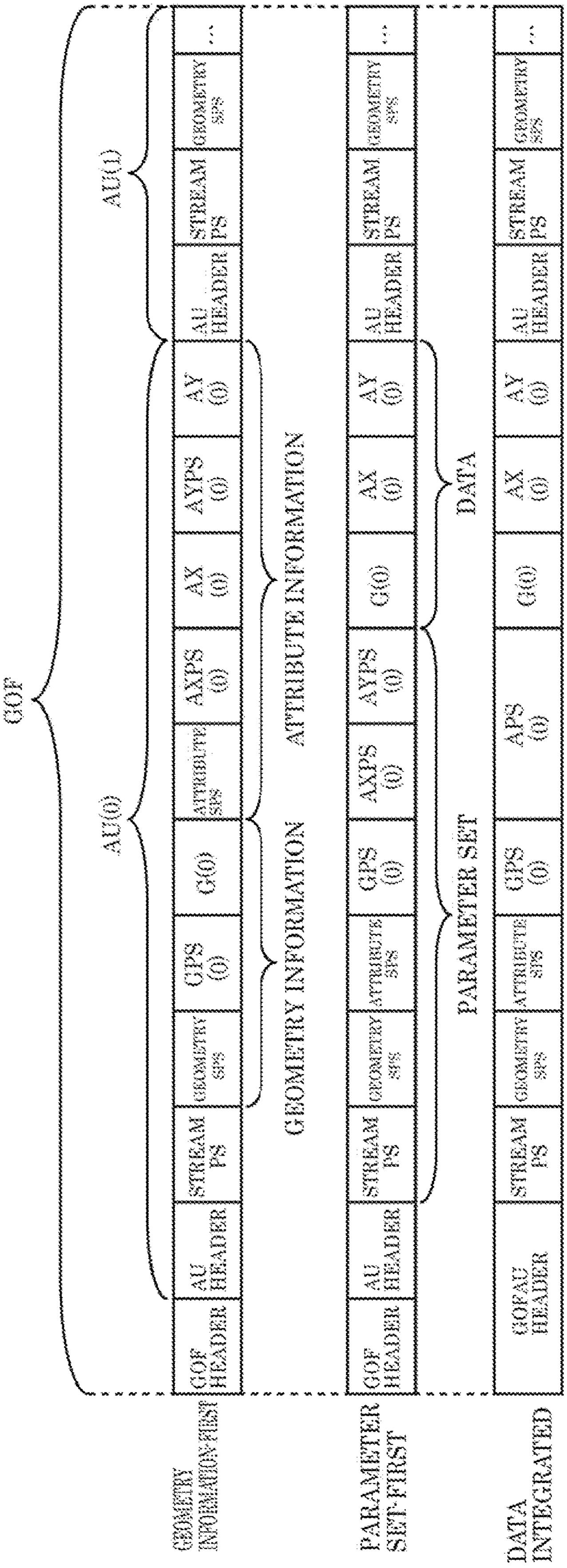
FIG. 30 is a diagram illustrating an example of a transmitting order of NAL units according to Embodiment 3.

FIG. 30 is a diagram showing examples of the order of transmission of NAL units. FIG. 30 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 30 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 30, the GOF header and the AU header may be integrated, or AXPS and AYPS may be integrated. In such a case, an identifier that indicates data having a plurality of functions is defined in pcc_nal_unit_type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the divided slices or tiles as divided data. The divided data includes information for identifying the divided data, and a parameter used for decoding of the divided data is included in the parameter set. In this case, an identifier that indicates that the data is data relating to a tile or slice or data storing a parameter is defined in pcc_nal_unit_type.

Figure 31:
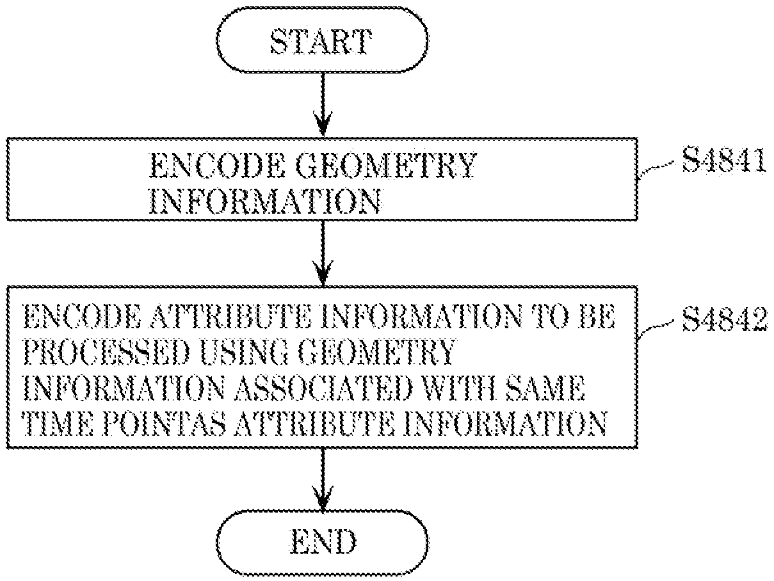
FIG. 31 is a flowchart of processing performed by a three-dimensional data encoding device according to Embodiment 3.

As described above, the three-dimensional data encoding device performs the process shown in FIG. 31. The three-dimensional data encoding device encodes time-series three-dimensional data (point cloud data on a dynamic object, for example). The three-dimensional data includes geometry information and attribute information associated with each time point.

First, the three-dimensional data encoding device encodes the geometry information (S4841). The three-dimensional data encoding device then encodes the attribute information to be processed by referring to the geometry information associated with the same time point as the attribute information to be processed (S4842). Here, as shown in FIG. 27, the geometry information and the attribute information associated with the same time point form an access unit (AU). That is, the three-dimensional data encoding device encodes the attribute information to be processed by referring to the geometry information included in the same access unit as the attribute information to be processed.

In this way, the three-dimensional data encoding device can take advantage of the access unit to facilitate control of reference in encoding. Therefore, the three-dimensional data encoding device can reduce the processing amount of the encoding process.

For example, the three-dimensional data encoding device generates a bitstream including the encoded geometry information (encoded geometry data), the encoded attribute information (encoded attribute data), and information indicating the geometry information of the entity to be referred to when encoding the attribute information to be processed.

For example, the bitstream includes a geometry parameter set (geometry PS) that includes control information for the geometry information associated with each time point and an attribute parameter set (attribute PS) that includes control information for the attribute information associated with each time point.

For example, the bitstream includes a geometry sequence parameter set (geometry SPS) that includes control information that is common to a plurality of pieces of geometry information associated with different time points and attribute sequence parameter set (attribute SPS) that includes control information that is common to a plurality of pieces of attribute information associated with different time points.

For example, the bitstream includes a stream parameter set (stream PS) that includes control information that is common to a plurality of pieces of geometry information associated with different time points and a plurality of pieces of attribute information associated with different time points.

For example, the bitstream includes an access unit header (AU header) that includes control information that is common in an access unit.

For example, the three-dimensional data encoding device performs encoding in such a manner that groups of frames (GOFs) formed by one or more access units can be independently decoded. That is, the GOF is a random access unit.

For example, the bitstream includes a GOF header that includes control information that is common in a GOF.

For example, the three-dimensional data encoding device includes a processor and a memory, and the processor performs the processes described above using the memory.

Figure 32:
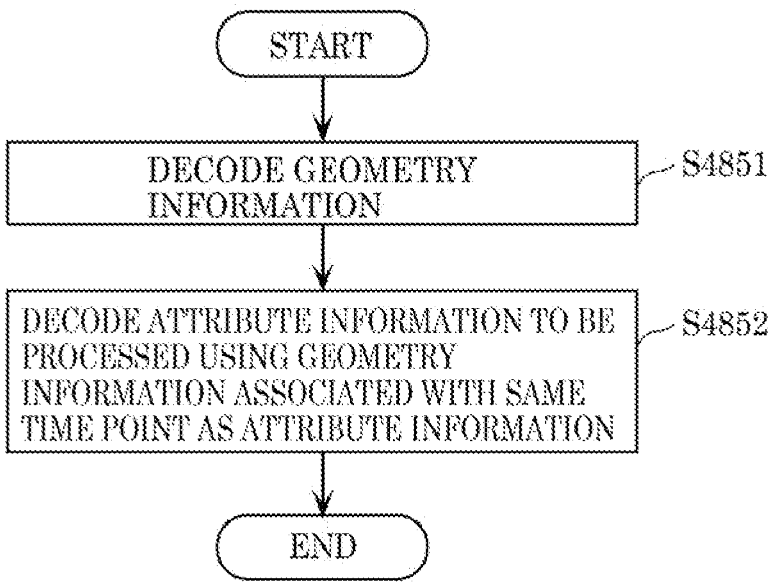
FIG. 32 is a flowchart of processing performed by a three-dimensional data decoding device according to Embodiment 3.

As described above, the three-dimensional data decoding device performs the process shown in FIG. 32. The three-dimensional data decoding device decodes time-series three-dimensional data (point cloud data on a dynamic object, for example). The three-dimensional data includes geometry information and attribute information associated with each time point. The geometry information and the attribute information associated with the same time point forms an access unit (AU).

First, the three-dimensional data decoding device decodes the bitstream to obtain the geometry information (S4851). That is, the three-dimensional data decoding device generates the geometry information by decoding the encoded geometry information (encoded geometry data) included in the bitstream.

The three-dimensional data decoding device then decodes the bitstream to obtain the attribute information to be processed by referring to the geometry information associated with the same time point as the attribute information to be processed (S4852). That is, the three-dimensional data decoding device generates the attribute information by decoding the encoded attribute information (encoded attribute data) included in the bitstream. In this process, the three-dimensional data decoding device refers to the decoded geometry information included in the access unit as the attribute information.

In this way, the three-dimensional data decoding device can take advantage of the access unit to facilitate control of reference in decoding. Therefore, the three-dimensional data decoding device can reduce the processing amount of the decoding process.

For example, the three-dimensional data decoding device obtains, from the bitstream, information indicating the geometry information of the entity to be referred to when decoding the attribute information to be processed, and decodes the attribute information to be processed by referring to the geometry information of the entity to be referred to indicated by the obtained information.

For example, the bitstream includes a geometry parameter set (geometry PS) that includes control information for the geometry information associated with each time point and an attribute parameter set (attribute PS) that includes control information for the attribute information associated with each time point. That is, the three-dimensional data decoding device uses the control information included in the geometry parameter set associated with the time point to be intended for processing to decode the geometry information associated with the time point intended for processing, and uses the control information included in the attribute parameter set associated with the time point intended for processing to decode the attribute information associated with the time point intended for processing.

For example, the bitstream includes a geometry sequence parameter set (geometry SPS) that includes control information that is common to a plurality of pieces of geometry information associated with different time points and an attribute sequence parameter set (attribute SPS) that includes control information that is common to a plurality of pieces of attribute information associated with different time points. That is, the three-dimensional data decoding device uses the control information included in the geometry sequence parameter set to decode a plurality of pieces of geometry information associated with different time points, and uses the control information included in the attribute sequence parameter set to decode a plurality of pieces of attribute information associated with different time points.

For example, the bitstream includes a stream parameter set (stream PS) that includes control information that is common to a plurality of pieces of geometry information associated with different time points and a plurality of pieces of attribute information associated with different time points. That is, the three-dimensional data decoding device uses the control information included in the stream parameter set to decode a plurality of pieces of geometry information associated with different time points and a plurality of pieces of attribute information associated with different time points.

For example, the bitstream includes an access unit header (AU header) that includes control information that is common in an access unit. That is, the three-dimensional data decoding device uses the control information included in the access unit header to decode the geometry information and the attribute information included in the access unit.

For example, the three-dimensional data decoding device independently decodes groups of frames (GOFs) formed by one or more access units. That is, the GOF is a random access unit.

For example, the bitstream includes a GOF header that includes control information that is common in a GOF. That is, the three-dimensional data decoding device decodes the geometry information and the attribute information included in the GOF using the control information included in the GOF header.

For example, the three-dimensional data decoding device includes a processor and a memory, and the processor performs the processes described above using the memory.

Embodiment 4

Figure 33:
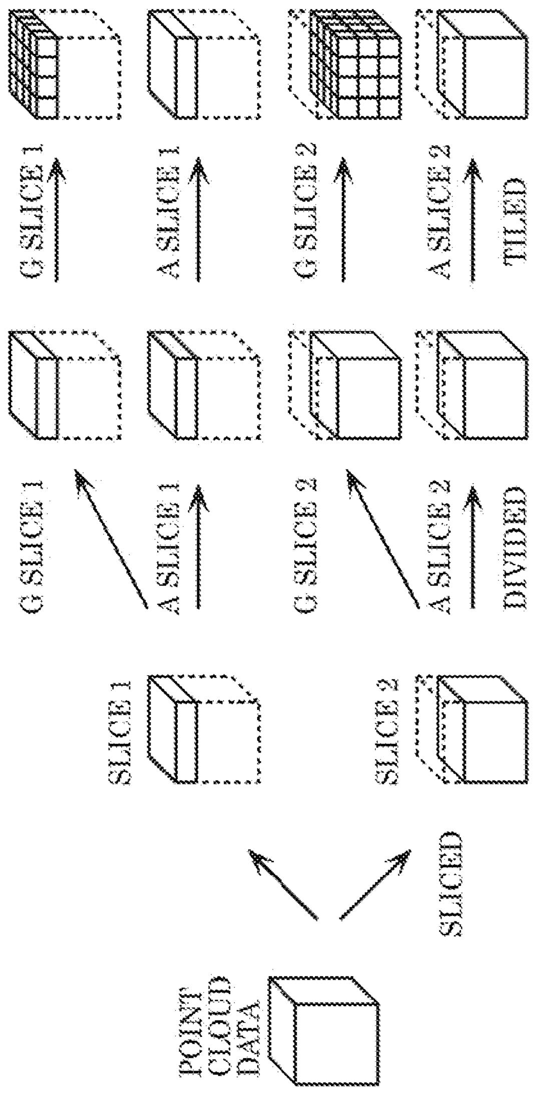
FIG. 33 is a diagram illustrating an example of dividing slices and tiles according to Embodiment 4.

Hereinafter, the division method for point cloud data will be described. FIG. 33 is a diagram illustrating an example of slice and tile dividing.

First, the method for slice dividing will be described. The three-dimensional data encoding device divides three-dimensional point cloud data into arbitrary point clouds on a slice-by-slice basis. In slice dividing, the three-dimensional data encoding device does not divide the geometry information and the attribute information constituting points, but collectively divides the geometry information and the attribute information. That is, the three-dimensional data encoding device performs slice dividing so that the geometry information and the attribute information of an arbitrary point belong to the same slice. Note that, as long as these are followed, the number of divisions and the division method may be any number and any method. Furthermore, the minimum unit of division is a point. For example, the numbers of divisions of geometry information and attribute information are the same. For example, a three-dimensional point corresponding to geometry information after slice dividing, and a three-dimensional point corresponding to attribute information are included in the same slice.

Also, the three-dimensional data encoding device generates slice additional information, which is additional information related to the number of divisions and the division method at the time of slice dividing. The slice additional information is the same for geometry information and attribute information. For example, the slice additional information includes the information indicating the reference coordinate position, size, or side length of a bounding box after division. Also, the slice additional information includes the information indicating the number of divisions, the division type, etc.

Next, the method for tile dividing will be described. The three-dimensional data encoding device divides the data divided into slices into slice geometry information (G slice) and slice attribute information (A slice), and divides each of the slice geometry information and the slice attribute information on a tile-by-tile basis.

Note that, although FIG. 33 illustrates the example in which division is performed with an octree structure, the number of divisions and the division method may be any number and any method.

Also, the three-dimensional data encoding device may divide geometry information and attribute information with different division methods, or may divide geometry information and attribute information with the same division method. Additionally, the three-dimensional data encoding device may divide a plurality of slices into tiles with different division methods, or may divide a plurality of slices into tiles with the same division method.

Furthermore, the three-dimensional data encoding device generates tile additional information related to the number of divisions and the division method at the time of tile dividing. The tile additional information (geometry tile additional information and attribute tile additional information) is separate for geometry information and attribute information. For example, the tile additional information includes the information indicating the reference coordinate position, size, or side length of a bounding box after division. Additionally, the tile additional information includes the information indicating the number of divisions, the division type, etc.

Next, an example of the method of dividing point cloud data into slices or tiles will be described. As the method for slice or tile dividing, the three-dimensional data encoding device may use a predetermined method, or may adaptively switch methods to be used according to point cloud data.

At the time of slice dividing, the three-dimensional data encoding device divides a three-dimensional space by collectively handling geometry information and attribute information. For example, the three-dimensional data encoding device determines the shape of an object, and divides a three-dimensional space into slices according to the shape of the object. For example, the three-dimensional data encoding device extracts objects such as trees or buildings, and performs division on an object-by-object basis. For example, the three-dimensional data encoding device performs slice dividing so that the entirety of one or more objects are included in one slice. Alternatively, the three-dimensional data encoding device divides one object into a plurality of slices.

In this case, the encoding device may change the encoding method for each slice, for example. For example, the encoding device may use a high-quality compression method for a specific object or a specific part of the object. In this case, the encoding device may store the information indicating the encoding method for each slice in additional information (metadata).

Also, the three-dimensional data encoding device may perform slice dividing so that each slice corresponds to a predetermined coordinate space based on map information or geometry information.

At the time of tile dividing, the three-dimensional data encoding device separately divides geometry information and attribute information. For example, the three-dimensional data encoding device divides slices into tiles according to the data amount or the processing amount. For example, the three-dimensional data encoding device determines whether the data amount of a slice (for example, the number of three-dimensional points included in a slice) is greater than a predetermined threshold value. When the data amount of the slice is greater than the threshold value, the three-dimensional data encoding device divides slices into tiles. When the data amount of the slice is less than the threshold value, the three-dimensional data encoding device does not divide slices into tiles.

For example, the three-dimensional data encoding device divides slices into tiles so that the processing amount or processing time in the decoding device is within a certain range (equal to or less than a predetermined value). Accordingly, the processing amount per tile in the decoding device becomes constant, and distributed processing in the decoding device becomes easy.

Additionally, when the processing amount is different between geometry information and attribute information, for example, when the processing amount of geometry information is greater than the processing amount of attribute information, the three-dimensional data encoding device makes the number of divisions of geometry information larger than the number of divisions of attribute information.

Furthermore, for example, when geometry information may be decoded and displayed earlier, and attribute information may be slowly decoded and displayed later in the decoding device according to contents, the three-dimensional data encoding device may make the number of divisions of geometry information larger than the number of divisions of attribute information. Accordingly, since the decoding device can increase the parallel number of geometry information, it is possible to make the processing of geometry information faster than the processing of attribute information.

Note that the decoding device does not necessarily have to process sliced or tiled data in parallel, and may determine whether or not to process them in parallel according to the number or capability of decoding processors.

By performing division with the method as described above, it is possible to achieve adaptive encoding according to contents or objects. Also, parallel processing in decoding processing can be achieved. Accordingly, the flexibility of a point cloud encoding system or a point cloud decoding system is improved.

Figure 34:
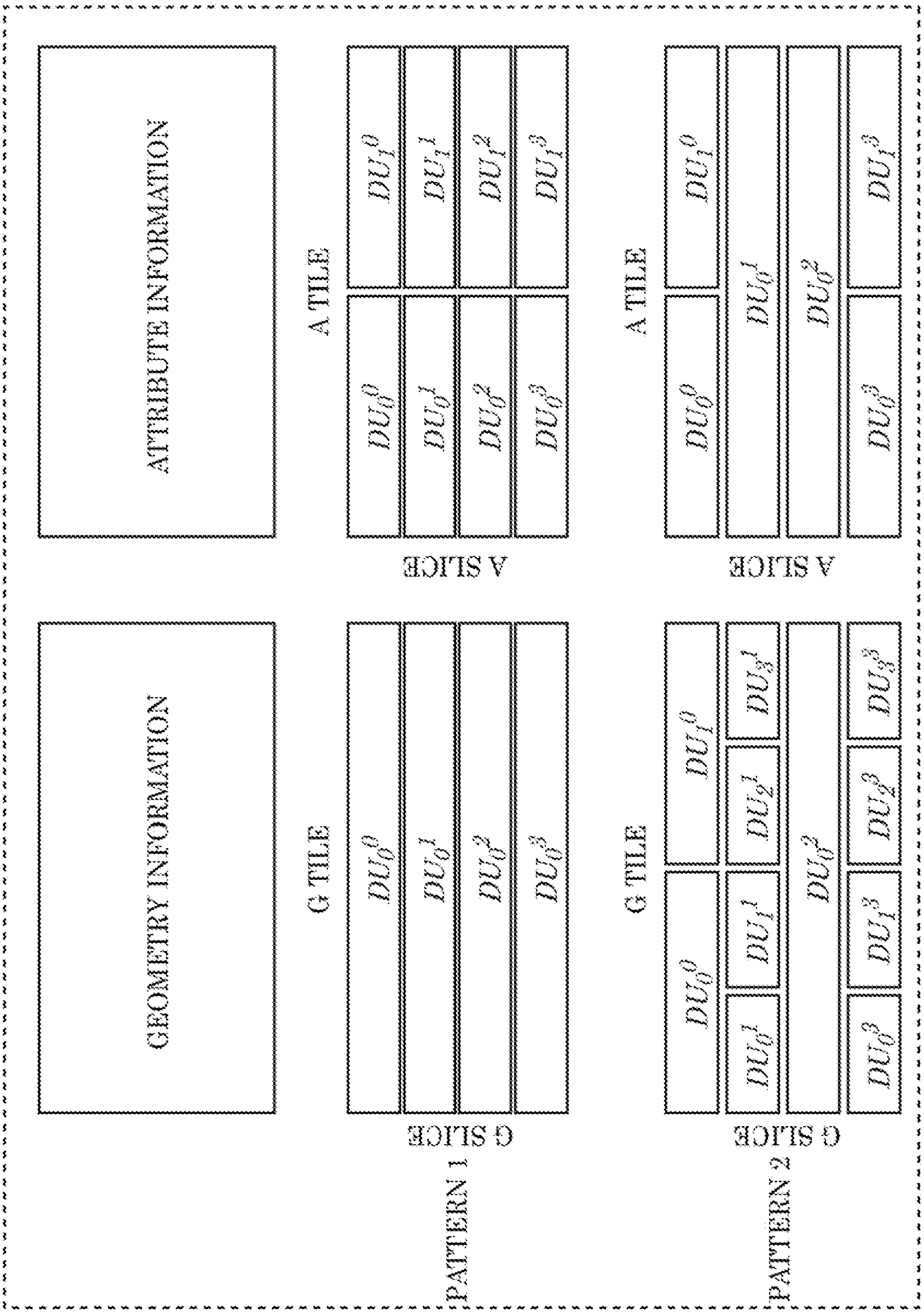
FIG. 34 is a diagram illustrating dividing pattern examples of slices and tiles according to Embodiment 4.

FIG. 34 is a diagram illustrating dividing pattern examples of slices and tiles. DU in the diagram is a data unit (DataUnit), and indicates the data of a tile or a slice. Additionally, each DU includes a slice index (SliceIndex) and a tile index (TileIndex). The top right numerical value of a DU in the diagram indicates the slice index, and the bottom left numerical value of the DU indicates the tile index.

In Pattern 1, in slice dividing, the number of divisions and the division method are the same for G slice and A slice. In tile dividing, the number of divisions and the division method for G slice are different from the number of divisions and the division method for A slice. Additionally, the same number of divisions and division method are used among a plurality of G slices. The same number of divisions and division method are used among a plurality of A slices.

In Pattern 2, in slice dividing, the number of divisions and the division method are the same for G slice and A slice. In tile dividing, the number of divisions and the division method for G slice are different from the number of divisions and the division method for A slice. Additionally, the number of divisions and the division method are different among a plurality of G slices. The number of divisions and the division method are different among a plurality of A slices.

Embodiment 5

Due to hardware restrictions such as a transfer speed, input and output performances, a memory use rate, CPU performances, it is difficult to decode a whole large-scale three-dimensional map (point cloud map), and download the decoded data into a system. To address this matter, this embodiment uses a method of encoding, into a bitstream, a large-scale three-dimensional map as a plurality of slices or tiles. In this way, it is possible to reduce hardware requirements in a three-dimensional data decoding device, and to enable real-time decoding processes in an embedded system or a mobile terminal.

The processes of encoding and decoding slices and tiles have been described above. However, in order to perform the above methods, both of formats for point cloud compression (PCC) encoding and formats for PCC decoding need to be modified irreversibly.

This embodiment uses supplemental enhancement information (SEI) for encoding slices and tiles. In this way, it is possible to perform processes of encoding and decoding slices and tiles without modifying formats.

In this embodiment, in PCC encoding, the three-dimensional data encoding device generates data of a tile or a slice and SEI including attribute information (metadata) and data access information about the tile or slice, and encodes the SEI together with the data.

In addition, in PCC decoding, the three-dimensional data encoding device identifies the tile or the slice which is necessary for decoding and a data access position of the tile or slice, based on the SEI including the attribute information and the data access information about the tile or the slice. In this way, the three-dimensional data encoding device performs a high-speed parallel decoding using the tile or the slice.

It is to be noted that one of or both of the tile and the slice may be used.

Hereinafter, an example of dividing a slice or a tile is described. For example, in a three-dimensional data decoding device in a car which runs at 60 km/hr, hardware is required to have a processing performance of 16.67 m/s. In addition, the data of a tunnel having a length of approximately 2.2 km in a city area is used as a test stream. In order to decode the test stream in real time, the test stream needs to be decoded in 132 seconds. In addition, 2-GB memory is necessary to store decoded point cloud information.

Figures 35, 36:
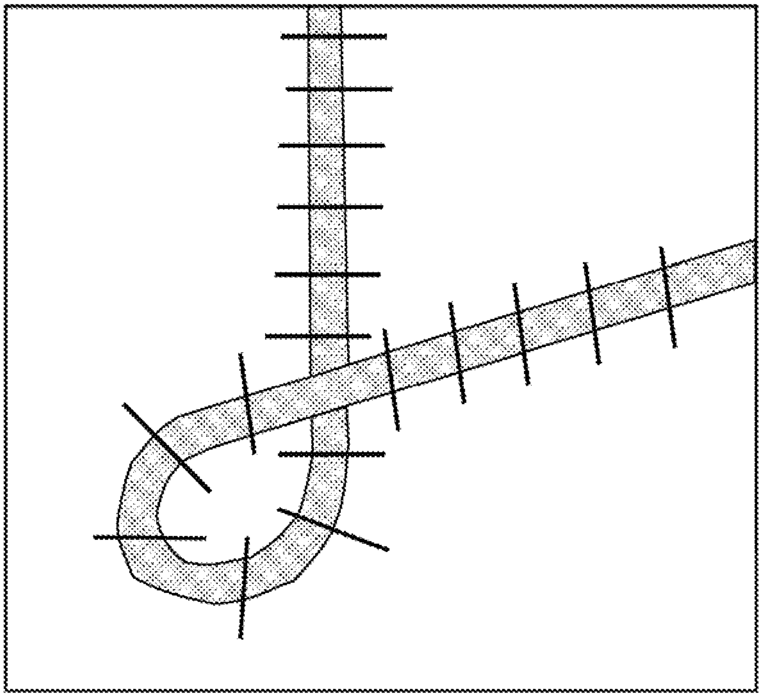
FIG. 35 is a diagram indicating a memory capacity, required actual time, current decoding time, and a current distance in the case where slice or tile division according to Embodiment 5 is performed, and a memory capacity, required actual time, current decoding time, and a current distance in the case where the slice or tile division is not performed.
FIG. 36 is a diagram illustrating an example of tile or slice division according to Embodiment 5.

When the bitstream is encoded as 20 slices or tiles, the three-dimensional data decoding device can decode one of the 20 slices or tiles. In this case, required actual time can be reduced to 6.5 seconds, and required memory capacity can be reduced to 100 MB. FIG. 35 is a diagram indicating examples of a memory capacity, required actual time, current decoding time, and a distance in each of a case in which the whole map is not divided into slices or tiles and a case in which the whole map is divided into slices or tiles.

FIG. 36 is a diagram illustrating an example of tile or slice division. For example, the division is performed using clustering by a fixed number of point cloud data. In this method, all of tiles includes a fixed number of point cloud data, and thus there is no vacant tile. This method has an advantage of being able to equalize tiles and processing loads. On the other hand, the method requires further computation and information in order to perform data clustering and determine the world coordinates of each tile.

Alternatively, another method of effectively dividing a point cloud data may be used instead of slice or tile division based on the number of point cloud data or a bit count for each slice or tile. This method is also referred to as non-uniform division. In this method, clustering is performed on positionally close point cloud data so as to prevent or minimize an overlap of spaces and provide coordinate relationships between clusters at the same time.

Point cloud data clustering methods include a plurality of methods such as a method of sorting the counts in octree division, hierarchical clustering, clustering based on the center of gravity (k-means clustering), clustering based on a distribution, clustering based on density.

The method of storing the counts in octree division is one of easy-to-mount methods. In this method, point cloud data are sorted, and counted. When the number of point cloud data reaches a fixed value, groups generated so far are then classified into one cluster. FIG. 37 is a diagram indicating an example in this method. For example, in the example indicated in FIG. 37, area numbers of the respective point cloud data are input. Here, area numbers are, for example, eight node numbers in an octree. In addition, point cloud data having the same number are extracted by sorting, and, for example, the point cloud data having the same number are assigned to one slice or tile.

Next, another example of slice or tile division is described. A method using a top-view two-dimensional map is used as the method of slice or tile division. The three-dimensional data encoding device performs partitioning according to a minimum value and a maximum value for the sizes of bounding boxes, based on the number of tiles which have been input by a user.

The method provides an advantage of being able to arrange spaces of point cloud data without performing additional computation in the three-dimensional data encoding device. However, there is a possibility that many areas do not include any point cloud depending on the density of point clouds.

Figure 38:
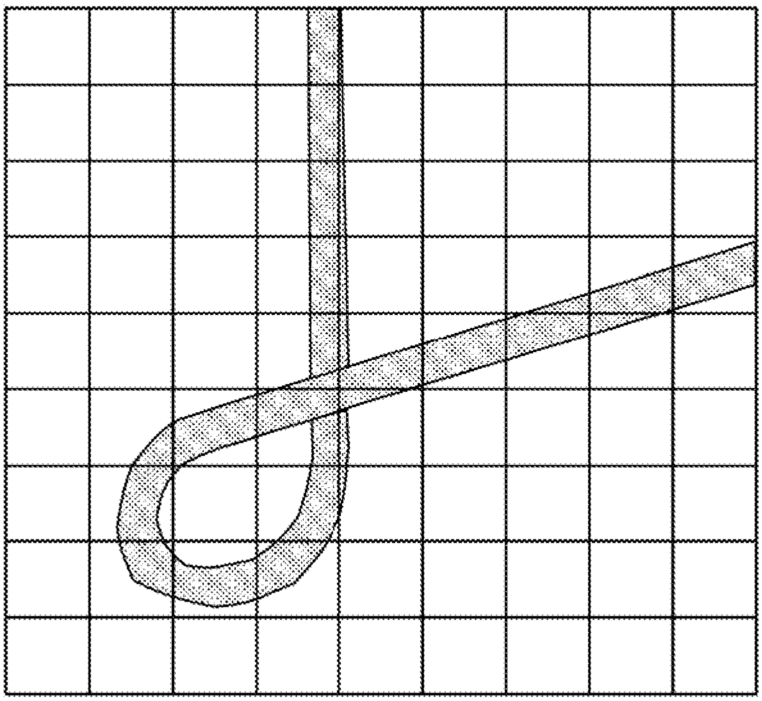
FIG. 38 is a diagram illustrating an example of tile or slice division according to Embodiment 5.

FIG. 38 is a diagram indicating an example in this method. As illustrated in FIG. 38, a point cloud data space is divided into a plurality of bounding boxes having the same size.

Next, a SEI structure is described. The three-dimensional data encoding device introduces additional information so as to allow the three dimensional data decoding device to decode slice or tile information. For example, the three-dimensional data encoding device may introduce SEI for PCC. SEI can be used in both the three-dimensional data encoding device and the three-dimensional data decoding device.

In addition, the three-dimensional data decoding device which does not support a SEI decoding process is capable of decoding a bitstream which includes a SEI message. On the other hand, the three-dimensional data decoding device which supports a SEI decoding process is capable of decoding a bitstream which does not include a SEI message.

Figures 39, 40, 41:
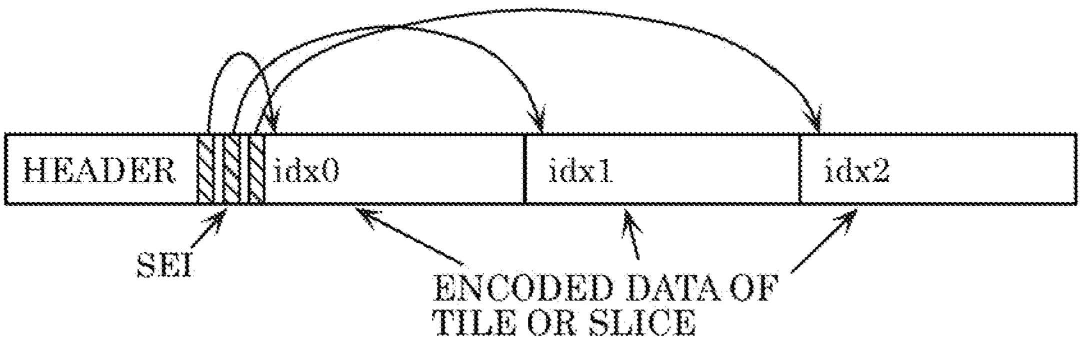
FIG. 39 is a diagram illustrating a structural example of a bitstream according to Embodiment 5.
FIG. 40 is a diagram illustrating a structural example of SEI according to Embodiment 5.
FIG. 41 is a diagram illustrating a syntax example of SEI according to Embodiment 5.

FIG. 39 is a diagram illustrating a structural example of a bitstream including SEI for PCC. FIG. 40 is a diagram indicating an example of information included in SEI for a tile or a slice. FIG. 41 is a diagram indicating a syntax example of Tile_Slice_information_SEI (SEI).

This SEI is included in a header of a bitstream, for instance. In other words, this SEI is included in control information common to encoded data of a plurality of tiles or slices. As illustrated in each of FIG. 40 and FIG. 41, this SEI includes a tile index (Tile idx) or a slice index (Slice idx), area information (Area information), a memory offset (pointer) (Memory offset pointer), and global position information (Global position information). In addition, this SEI may include other information related to encoding or decoding of a tile or a slice. In addition, SEI includes the above information for each tile index or slice index. It is to be noted that SEI may include at least a part of the above information.

The tile index is an identifier for identifying one of a plurality of tiles. Values of different tile indexes are assigned respectively to the plurality of tiles. The slice index is an identifier for identifying one of a plurality of tiles. Values of different slice indexes are assigned respectively to the plurality of slices. In addition, the header of the encoded data of each tile or each slice is added with a tile index or a slice index of the tile or the slice corresponding to the encoded data.

The area information is information indicating a spatial range (area) of the tile or the slice. For example, the area information includes size information indicating the size of the tile or the slice. The memory offset is information which indicates a position (address) in memory in which the encoded data of the tile or the slice is stored and indicates a position (address) of the encoded data of the tile or the slice in a bitstream. The global position information is information indicating a global position (for example, world coordinates (latitude and longitude, etc.) of the tile or the slice.

In addition, the three-dimensional data encoding device performs a bite alignment process, etc. of each tile or each slice.

It is to be noted that usage of SEI is not limited to encoding of a slice or a tile, and SEI may be optionally used for other information to be encoded into a bitstream.

In addition, the three-dimensional data encoding device may provides a tile or a slice with a kind of attribute information (such as the area information, address information (memory offset), and position information (global position information), etc.), or may associate a tile or a slice with a plurality of kinds of attribute information. In addition, the three-dimensional data encoding device may associate a plurality of tiles or a plurality of slices with a kind of attribute information. In addition, when tiles and slices are co-used, the three-dimensional data encoding device may add attribute information for each of the tiles and the slices to a bitstream. In addition, for example, the three-dimensional data encoding device may generate first attribute information which is area information and second attribute information indicating a relationship between the first area information and the second area information, and may store the first attribute information and the second attribute information into SEI.

In addition, as indicated in FIG. 41, SEI may include attribute information (area information, address information, and position information) of the tile or the slice. For example, an attribute information number may be defined, and SEI may include a tile index or a slice index corresponding to the attribute information number.

Figure 42:
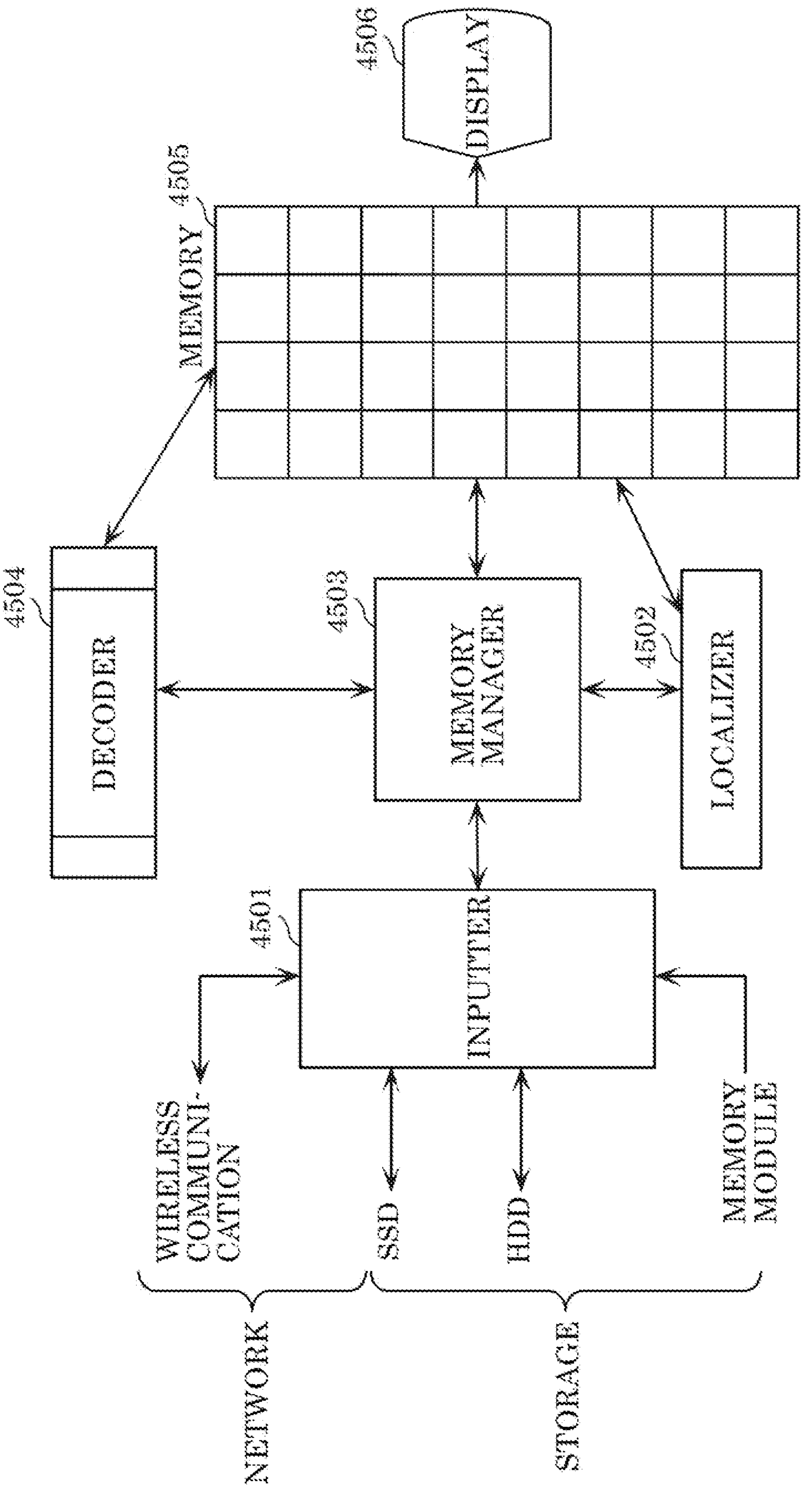
FIG. 42 is a diagram of a three-dimensional data decoding device according to Embodiment 5.

Next, an example of a hardware structure of a three-dimensional data decoding device is described. FIG. 42 is a diagram illustrating the structural example of the hardware of the three-dimensional data decoding device. As illustrated in FIG. 42, the three-dimensional data decoding device includes inputter 4501, localizer 4502, memory manager 4503, decoder 4504, memory 4505, and display 4506.

Inputter 4501 inputs and outputs data from and to an external device via a network such as wireless communication. In addition, inputter 4501 inputs and outputs data from and to storage such as a Solid State Drive (SSD), a hard disk drive (HDD), and a memory module.

Localizer 4502 is a Global Positioning System (GPS), a wheel direction detector, a gyroscope sensor, or the like. Localizer 4502 is a module which detects the position, speed, etc. of a mobile object, or the like on which a three-dimensional data encoding device is mounted.

Memory manager 4503 manages memory 4505. Memory manager 4503 obtains information from localizer 4502, reads a stream of a related slice or tile with reference to SEI using the obtained information, and loads the read stream into decoder 4504.

Decoder 4504 decodes the stream of the slice or the tile, and stores the obtained three-dimensional data into memory 4505. Memory 4505 stores the three-dimensional data of the slice or the tile.

Display 4506 displays an image or a video based on the three-dimensional data which is stored in memory 4505.

Next, an operation of accessing a slice or a tile is described. A PCC stream is divided, and the information is stored into SEI. In this way, the three-dimensional data decoding device is capable of easily making access on an area-by-area basis. Memory manager 4503 determines a necessary area (an encoded slice or tile) based on the information from localizer 4502 (such as a GPS) and a traveling direction, etc. of the mobile object on which the three-dimensional data decoding device is mounted, and obtains data of the necessary area from memory 4505.

Figure 43:
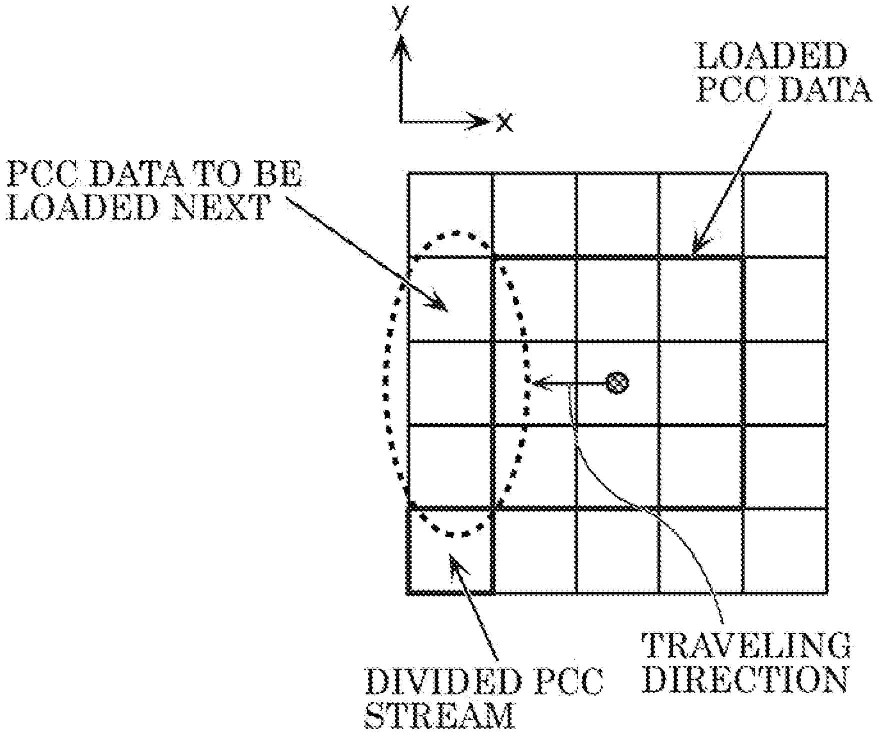
FIG. 43 is a diagram for illustrating an operation of obtaining tile or slice data according to Embodiment 5.
Figure 44:
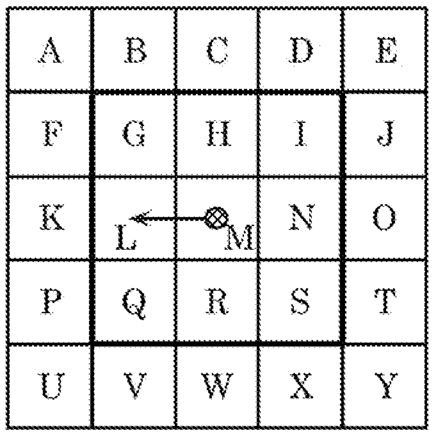
FIG. 44 is a diagram for illustrating an operation of obtaining tile or slice data according to Embodiment 5.

Into SEI, a related global position or a relative position related to a map is encoded as area information. Each of FIG. 43 and FIG. 44 is a diagram illustrating an example of an operation of accessing a slice or a tile. In this example, a current position of a target in which a three-dimensional data decoding device is mounted is identified as being area M. In addition, the target travels leftward as illustrated in FIG. 43 and FIG. 44. In this case, areas F, K, and P are not available (not loaded), and thus data of these areas are read out from memory 4505 by memory manager 4503 in order to decode the data of these areas. The other areas are not related to the traveling direction, and thus do not need to be decoded.

Using the above method, it is possible to reduce the decoding time and also reduce the memory capacity required in hardware.

Figure 45:
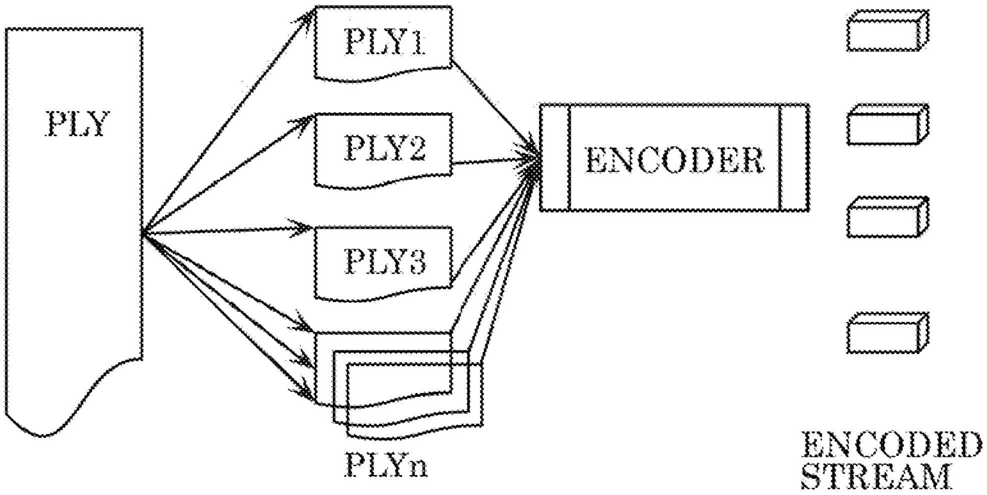
FIG. 45 is a diagram illustrating a test operation of SEI according to Embodiment 5.
Figure 46:
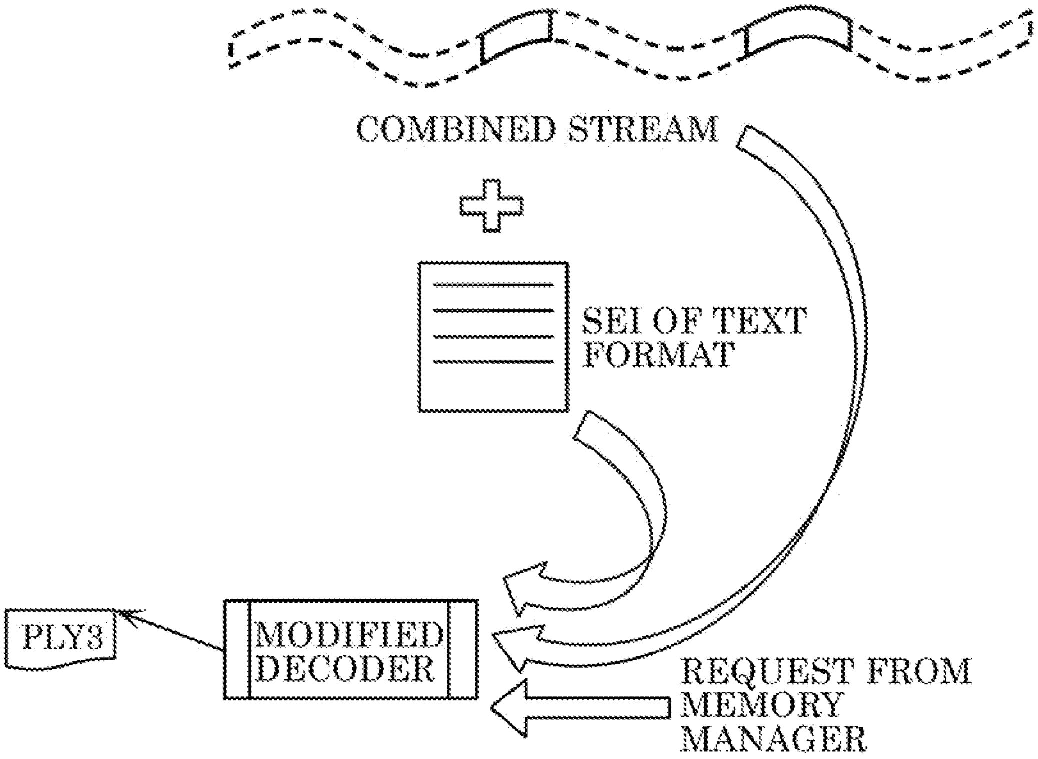
FIG. 46 is a diagram illustrating a test operation of SEI according to Embodiment 5.

Next, a test example of a process of decoding a slice or a tile is described. Hereinafter, a test of SEI in decoding of a point cloud data bitstream is described. Each of FIG. 45 and FIG. 46 is a diagram illustrating a test operation of SEI.

The point cloud data bitstream for the test is generated by dividing original point cloud data having a PLY format and encoding the divided point cloud data individually. A plurality of bitstreams obtained are combined to generate one file (a combined stream). In addition, the one file is transmitted together with a text format indicating the file size of each bitstream.

Decoder 4504 is modified so as to load and decode a part of a stream using the information from memory manager 4503. A plurality of observations enables observation of an upper limit for decoding time with a small overhead.

Figure 47:
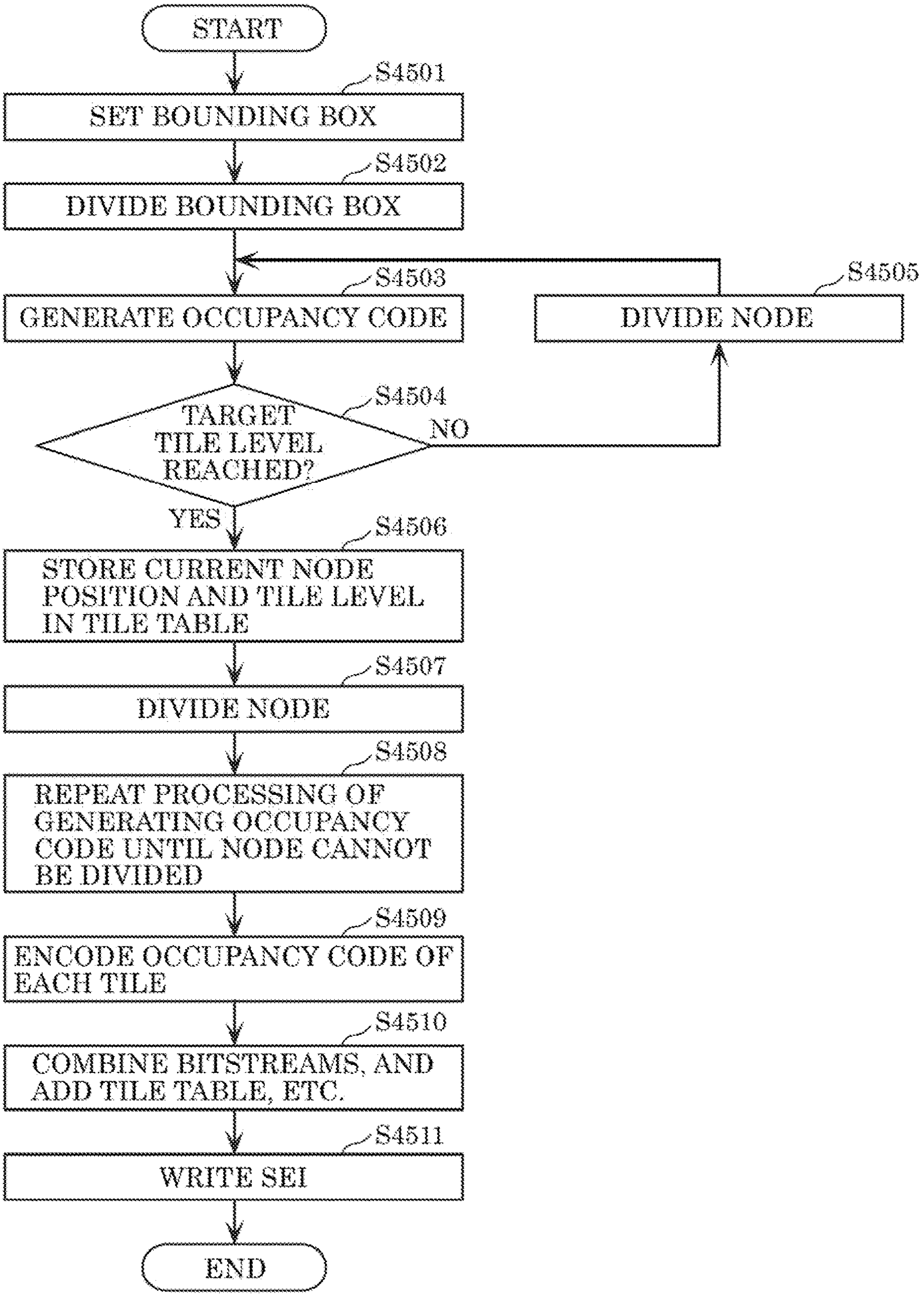
FIG. 47 is a flowchart of a three-dimensional data encoding process according to Embodiment 5.

Hereinafter, descriptions are given of an operation performed by the three-dimensional data encoding device and an operation performed by the three-dimensional data decoding device. FIG. 47 is a flowchart of a three-dimensional data encoding process performed by the three-dimensional data encoding device according to this embodiment.

First, the three-dimensional data encoding device sets a bounding box including a three-dimensional point which has been input, based on a user setting in response to a request for a tile or a slice (S4501). Next, the three-dimensional data encoding device divides the bounding box into eight child nodes (S4502).

Next, the three-dimensional data encoding device generates an occupancy code of each of child nodes in which a three-dimensional points is included among the eight child nodes (S4503). Next, the three-dimensional data encoding device determines whether the level (a layer in a tree structure) of a current node to be processed has reached a target tile level (S4504). Here, the target tile level is a level (a layer in a tree structure) in which tile division is performed.

In the case where the level of the current node has not reached the target tile level (No in S4504), the three-dimensional data encoding device divides each node into eight grandchild nodes (S4505), and performs processes in Step S4503 and the following steps onto each grandchild node.

In the case where the level of the current node has reached the target tile level (Yes in S4504), the three-dimensional data encoding device stores a current node position and a tile level (or a tile size) into a tile table (S4506).

Next, the three-dimensional data encoding device divides each child node into eight grandchild nodes (S4507). Next, the three-dimensional data encoding device repeats a process of generating an occupancy code until a node cannot be divided (S4508). Next, the three-dimensional data encoding device encodes the occupancy node of each tile (S4509).

Next, the three-dimensional data encoding device combines generated encoded bitstreams (encoded data) of a plurality of tiles (S4510). In addition, the three-dimensional data encoding device adds the information indicating the size of each encoded bitstream (encoded data), a tile table, etc. into header information of the bitstream. In addition, the three-dimensional data encoding device adds the identifier of the tile or the slice (the tile index or the slice index) corresponding to the encoded bitstream (encoded data) into the header information of the encoded bitstream.

Here, the tile size (tile level) is stored into the tile table. Thus, the three-dimensional data decoding device is capable of obtaining the size of the bounding box of a sub-tree in each tile, using the tile size. In addition, the three-dimensional data decoding device is capable of calculating the size of the bounding box of the whole tree structure, using the size of the bounding box of the sub-tree.

It is to be noted that the three-dimensional data encoding device may store the size of the bounding box of each tile into the tile table. In this way, the three-dimensional data decoding device is capable of obtaining the size of the bounding box of each tile with reference to the tile table.

Lastly, the three-dimensional data decoding device adds SEI to the bitstream (S4511). As described above, SEI includes a list indicating the relationship between attribute information (area information, address information, position information, etc.) of each tile or each slice and an identifier (the tile index or the slice index). It is to be noted that the tile table may be included in SEI.

Figure 48:
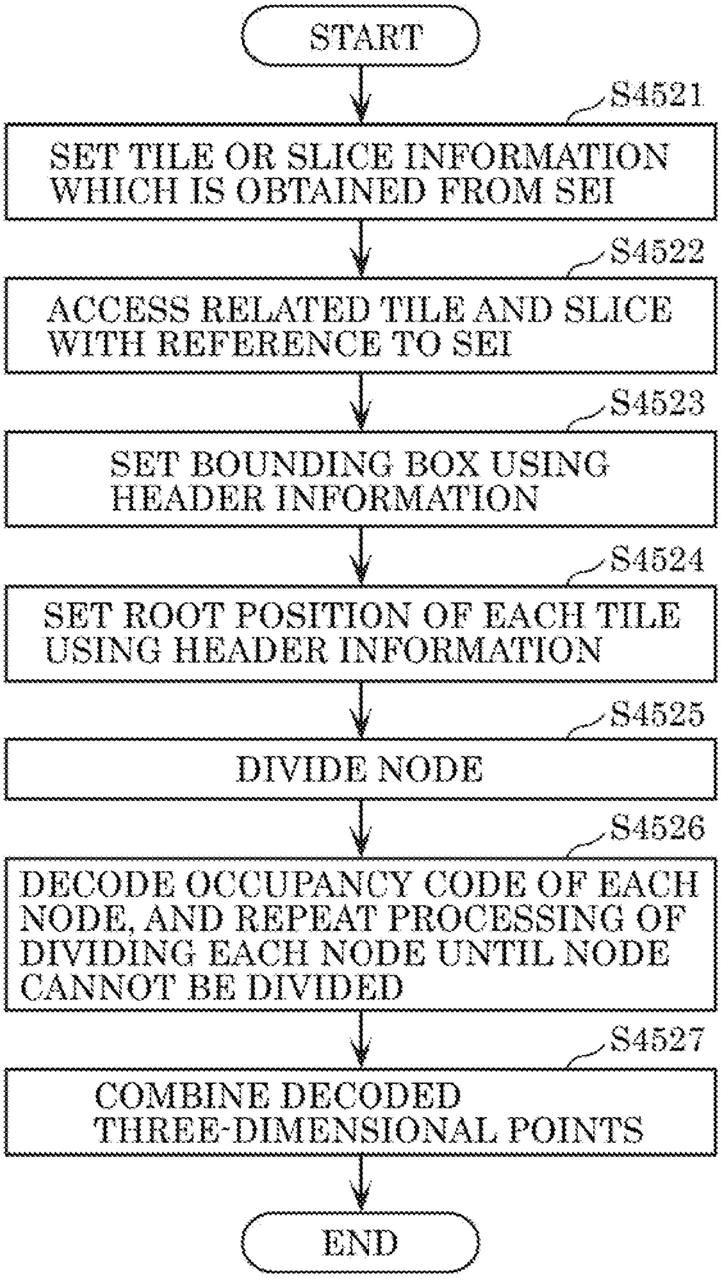
FIG. 48 is a flowchart of a three-dimensional data decoding process according to Embodiment 5.

FIG. 48 is a flowchart of a three-dimensional data decoding process performed by the three-dimensional data decoding device according to this embodiment.

First, memory manager 4503 sets information about a tile or a slice which is obtained from SEI (a SEI header) (S4521). Next, the three-dimensional data decoding device accesses the tile or the slice related to the SEI (SEI header) with reference to the SEI (S4522).

For example, as indicated in FIG. 43 and FIG. 44, memory manager 4503 determines the position of the tile or the slice to be obtained, based on a current position and a traveling direction of the three-dimensional data decoding device. Alternatively, memory manager 4503 determines the position of the tile or the slice to be obtained, based on user settings. Next, memory manager 4503 determines the identifier of the tile or the slice at the determined position with reference to a list of attribute information and the identifier (tile index or slice index) included in the SEI. Next, memory manager 4503 obtains each encoded bitstream added with a determined identifier as a current encoded bitstream to be decoded, with reference to header information of the encoded bitstream.

Next, the three-dimensional data decoding device sets a bounding box including a three-dimensional point to be output, using the header information included in the bitstream (S4523). Next, the three-dimensional data decoding device sets a root position of each tile (subtree) using the header information included in the bitstream (S4524).

Next, the three-dimensional data decoding device divides the bounding box into eight child nodes (S4525). Next, the three-dimensional data decoding device decodes an occupancy code of each node, and divides the node into eight child nodes based on the decoded occupancy code. In addition, the three-dimensional data decoding device repeats the process until the node of each tile (subtree) cannot be divided (S4526).

Lastly, the three-dimensional data decoding device combines three-dimensional points of a plurality of tiles decoded.

Figure 49:
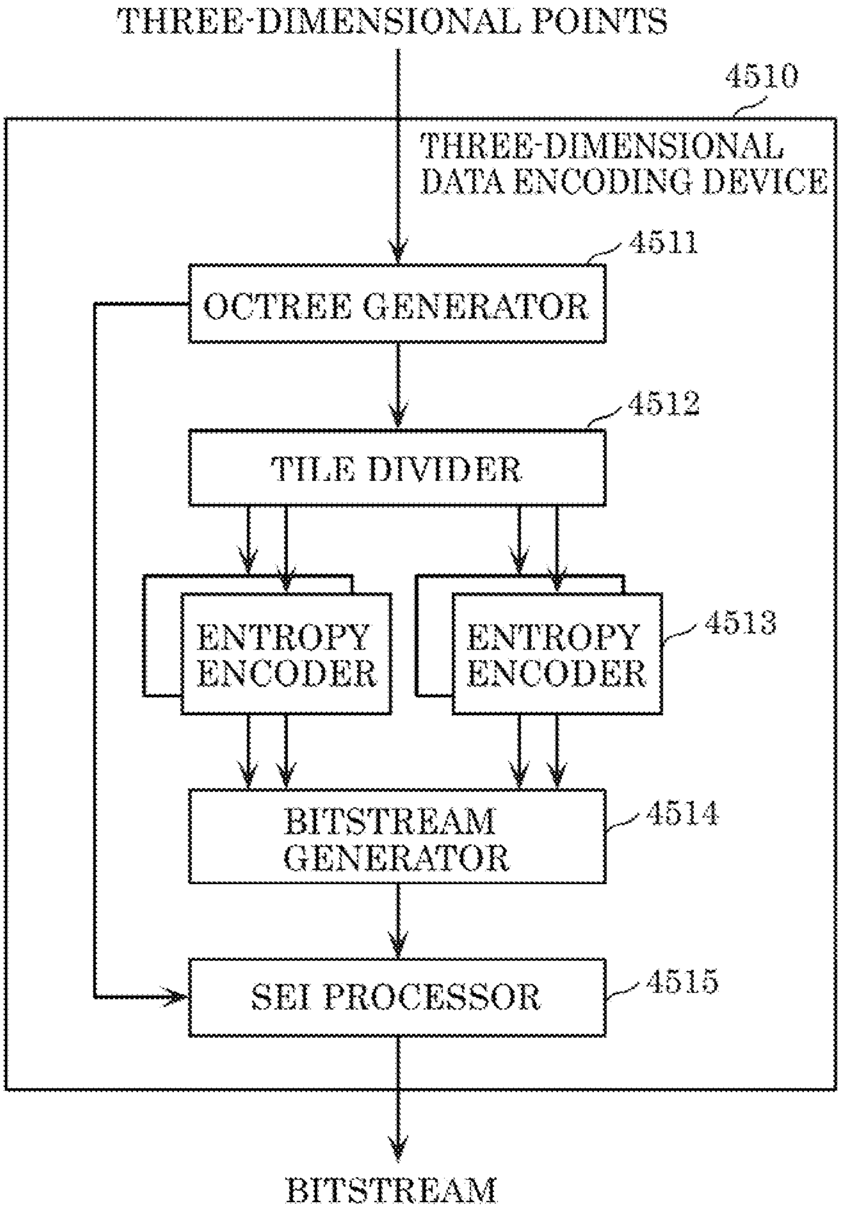
FIG. 49 is a block diagram of a three-dimensional data encoding device according to Embodiment 5.

FIG. 49 is a block diagram illustrating a configuration of three-dimensional data encoding device 4510 according to this embodiment. Three-dimensional data encoding device 4510 includes octree generator 4511, tile divider 4512, a plurality of entropy encoders 4513, bitstream generator 4514, and SEI processor 4515.

A target tile level is input to three-dimensional data encoding device 4510. After the target tile level is reached through division processes, three-dimensional data encoding device 4510 stores an occupancy code of each of the plurality of tiles, and generates encoded data of the tile by encoding the occupancy code of the tile individually.

Octree generator 4511 sets a bounding box, and divides the bounding box into eight child nodes. In addition, octree generator 4511 repeats the division process until the target level is reached through division processes. In addition, the obtained information is analyzed and transmitted to SEI processor 4515.

Tile divider 4512 sets tiles. Specifically, when the target level is reached through division processes, tile divider 4512 sets a plurality of tiles having the level as a root.

The plurality of entropy encoders 4513 encodes the plurality of tiles individually. Bitstream generator 4514 generates a bitstream by combining encoded data of the plurality of tiles.

SEI processor 4515 generates SEI, and writes the generated SEI into a bitstream.

Figure 50:
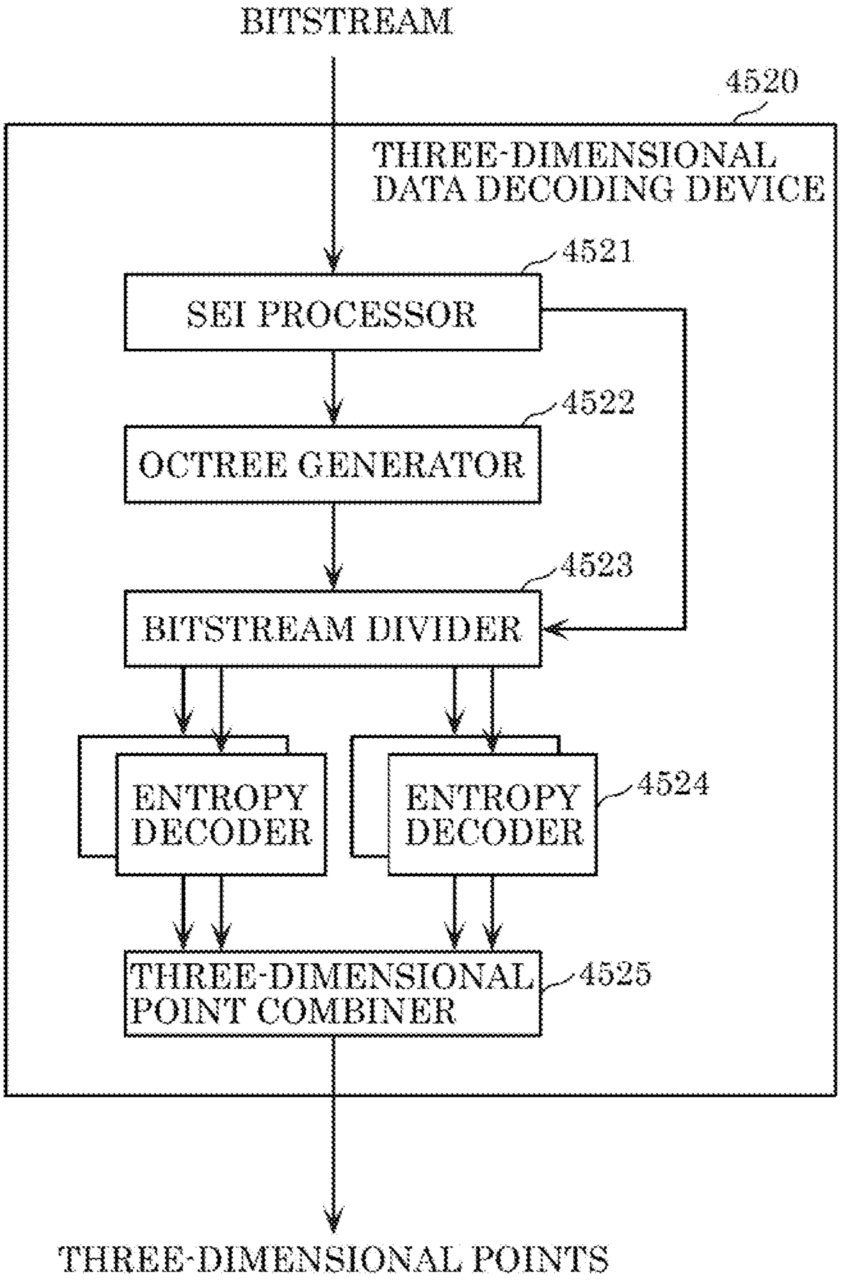
FIG. 50 is a block diagram of a three-dimensional data decoding device according to Embodiment 5.

FIG. 50 is a block diagram illustrating a configuration of three-dimensional data decoding device 4520 according to this embodiment. Three-dimensional data decoding device 4520 includes SEI processor 4521, octree generator 4522, bitstream divider 4523, a plurality of entropy decoders 4524, and three-dimensional point combiner 4525.

SEI processor 4521 determines data to be read out and processed, with reference to SEI. In addition, the determination result is transmitted to bitstream divider 4523.

Octree generator 4522 sets a bounding box, and divides the bounding box into eight child nodes. In addition, octree generator 4522 repeats the division process until the target level is reached through division processes.

Bitstream divider 4523 divides the bitstream into encoded data of each of the tiles, using the header information included in the bitstream. In addition, bitstream divider 4523 transmits the encoded data of each tile to be decoded, based on the information from SEI processor 4521 to a corresponding one of the plurality of entropy decoders 4524.

The plurality of entropy decoders 4524 encode the plurality of tiles individually. Three-dimensional point combiner 4525 combines the decoded three-dimensional points of the plurality of tiles. It is to be noted that the decoded three-dimensional points may be used directly in an application. In such a case, this combination process is skipped.

It is to be noted that attribute information (an identifier, area information, address information, position information, etc.) of a tile or a slice may be stored in other control information instead of SEI. For example, the attribute information may be stored in control information indicating the overall structure of PCC data, or may be stored in control information for each tile or each slice.

In addition, when the three-dimensional data encoding device (three-dimensional data transmitting device) transmits the PCC data to another device, the three-dimensional data encoding device may convert control information such as SEI into control information unique to a protocol supported by the system and present the converted control information.

For example, when the three-dimensional data encoding device converts PCC data including attribute information into an ISO Base Media File Format (ISOBM), the three-dimensional data encoding device may store SEI in an "mdat box" together with the PCC data, or may store SEI in a "track box" in which control information related to a stream is described. In other words, the three-dimensional data encoding device may store the control information in a table for random access. In addition, when the three-dimensional data encoding device packetizes PCC data and transmits packets of PCC data, the three-dimensional data encoding device may store SEI in packet headers. In this way, attribute information can be obtained in a layer of the system, which makes it easier to access the attribute information, and the tile data or the slice data, and thus makes it possible to accelerate the access.

It is to be noted that, in the configuration of the three-dimensional data decoding device illustrated in FIG. 42, memory manager 4503 may determine, in advance, whether information which is necessary for a decoding process is present in memory 4505, and if the information necessary for the decoding process is absent, memory manager 4503 may obtain the information necessary for the decoding process from storage or via a network.

When the three-dimensional data decoding device obtains PCC data from storage or via a network using Pull in a protocol such as the MPEG-DASH, memory manager 4503 may identify attribute information of data necessary for a decoding process based on information obtained from localizer 4502 or the like, request the tile or the slice including the identified attribute information, and obtain the necessary data (PCC stream). A tile or a slice including attribute information may be identified by a storage or network side, or may be identified by memory manager 4503. For example, memory manager 4503 may obtain SEI from all PCC data in advance, and identify a tile or a slice based on the information.

When all PCC data have been transmitted from the storage or via the network using Push in the UDP protocol, or the like, memory manager 4503 may obtain desired data by identifying the attribute information of data necessary for a decoding process and a tile or a slice, based on information obtained from localizer 4502, or the like, and by filtering a plurality of tiles or slices to obtain a desired tile or a slice from the PCC data transmitted.

In addition, when obtaining data, the three-dimensional data encoding device may determine whether desired data is present, whether real-time processing is possible based on a data size, etc., or a communication state, etc. When the three-dimensional data encoding device determines that it is difficult to obtain the data based on the determination result, the three-dimensional data encoding device may select and obtain another slice or tile whose priority or data amount is different from that of the data.

In addition, the three-dimensional data decoding device may transmit information from localizer 4502, or the like to a cloud server, and the cloud server may determine necessary information based on the information.

Figure 51:
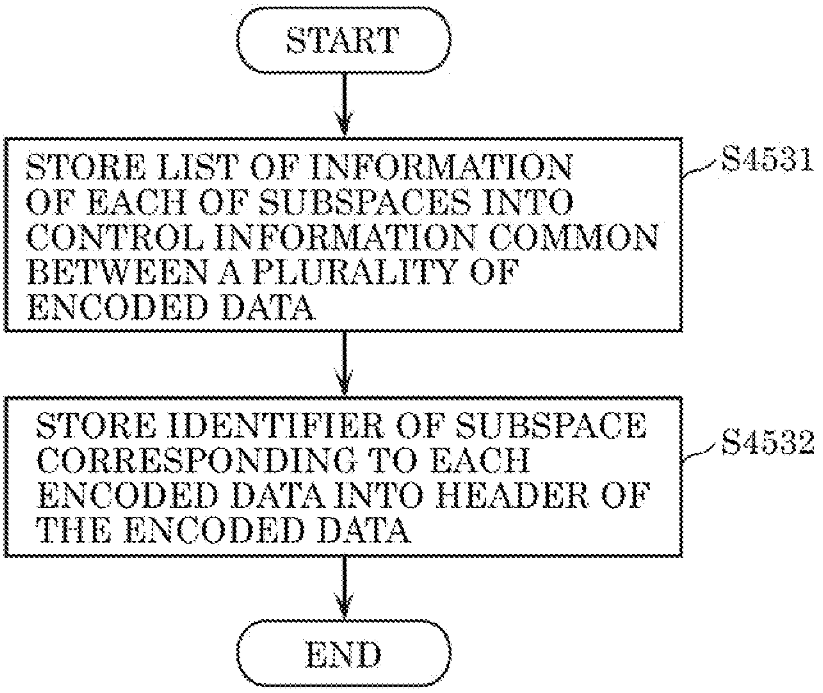
FIG. 51 is a flowchart of a three-dimensional data encoding process according to Embodiment 5.

As described above, the three-dimensional data encoding device according to this embodiment performs the process illustrated in FIG. 51. The three-dimensional data encoding device encodes a plurality of subspaces (such as tiles or slices) included in a current space in which a plurality of three-dimensional points are included, to generate a bitstream including a plurality of encoded data corresponding respectively to the plurality of subspaces.

When generating the bitstream, the three-dimensional data encoding device stores, into first control information (such as SEI) included in the bitstream and common to a plurality of encoded data, a list of information (such as position information or size information) about the plurality of subspaces each of which is associated with an identifier (such as a tile index or a slice index) assigned to the subspace (S4531). The three-dimensional data encoding device stores the identifier assigned to the subspace corresponding to each encoded data into a header (such as a tile header or a slice header) of the encoded data (S4532).

In this way, the three-dimensional data decoding device is capable of obtaining desired encoded data with reference to (i) the list of information which is stored in the first control information and is about the plurality of subspaces respectively associated with the identifiers each stored in the header of the corresponding one of the plurality of encoded data and (ii) the plurality of identifiers, when decoding the bitstream generated by the three-dimensional data encoding device. Accordingly, it is possible to reduce the amount of processing performed by the three-dimensional data decoding device.

For example, the first control information is disposed ahead of the plurality of encoded data in the bitstream.

For example, the list includes position information (for example, a global position or a relative position) of each of the plurality of subspaces. For example, the list includes size information of each of the plurality of subspaces.

For example, the three-dimensional data encoding device converts the first control information into second control information in accordance with a protocol supported by a transmission destination of a bitstream.

In this way, the three-dimensional data encoding method enables conversion of control information in accordance with the protocol supported by the transmission destination of the bitstream.

For example, the second control information is a table for making random access in accordance with the protocol. For example, the second control information is an mdat box or a track box in ISO Base Media File Format (ISOBMFF).

For example, the three-dimensional data encoding device includes a processor and memory, and the processor performs the above processes using the memory.

Figure 52:
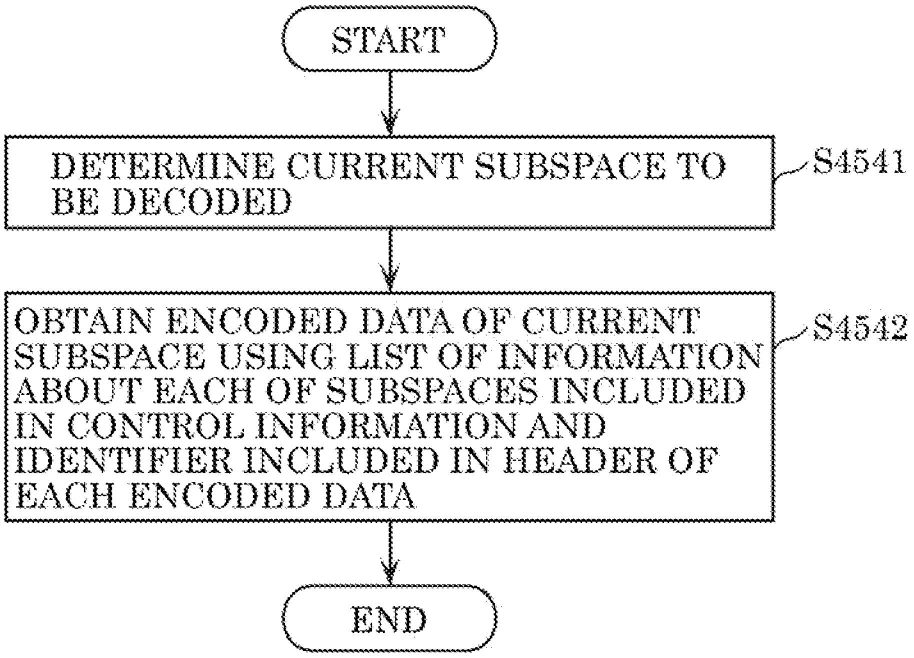
FIG. 52 is a flowchart of a three-dimensional data decoding process according to Embodiment 5.

In addition, the three-dimensional data decoding device according to this embodiment performs the processes illustrated in FIG. 52. First, the three-dimensional data decoding device decodes a bitstream including a plurality of encoded data corresponding to a plurality of subspaces (such as tiles or slices) which are included in a current space including a plurality of three-dimensional points and obtained by encoding the plurality of subspaces.

When decoding the bitstream, the three-dimensional data decoding device determines a current subspace to be decoded among the plurality of subspaces (S4541). The three-dimensional data decoding device obtains encoded data of the current subspace using (i) a list of information about the plurality of subspaces (for example, position information or size information) respectively associated with a plurality of identifiers (for example, tile indexes or slice indexes), and (ii) the plurality of identifiers. The list of information is included in first control information (for example, SEI) common to the plurality of encoded data. The first control information is included in the bitstream Each of the plurality of identifiers is included in a header (for example, a tile header or a slice header) of corresponding encoded data included in the plurality of encoded data and being assigned to the subspace corresponding to the corresponding encoded data (S4542).

In this way, the three-dimensional data decoding method is capable obtaining desired encoded data, with reference to the list of information about the plurality of subspaces respectively associated with the plurality of identifiers stored in the first control and the plurality of identifier each stored in the header of the corresponding one of the plurality of encoded data. Accordingly, it is possible to reduce the amount of processing performed by the three-dimensional data decoding device.

For example, the first control information is disposed ahead of the plurality of encoded data in the bitstream.

For example, the list includes position information (for example, a global position or a relative position) of each of the plurality of subspaces. For example, the list includes size information of each of the plurality of subspaces.

For example, the three-dimensional data decoding device includes a processor and memory, and the processor performs the above-described process using the memory.

Embodiment 6

Hereinafter, an example of performing slice division after tile division will be described. An autonomous application for automated driving of a vehicle etc. requires not point cloud data of all areas but point cloud data of an area surrounding a vehicle or an area in a traveling direction of a vehicle. Here, tiles and slices can be used to selectively decode original point cloud data. It is possible to achieve the improvement of coding efficiency or parallel processing by dividing three-dimensional point cloud data into tiles and further dividing the tiles into slices. When data is divided, additional information (meta data) is generated, and the generated additional information is transmitted to a multiplexer.

FIG. 53 is a diagram illustrating an example of syntax of tile additional information (TileMetaData). As shown in FIG. 53, for example, tile additional information includes division method information (type_of_divide), shape information (topview_shape), an overlap flag (tile_overlap_flag), overlap information (type_of_overlap), height information (tile_height), a tile number (tile_number), and tile position information (global_position, relative_position).

Division method information (type_of_divide) indicates a tile division method. For example, division method information indicates whether a tile division method is division based on map information, that is, division based on top view (top_view) or another division (other).

Shape information (topview_shape) is included in tile additional information when a tile division method is, for example, division based on top view. Shape information indicates a shape in top view of a tile. Examples of the shape include a square and a circle. Moreover, the examples of the shape may include an ellipse, a rectangle, or a polygon other than a quadrangle, or may include a shape other than these. It should be noted that shape information may indicate not only a shape in top view of a tile but also a three-dimensional shape (e.g., a cube, a round column) of a tile.

An overlap flag (tile_overlap_flag) indicates whether tiles overlap each other. For example, an overlap flag is included in tile additional information when a tile division method is division based on top view. In this case, the overlap flag indicates whether tiles overlap each other in top view. It should be noted that an overlap flag may indicate whether tiles overlap each other in a three-dimensional space.

Overlap information (type_of_overlap) is included in tile additional information when, for example, tiles overlap each other. Overlap information indicates, for example, how tiles overlap each other. For example, overlap information indicates the size of an overlapping region.

Height information (tile_height) indicates the height of a tile. It should be noted that height information may include information indicating a tile shape. For example, when the shape of a tile in top view is a rectangle, the information may indicate the length of a side (a vertical length, a horizontal length) of the rectangle. When the shape of a tile in top view is a circle, the information may indicate the diameter or radius of the circle.

Moreover, height information may indicate the height of each tile or a height common to tiles. In addition, height types such as roads and overpasses may be set in advance, and height information may indicate the height of each of the height types and a height type of each tile. Alternatively, a height of each height type may be specified in advance, and height information may indicate a height type of each tile. In other words, height information need not indicate a height of each height type.

A tile number (tile_number) indicates the number of tiles. It should be noted that tile additional information may include information indicating an interval between tiles.

Tile position information (global_position, relative_position) is information for identifying the position of each tile. For example, tile position information indicates the absolute coordinates or relative coordinates of each tile.

It should be noted that part or all of the above-mentioned information may be provided for each tile or each group of tiles (e.g., for each frame or group of frames).

The three-dimensional data encoding device may include tile additional information in supplemental enhancement information (SEI) and transmit the SEI. Alternatively, the three-dimensional data encoding device may store tile additional information in an existing parameter set (PPS, GPS, or APS, etc.) and transmit the parameter set.

For example, when tile additional information changes for each frame, the tile additional information may be stored in a parameter set for each frame (GPS or APS etc.). When tile additional information does not change in a sequence, the tile additional information may be stored in a parameter set for sequence (geometry SPS or attribute SPS). Further, when the same tile division information is used for geometry information and attribute information, tile additional information may be stored in a parameter set for a PCC stream (a stream PS).

Moreover, tile additional information may be stored in any one of the above-mentioned parameter sets or in parameter sets. In addition, tile additional information may be stored in the header of encoded data. Additionally, tile additional information may be stored in the header of a NAL unit.

Furthermore, part or all of tile additional information may be stored in one of the header of divided geometry information and the header of divided attribute information, and need not be stored in the other. For example, when the same tile additional information is used for geometry information and attribute information, the tile additional information may be included in the header of one of the geometry information and the attribute information. For example, when attribute information depends on geometry information, the geometry information is processed first. For this reason, the tile additional information may be included in the header of the geometry information, and need not be included in the header of the attribute information. In this case, for example, the three-dimensional data decoding device determines that the attribute information of the depender belongs to the same tile as a tile having the geometry information of the dependee.

The three-dimensional data decoding device reconstructs point cloud data subjected to tile division, based on tile additional information. When there are pieces of overlapping point cloud data, the three-dimensional data decoding device specifies the pieces of overlapping point cloud data and selects one of the pieces of overlapping point cloud data or merges pieces of point cloud data.

Moreover, the three-dimensional data decoding device may perform decoding using tile additional information. For example, when tiles overlap each other, the three-dimensional data decoding device may perform decoding for each tile, perform processing (e.g., smoothing or filtering) using the pieces of decoded data, and generate point cloud data. This makes it possible to perform highly accurate decoding.

Figure 54:
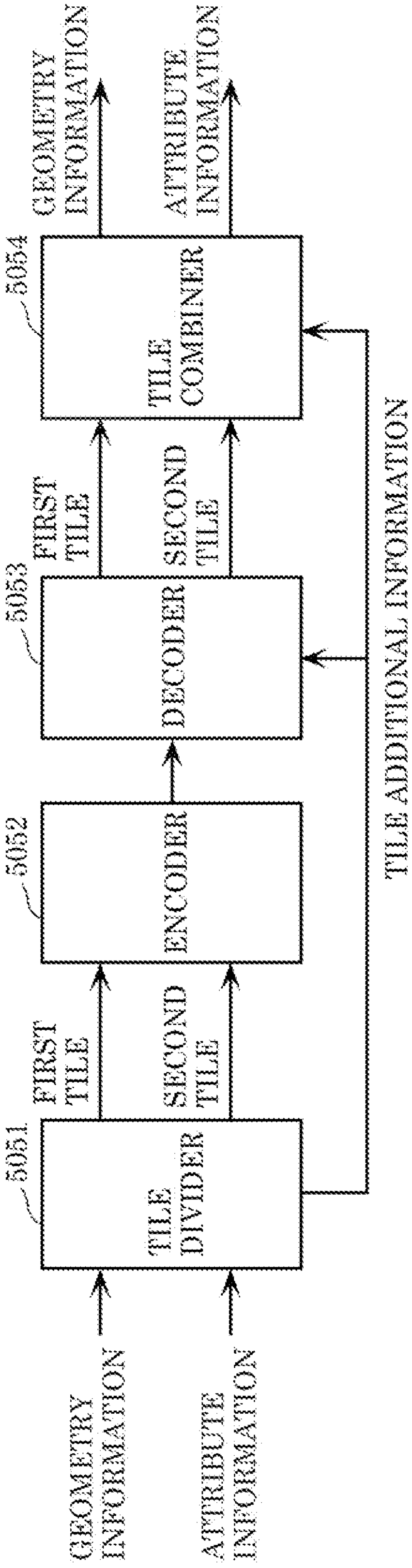
FIG. 54 is a block diagram of an encoding and decoding system according to Embodiment 6.

FIG. 54 is a diagram illustrating a configuration example of a system including the three-dimensional data encoding device and the three-dimensional data decoding device. Tile divider 5051 divides point cloud data including geometry information and attribute information into a first tile and a second tile. In addition, tile divider 5051 transmits tile additional information regarding tile division to decoder 5053 and tile combiner 5054.

Encoder 5052 generates encoded data by encoding the first tile and the second tile.

Decoder 5053 restores the first tile and the second tile by decoding the encoded data generated by encoder 5052. Tile combiner 5054 restores the point cloud data (the geometry information and the attribute information) by combining the first tile and the second tile using the tile additional information.

The following describes slice additional information. The three-dimensional data encoding device generates slice additional information that is metadata regarding a slice division method, and transmits the generated slice additional information to the three-dimensional data decoding device.

FIG. 55 is a diagram illustrating an example of syntax of slice additional information (SliceMetaData). As shown in FIG. 55, for example, slice additional information includes division method information (type_of_divide), an overlap flag (slice_overlap_flag), overlap information (type_of_overlap), a slice number (slice_number), slice position information (global_position, relative_position), and slice size information (slice_bounding_box_size).

Figure 60:
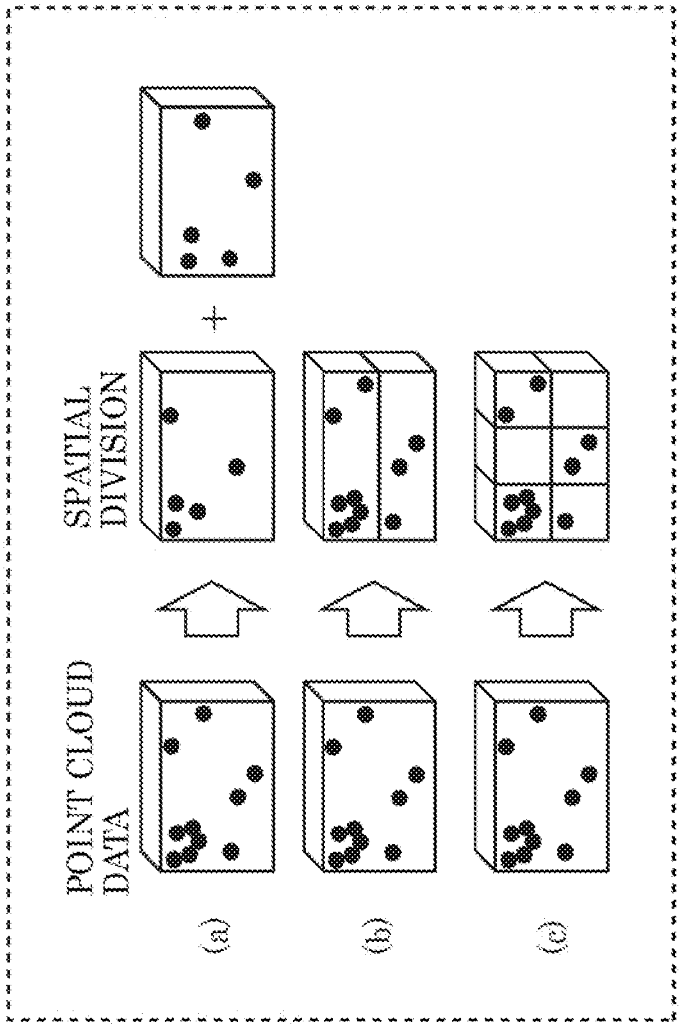
FIG. 60 is a diagram illustrating examples of a division method according to Embodiment 7.

Division method information (type_of_divide) indicates a slice division method. For example, division method information indicates whether a slice division method is division based on information about an object (object) as shown in FIG. 60. It should be noted that slice additional information may include information indicating an object division method. For example, this information indicates whether one object is to be divided into slices or assigned to one slice. In addition, the information may indicate, for example, a division number when one object is divided into slices.

An overlap flag (slice_overlap_flag) indicates whether slices overlap each other. Overlap information (type_of_overlap) is included in slice additional information when, for example, slices overlap each other. Overlap information indicates, for example, how slices overlap each other. For example, overlap information indicates the size of an overlapping region.

A slice number (slice number) indicates the number of slices.

Slice position information (global_position, relative_position) and slice size information (slice_bounding_box_size) are information about a region of a slice. Slice position information is information for identifying the position of each slice. For example, slice position information indicates the absolute coordinates or relative coordinates of each slice. Slice size information (slice_bounding_box_size) indicates the size of each slice. For example, slice size information indicates the size of a bounding box of each slice.

The three-dimensional data encoding device may include slice additional information in SEI and transmit the SEI. Alternatively, the three-dimensional data encoding device may store slice additional information in an existing parameter set (PPS, GPS, or APS, etc.) and transmit the parameter set.

For example, when slice additional information changes for each frame, the slice additional information may be stored in a parameter set for each frame (GPS or APS etc.). When slice additional information does not change in a sequence, the slice additional information may be stored in a parameter set for sequence (geometry SPS or attribute SPS). Further, when the same slice division information is used for geometry information and attribute information, slice additional information may be stored in a parameter set for a PCC stream (a stream PS).

Moreover, slice additional information may be stored in any one of the above-mentioned parameter sets or in parameter sets. In addition, slice additional information may be stored in the header of encoded data. Additionally, slice additional information may be stored in the header of a NAL unit.

Furthermore, part or all of slice additional information may be stored in one of the header of divided geometry information and the header of divided attribute information, and need not be stored in the other. For example, when the same slice additional information is used for geometry information and attribute information, the slice additional information may be included in the header of one of the geometry information and the attribute information. For example, when attribute information depends on geometry information, the geometry information is processed first. For this reason, the slice additional information may be included in the header of the geometry information, and need not be included in the header of the attribute information. In this case, for example, the three-dimensional data decoding device determines that the attribute information of the depender belongs to the same slice as a slice having the geometry information of the dependee.

The three-dimensional data decoding device reconstructs point cloud data subjected to slice division, based on slice additional information. When there are pieces of overlapping point cloud data, the three-dimensional data decoding device specifies the pieces of overlapping point cloud data and selects one of the pieces of overlapping point cloud data or merges pieces of point cloud data.

Moreover, the three-dimensional data decoding device may perform decoding using slice additional information. For example, when slices overlap each other, the three-dimensional data decoding device may perform decoding for each slice, perform processing (e.g., smoothing or filtering) using the pieces of decoded data, and generate point cloud data. This makes it possible to perform highly accurate decoding.

Figure 56:
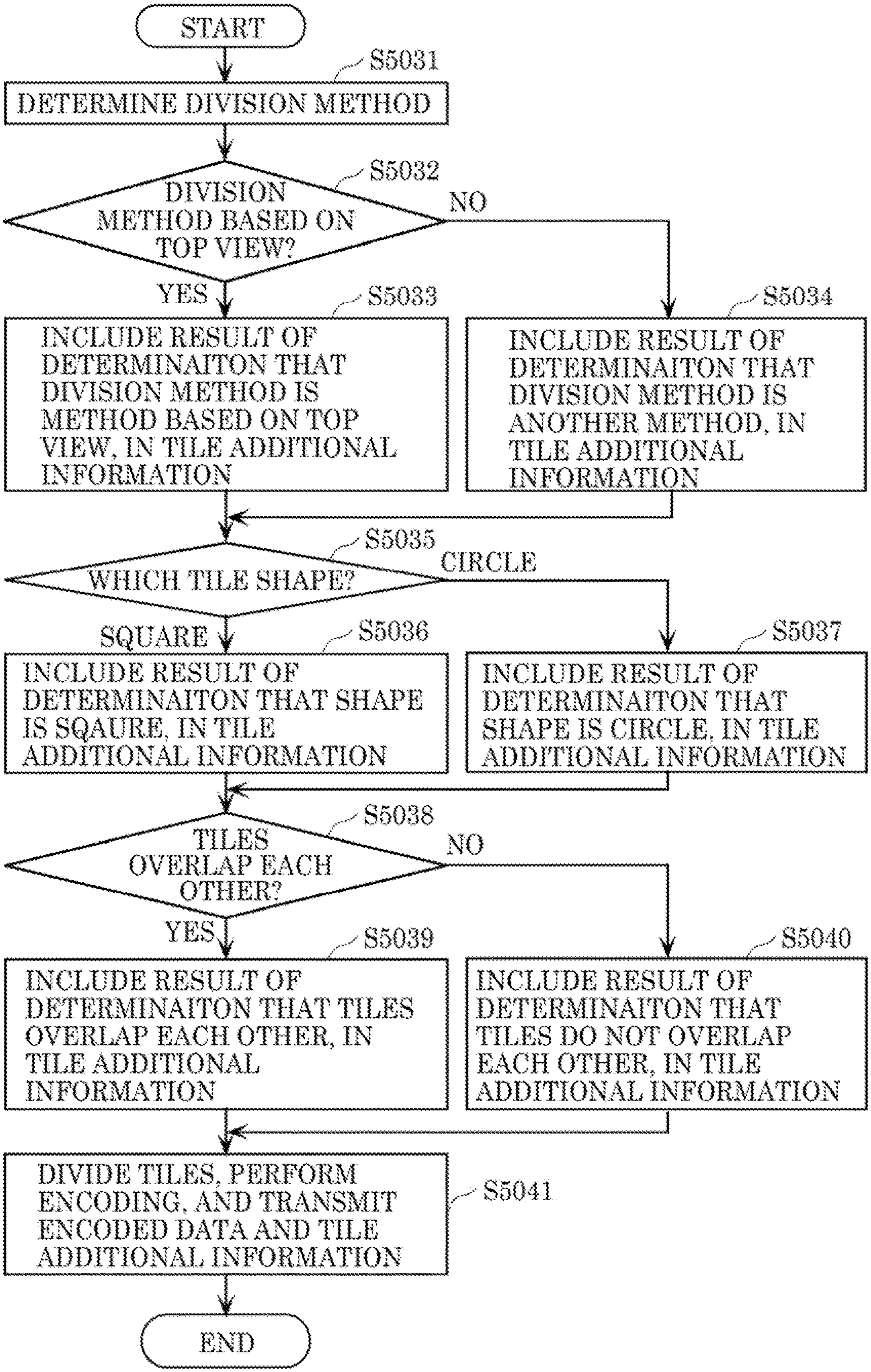
FIG. 56 is a flowchart of an encoding process according to Embodiment 6.

FIG. 56 is a flowchart of a three-dimensional data encoding process including a tile additional information generation process performed by the three-dimensional data encoding device according to the present embodiment.

First, the three-dimensional data encoding device determines a division method to be used (S5031). Specifically, the three-dimensional data encoding device determines whether a division method based on top view (top_view) or another method (other) is to be used as a tile division method. In addition, the three-dimensional data encoding device determines a tile shape when the division method based on top view is used. Additionally, the three-dimensional data encoding device determines whether tiles overlap with other tiles.

When the tile division method determined in step S5031 is the division method based on top view (YES in S5032), the three-dimensional data encoding device includes a result of the determination that the tile division method is the division method based on top view (top_view), in tile additional information (S5033).

On the other hand, when the tile division method determined in step S5031 is a method other than the division method based on top view (NO in S5032), the three-dimensional data encoding device includes a result of the determination that the tile division method is the method other than the division method based on top view (top_view), in tile additional information (S5034).

Moreover, when a shape in top view of a tile determined in step S5031 is a square (SQUARE in S5035), the three-dimensional data encoding device includes a result of the determination that the shape in top view of the tile is the square, in the tile additional information (S5036). In contrast, when a shape in top view of a tile determined in step S5031 is a circle (CIRCLE in S5035), the three-dimensional data encoding device includes a result of the determination that the shape in top view of the tile is the circle, in the tile additional information (S5037).

Next, the three-dimensional data encoding device determines whether tiles overlap with other tiles (S5038). When the tiles overlap with the other tiles (YES in S5038), the three-dimensional data encoding device includes a result of the determination that the tiles overlap with the other tiles, in the tile additional information (S5039). On the other hand, when the tiles do not overlap with other tiles (NO in S5038), the three-dimensional data encoding device includes a result of the determination that the tiles do not overlap with the other tiles, in the tile additional information (S5040).

Finally, the three-dimensional data encoding device divides the tiles based on the tile division method determined in step S5031, encodes each of the tiles, and transmits the generated encoded data and the tile additional information (S5041).

Figure 57:
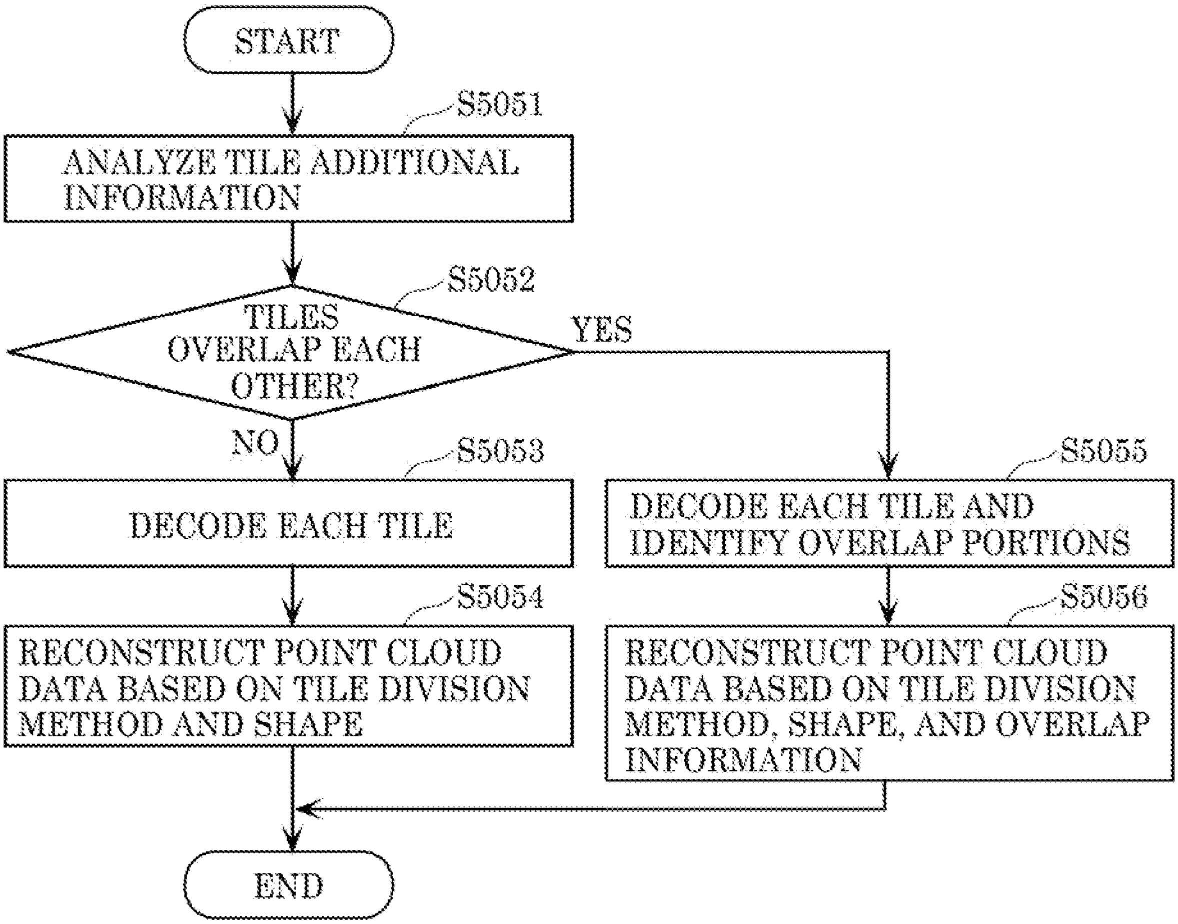
FIG. 57 is a flowchart of a decoding process according to Embodiment 6.

FIG. 57 is a flowchart of a three-dimensional data decoding process performed by the three-dimensional data decoding device according to the present embodiment using tile additional information.

First, the three-dimensional data decoding device analyzes tile additional information included in a bitstream (S5051).

When the tile additional information indicates that tiles do not overlap with other tiles (NO in S5052), the three-dimensional data decoding device generates point cloud data of each tile by decoding the tile (S5053). Finally, the three-dimensional data decoding device reconstructs point cloud data from the point cloud data of each tile, based on a tile division method and a tile shape indicated by the tile additional information (S5054).

In contrast, when the tile additional information indicates that tiles overlap with other tiles (YES in S5052), the three-dimensional data decoding device generates point cloud data of each tile by decoding the tile. In addition, the three-dimensional data decoding device identifies overlap portions of the tiles based on the tile additional information (S5055). It should be noted that, regarding the overlap portions, the three-dimensional data decoding device may perform decoding using pieces of overlapping information. Finally, the three-dimensional data decoding device reconstructs point cloud data from the point cloud data of each tile, based on a tile division method, a tile shape, and overlap information indicated by the tile additional information (S5056).

The following describes, for example, variations regarding slice. The three-dimensional data encoding device may transmit, as additional information, information indicating a type (a road, a building, a tree, etc.) or attribute (dynamic information, static information, etc.) of an object. Alternatively, a coding parameter may be predetermined according to an object, and the three-dimensional data encoding device may notify the coding parameter to the three-dimensional data decoding device by transmitting a type or attribute of the object.

The following methods may be used regarding slice data encoding order and transmitting order. For example, the three-dimensional data encoding device may encode slice data in decreasing order of ease of object recognition or clustering. Alternatively, the three-dimensional data encoding device may encode slice data in the order in which clustering is completed. Moreover, the three-dimensional data encoding device may transmit slice data in the order in which the slice data is encoded. Alternatively, the three-dimensional data encoding device may transmit slice data in decreasing order of priority for decoding in an application. For example, when dynamic information has high priority for decoding, the three-dimensional data encoding device may transmit slice data in the order in which slices are grouped using the dynamic information.

Furthermore, when encoded data order is different from the order of priority for decoding, the three-dimensional data encoding device may transmit encoded data after rearranging the encoded data. In addition, when storing encoded data, the three-dimensional data encoding device may store encoded data after rearranging the encoded data.

An application (the three-dimensional data decoding device) requests a server (the three-dimensional data encoding device) to transmit slices including desired data. The server may transmit slice data required by the application, and need not transmit slice data unnecessary for the application.

An application requests a server to transmit a tile including desired data. The server may transmit tile data required by the application, and need not transmit tile data unnecessary for the application.

Figure 58:
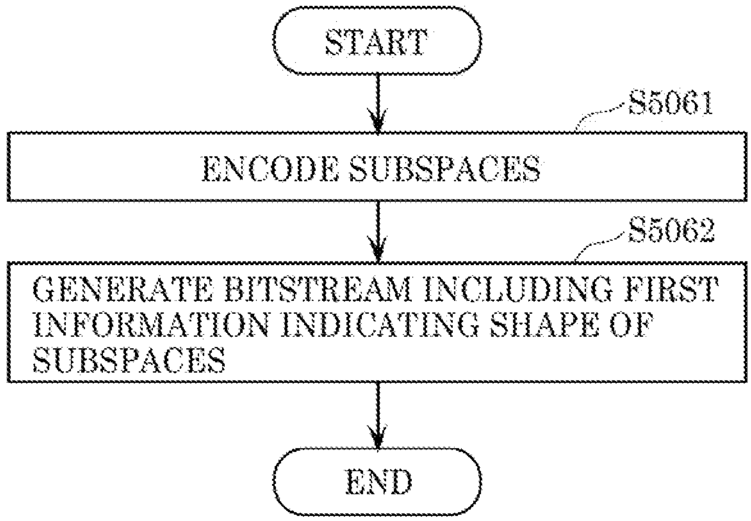
FIG. 58 is a flowchart of an encoding process according to Embodiment 6.

As stated above, the three-dimensional data encoding device according to the present embodiment performs the process shown in FIG. 58. First, the three-dimensional data encoding device encodes subspaces (e.g., tiles) obtained by dividing a current space which includes three-dimensional points, to generate pieces of encoded data (S5061). The three-dimensional data encoding device generates a bitstream including the pieces of encoded data and first information (e.g., topview_shape) indicating a shape of each of the subspaces (S5062).

Accordingly, since the three-dimensional data encoding device can select any shape from various types of shapes of subspaces, the three-dimensional data encoding device can improve the coding efficiency.

For example, the shape is a two-dimensional shape or a three-dimensional shape of each of the subspaces. For example, the shape is a shape in a top view of the subspace. To put it another way, the first information indicates a shape of the subspace viewed from a specific direction (e.g., an upper direction). In short, the first information indicates a shape in an overhead view of the subspace. For example, the shape is rectangular or circular.

For example, the bitstream includes second information (e.g., tile_overlap_flag) indicating whether the subspaces overlap.

Accordingly, since the three-dimensional data encoding device allows subspaces to overlap, the three-dimensional data encoding device can generate the subspaces without making a shape of each of the subspaces complex.

For example, the bitstream includes third information (e.g., type_of_divide) indicating whether a division method used to obtain the subspaces is a division method using a top view.

For example, the bitstream includes fourth information (e.g., tile_height) indicating at least one of a height, a width, a depth, or a radius of each of the subspaces.

For example, the bitstream includes fifth information (e.g., global_position or relative_position) indicating a position of each of the subspaces.

For example, the bitstream includes sixth information (e.g., tile_number) indicating a total number of the subspaces.

For example, the bitstream includes seventh information indicating an interval between the subspaces.

For example, the three-dimensional data encoding device includes a processor and memory, and the processor performs the above process using the memory.

Figure 59:
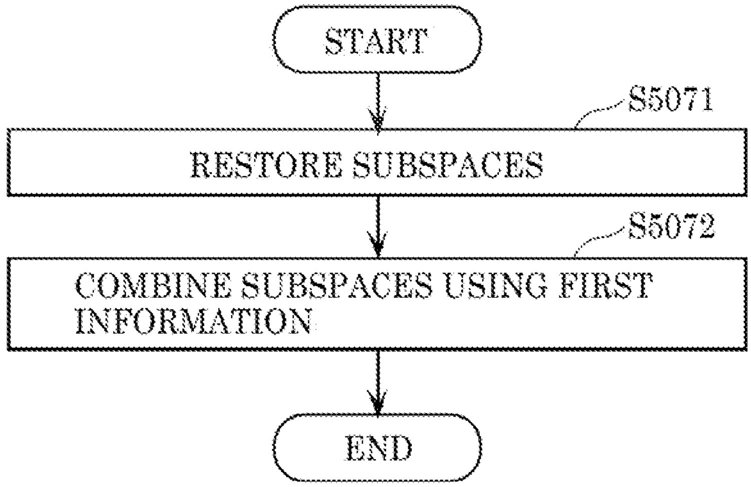
FIG. 59 is a flowchart of a decoding process according to Embodiment 6.

Moreover, the three-dimensional data decoding device according to the present embodiment performs the process shown in FIG. 59. First, the three-dimensional data decoding device decodes pieces of encoded data included in a bitstream and generated by encoding subspaces (e.g., tiles) obtained by dividing a current space which includes three-dimensional points, to restore the subspaces (S5071). The three-dimensional data decoding device restores the current space by combining the subspaces using first information (e.g., topview_shape) which is included in the bitstream and indicates a shape of each of the subspaces (S5072). For example, the three-dimensional data decoding device can determine a position and a range of each of subspaces in a current space by recognizing a shape of the subspace using the first information. The three-dimensional data decoding device can combine the subspaces based on the determined positions and ranges of the subspaces. Accordingly, the three-dimensional data decoding device can combine the subspaces correctly.

For example, the shape is a two-dimensional shape or a three-dimensional shape of each of the subspaces. For example, the shape is rectangular or circular.

For example, the bitstream includes second information (e.g., tile_overlap_flag) indicating whether the subspaces overlap. In the restoring of the current space, the three-dimensional data decoding device combines the subspaces by further using the second information. For example, the three-dimensional data decoding device determines whether subspaces overlap, using the second information. When the subspaces overlap, the three-dimensional data decoding device identifies overlap regions and performs a predetermined process on the identified regions.

For example, the bitstream includes third information (e.g., type_of_divide) indicating whether a division method used to obtain the subspaces is a division method using a top view. In the restoring of the current space, when the third information indicates that the division method used to obtain the subspaces is the division method using the top view, the three-dimensional data decoding device combines the subspaces using the first information.

For example, the bitstream includes fourth information (e.g., tile_height) indicating at least one of a height, a width, a depth, or a radius of each of the subspaces. In the restoring of the current space, the three-dimensional data decoding device combines the subspaces by further using the fourth information. For example, the three-dimensional data decoding device can determine a position and a range of each of subspaces in a current space by recognizing a height of the subspace using the fourth information. The three-dimensional data decoding device can combine the subspaces based on the determined positions and ranges of the subspaces.

For example, the bitstream includes fifth information (e.g., global_position or relative_position) indicating a position of each of the subspaces. In the restoring of the current space, the three-dimensional data decoding device combines the subspaces by further using the fifth information. For example, the three-dimensional data decoding device can determine a position of each of subspaces in a current space by recognizing a position of the subspace using the fifth information. The three-dimensional data decoding device can combine the subspaces based on the determined positions of the subspaces.

For example, the bitstream includes sixth information (e.g., tile_number) indicating a total number of the subspaces. In the restoring of the current space, the three-dimensional data decoding device combines the subspaces by further using the sixth information.

For example, the bitstream includes seventh information indicating an interval between the subspaces. In the restoring of the current space, the three-dimensional data decoding device combines the subspaces by further using the seventh information. For example, the three-dimensional data decoding device can determine a position and a range of each of subspaces in a current space by recognizing an interval between the subspaces using the seventh information. The three-dimensional data decoding device can combine the subspaces based on the determined positions and ranges of the subspaces.

For example, the three-dimensional data decoding device includes a processor and memory, and the processor performs the above process using the memory.

Embodiment 7

The present embodiment describes processing of a division unit (e.g., a tile or a slice) including no points. First, a method of dividing point cloud data will be described.

In a video coding standard such as HEVC, since there are data for all the pixels of a two-dimensional image, even when a two-dimensional space is divided into data areas, all the data areas include data. On the other hand, in encoding of three-dimensional point cloud data, points themselves that are elements of point cloud data are data, and there is a possibility that data are not included in some of areas.

There are various methods of spatially dividing point cloud data, and such methods can be classified according to whether a division unit (e.g., a tile or a slice) that is a divided data unit always includes one or more point data.

A division method in which all division units each include one or more point data is referred to as a first division method. Examples of the first division method include a method of dividing point cloud data in consideration of processing time for encoding or the size of encoded data. In this case, each division unit has a substantially even number of points.

FIG. 60 is a diagram illustrating examples of a division method. For example, as shown in (a) in FIG. 60, a method of separating points belonging to an identical space into two identical spaces may be used as the first division method. In addition, as shown in (b) in FIG. 60, a space may be divided into subspaces (division units) so that each of the division units includes points.

Since these methods are division in consideration of points, all division units always include one or more points.

A division method in which division units are likely to include one or more division units including no point data is referred to as a second division method. For example, as shown in (c) in FIG. 60, a method of dividing a space equally may be used as the second division method. In this case, a division unit does not always include points. In short, a division unit may include no points.

When the three-dimensional data encoding device divides point cloud data, the three-dimensional data encoding device may include, in divided additional information (e.g., tile additional information or slice additional information), (i) whether a division method in which all division units include one or more point data has been used, (ii) whether a division method in which division units include one or more division units including no point data has been used, or (iii) whether a division method in which division units are likely to include one or more division units including no point data. Subsequently, the three-dimensional data encoding device may transmit the divided additional information.

It should be noted that the three-dimensional data encoding device may indicate the above information as a type of a division method. Additionally, the three-dimensional data encoding device may perform division using a predetermined division method, and need not transmit divided additional information. In this case, the three-dimensional data encoding device clearly specifies whether the division method is the first division method or the second division method in advance.

The following describes the second division method and an example of generating and transmitting encoded data. It should be noted that although tile division will be exemplified as a method of dividing a three-dimensional space below, the present embodiment is not limited to tile division, and the following procedure is applicable to a division method using division units other than tiles. For example, slice division may be used instead of tile division.

Figure 61:
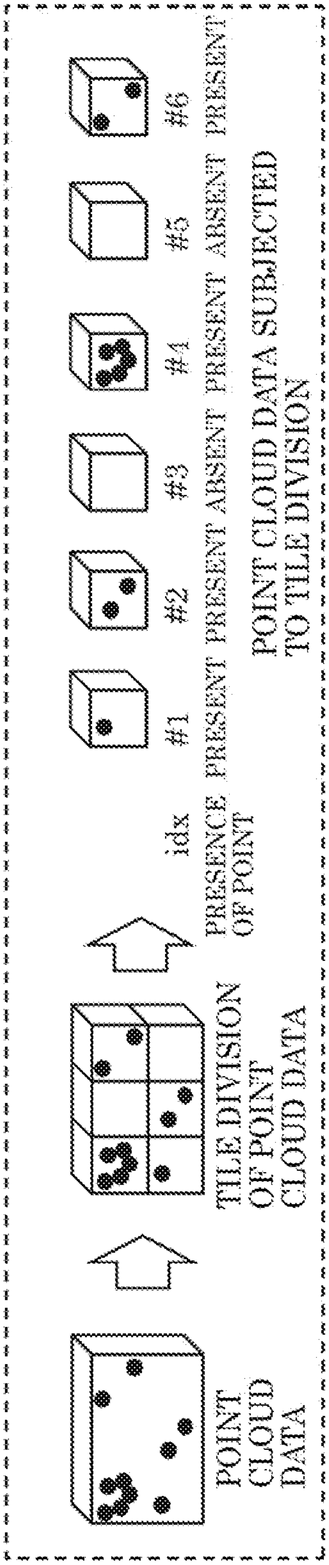
FIG. 61 is a diagram illustrating an example of dividing point cloud data according to Embodiment 7.

FIG. 61 is a diagram illustrating an example of dividing point cloud data into six tiles. FIG. 61 shows an example in which the smallest unit is a point and geometry information (geometry) and attribute information (attribute) are divided together. It should be noted that the same applies to a case in which geometry information and attribute information are divided using separate division methods or by separate division numbers, a case in which there is no attribute information, and a case in which there are pieces of attribute information.

In the example shown in FIG. 61, tile division results in tiles (#1, #2, #4, #6) including points and tiles (#3, #5) including no points. A tile including no points is referred to as a null tile.

It should be noted that the present disclosure is not limited to the division into six tiles, and any division method may be used. For example, a division unit may be a cube or have a non-cubic shape such as a cuboid or round column. Division units may be identical or different in shape. Moreover, a predetermined method may be used as a division method, or a different method may be used for each predetermined unit (e.g., PCC frame).

In the present division method, when point cloud data is divided into tiles and one or more of the tiles include no data, a bitstream including information indicating that the one or more tiles are null tiles is generated.

The following describes a method of transmitting a null tile and a method of signaling a null tile. The three-dimensional data encoding device may generate, as addition information (metadata) regarding data division, for example, the following information and transmit the generated information. FIG. 62 is a diagram illustrating an example of syntax of tile additional information (TileMetaData). Tile additional information includes division method information (type_of_divide), division method null information (type_of_divide_null), a tile division number (number_of_tiles), and a tile null flag (tile_null_flag).

Division method information (type_of_divide) is information regarding a division method or a division type. For example, division method information indicates one or more division methods or division types. Examples of a division method include top view (top_view) division and equal division. It should be noted that when the number of definitions of a division method is one, tile additional information need not include division method information.

Division method null information (type_of_divide_null) is information indicating whether a division method to be used is the following first division method or second division method. Here, the first division method is a division method in which each of all division units always includes one or more point data. The second division method is a division method in which division units include one or more division units including no point data or a division method in which division units are likely to include one or more division units including no point data.

Tile additional information may also include, as division information about tiles as a whole, at least one of (i) information (a tile division number (number_of_tiles)) indicating a tile division number or information for specifying a tile division number, (ii) information indicating the number of null tiles or information for specifying the number of null tiles, or (iii) information indicating the number of tiles other than null tiles or information for specifying the number of tiles other than null tiles. In addition, the tile additional information may include, as division information about tiles as a whole, information indicating shapes of tiles or whether tiles overlap each other.

Moreover, the tile additional information indicates division information of each tile in sequence. For example, the order of tiles is predetermined for each division method, and is already known to the three-dimensional data encoding device and the three-dimensional data decoding device. It should be noted that when the order of tiles is not predetermined, the three-dimensional data encoding device may transmit information indicating the order to the three-dimensional data decoding device.

Division information of each tile includes a tile null flag (tile_null_flag) indicating whether the tile includes data (a point). It should be noted that when a tile includes no data, a tile null flag may be included as tile division information.

Moreover, when a tile is not a null tile, tile additional information includes division information (position information (e.g., the coordinates of the origin (origin_x, origin_y, origin_z), tile height information, etc.) of each tile. Furthermore, when a tile is a null tile, tile additional information does not include division information of each tile.

For example, when slice division information of each tile is stored into division information of each tile, the three-dimensional data encoding device need not store slice division information of a null tile into additional information.

Figure 63:
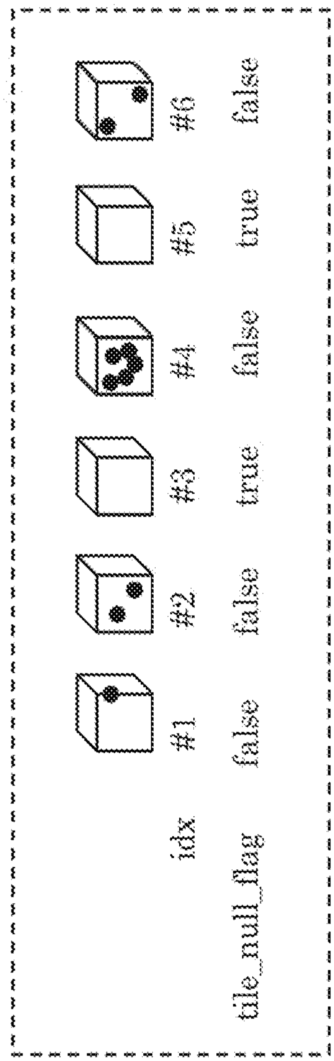
FIG. 63 is a diagram illustrating an example of index information according to Embodiment 7.

It should be noted that in this example, a tile division number (number_of_tiles) indicates the number of tiles including null tiles. FIG. 63 is a diagram illustrating an example of index information (idx) of a tile. In the example shown in FIG. 63, index information is also assigned to a null tile.

Figure 64:
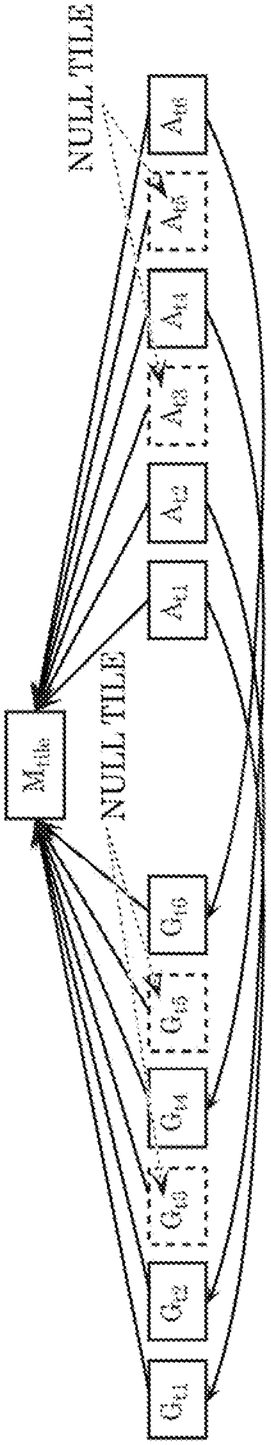
FIG. 64 is a diagram illustrating an example of dependency relationships according to Embodiment 7.
Figure 65:
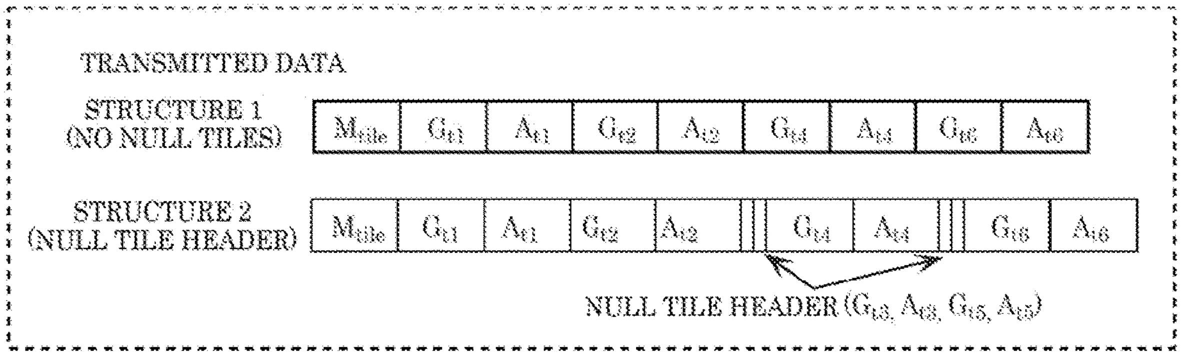
FIG. 65 is a diagram illustrating an example of transmitted data according to Embodiment 7.
Figure 66:
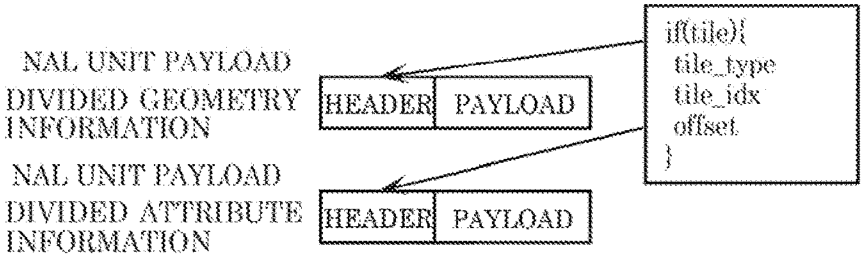
FIG. 66 is a diagram illustrating a structural example of NAL units according to Embodiment 7.

The following describes a data structure of encoded data including null tiles and a transmission method. FIG. 64 to FIG. 66 each are a diagram illustrating a data structure when the third and fifth tiles include no data after geometry information and attribute information are divided into six tiles.

FIG. 64 is a diagram illustrating an example of a dependency relationship of each data. The pointed end of an arrow in the figure indicates a dependee, and the other end of the arrow indicates a depender. Moreover, in the figure, $G_{tn}$ denotes geometry information for tile number n, and $A_{tn}$ denotes attribute information for tile number n, n being an integer from 1 to 6. $M_{tile}$ denotes tile additional information.

FIG. 65 is a diagram illustrating a structural example of transmitted data that is encoded data transmitted by the three-dimensional data encoding device. FIG. 66 is a diagram illustrating a structure of encoded data and a method of storing encoded data in a NAL unit.

As shown in FIG. 66, each of the headers of data of geometry information (divided geometry information) and attribute information (divided attribute information) includes index information (tile idx) of a tile.

Moreover, as shown in structure 1 in FIG. 65, the three-dimensional data encoding device need not transmit geometry information or attribute information constituting a null tile. Alternatively, as shown in structure 2 in FIG. 65, the three-dimensional data encoding device may transmit, as data of a null tile, information indicating that a tile is a null tile. For example, the three-dimensional data encoding device may include, in tile_type stored in the header of a NAL unit or the header in a payload (nal_unit_payload) of a NAL unit, that a type of the data is a null tile, and transmit the header. It should be noted that the following description will be premised on structure 1.

In structure 1, when there are null tiles, some of values of index information (tile_idx) of tiles included in the header of geometry information data or attribute information data are missing and the values are not continuous in transmitted data.

Moreover, when data have a dependency relationship with each other, the three-dimensional data encoding device transmits the data so that data referred to can be decoded before data referring to the data. It should be noted that a tile of attribute information depends on a tile of geometry information. The same index number of a tile is assigned to attribute information and geometry information having a dependency relationship with each other.

It should be noted that tile additional information regarding tile division may be stored in both or one of a parameter set for geometry information (GPS) and a parameter set for attribute information (APS). When the tile additional information is stored in one of the GPS or the APS, reference information indicating a GPS or an APS to be referred to may be stored in the other of the GPS or the APS. Moreover, when a tile division method is different between geometry information and attribute information, different tile additional information is stored in each of a GPS and an APS. Furthermore, when an identical tile division method is used for sequences (PCC frames), tile additional information may be stored in a GPS, an APS, or a sequence parameter set (SPS).

For example, when tile additional information is stored in both a GPS and an APS, tile additional information for geometry information is stored in the GPS, and tile additional information for attribute information is stored in the APS. Moreover, when tile additional information is stored in common information such as an SPS, tile additional information to be commonly used for geometry information and attribute information may be stored, or tile additional information for the geometry information and tile additional information for the attribute information may be stored separately.

Hereinafter, a combination of tile division and slice division will be described. First, the following describe a data structure and data transmission when tile division is performed after slice division.

Figure 67:
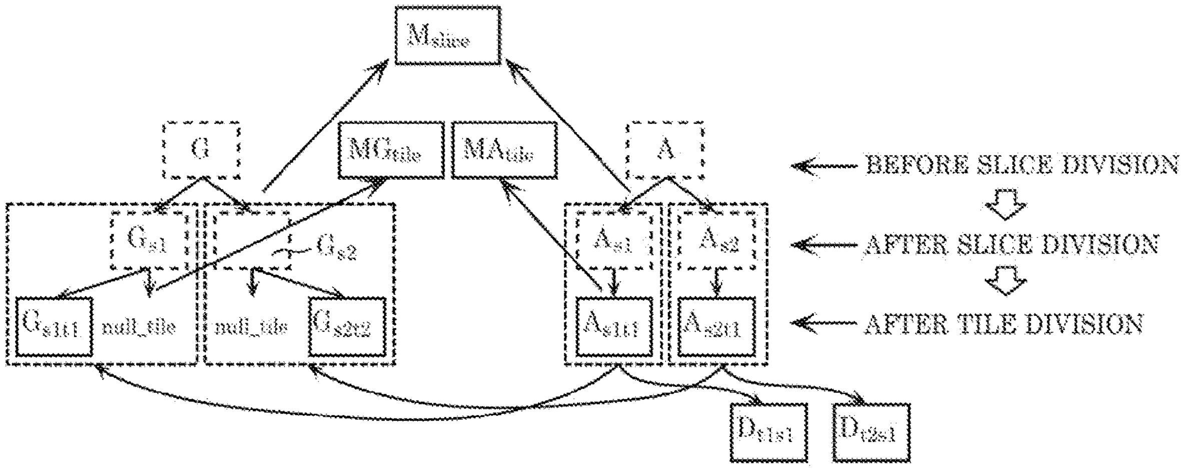
FIG. 67 is a diagram illustrating an example of dependency relationships according to Embodiment 7.

FIG. 67 is a diagram illustrating an example of a dependency relationship of each data when tile division is performed after slice division. The pointed end of an arrow in the figure indicates a dependee, and the other end of the arrow indicates a depender. Data indicated by a solid line in the figure is data actually transmitted, and data indicated by a broken line is data not transmitted.

In the figure, G denotes geometry information, and A denotes attribute information. $G_{s1}$ denotes geometry information for slice number 1, and $G_{s2}$ denotes geometry information for slice number 2. $G_{s1t1}$ denotes geometry information for slice number 1 and tile number 1, and $G_{s2t2}$ denotes geometry information for slice number 2 and tile number 2. Likewise, $A_{s1}$ denotes attribute information for slice number 1, and $A_{s2}$ denotes attribute information for slice number 2. $A_{s1t1}$ denotes attribute information for slice number 1 and tile number 1, and $A_{s2t1}$ denotes attribute information for slice number 2 and tile number 1.

$M_{slice}$ denotes slice additional information, $MG_{tile}$ denotes geometry tile additional information, and $MA_{tile}$ denotes attribute tile additional information. $D_{s2t1}$ denotes dependency relationship information of attribute information $A_{s1t1}$, and $D_{s2t1}$ denotes dependency relationship information of attribute information $A_{s2t1}$.

The three-dimensional data encoding device need not generate and transmit geometry information and attribute information regarding a null tile.

Even when a tile division number is identical to all slices, there is a possibility that the number of tiles generated and transmitted is different between slices. For example, when a tile division number is different between geometry information and attribute information, there is a case in which a null tile is included in one of the geometry information and the attribute information, and a null tile is not included in the other of the geometry information and the attribute information. In the example shown in FIG. 67, geometry information of slice 1 ($G_{s1}$) is divided into two tiles $G_{s1t1}$ and $G_{s1t2}$, and $G_{s1t2}$ is a null tile. In contrast, attribute information of slice 1 (Asi) is not divided, with the result that there are one $A_{s1t1}$ and no null tiles.

When data is included in at least a tile of attribution information regardless of whether a null tile is included in a slice of geometry information, the three-dimensional data encoding device generates and transmits dependency relationship information of the attribute information. For example, when the three-dimensional data encoding device stores slice division information of each tile in division information of each slice included in slice additional information regarding slice division, the three-dimensional data encoding device stores information indicating whether the tile is a null tile in the slice division information.

Figure 68:
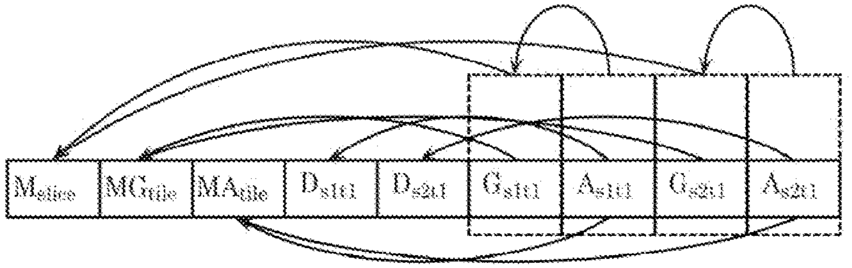
FIG. 68 is a diagram illustrating an example of decoding order of data according to Embodiment 7.

FIG. 68 is a diagram illustrating an example of decoding order of data. In the example shown in FIG. 68, data are decoded in order from the left. The three-dimensional data decoding device decodes, out of data having a dependency relationship with each other, data of a dependee first. For example, the three-dimensional data encoding device rearranges data in this order and transmits the data. It should be noted that any order may be used as long as data of a dependee takes precedence. Moreover, the three-dimensional data encoding device may transmit additional information and dependency relationship information before data.

Next, the following describe a data structure and data transmission when slice division is performed after tile division.

Figure 69:
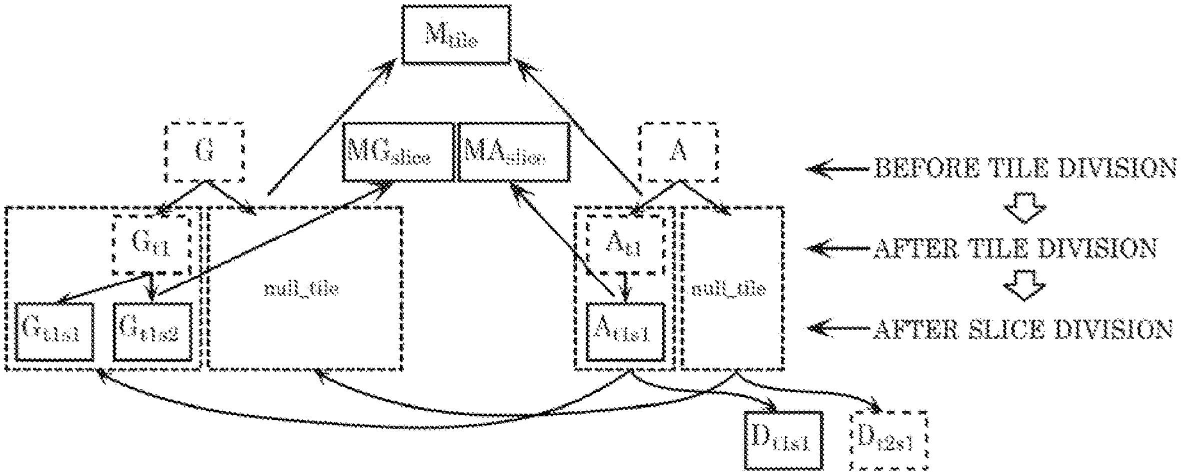
FIG. 69 is a diagram illustrating an example of dependency relationships according to Embodiment 7.

FIG. 69 is a diagram illustrating an example of a dependency relationship of each data when slice division is performed after tile division. The pointed end of an arrow in the figure indicates a dependee, and the other end of the arrow indicates a depender. Data indicated by a solid line in the figure is data actually transmitted, and data indicated by a broken line is data not transmitted.

In the figure, G denotes geometry information, and A denotes attribute information. $G_{t1}$ denotes geometry information for tile number 1. $G_{t1s1}$ denotes geometry information for tile number 1 and slice number 1, and $G_{t1s2}$ denotes geometry information for tile number 1 and slice number 2. Likewise, $A_t$1 denotes attribute information for tile number 1, and $A_{s1t1}$ denotes attribute information for tile number 1 and slice number 1.

$M_{tile}$ denotes tile additional information, $MG_{slice}$ denotes geometry slice additional information, and $MA_{slice}$ denotes attribute slice additional information. $D_{t1s1}$ denotes dependency relationship information of attribute information $A_{t1s1}$, and $D_{t2s1}$ denotes dependency relationship information of attribute information $A_{t2s1}$.

The three-dimensional data encoding device does not perform slice division on a null tile. In addition, the three-dimensional data encoding device need not generate and transmit geometry information and attribute information regarding a null tile, and dependency relationship information of the geometry information.

Figure 70:
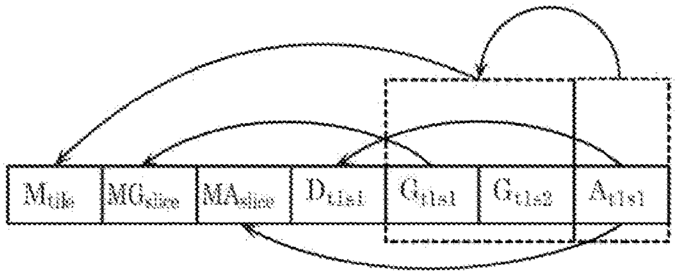
FIG. 70 is a diagram illustrating an example of decoding order of data according to Embodiment 7.

FIG. 70 is a diagram illustrating an example of decoding order of data. In the example shown in FIG. 70, data are decoded in order from the left. The three-dimensional data decoding device decodes, out of data having a dependency relationship with each other, data of a dependee first. For example, the three-dimensional data encoding device rearranges data in this order and transmits the data. It should be noted that any order may be used as long as data of a dependee takes precedence. Moreover, the three-dimensional data encoding device may transmit additional information and dependency relationship information before data.

The following describes procedures of a point cloud data division process and a point cloud data combination process. It should be noted that although examples of tile division and slice division will be described here, the same procedures can be applied to division of another space.

Figure 71:
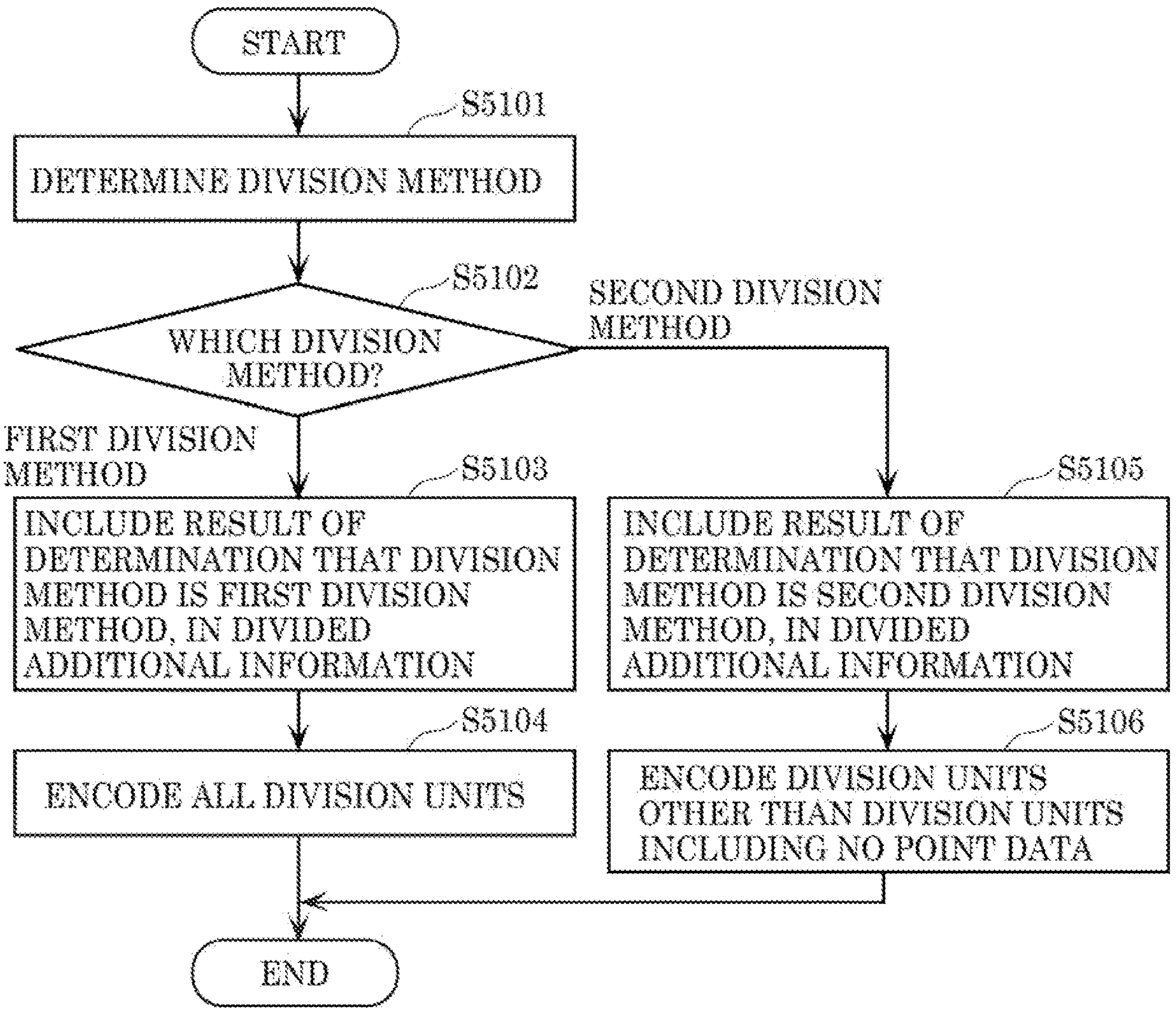
FIG. 71 is a flowchart of an encoding process according to Embodiment 7.

FIG. 71 is a flowchart of a three-dimensional data encoding process including a data division process performed by the three-dimensional data encoding device. First, the three-dimensional data encoding device determines a division method to be used (S5101). Specifically, the three-dimensional data encoding device determines whether to use a first division method or a second division method. For example, the three-dimensional data encoding device may determine a division method based on instructions from a user or an external device (e.g., the three-dimensional data decoding device), or determine a division method according to inputted point cloud data. In addition, a division method to be used may be predetermined.

Here, the first division method is a division method in which each of all division units (tiles or slices) always includes one or more point data. The second division method is a division method in which division units include one or more division units including no point data or a division method in which division units are likely to include one or more division units including no point data.

When the determined division method is the first division method (FIRST DIVISION METHOD in S5102), the three-dimensional data encoding device includes a result of the determination that the division method used is the first division method, in divided additional information (e.g., tile additional information or slice additional information) that is metadata regarding data division (S5103). Finally, the three-dimensional data encoding device encodes all division units (S5104).

On the other hand, when the determined division method is the second division method (SECOND DIVISION METHOD in S5102), the three-dimensional data encoding device includes a result of the determination that the division method used in the second division method, in divided additional information (S5105). Finally, the three-dimensional data encoding device encodes, among division units, division units other than division units (e.g., null tiles) including no point data (S5106).

Figure 72:
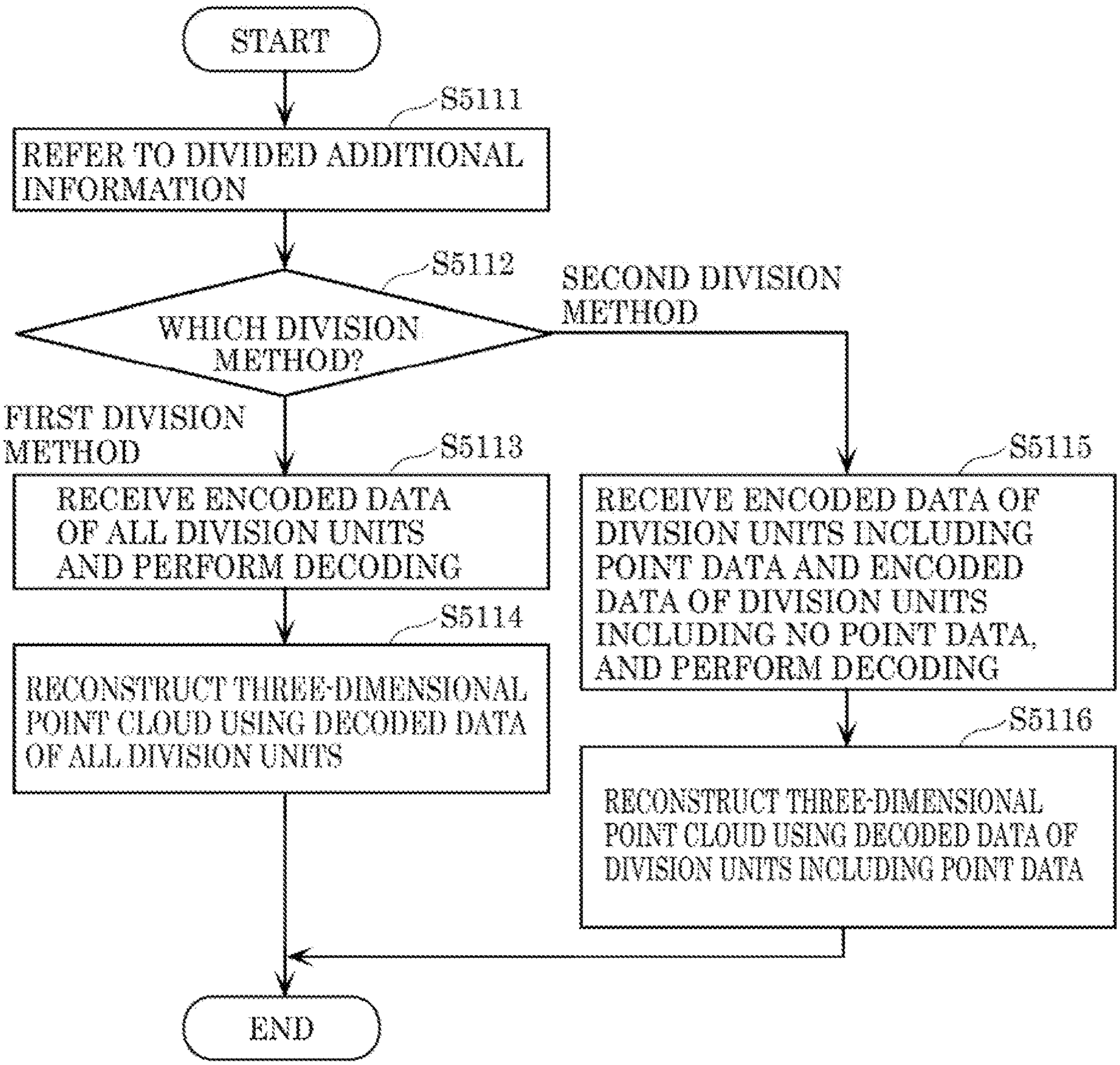
FIG. 72 is a flowchart of a decoding process according to Embodiment 7.

FIG. 72 is a flowchart of a three-dimensional data decoding process including a data combination process performed by the three-dimensional data decoding device. First, the three-dimensional data decoding device refers to divided additional information included in a bitstream and determines whether a division method used is the first division method or the second division method (S5111).

When the division method used is the first division method (FIRST DIVISION METHOD in S5112), the three-dimensional data decoding device receives encoded data of all division units and generates decoded data of all the division units by decoding the received encoded data (S5113). Finally, the three-dimensional data decoding device reconstructs a three-dimensional point cloud using the decoded data of all the division units (S5114). For example, the three-dimensional data decoding device reconstructs a three-dimensional point cloud by combining division units.

On the other hand, when the division method used is the second division method (SECOND DIVISION METHOD in S5112), the three-dimensional data decoding device receives encoded data of division units including point data and encoded data of division units including no point data, and generates decoded data by decoding the received encoded data of the division units (S5115). It should be noted that when division units including no point data are not transmitted, the three-dimensional data decoding device need not receive and decode the division units including no point data. Finally, the three-dimensional data decoding device reconstructs a three-dimensional point cloud using the decoded data of the division units including the point data (S5116). For example, the three-dimensional data decoding device reconstructs a three-dimensional point cloud by combining division units.

The following describes other point cloud data division methods. When a space is divided equally as shown in (c) in FIG. 60, a divided space may include no points. In this case, the three-dimensional data encoding device combines the space including no points with another space including points. As a result, the three-dimensional data encoding device can form division units so that each of the division units includes one or more points.

Figure 73:
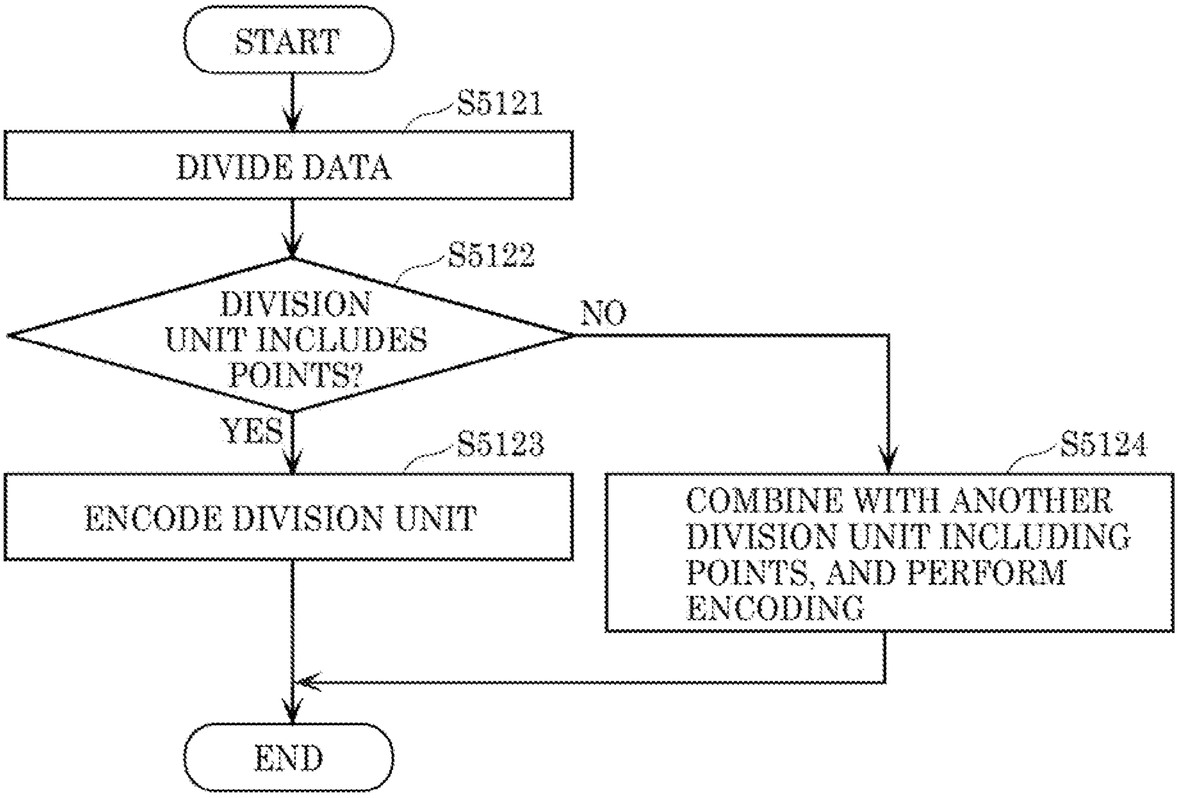
FIG. 73 is a flowchart of an encoding process according to Embodiment 7.

FIG. 73 is a flowchart for data division in the above case. First, the three-dimensional data encoding device divides data using a specific method (S5121). For example, the specific method is the above second division method.

Next, the three-dimensional data encoding device determines whether a current division unit that is a division unit to be processed includes points (S5122). When the current division unit includes points (YES in S5122), the three-dimensional data encoding device encodes the current division unit (S5123). On the other hand, when the current division unit includes no points (NO in S5122), the three-dimensional data encoding device combines the current division unit with another division unit including points, and encodes the combined division unit (S5124). To put it another way, the three-dimensional data encoding device encodes the current division unit together with the other division unit including the points.

It should be noted that although the example of performing determination and combination for each division unit has been described above, a processing method is not limited to this. For example, the three-dimensional data encoding device may determine whether each of division units includes points, perform combination so that any division unit including no points will disappear, and encode each of the combined division units.

Figure 74:
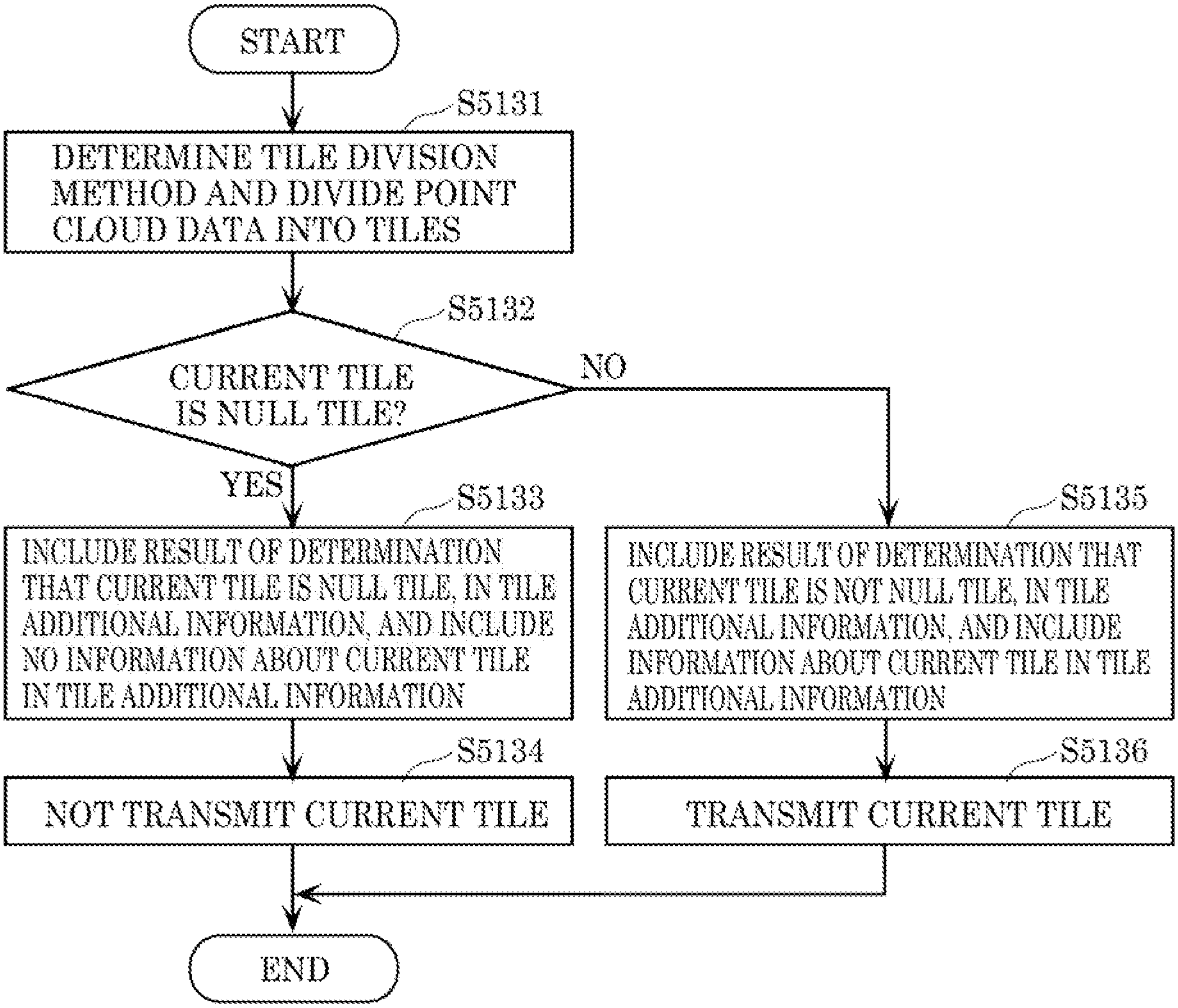
FIG. 74 is a flowchart of an encoding process according to Embodiment 7.

The following describes a method of transmitting data including a null tile. When a current tile that is a tile to be processed is a null tile, the three-dimensional data encoding device does not transmit data of the current tile. FIG. 74 is a flowchart of a data transmission process.

First, the three-dimensional data encoding device determines a tile division method and divides point cloud data into tiles using the determined division method (S5131).

Next, the three-dimensional data encoding device determines whether the current tile is a null tile (S5132). In other words, the three-dimensional data encoding device determines whether no data is included in the current tile.

When the current tile is the null tile (YES in S5132), the three-dimensional data encoding device includes a result of the determination that the current tile is the null tile, in tile additional information, and does not include information (tile position, size, etc.) about the current tile in the tile additional information (S5133). In addition, the three-dimensional data encoding device does not transmit the current tile (S5134).

On the other hand, when the current tile is not the null tile (NO in S5132), the three-dimensional data encoding device includes a result of the determination that the current tile is not the null tile, in tile additional information, and includes information about each tile in the tile additional information (S5135). In addition, the three-dimensional data encoding device transmits the current tile (S5136).

As stated above, it is possible to reduce the amount of tile additional information by omitting information about a null tile from the tile additional information.

The following describes a method of decoding encoded data including a null tile. First, a process when there is no packet loss will be described.

Figure 75:
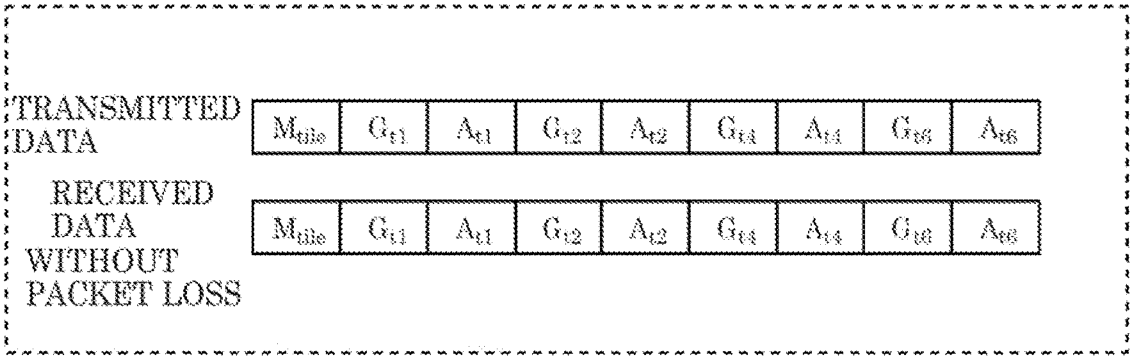
FIG. 75 is a diagram illustrating an example of transmitted data and an example of received data according to Embodiment 7.

FIG. 75 is a diagram illustrating an example of transmitted data that is encoded data transmitted by the three-dimensional data encoding device, and an example of received data inputted to the three-dimensional data decoding device. It should be noted that a system environment without packet loss is assumed here, and received data is identical to transmitted data.

Figure 76:
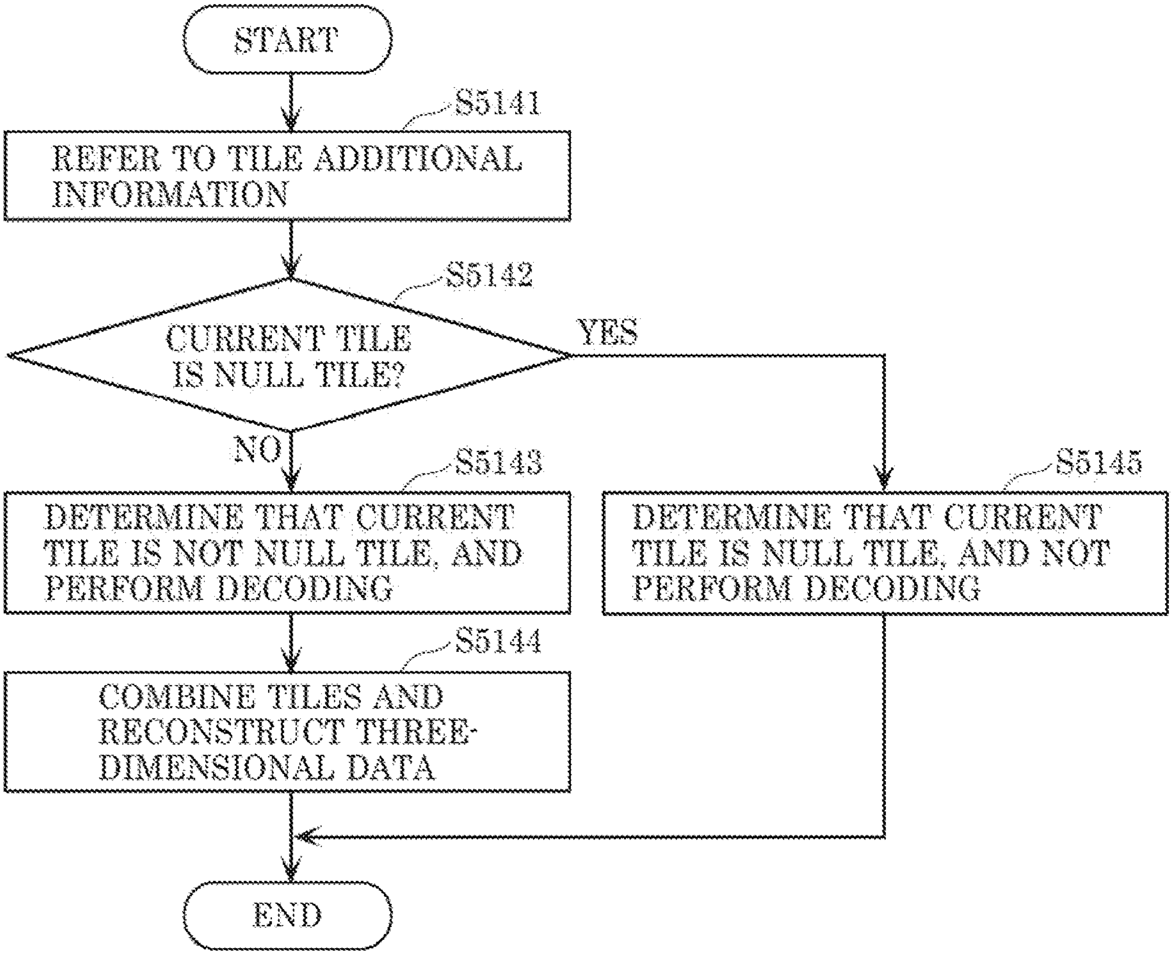
FIG. 76 is a flowchart of a decoding process according to Embodiment 7.

When a system environment is free from packet loss, the three-dimensional data decoding device receives all transmitted data. FIG. 76 is a flowchart of a process performed by the three-dimensional data decoding device.

First, the three-dimensional data decoding device refers to tile additional information (S5141) and determines whether each of tiles is a null tile (S5142).

When the tile additional information indicates that a current tile is not a null tile (NO in S5142), the three-dimensional data decoding device determines that the current tile is not the null tile and decodes the current tile (S5143). Finally, the three-dimensional data decoding device obtains information (position information (e.g., origin coordinates), size, etc. of the tiles) about the tiles from the tile additional information, and reconstructs three-dimensional data by combining the tiles using the obtained information (S5144).

On the other hand, when the tile additional information indicates that a current tile is a null tile (YES in S5142), the three-dimensional data decoding device determines that the current tile is the null tile and does not decode the current tile (S5145).

It should be noted that the three-dimensional data decoding device may determine that missing data is a null tile, by sequentially analyzing index information indicated by the header of encoded data. In addition, the three-dimensional data decoding device may combine a determination method using tile additional information and a determination method using index information.

Figure 77:
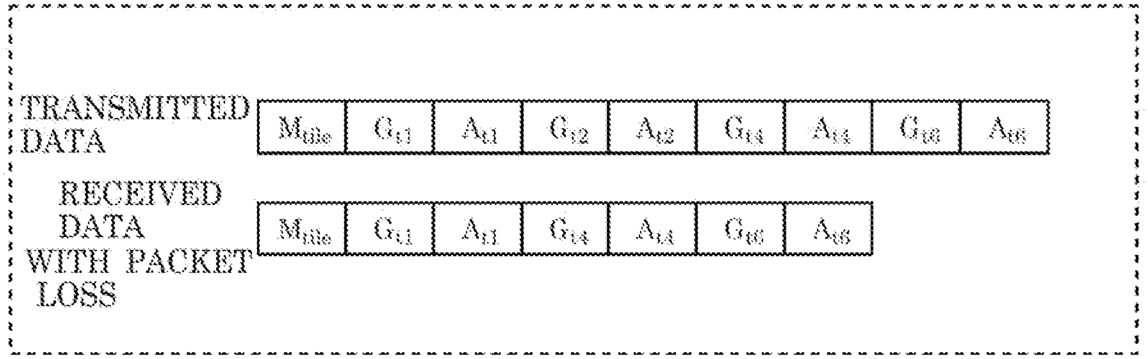
FIG. 77 is a diagram illustrating an example of transmitted data and an example of received data according to Embodiment 7.

The following describes a process when there is packet loss. FIG. 77 is a diagram illustrating an example of transmitted data from the three-dimensional data encoding device, and an example of received data inputted to the three-dimensional data decoding device. Here, a system environment with packet loss is assumed.

When packet loss occurs in a system environment, there is a possibility that the three-dimensional data decoding device cannot receive all transmitted data. In this example, packets of $G_t2$ and $A_te$ are lost.

Figure 78:
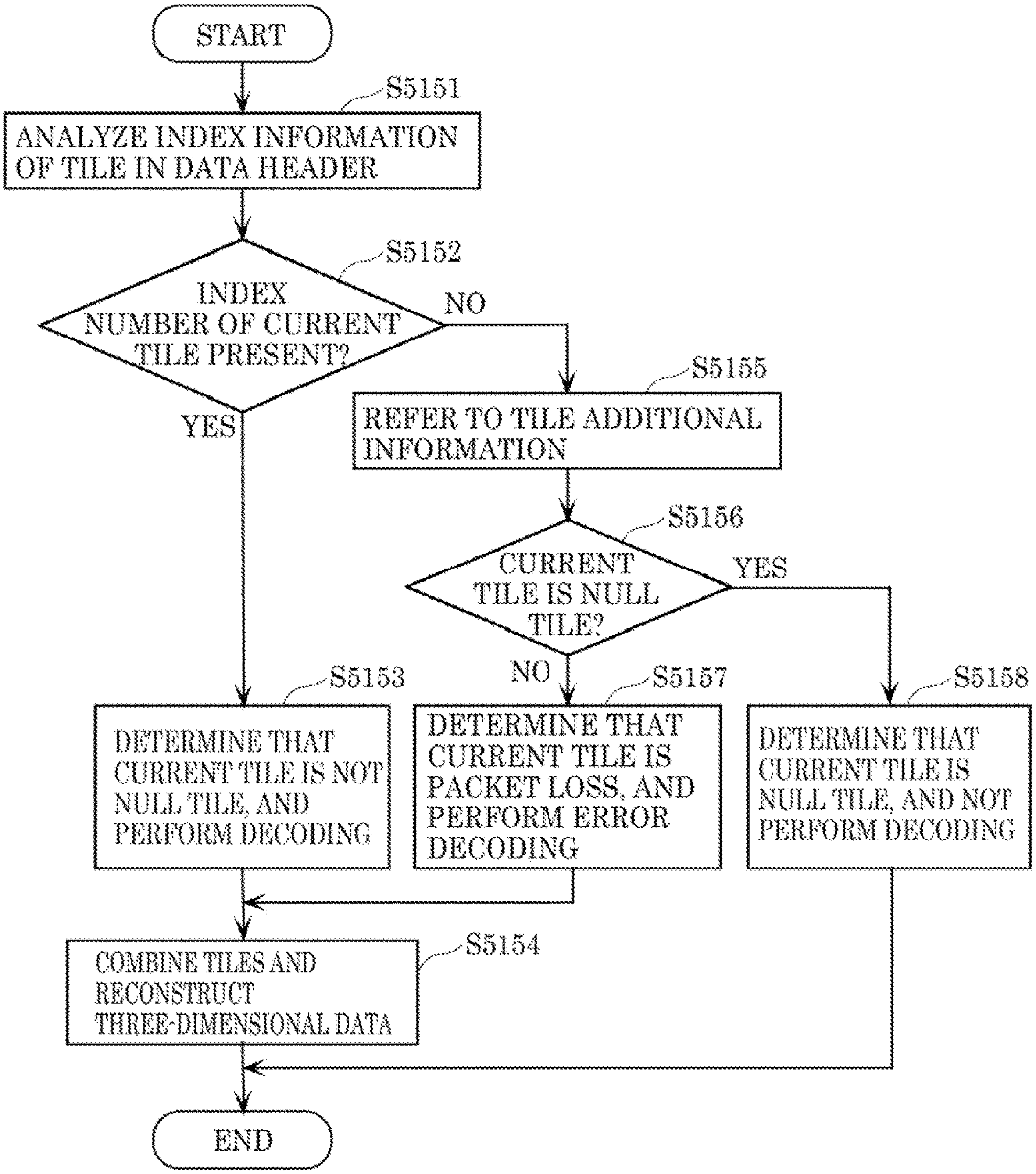
FIG. 78 is a flowchart of a decoding process according to Embodiment 7.

FIG. 78 is a flowchart of a process performed by the three-dimensional data decoding device in the above case. First, the three-dimensional data decoding device analyzes the continuity of index information indicated by the header of encoded data (S5151) and determines whether an index number of a current tile is present (S5152).

When the index number of the current tile is present (YES in S5152), the three-dimensional data decoding device determines that the current tile is not a null tile and decodes the current tile (S5153). Finally, the three-dimensional data decoding device obtains information (position information (e.g., origin coordinates), size, etc. of tiles) about tiles from tile additional information, and reconstructs three-dimensional data by combining the tiles using the obtained information (S5154).

On the other hand, when the index number of the current tile is not present (NO in S5152), the three-dimensional data decoding device refers to tile additional information (S5155) and determines whether the current tile is a null tile (S5156).

When the current tile is not the null tile (NO in S5156), the three-dimensional data decoding device determines that the current tile is lost (packet loss) and performs error decoding (S5157). Error decoding is, for example, a process of trying to decode original data assuming that the data existed. In this case, the three-dimensional data decoding device may regenerate three-dimensional data and reconstruct three-dimensional data (S5154).

In contrast, when the current tile is the null tile (YES in S5156), the three-dimensional data decoding device determines that the current tile is the null tile, and performs neither decoding nor the reconstruction of three-dimensional data (S5158).

The following describes an encoding method when no null tiles are clearly shown. The three-dimensional data encoding device may generate encoded data and additional information using the following method.

The three-dimensional data encoding device does not include information about a null tile in tile additional information. The three-dimensional data encoding device appends index numbers of tiles other than the null tile to a data header. The three-dimensional data encoding device does not transmit the null tile.

In this case, a tile division number (number_of_tiles) indicates a division number excluding a null tile. It should be noted that the three-dimensional data encoding device may separately store information indicating the number of null tiles in a bitstream. In addition, the three-dimensional data encoding device may include information about a null tile in additional information or include part of information about a null tile in the additional information.

Figure 79:
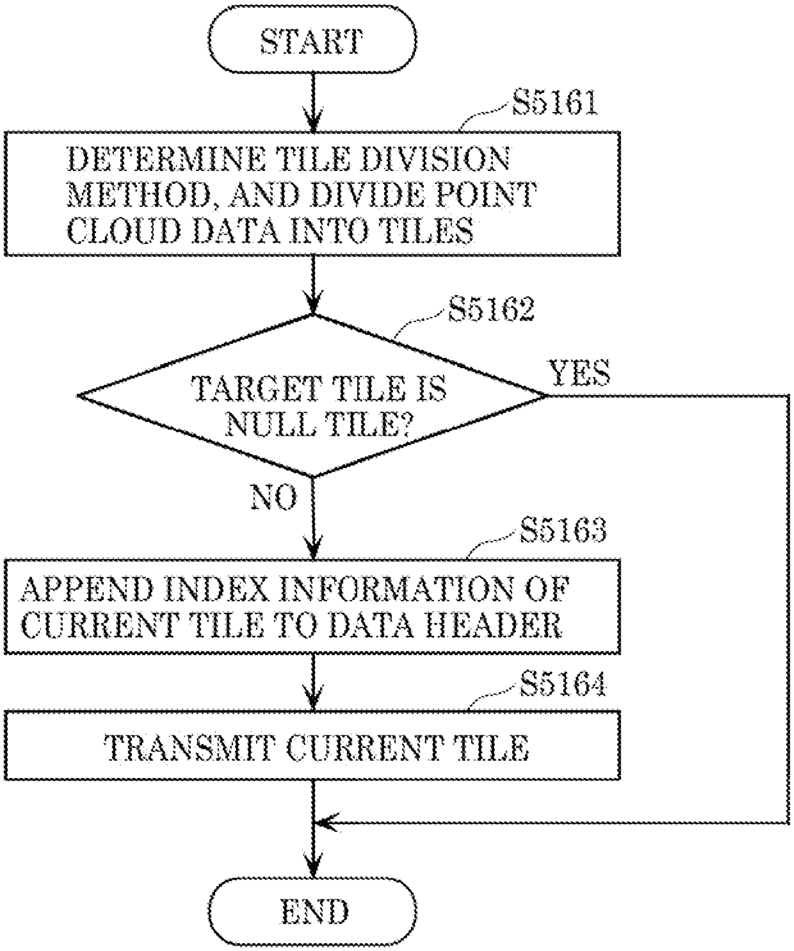
FIG. 79 is a flowchart of an encoding process according to Embodiment 7.

FIG. 79 is a flowchart of a three-dimensional data encoding process performed by the three-dimensional data decoding device in the above case. First, the three-dimensional data encoding device determines a tile division method and divides point cloud data into tiles using the determined division method (S5161).

Next, the three-dimensional data encoding device determines whether a current tile is a null tile (S5162). In other words, the three-dimensional data encoding device determines whether no data is included in the current tile.

When the current tile is not the null tile (NO in S5162), the three-dimensional data encoding device appends index information of the current tile other than a null tile to a data header (S5163). Finally, the three-dimensional data encoding device transmits the current tile (S5164).

On the other hand, when the current tile is the null tile (YES in S5162), the three-dimensional data encoding device neither appends index information of the current tile to a data header nor transmits the current tile.

Figure 80:
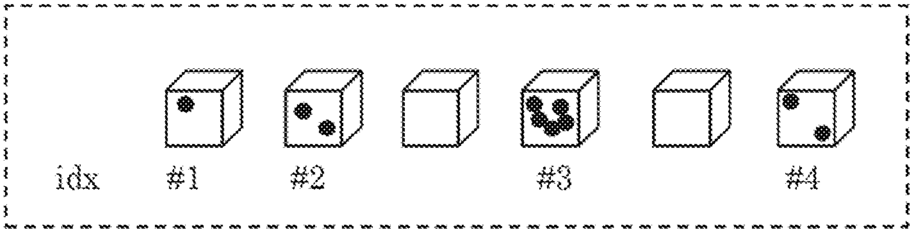
FIG. 80 is a diagram illustrating an example of index information according to Embodiment 7.

FIG. 80 is a diagram illustrating an example of index information (idx) to be appended to a data header. As shown in FIG. 80, index information of any null tile is not appended, and serial numbers are put on tiles other than null tiles.

Figure 81:
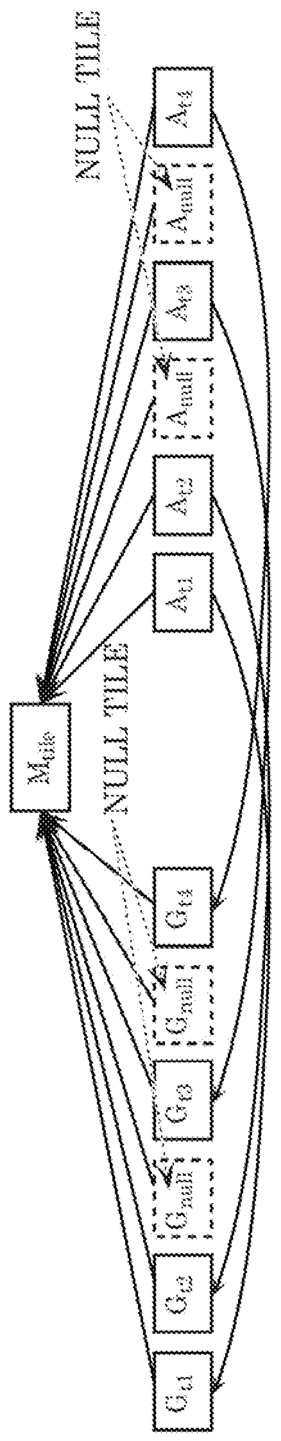
FIG. 81 is a diagram illustrating an example of dependency relationships according to Embodiment 7.

FIG. 81 is a diagram illustrating an example of a dependency relationship of each data. The pointed end of an arrow in the figure indicates a dependee, and the other end of the arrow indicates a depender. Moreover, in the figure, $G_{t}$. denotes geometry information for tile number n, and $A_{tn}$ denotes attribute information for tile number n, n being an integer from 1 to 4. $M_{tile}$ denotes tile additional information.

Figure 82:
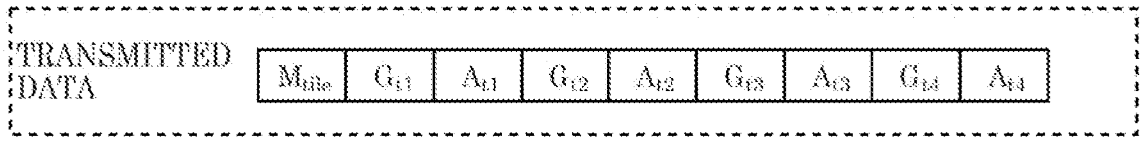
FIG. 82 is a diagram illustrating an example of transmitted data according to Embodiment 7.

FIG. 82 is a diagram illustrating a structural example of transmitted data that is encoded data transmitted by the three-dimensional data encoding device.

Figure 83:
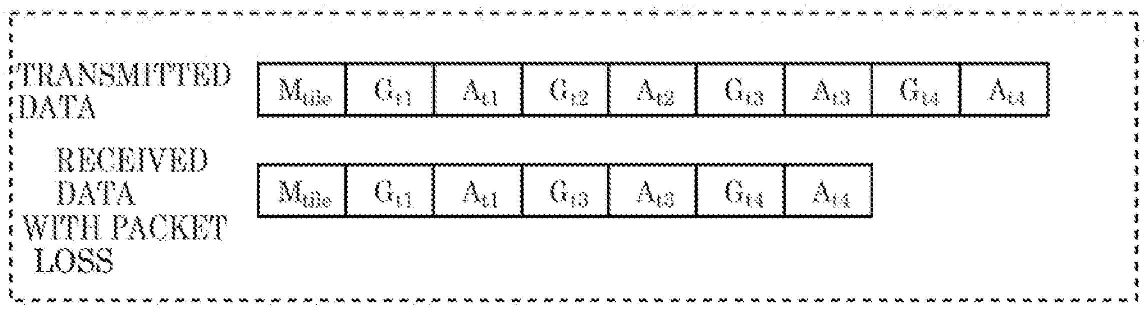
FIG. 83 is a diagram illustrating an example of transmitted data and an example of received data according to Embodiment 7.

The following describes a decoding method when no null tiles are clearly shown. FIG. 83 is a diagram illustrating an example of transmitted data from the three-dimensional data encoding device, and an example of received data inputted to the three-dimensional data decoding device. Here, a system environment with packet loss is assumed.

Figure 84:
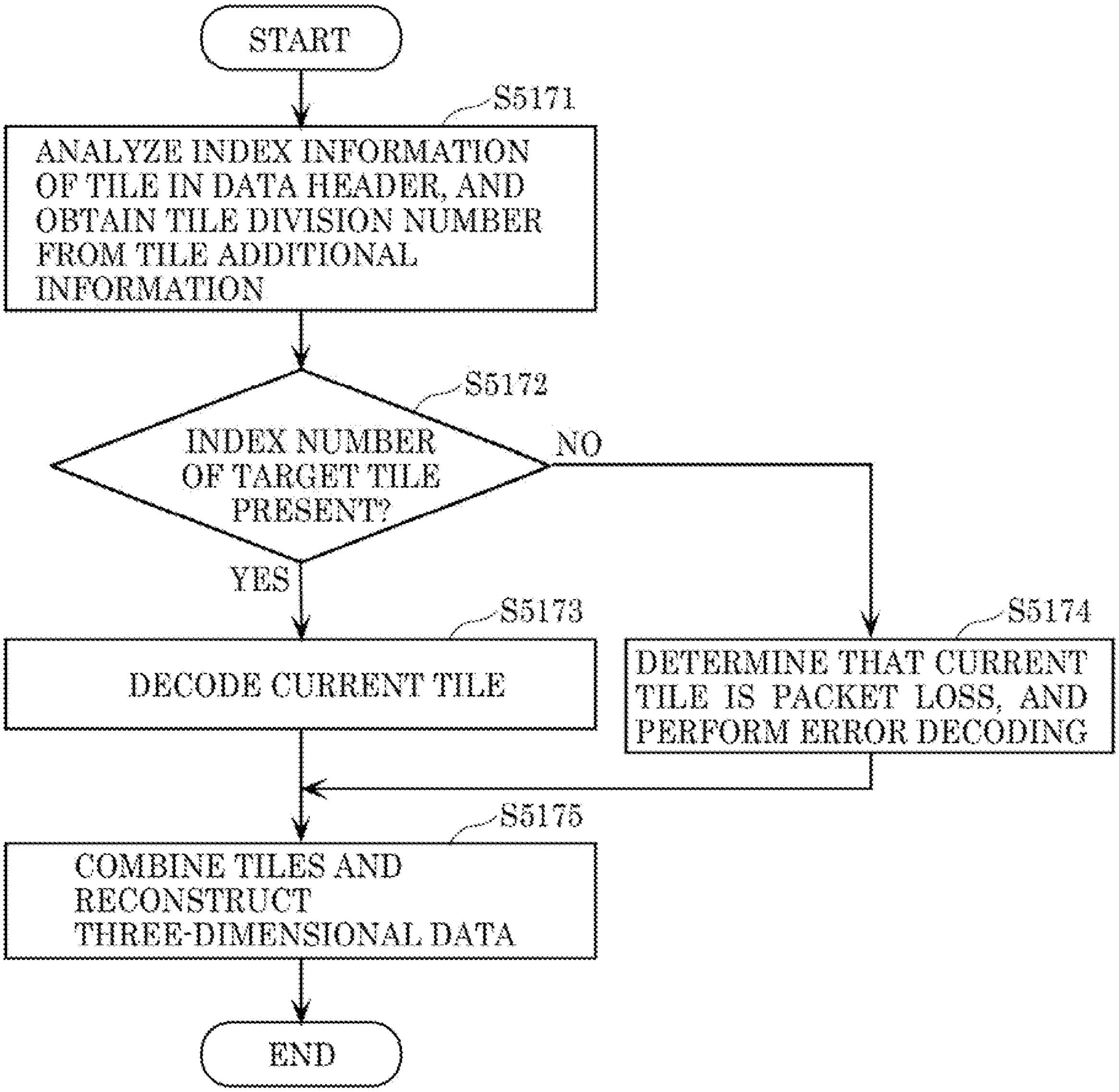
FIG. 84 is a flowchart of a decoding process according to Embodiment 7.

FIG. 84 is a flowchart of a process performed by the three-dimensional data decoding device in the above case. First, the three-dimensional data decoding device analyzes index information of tiles indicated by the header of encoded data, and determines whether an index number of a current tile is present. In addition, the three-dimensional data decoding device obtains a tile division number from tile additional information (S5171).

When the index number of the current tile is present (YES in S5172), the three-dimensional data decoding device decodes the current tile (S5173). Finally, the three-dimensional data decoding device obtains information (position information (e.g., origin coordinates), size, etc. of the tiles) about the tiles from the tile additional information, and reconstructs three-dimensional data by combining the tiles using the obtained information (S5175).

In contrast, when the index number of the current tile is not present (NO in S5172), the three-dimensional data decoding device determines that the current tile is lost and performs error decoding (S5174). In addition, the three-dimensional data decoding device determines that any space including no data is a null tile, and reconstructs three-dimensional data.

By clearly showing null tiles, the three-dimensional data encoding device can appropriately determine the absence of points in tiles, not data unavailability due to, for example, mismeasurement or data processing, or packet loss.

It should be noted that the three-dimensional data encoding device may use both a method of clearly showing null packets and a method of clearly showing no null packets. In this case, the three-dimensional data encoding device may include information indicating whether null packets are clearly shown, in tile additional information. Moreover, whether null packets are to be clearly shown may be determined in advance according to a type of a division method, and the three-dimensional data encoding device may indicate whether the null packets are to be clearly shown, by showing the type of the division method.

Although an example in which information regarding all tiles is included in tile additional information has been described in FIG. 62, etc., information regarding some of tiles or information regarding null tiles of some of tiles may be included in tile additional information.

Moreover, although an example in which information regarding divided data such as information indicating whether divided data (tiles) are present is stored in tile additional information has been described, part or all of these pieces of information may be stored in a parameter set or may be stored as data. When these pieces of information are stored as data, for example, nal_unit_type denoting information indicating whether divided data are present may be defined, and the pieces of information may be stored in a NAL unit. Additionally, the pieces of information may be stored in both additional information and data.

Figure 85:
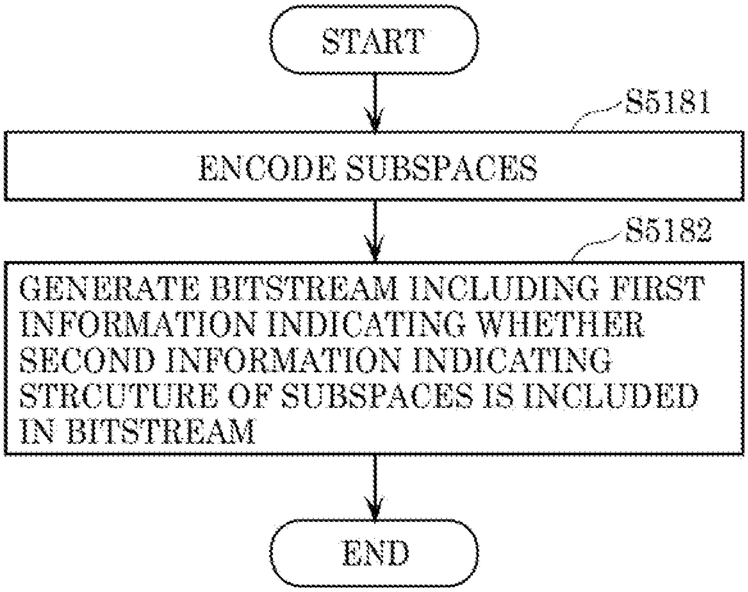
FIG. 85 is a flowchart of an encoding process according to Embodiment 7.

As stated above, the three-dimensional data encoding device according to the present embodiment performs the process shown in FIG. 85. First, the three-dimensional data encoding device generates pieces of encoded data by encoding subspaces (e.g., tiles or slices) obtained by dividing a current space including three-dimensional points (S5181). The three-dimensional data encoding device generates a bitstream including the pieces of encoded data and pieces of first information (e.g., tile_null_flag) each of which corresponds to a corresponding one of the subspaces (S5182). Each of the pieces of first information indicates whether the bitstream includes second information indicating a structure of the corresponding one of the subspaces.

Accordingly, for example, since the second information can be omitted for a subspace including no points, it is possible to reduce the data volume of a bitstream.

For example, the second information includes information indicating origin coordinates of the corresponding one of the subspaces. For example, the second information includes information indicating at least one of a height, a width, or a depth of the corresponding one of the subspaces.

Accordingly, the three-dimensional data encoding device can reduce the data volume of a bitstream.

Moreover, as shown in FIG. 73, the three-dimensional data encoding device may divide a current space including three-dimensional points into subspaces (e.g., tiles or slices), combine the subspaces according to the number of three-dimensional points included in each of the subspaces, and encode the combined subspaces. For example, the three-dimensional data encoding device may combine subspaces so that the number of three-dimensional points included in each of the combined subspaces is greater than or equal to a predetermined number. For example, the three-dimensional data encoding device may combine subspaces including no three-dimensional points with subspaces including three-dimensional points.

Accordingly, since the three-dimensional data encoding device can suppress the generation of subspaces including fewer points or no points, the three-dimensional data encoding device can improve the coding efficiency.

For example, the three-dimensional data encoding device includes a processor and memory, and the memory performs the above process using the memory.

Figure 86:
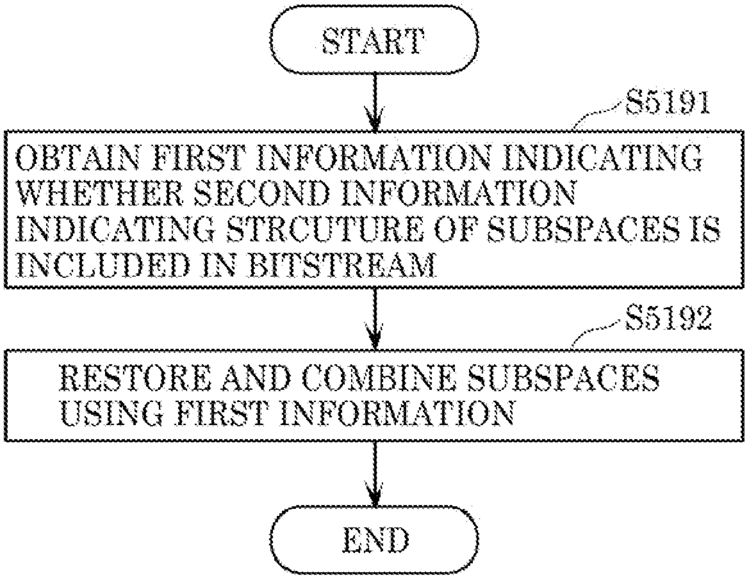
FIG. 86 is a flowchart of a decoding process according to Embodiment 7.

The three-dimensional data decoding device according to the present embodiment performs the process shown in FIG. 86. First, the three-dimensional data decoding device obtains from a bitstream pieces of first information (e.g., tile_null_flag) each of which (i) corresponds to a corresponding one of subspaces (e.g., tiles or slices) obtained by dividing a current space including three-dimensional points and (ii) indicates whether the bitstream includes second information indicating a structure of the corresponding one of the subspaces (S5191). The three-dimensional data decoding device restores the subspaces by decoding pieces of encoded data included in the bitstream and generated by encoding the subspaces, and restores the current space by combining the subspaces, using the pieces of first information (S5192). For example, the three-dimensional data decoding device determines whether a bitstream includes second information, using first information; and combines decoded subspaces using the second information when the bitstream includes the second information.

Accordingly, for example, since the second information can be omitted for a subspace including no points, it is possible to reduce the data volume of a bitstream.

For example, the second information includes information indicating origin coordinates of the corresponding one of the subspaces. For example, the second information includes information indicating at least one of a height, a width, or a depth of the corresponding one of the subspaces.

Accordingly, the three-dimensional data decoding device can reduce the data volume of a bitstream.

Moreover, the three-dimensional data decoding device may divide a current space including three-dimensional points into subspaces (e.g., tiles or slices), combine the subspaces according to the number of three-dimensional points included in each of the subspaces, receive encoded data generated by encoding the combined subspaces, and decode the received encoded data. For example, encoded data may be generated by combining subspaces so that the number of three-dimensional points included in each of the combined subspaces is greater than or equal to a predetermined number. For example, three-dimensional data may be generated by combining subspaces including no three-dimensional points with subspaces including three-dimensional points.

Accordingly, the three-dimensional data decoding device can decode encoded data for which the coding efficiency is improved, by suppressing the generation of subspaces including fewer points or no points.

For example, the three-dimensional data decoding device includes a processor and memory, and the memory performs the above process using the memory.

Embodiment 8

Figure 87:
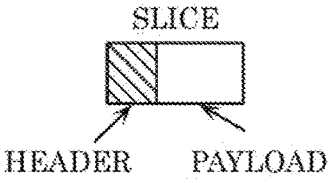
FIG. 87 is a diagram illustrating the configuration of slice data according to Embodiment 8.

In the present embodiment, tile-related signaling methods, syntax, and semantics will be described. FIG. 87 is a diagram illustrating the configuration of slice data. As illustrated in FIG. 87, slice data includes a slice header and a payload.

Figure 88:
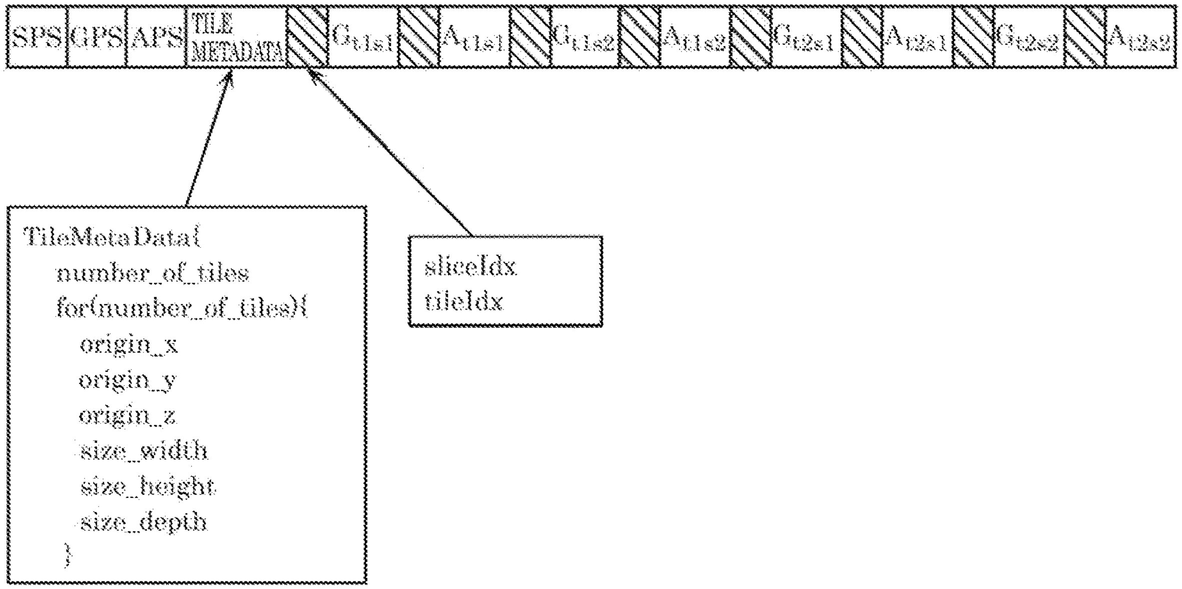
FIG. 88 is a diagram illustrating a configuration example of a bitstream according to Embodiment 8.

FIG. 88 is a diagram illustrating a configuration example of a bitstream. The bitstream includes an SPS (sequence parameter set), a GPS (geometry information parameter set), an APS (attribute information parameter set), tile metadata, and a plurality of pieces of slice data. Additionally, the slice data includes geometry information (geometry) slices (indicated as Gtisj in FIG. 88 (i and j are arbitrary natural numbers, respectively)), and attribute information slices (indicated as Atisj in FIG. 88 (i and j are arbitrary natural numbers, respectively)). Additionally, FIG. 88 illustrates an example in which two tiles, tile 1 and tile 2, exist, and each tile is divided into two slices. For example, Gt1*s*1 illustrated in FIG. 88 is a geometry information slice (encoded data of geometry information) of slice 1 included in tile 1.

As illustrated in FIG. 88, the slice header of a geometry information slice includes a slice index (sliceIdx), which is the identifier of the slice, and a tile index (tileIdx), which is the identifier of a tile.

The SPS is a parameter set per sequence (a plurality of frames), and is the parameter set in common to geometry information and attribute information. The GPS is a parameter set of geometry information, for example, the parameter set per frame unit. The APS is a parameter set of attribute information, for example, the parameter set per frame unit.

The tile metadata is metadata (control information) including information on tiles. The tile metadata includes information (number_of_tiles) indicating the number of tiles, and information indicating the space area (bounding box) of each tile. The information indicating the space area of a tile indicates, for example, information indicating the position of the tile, and information indicating the size of the tile. For example, the information indicating the position of the tile is information (origin_x, origin_y, origin_z) indicating the three dimensional coordinates of the origin of the tile. Additionally, the information indicating the size of the tile is information (size_width, size_height, size_depth) indicating the width, height, and depth of the tile.

Here, in the current situation, the detailed specification of syntax and semantics are not defined. Hereinafter, the detailed specification of syntax and semantics will be described.

Figure 89:
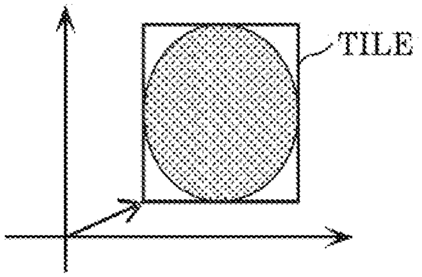
FIG. 89 is a diagram illustrating an example of a tile according to Embodiment 8.
Figure 90:
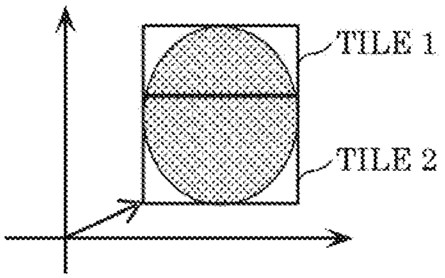
FIG. 90 is a diagram illustrating an example of a tile according to Embodiment 8.
Figure 91:
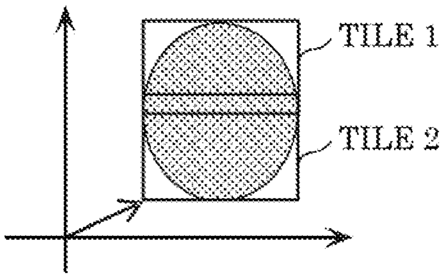
FIG. 91 is a diagram illustrating an example of a tile according to Embodiment 8.

FIG. 89 to FIG. 91 are diagrams illustrating examples of tiles. A circle illustrated in the diagrams indicates a point cloud (three-dimensional point cloud data), and a solid line rectangle indicates the bounding box of tiles. Additionally, although the point cloud data and the bounding boxes are illustrated in two dimensions in the diagrams, these are actually three dimensions.

Here, it is defined that point cloud data (slice) always belongs to one of tiles, i.e., a slice always belongs to one or more tiles. In other words, it is defined that there is no slice that does not belong to any tile.

FIG. 89 illustrates an example in a case where the tile number is 1. In this case, the bounding box of a tile is a default bounding box. The default bounding box is at least larger than the bounding box of point cloud data.

Additionally, the example illustrated in FIG. 89 is the example in which the default bounding box matches the bounding box of the original point cloud. In this case, the bounding box of the tile matches the bounding box of the original point cloud.

FIG. 90 illustrates an example in a case where the tile number is 2 (or more). In this example, tile 1 and tile 2 do not overlap each other. FIG. 91 illustrates an example in a case where the tile number is 2 (or more), and tiles overlap each other. In this example, tile 1 and tile 2 overlap each other. Note that, when slice dividing is performed, two slices may belong to one tile.

Figure 92:
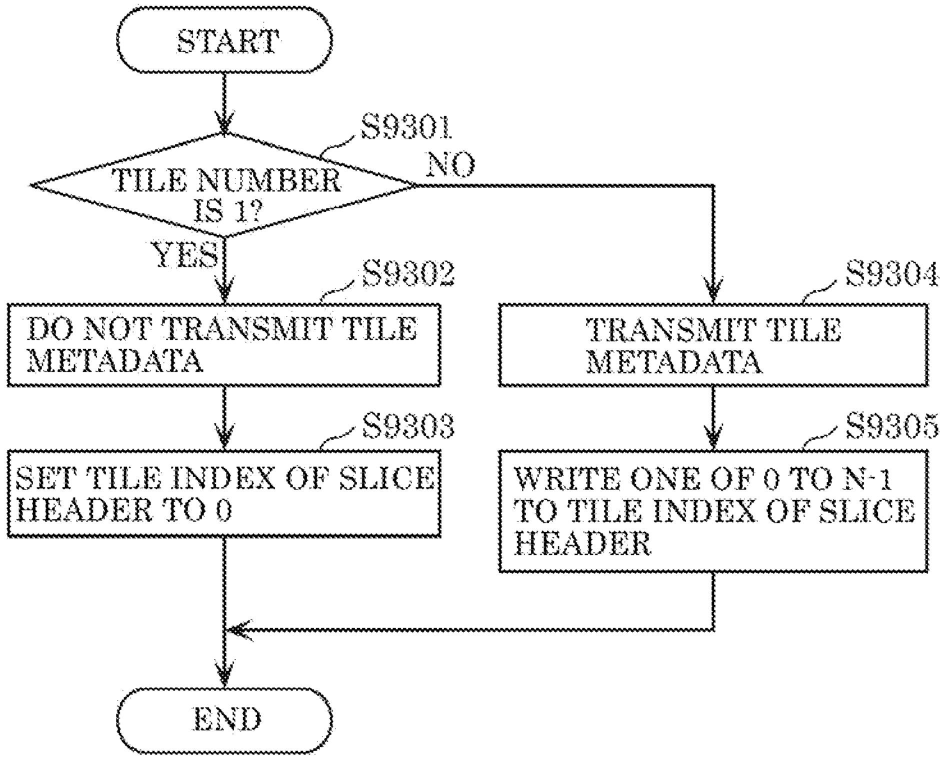
FIG. 92 is a flowchart of a three-dimensional data encoding process according to Embodiment 8.

In an example illustrated below, it is specified that at least one tile exists. FIG. 92 is a flowchart of a three-dimensional data encoding process according to the present embodiment.

First, a three-dimensional data encoding device determines whether or not the tile number, which is the number of divided tiles, is 1 (S9301). When the tile number is 1 (Yes in S9301), the three-dimensional data encoding device determines that the tile is a default tile, and does not transmit the tile metadata (S9302). That is, the three-dimensional data encoding device does not add the tile metadata to a bitstream.

Additionally, the three-dimensional data encoding device sets the tile index of the slice header of slices belonging to the tile to 0 (S9303). FIG. 93 is a diagram illustrating a setting example of the tile index (tileIdx) in a case where the tile number=1. As illustrated in FIG. 93, the tile index of the default tile in a case where the tile number=1 is set to 0.

On the other hand, when the tile number is not 1, i.e., when the tile number is two or more (No in S9301), the three-dimensional data encoding device determines that the tile is not the default tile, and transmits the tile metadata (S9304). That is, the three-dimensional data encoding device adds the tile metadata to a bitstream. Additionally, the three-dimensional data encoding device stores, in the tile metadata, the tile number=N, and bounding box information on each of the 1st to Nth tiles (information indicating the position and size of tiles).

Additionally, the three-dimensional data encoding device writes one of 0 to N−1 to the tile index of a slice header (S9305). Specifically, the three-dimensional data encoding device stores, in the slice header, the tile index assigned to the tile to which a slice belongs. FIG. 94 is a diagram illustrating a setting example of the tile index (tileIdx) in a case where the tile number>1. As illustrated in FIG. 94, for each tile in the case where the tile number>1, a value from 1 to N−1 is set as the tile index to the tiles other than the default tile. Note that N is the tile number.

Here, the default bounding box, which is the bounding box of the default tile, is specified in advance. The default bounding box may be of a size to include the bounding box of a point cloud. The origin of the default bounding box may be the origin of a point cloud, or may be 0 in a coordinate system.

As illustrated in FIG. 89, when the tile number is 1, the default tile is used. The bounding box information on the default tile is not indicated in the tile metadata. Additionally, the tile metadata is not sent.

As illustrated in FIG. 90, when the tile number is two or more, i.e., when a tile other than the default tile exists, tile information of a tile other than the default tile is indicated in the tile metadata.

Additionally, the tile number indicates the tile number N that does not include the default tile. In addition, the value obtained by subtracting 1 from the order (from 1 to N) of the loop of a tile is used as the value of the tile index (tileIdx) of the tile, and is written to the slice header of the slice to which the tile belongs. Note that the case where the tile number is two or more includes a case where the default tile and one or more tiles other than the default tile exist, and a case where the default tile does not exist, and two or more tiles other than the default tile exist.

Note that, in this example, 0 is not written to the tile number of the tile metadata. Accordingly, it may be specified that tile number=0 is prohibited. Alternatively, it may be specified that the information included in the tile metadata does not indicate the tile number, but the tile number−1.

According to the present embodiment, when the tile number is 1, since tile metadata is not included in a bitstream, the data amount of the bitstream can be reduced. Additionally, by specifying the process of the present embodiment, a three-dimensional data decoding device can determine whether or not the tile number is 1, depending on to whether tile metadata is transmitted.

Note that the three-dimensional data encoding device may store the information indicating whether or not the tile metadata is transmitted in the other metadata included in a bitstream, such as an SPS or GPS. Accordingly, the three-dimensional data decoding device can determine whether or not there is tile metadata by analyzing the SPS or GPS, not whether or not the tile metadata is received.

Additionally, the three-dimensional data encoding device need not add a tile index to all slice headers when tile metadata is not added to a bitstream. In this case, the three-dimensional data decoding device may determine that all slices belong to the default tile when the tile metadata is not transmitted.

Figure 95:
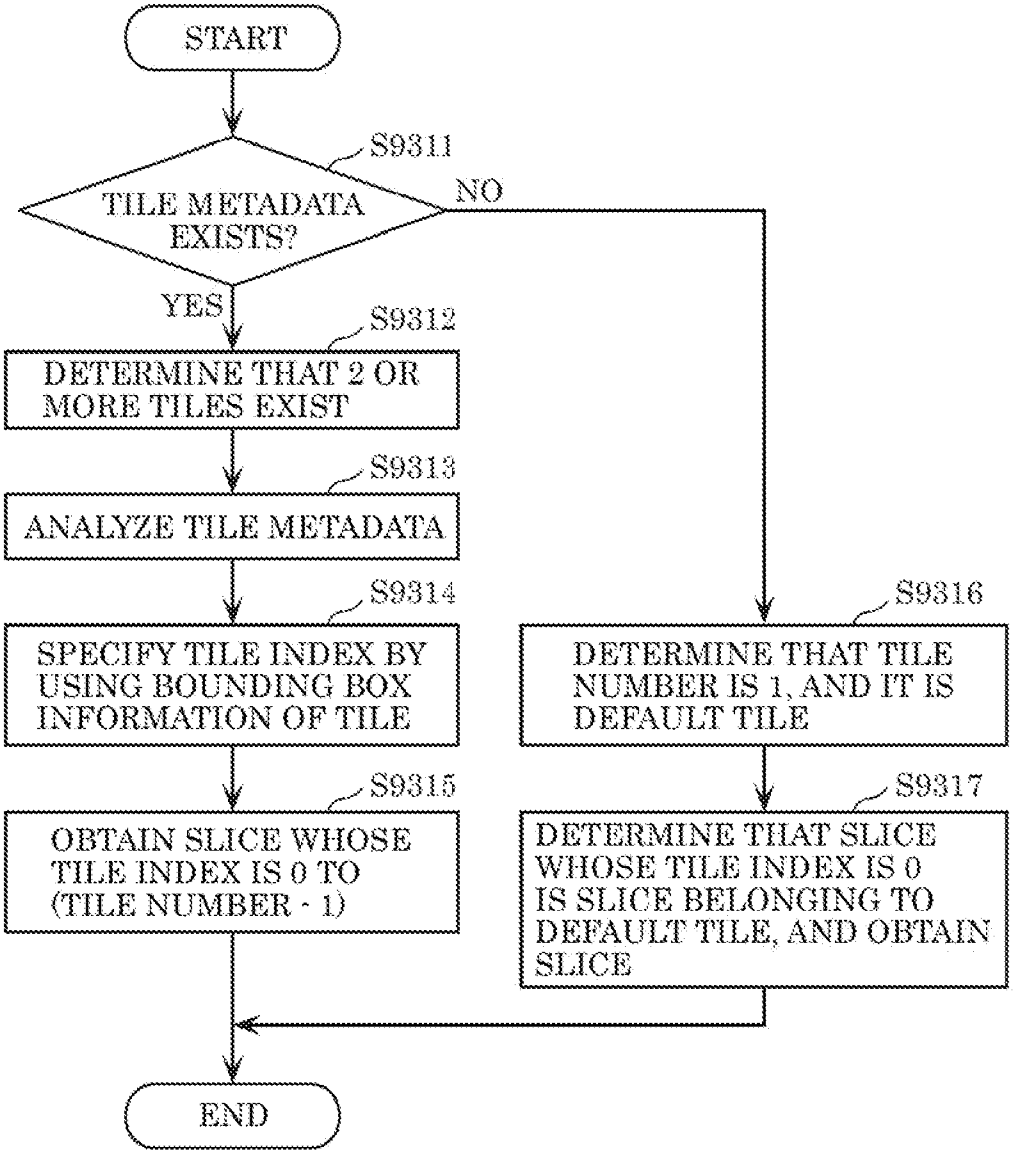
FIG. 95 is a flowchart of a three-dimensional data decoding processing according to Embodiment 8.

Next, a process in the three-dimensional data decoding device that decodes a bitstream generated by the above-described process will be described. FIG. 95 is a flowchart of a three-dimensional data decoding process according to the present embodiment. Note that the process illustrated in FIG. 95 is the process in a case where all slice data included in a bitstream is decoded.

First, the three-dimensional data encoding device determines whether or not tile metadata exists in a bitstream (S9311). Note that the three-dimensional data decoding device may perform this determination by determining whether or not the tile metadata is received, or when a flag indicating whether or not the tile metadata is transmitted is stored in the SPS or GPS, the three-dimensional data decoding device may analyze the flag to perform the determination.

When the tile metadata exists in the bitstream (Yes in S9311), the three-dimensional data decoding device determines that two or more tiles exist (S9312). Additionally, the three-dimensional data decoding device determines that a tile other than the default tile exists.

Next, the three-dimensional data decoding device obtains the tile number and the bounding box information on each tile by analyzing the tile metadata (S9313). Note that, when the information indicating the tile number=0 is included in the tile metadata, the three-dimensional data decoding device need not analyze the tile metadata as standard mismatch, or may perform an error notification or the like.

Next, the three-dimensional data decoding device specifies the tile index (0 to (the tile number−1)) of each tile by using the bounding box information on tiles (S9314).

Next, the three-dimensional data decoding device obtains the slice data of tileIdx=0 to (the tile number−1) (S9315). Additionally, the three-dimensional data decoding device decodes the obtained slice data.

On the other hand, when the tile metadata does not exist in the bitstream (No in S9311), the three-dimensional data decoding device determines that the tile number is 1, and the tile is the default tile (S9316). Next, the three-dimensional data decoding device determines that the slice data of tileIdx=0 is the slice data belonging to the default tile, and obtains the slice data (S9317). Additionally, the three-dimensional data decoding device decodes the obtained slice data.

Figure 96:
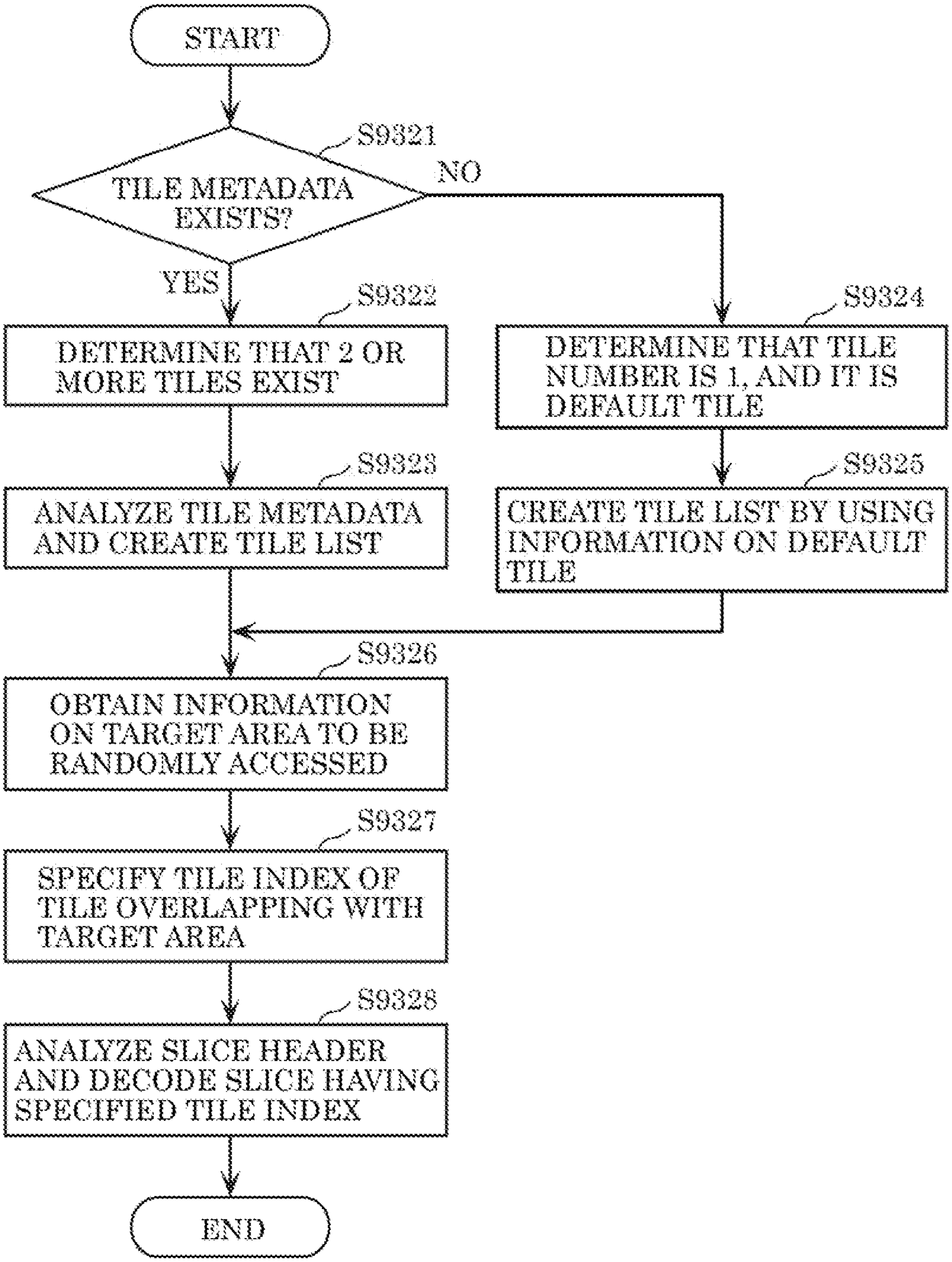
FIG. 96 is a flowchart of a random-access process according to Embodiment 8.

Next, the operation in a case of performing a random access process that decodes desired target data of the data included in a bitstream will be described. FIG. 96 is a flowchart of the random access process.

First, the three-dimensional data decoding device determines whether or not tile metadata exists in a bitstream (S9321). Note that the details of this determination are the same as those in, for example, S9311.

When the tile metadata exists in the bitstream (Yes in S9321), the three-dimensional data decoding device determines that two or more tiles exist (S9322). Additionally, the three-dimensional data decoding device determines that tiles other than the default tile exist.

Next, the three-dimensional data decoding device analyzes the tile metadata, and creates a tile list, which is a list of bounding box information on a plurality of tiles (S9323). Specifically, the tile list indicates the tile index and bounding box information for each tile.

On the other hand, when the tile metadata does not exist in the bitstream (No in S9321), the three-dimensional data decoding device determines that the tile number is 1, and the tile is the default tile (S9324). Next, the three-dimensional data decoding device creates the tile list by using the information on the default tile (S9325). This tile list indicates the tile index (value 0) of the default tile, and the bounding box information of the default tile.

After step S9323 or S9325, the three-dimensional data decoding device obtains the information on a target area, which is an area to be randomly accessed (S9326). Next, the three-dimensional data decoding device compares the target area with the bounding box information included in the tile list, and specifies the tile index of a tile that overlaps with the target area (S9327).

Next, the three-dimensional data decoding device analyzes each slice header, selects the slice data having the tile index to be randomly accessed specified in step S9327, and decodes the selected slice data (S9328).

Hereinafter, a case where tiles overlaps with each other as illustrated in FIG. 91 will be described. The slice header has only one area for indicating the tile index of a tile to which a slice belongs, and cannot indicate a plurality of tile indexes. That is, when tiles overlap each other, the slice header can indicate only the tile index of one of the tiles among the tiles to which the slice belongs.

Figure 97:
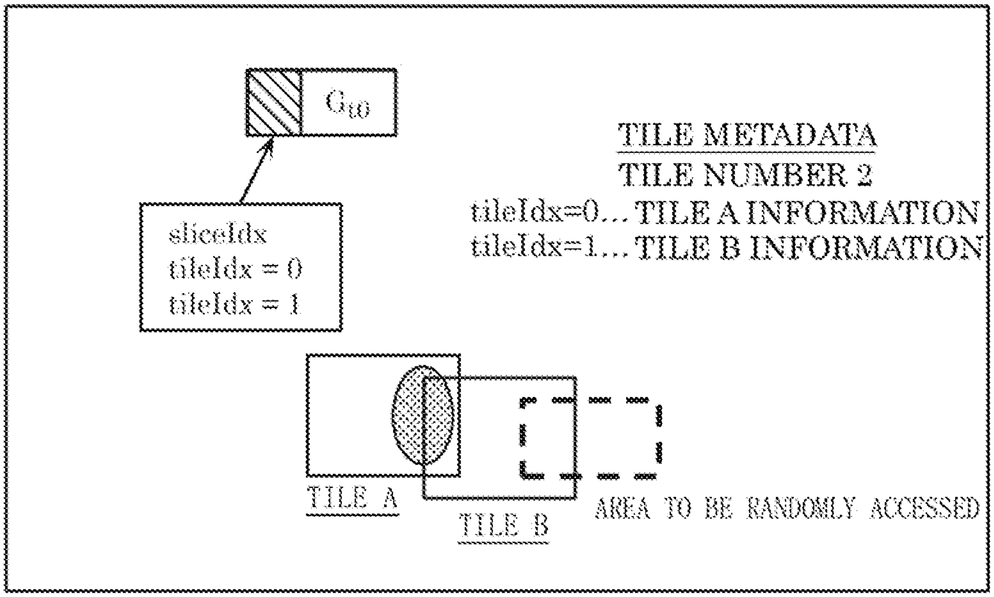
FIG. 97 is a diagram illustrating an addition method of the tile index according to Embodiment 8.

In order to avoid this, the following technique can be used. FIG. 97 is a diagram illustrating an addition method of tile index. As illustrated in FIG. 97, when tiles overlaps with each other, a plurality of tile indexes may be included in a slice header. Additionally, the tile metadata may indicate the number of overlapping tiles, and the tile index of each tile.

Figure 98:
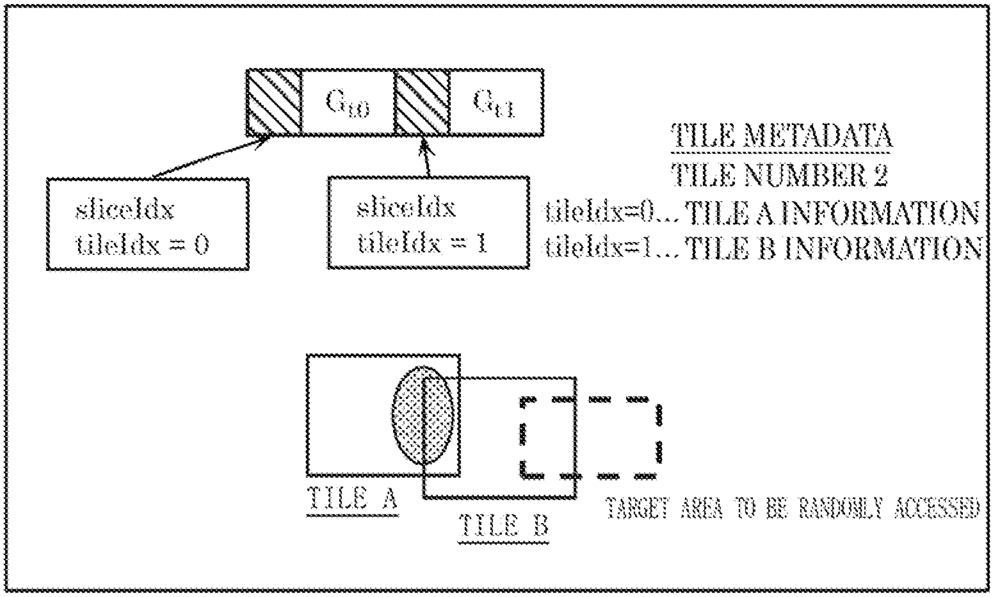
FIG. 98 is a diagram illustrating an addition method of the tile index according to Embodiment 8.

FIG. 98 is a diagram illustrating another method of the addition method of tile index. As illustrated in FIG. 98, when tiles overlap each other, the slice header may indicate the tile index of any one of a plurality of tiles to which a slice belongs. In that case, the three-dimensional data decoding device determines overlapping tiles from the information on the default tile and the tile list at the time of random access. Additionally, when one of two overlapping tiles and the target area of random access overlap, the three-dimensional data decoding device determines that the target area may overlap with the other tile, and obtains the slice data that belongs to both the tiles.

That is, in FIG. 98, even when the target area of random access actually overlaps with only tile B, since tile A overlaps with tile B, the three-dimensional data decoding device obtains the slice data belonging to tile A and the slice data belonging to tile B.

Additionally, regarding overlapping of tiles, partial overlapping may be allowed, but a case of complete overlapping, and the setting of tiles in which one completely includes the other may be prohibited.

Figure 99:
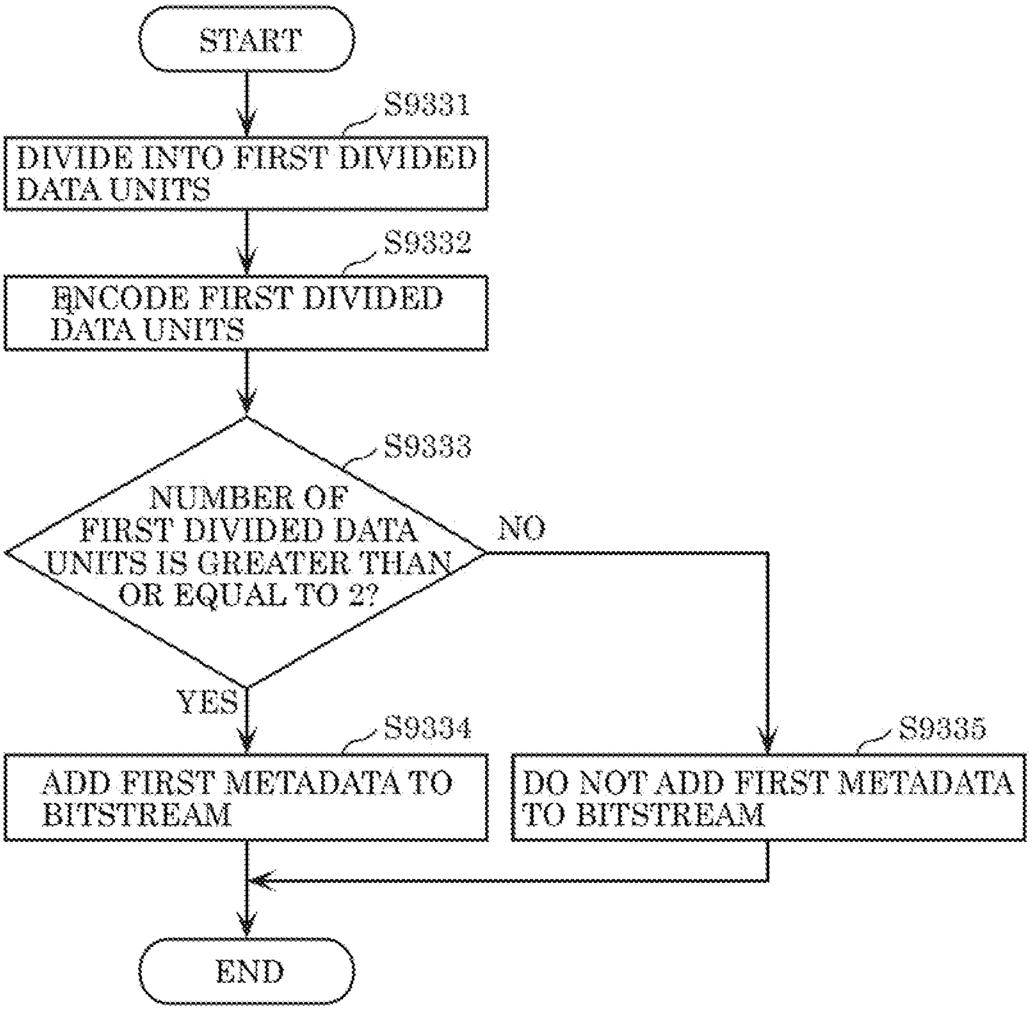
FIG. 99 is a flowchart of the three-dimensional data encoding process according to Embodiment 8.

As described above, the three-dimensional data encoding device according to the present embodiment performs the process shown in FIG. 99. First, the three-dimensional data encoding device divides three-dimensional points included in point cloud data into one or more first divided data units (for example, tile) (S9331), and encoding the one or more first divided data units to generate a bitstream (S9332). The three-dimensional data encoding device adds first metadata regarding the one or more first divided data units to the bitstream (S9334) when the total number of the one or more first divided data units is greater than or equal to two (Yes in S9333), and does not add the first metadata to the bitstream (S9335) when the total number of the one or more first divided data units is one (No in S9333).

Accordingly, since the three-dimensional data encoding device does not add the first metadata to the bitstream when the total number of the first divided data unit is one, the data amount of the bitstream can be reduced.

For example, the first metadata includes information indicating a spatial region (for example, bounding box) of each first divided data unit. For example, the first metadata includes information indicating the total number of the one or more first divided data units. For example, the space indicated by the information indicating the spatial region of a first divided data unit is a tile.

For example, the three-dimensional data encoding device adds, to the header (for example, slice header) of each second divided data unit (for example, slice) included in the bitstream, the identifier (for example, tile index) of the first divided data unit to which the second divided data unit belongs, when the total number of the one or more first divided data units is greater than or equal to two, and adds, to the header of each second divided data unit, an identifier indicating a predetermined value (for example, 0), as the identifier, when the total number of the one or more first divided data units is 1.

For example, the three-dimensional data encoding device includes a processor and memory, and the processor performs the above process using the memory.

Figure 100:
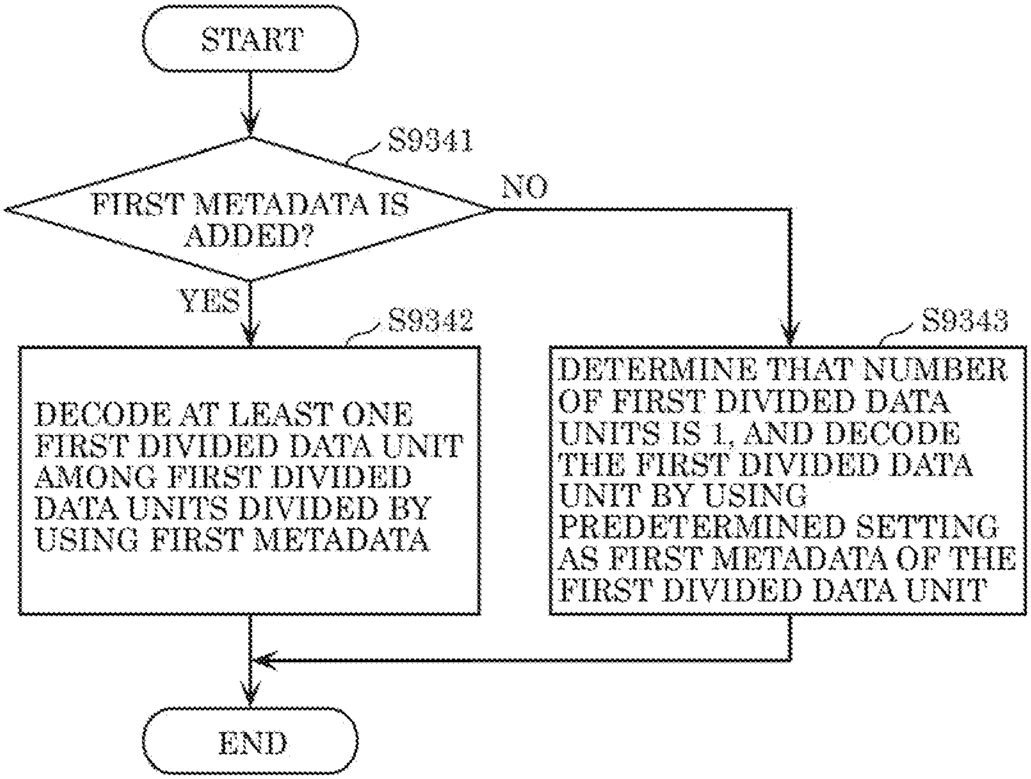
FIG. 100 is a flowchart of the three-dimensional data decoding process according to Embodiment 8.

Furthermore, as described above, the three-dimensional data decoding device according to the present embodiment performs the process shown in FIG. 100. First, the three-dimensional data decoding device determines whether first metadata (for example, tile metadata) regarding one or more first divided data units (for example, tile) has been added to a bitstream generated by encoding one or more first divided data units obtained by dividing three-dimensional points included in point cloud data (S9341). When first metadata has been added in the bitstream (Yes in S9341), the three-dimensional data decoding device decodes at least one first divided data unit among the one or more first divided data units from the bitstream, using the first metadata (S9342). When first metadata has not been added to the bitstream (No in S9341), the three-dimensional data decoding device determines that the total number of the one or more first divided data units is one, and decodes the one first divided data unit from the bitstream, using a predetermined setting as the first metadata of the one first divided data unit (S9343).

Accordingly, the three-dimensional data decoding device can appropriately decode a bitstream the data amount of which has been reduced.

For example, the first metadata includes information indicating a spatial region (for example, bounding box) of each first divided data unit. For example, the first metadata includes information indicating the total number of the one or more first divided data units. For example, the space indicated by the information indicating the spatial region of a first divided data unit is a tile.

For example, when the total number of the one or more first divided data units is greater than or equal to two, there is added, to the header (for example, slice header) of each second divided data unit (for example, slice) included in the bitstream, the identifier (for example, first divided data unit index) of the first divided data unit to which the second divided data unit belongs, and, when the total number of the one or more first divided data units is 1, there is added, to the header of each second divided data unit, an identifier indicating a predetermined value (for example, 0), as the identifier.

For example, the first metadata indicates a spatial region of each first divided data unit, and, there is added, to the header of each second divided data unit included in the bitstream, the identifier of the first divided data unit to which the second divided data unit belongs. The three-dimensional data decoding device obtains information on a region to be accessed (for example, S9326 in FIG. 96), specifies a first divided data unit that overlaps with the region to be accessed, using the first metadata (S9327), and decodes the second divided data unit to which the identifier of the specified first divided data unit has been added (S9328).

For example, three-dimensional data decoding device includes a processor and memory, and the processor performs the above process using the memory.

Embodiment 9

A method of reducing the bit count of tile information (tile metadata) will be described.

The tile information includes, for example, the information (box information) indicating the origin and size of the bounding box for each tile.

Particularly, three-dimensional map information is a large point cloud of an area spanning several kilometers. Therefore, when dividing such a large point cloud into a plurality of tiles and encoding the tiles, the number of tiles, the origin, and the size become large. Accordingly, the bit count of tile information is increased, the percentage of the tile information in a bitstream including the data (point cloud data) of encoded point cloud becomes higher, and the coding efficiency by the three-dimensional data encoding device is decreased.

Therefore, by using the following method, the bit count of tile information is reduced, and an increase in the bit count of the bitstream including the tile information in the case of the large point cloud is suppressed.

FIG. 101 is a diagram illustrating a first example of the syntax of tile information according to the present embodiment.

number_of_tiles is information (box number information) indicating the number of bounding boxes included in the tile information. Each of the origin (origin_x) in an x axial direction, the origin (origin_y) in a y axial direction, and the origin (origin_z) in a z axial direction, which are origins of a bounding box, is indicated by the loop of the number of number_of_tiles, respectively.

Additionally, each of the width (size_width), height (size_height), and depth (size_depth), which are the sizes of the bounding box, is indicated by the loop of the number of number_of_tiles.

For example, when num_of_tiles=0, the three-dimensional data encoding device does not include the box information in a bitstream. On the other hand, for example, when number_of_tiles is not 0, the three-dimensional data encoding device includes common information in a bitstream in each bounding box.

Note that, when num_of_tiles=0, the three-dimensional data encoding device may include the information on a bounding box defined in advance in a bitstream.

bb_bits is the bit count at the time when the three-dimensional data encoding device performs entropy encoding of origin and size, i.e., the information indicating the code length. That is, the three-dimensional data encoding device encodes origin and size using the length specified by bb_bits, i.e., a fixed length.

Accordingly, for example, compared with the case where bb_bits is not specified, and the three-dimensional data encoding device encodes origin and size using a variable length, the bit count to be encoded can be reduced.

common_origin is origin coordinates that are used in common to all tiles. Specifically, common_origin is the origin of the entire space including all tiles. For example, origin is represented by $$\text{origin}=\text{common\_origin}+\text{origin} \quad \text{(i)}.$$

Note that i is the count of tiles, i.e., an identifier indicating which one of one or more tiles.

bb_bits is calculated by, for example, the following calculating method.

bb_bits=0;

for (int i=0; i<number_of_tiles; i++) {bb_bits=max{count (bb(i).origin_x), count(bb(i).origin_y), count(bb(i).origin_z), count(bb(i).size), count(bb(i).width), count(bb(i) .depth), bb_bits};}

Here, count( ) is a function for counting the bit count of parameters, such as origin and size. For example, the three-dimensional data encoding device counts the bit count of each of the parameters, origin and size, for all tiles. Further, the three-dimensional data encoding device uses the largest bit count counted as bb_bits (i.e., a fixed length) to be used in entropy encoding.

Note that, when decoding (entropy decoding) the coordinate information and size information of origin, size, etc, the three-dimensional data decoding device decodes the coordinate information and size information as having been encoded with bb_bits (the fixed length).

FIG. 102 is a diagram illustrating a second example of the syntax of tile information according to the present embodiment.

For example, when dividing a three-dimensional point cloud into a plurality of tiles (bounding boxes), it is assumed that close values are used for the range of the size (specifically, each value of size_width, size_height, and size_depth) of a tile. That is, the values of the bit counts of size_width, size_height, and size_depth are highly likely to become close to each other.

On the other hand, origin tends to show small to large values (i.e., a wide range of possibilities). Therefore, the range of possible bit count of origin is highly likely to be large.

Note that size_width is, for example, the length in the x-axial direction in a three-dimensional orthogonal coordinate system. Additionally, size_height is, for example, the length in the y-axial direction in the three-dimensional orthogonal coordinate system. In addition, size_depth is, for example, the length in the z-axial direction in the three-dimensional orthogonal coordinate system.

In this manner, the possible bit counts for size and origin have different tendencies. Therefore, the encoded bit number can be reduced by individually specifying the bit counts for encoding origin and size, without using the same bit count. That is, for example, the three-dimensional data encoding device encodes size and origin with different fixed lengths.

bb_origin_bits is the information indicating the bit count at the time when the three-dimensional data encoding device performs entropy encoding of origin. That is, the three-dimensional data encoding device encodes origin with the length (i.e., the fixed length) specified by bb_origin_bits.

bb_size_bits is the information indicating the bit count at the time when the three-dimensional data encoding device performs entropy encoding of size. That is, the three-dimensional data encoding device encodes size with the length (i.e., the fixed length) specified by bb_size_bits.

bb_size_bits and bb_origin_bits are calculated by, for example, the following calculating method.

bb_bits=0;

for (int i=0; i<number_of_tiles; i++) {bb_origin_bits=max{count (bb(i).origin_x), count (bb(i) .origin_y), count(bb(i).origin_a; bb_size_bits=max{count (bbasize), count(bb(i).width), count(bb(i).depth),bb_bits};}

When performing entropy decoding of origin, the three-dimensional data decoding device decodes origin as having been encoded with bb_origin_bits. Additionally, when performing entropy decoding of size, the three-dimensional data decoding device decodes size as having been encoded with bb_size_bits.

FIG. 103 is a diagram illustrating a third example of the syntax of tile information according to the present embodiment.

For example, when a part of size_width, size_height, and size_depth, which are the sizes of a tile, are common to the sizes of other tiles, the bit count can be further reduced.

For example, when it is defined in advance that a tile is a cube, size_width, size_height, and size_depth are the same length for all tiles. Additionally, in a case where a tile is a square when seen from above (for example, from the y-axial direction in a coordinate space of a triaxial orthogonal system), size_width and size_depth are the same length for all tiles.

Therefore, the data amount of a bitstream generated by the three-dimensional data encoding device is reduced by using common size information indicating a predetermined (common) size (common_bb_size), and a common size flag (common_size_flag) indicating whether or not the size of a tile is the predetermined size.

common_size_flag is 3-bit information. For example, the 0th bit of common_size_flag is flag information indicating whether or not common_bb_size is used for size_width. Additionally, for example, the 1st bit of common_size_flag is flag information indicating whether or not common_bb-_size is used for size_height. In addition, for example, the 2nd bit of common_size_flag is flag information indicating whether or not common_bb_size is used for size_depth. For example, when any of bit flags is up among these items of common size flag information, i.e., when common_size_flag is not b'000, the three-dimensional data encoding device generates a bitstream including the information indicating a common size (common_bb_size) for a plurality of tiles.

Additionally, for example, when none of the bit flags is up among these items of flag information, i.e., when common-_size_flag is not b'111, the three-dimensional data encoding device generates a bitstream including the information indicating the fixed length to be individually used for encoding (for example, the maximum bit count in a plurality of bit counts calculated as described above).

When common_size_flag [0]==0, i.e., when a common size is not applied to size_width, the three-dimensional data encoding device encodes size width of each tile with a common bit count (bb size bits) for each tile.

Additionally, when common_size_flag [1]==0, i.e., when the common size is not applied to size_height, the three-dimensional data encoding device encodes size_height of each tile with the common bit count (bb_size_bits) for each tile.

Additionally, when common_size_flag [2]==0, i.e., when the common size is not applied to size_depth, the three-dimensional data encoding device encodes size_depth of each tile with the common bit count (bb_size_bits) for each tile.

The three-dimensional data decoding device uses width=common_bb_size when common_size_flag [0]==1, and uses the value obtained by decoding size_width by bb_size_bits as size_width when common_size_flag [0]==0. Similarly, the three-dimensional data decoding device also decodes size_height and size_depth.

Note that the three-dimensional data encoding device may indicate common_size_flag as a flag that indicates whether or not all of size_width, size_height, and size_depth are common.

Additionally, the three-dimensional data encoding device may specify the shapes (i.e., divided shapes) of various tiles not as the flag but as a type, and may determine whether or not to perform signaling of the size based on the type.

Note that, although the example has been described above in which the common information (the information indicating common_bb_size) is used (i.e., commonized) for the size common to each tile, a similar method may be used also when commonizing an initial value (origin).

Additionally, whether to use/not to use the above-described method may be switched with a flag, or which method of a plurality of methods should be used may be switched.

Subsequently, the processing procedure of the three-dimensional data encoding device will be described.

Figure 104:
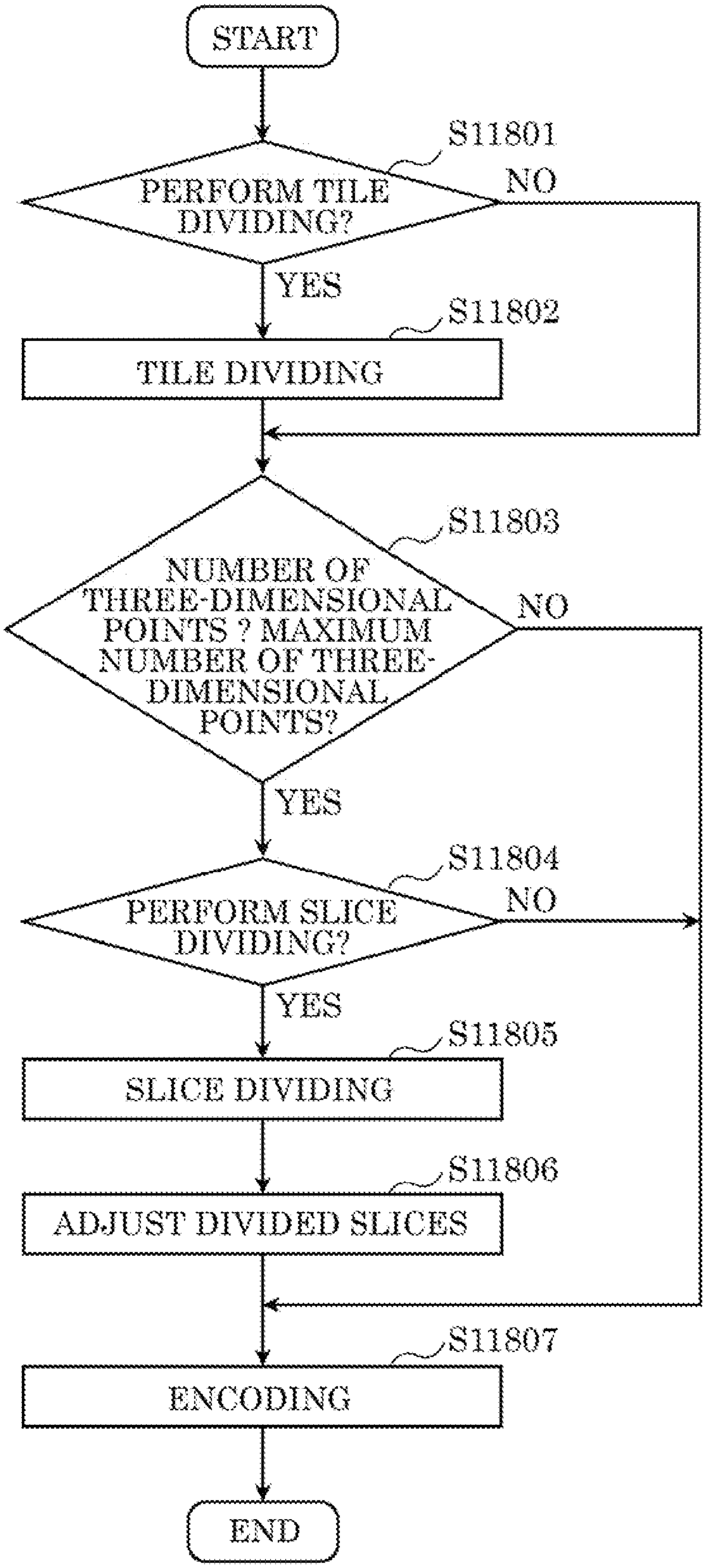
FIG. 104 is a flowchart illustrating the outline of an encoding process of a three-dimensional data encoding device according to Embodiment 9.

FIG. 104 is a flowchart illustrating the outline of an encoding process of the three-dimensional data encoding device according to the present embodiment.

First, the three-dimensional data encoding device determines whether or not to divide the space in which a three-dimensional point cloud is located into one or more tiles (S11801).

When the three-dimensional data encoding device determines that the space in which the three-dimensional point cloud is located is to be divided into one or more tiles (Yes in S11801), the three-dimensional data encoding device divides the space in which the three-dimensional point cloud is located into one or more tiles (S11802).

Next, the three-dimensional data encoding device determines whether or not the number of three-dimensional points located in a tile is greater than or equal to a predetermined maximum number of three-dimensional points per slice (S11803). For example, the three-dimensional data encoding device performs step S11803 for each of the one or more tiles. For example, when the three-dimensional data encoding device determines that the number of three-dimensional points located in a tile is less than the maximum number of three-dimensional points (No in S11803), the three-dimensional data encoding device does not perform slice dividing, which will be described later.

When the three-dimensional data encoding device determines that the number of three-dimensional points located in a tile is greater than or equal to the maximum number of three-dimensional points (Yes in S11803), the three-dimensional data encoding device determines whether or not to divide the three-dimensional points located in a tile into a predetermined number of slices (S11804).

When the three-dimensional data encoding device determines that the three-dimensional points located in a tile are to be divided into the predetermined number of slices (Yes in S11804), the three-dimensional data encoding device divides (slice dividing) the three-dimensional points located in a tile into the predetermined number of slices (S11805).

Next, the three-dimensional data encoding device analyzes the data (divided data) of the slices after performing slice dividing, and performs a predetermined process (adjustment of slices), when a further process is required (S11806). For example, when the number of three-dimensional-points included in the slice after performing slice dividing is greater than or equal to the maximum number of three-dimensional points, the three-dimensional data encoding device further divides a corresponding slice into slices, and adjusts the number of three-dimensional-points included in the slice to be less than the maximum number of three-dimensional points. Alternatively, for example, when the number of three-dimensional points included in the slice after performing slice dividing is less than a predetermined minimum number of three-dimensional points, the three-dimensional data encoding device adjusts the number of three-dimensional-points included in the slice to be greater than or equal to the minimum number of three-dimensional points by combining a corresponding slice and another slice.

Next to step S11806, when the three-dimensional data encoding device determines that the number of three-dimensional points located in the tile is less than the maximum number of three-dimensional points (No in S11803), or determines that the three-dimensional points located in the tile are not to be divided into the predetermined number of slices (No in S11804), the three-dimensional encoding data device encodes point cloud data (S11807). For example, when slice dividing has been performed on the three-dimensional point cloud, the three-dimensional data encoding device encodes the point cloud data for each slice (i.e., for each data of the three-dimensional points included in a slice). Alternatively, for example, when slice dividing has not been performed, the three-dimensional data encoding device collectively encodes a three-dimensional point cloud as one slice, or individually encodes each data of a three-dimensional point.

Note that the three-dimensional data encoding device may be set to always perform slice dividing (S11805) by setting the maximum number of three-dimensional points to MAX.

Additionally, step S11806 need not be performed.

Additionally, for example, when performing tile dividing (when performing step S11802), the three-dimensional data encoding device generates tile information. For example, the three-dimensional data encoding device may generate tile information when the number of tiles>2, and need not generate tile information when the number of tiles=0 or 1. The three-dimensional data encoding device generates a bitstream including the point cloud data of an encoded three-dimensional point cloud, and the generated tile information, when the tile information is generated, and transmits the generated bitstream to, for example, the three-dimensional data decoding device.

Figure 105:
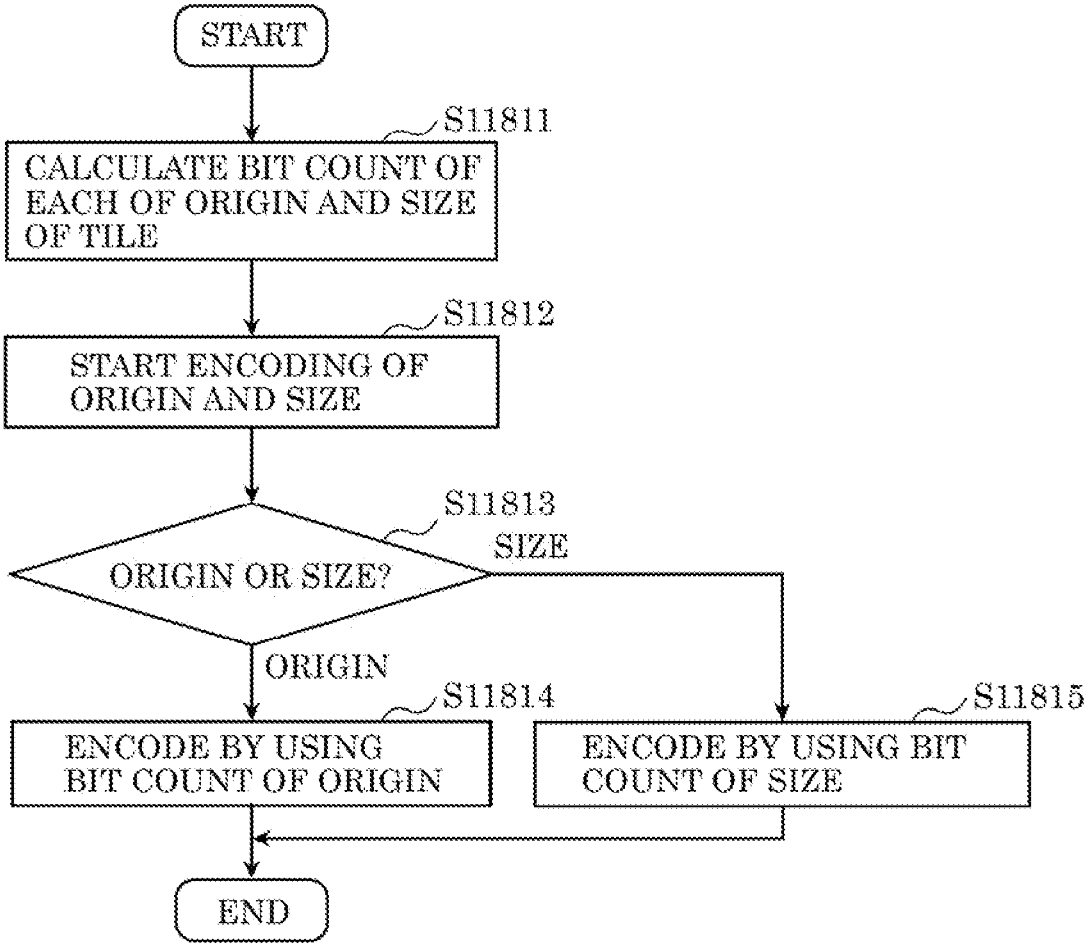
FIG. 105 is a flowchart illustrating a specific example of the encoding process of tile information of the three-dimensional data encoding device according to Embodiment 9.

FIG. 105 is a flowchart illustrating a specific example of the encoding process of tile information of the three-dimensional data encoding device according to the present embodiment.

First, the three-dimensional data encoding device calculates the bit count of each of the information indicating the origin of a tile and the information indicating the size of the tile based on tile information (S11811).

Next, the three-dimensional data decoding device starts encoding of the information indicating the origin and the information indicating the size (S11812).

For the information indicating the origin of the tile ("origin" in S11813), the three-dimensional data encoding device calculates the bit count of the origin (for example, the above-described bb_origin_bits) by the above-described method, and encodes the information indicating the origin of the tile by using the calculated bit count as a fixed length (S11814).

On the other hand, for the information indicating the size of a tile ("size" in S11813), the three-dimensional data encoding device calculates the bit count of the size (for example, the above-described bb_size_bits) by the above-described method, and encodes the information indicating the size of the tile by using the calculated bit count as a fixed length (S11815).

The three-dimensional data encoding device generates a bitstream including, for example, the information on the encoded tile (the information indicating the origin of the tile and the information indicating the size of the tile), and the information indicating the bit count (bb_origin_bits and bb_size_bits), and transmits the generated bitstream to the three-dimensional data decoding device.

Figure 106:
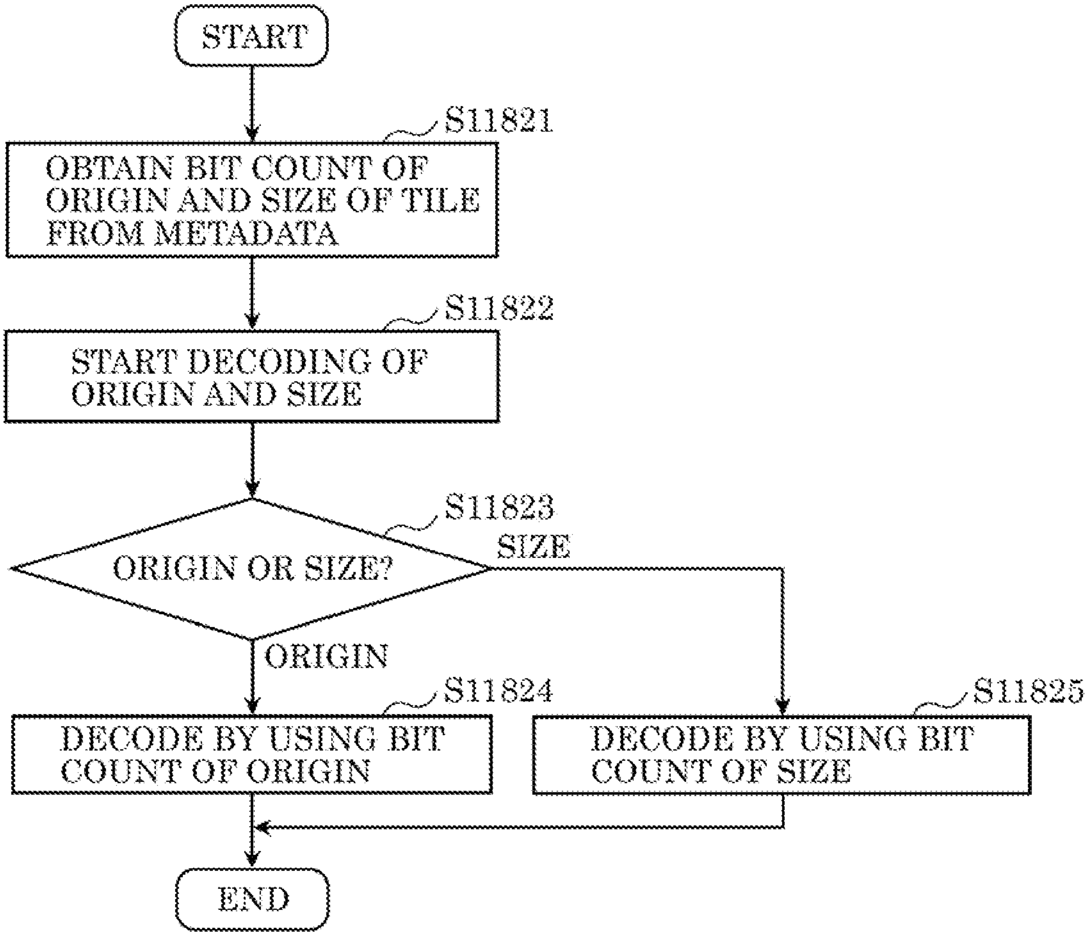
FIG. 106 is a flowchart illustrating a specific example of a decoding process of encoded tile information of a three-dimensional data decoding device according to Embodiment 9.

FIG. 106 is a flowchart illustrating a specific example of a decoding process of encoded tile information of the three-dimensional data decoding device according to the present embodiment.

First, the three-dimensional data decoding device obtains, from metadata (additional information), the information indicating the bit count of the origin of a tile, and the information indicating the bit count of the size of the tile (S11821). For example, the three-dimensional data decoding device obtains a bitstream including the information on an encoded tile (the information indicating the origin of the tile and the information indicating the size of the tile), and the information indicating the bit count (bb_origin_bits and bb_size_bits), and obtains the information indicating the bit count of the origin (for example, the above-described bb_origin_bits), and the information indicating the bit count of the size (for example, the above-described bb_size_bits), each of the items of information is the additional information included in the obtained bitstream.

Next, the three-dimensional data decoding device starts decoding of the information indicating the encoded origin, and the information indicating the encoded size (S11822).

For the information indicating the origin of the encoded tile ("origin" in S11823), the three-dimensional data decoding device decodes the information indicating the origin of the tile encoded by using the bit count of the origin as a fixed length (S11824).

On the other hand, for the information indicating the size of the encoded tile ("size" in S11823), the three-dimensional data decoding device decodes the information indicating the size of the tile encoded by using the bit count of the size as the fixed length (S11825).

Figure 107:
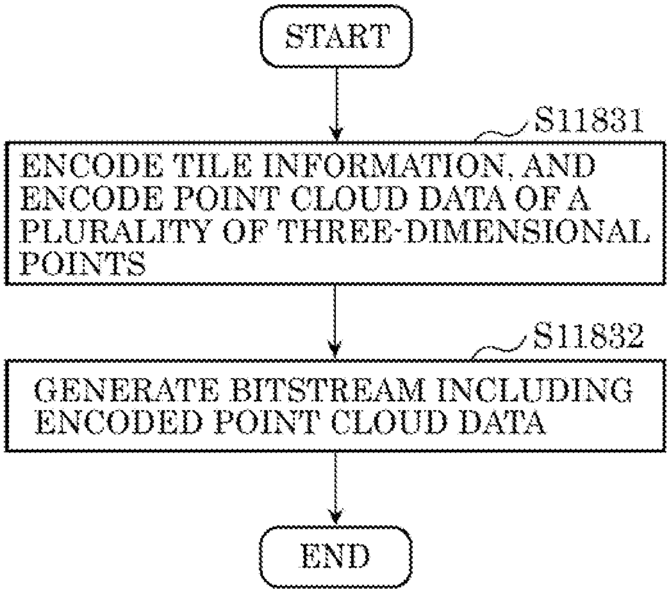
FIG. 107 is a flowchart illustrating a processing procedure of the three-dimensional data encoding device according to Embodiment 9.

As described above, the three-dimensional data encoding device according to the present embodiment performs the process shown in FIG. 107.

FIG. 107 is a flowchart illustrating a processing procedure of the three-dimensional data encoding device according to Embodiment 9.

First, the three-dimensional data encoding device encodes tile information including information on N (N is an integer greater than or equal to 0) subspaces which are at least part of a target space in which three-dimensional points are included, and encodes point cloud data of the three-dimensional points based on the tile information (S11831).

Next, the three-dimensional data encoding device generates a bitstream including the point cloud data encoded (S11832).

The tile information includes N items of subspace coordinate information indicating coordinates of the N subspaces. In addition, the N items of subspace coordinate information each include three items of coordinate information each indicating a coordinate in a different one of three axial directions in a three-dimensional orthogonal coordinate system.

When N is greater than or equal to 1, (i) in the encoding of the tile information (S11831), the three-dimensional data encoding device encodes each (more specifically, all) of the three items of coordinate information included in each of the N items of subspace coordinate information using a first fixed length. Furthermore, in this case (when N is greater than or equal to 1), (ii) in the generating of the bitstream (S11832), the three-dimensional data encoding device generates the bitstream which includes the N items of subspace coordinate information encoded and first fixed length information indicating the first fixed length. Specifically, when N is greater than or equal to 1, the three-dimensional data encoding device generates a bitstream including the point cloud data encoded, the N items of subspace coordinate information encoded, and the first fixed length information.

Note that encoding based on tile information means, for example, confirming that the information on a subspace (for example, the position of a bounding box such as the subspace coordinate information and the size information described later, the information indicating the size, etc.) is not included in a bitstream and performing encoding when N is 0, and performing encoding based on the information on the subspace when N is greater than or equal to 1. Additionally, encoding based on tile information means, for example, performing slice dividing on the point cloud data based on the tile information (i.e., dividing the point cloud data), and encoding each of the divided slice (i.e., each divided point cloud data) as described above.

Tile information is, for example, the tile metadata described above, and is information on a bounding box.

The target space is a space that includes N subspaces.

A subspace is for example a region inside the above-described bounding box, or, stated differently, is a region surrounded by the bounding box.

The subspace coordinate information is an example of information on a subspace, and is information indicating coordinates of the subspace (that is, the position of the subspace). For example, the subspace coordinate information includes three items of coordinate information indicating the coordinates in three axial directions (the origin, in the present embodiment) in a three-dimensional orthogonal coordinate system. For example, in the case of a three-dimensional orthogonal coordinate system (an xyz coordinate system), the three items of coordinate information are information indicating origin_x, information indicating origin y, and information indicating origin_z, and are information indicating the coordinate of the origin in an x-axial direction, information indicating the coordinate of the origin in a y-axial direction, and information indicating the coordinate of the origin in a z-axial direction.

The first fixed length may be calculated using the calculation method for a fixed length described above, or may be arbitrarily set in advance.

Accordingly, since each of the three items of coordinate information of each of the N items of subspace coordinate information included in the tile information is encoded using the first fixed length, the processing amount in the encoding can be reduced compared to when encoding is performed using a variable length, for example.

Furthermore, for example, the tile information includes at least one item of size information indicating a size of at least one subspace among the N subspaces. In this case, for example, in the encoding of the tile information (S11831), the three-dimensional data encoding device encodes each (more specifically, all) of the at least one item of size information using a second fixed length. Furthermore, in this case, for example, in the generating of the bitstream (S11832), the three-dimensional data encoding device generates the bitstream which includes the at least one item of size information encoded and second fixed length information indicating the second fixed length.

In should be noted that, in this case, the three-dimensional data encoding device encodes the point cloud data based on the N items of subspace coordinate information and at least one item of size information, for example.

Size information is for example information indicating the size of the bounding box described above. Size information includes, for example, information indicating size_width, information indicating size_height, and information indicating size_depth described above.

The second fixed length may be calculated using the calculation method for a fixed length described above, or may be arbitrarily set in advance.

Accordingly, since the size information included in the tile information is encoded using the second fixed length, the processing amount in the encoding can be further reduced compared to when encoding is performed using a variable length, for example.

Furthermore, for example, before step S11831, the three-dimensional data encoding device further determines whether a size of each of the N subspaces matches a predetermined size. In this case, in the encoding of the tile information (S11831), the three-dimensional data encoding device encodes size information indicating a size of a subspace that does not match the predetermined size among the N subspaces, as the at least one item of size information, using the second fixed length. Furthermore, in this case, in the generating of the bitstream (S11832), the three-dimensional data encoding device generates the bitstream which includes common flag information indicating whether the size of each of the N subspaces matches the predetermined size.

More specifically, for example, after further determining whether or not the size of a subspace matches a predetermined size for each of N subspaces, when the size of the subspace does not match the predetermined size, in the above-described encoding of tile information (S11831), the three-dimensional data encoding device encodes the size information indicating the size of the subspace with a second fixed length as one of the above-described at least one item of size information, and in the above-described generation of a bitstream (S11832), the three-dimensional data encoding device includes, in the bitstream, first common flag information indicating that the size of the subspace does not match the predetermined size. On the other hand, for example, when the size of the subspace matches the predetermined size, in generation of a bitstream (S11832), the three-dimensional data encoding device includes, in the bitstream, second common flag information indicating that the size of the subspace matches the predetermined size.

In this manner, the three-dimensional data encoding device, for example, determines, for each of the N subspaces, whether the size of the subspace matches the predetermined size, and indicates the size of the subspace by way of common flag information when the size is determined to match the predetermined size, and indicates the size of the subspace by way of size information indicating the specific size (length) when the size is determined not to match the predetermined size.

Common flag information is for example common_size_flag described above. First common flag information is for example above-described common_size_flag[n]=0 (where n is 0, 1, or 2). Second common flag information is for example above-described common_size_flag[n]=1.

Accordingly, in a case the size of a subspace matches the predetermined size, even if size information indicating the size is not included in the encoded bitstream, by including common size information, which indicates whether the subspace matches the predetermined size, in the bitstream, the three-dimensional data decoding device which has obtained the bitstream can appropriately determine the size of the subspace. For this reason, for example, when many subspaces have sizes matching the predetermined size, the data amount of the bitstream to be generated can be reduced, and the processing amount in the encoding of size information can be reduced.

It should be noted that, as described above, for example, the size information includes information indicating width, information indicating height, and information indicating depth. Each of width, height, and depth is an example of size, and the common size flag information may indicate whether each of width, height, and depth matches the predetermined size Furthermore, when the common size information indicating the predetermined size is set in advance, the three-dimensional data encoding device need not include the common size information in the bitstream. Of course, when one of the sizes of the N items of subspaces matches the predetermined size for example, the three-dimensional data encoding device may include the common size information in the bitstream.

Furthermore, for example, the first fixed length and the second fixed length are of the same length (i.e., the same bit count).

The three-dimensional data encoding device may, for example, calculate the first fixed length and the second fixed length using the calculation method for a fixed length described above, and set the longer fixed length (the fixed length having a higher bit count) as a fixed length that is common to the first fixed length and the second fixed length, or a common fixed length may be arbitrarily set in advance.

Accordingly, since the information indicating each of the first fixed length and the second fixed length can be a single item of information, the data amount of the bitstream to be generated can be reduced.

Furthermore, for example, the tile information includes common origin information indicating coordinates of an origin of the target space. In this case, for example, in the generating of the bitstream (S11832), the three-dimensional data encoding device generates the bitstream which includes the common origin information.

The common origin information is, for example in the case of a three-dimensional orthogonal coordinate system (an xyz coordinate system), information indicating common_origin_x, information indicating common_origin_y, and information indicating common_origin_z described above.

Accordingly, even if the coordinates of the origin of the target space is not set in advance for example, the three-dimensional data decoding device that has obtained the bitstream can appropriately decode the encoded point cloud data based on the information included in the bitstream.

Furthermore, for example, in the generating of the bitstream (S11832), when N is 0, the three-dimensional data encoding device generates the bitstream that does not include the information on the N subspaces.

For example, the three-dimensional data encoding device first determines whether N is 0, and executes the respective processes described above (for example, processes from step S11831 onward) based on the determination result.

Accordingly, the data amount of the bitstream to be generated can be reduced.

Furthermore, for example, the three-dimensional data encoding device includes a processor and memory, and the processor performs the above process using the memory. A control program for performing the above process may be stored in the memory.

Furthermore, the three-dimensional data decoding device performs the process shown in FIG. 8.

Figure 108:
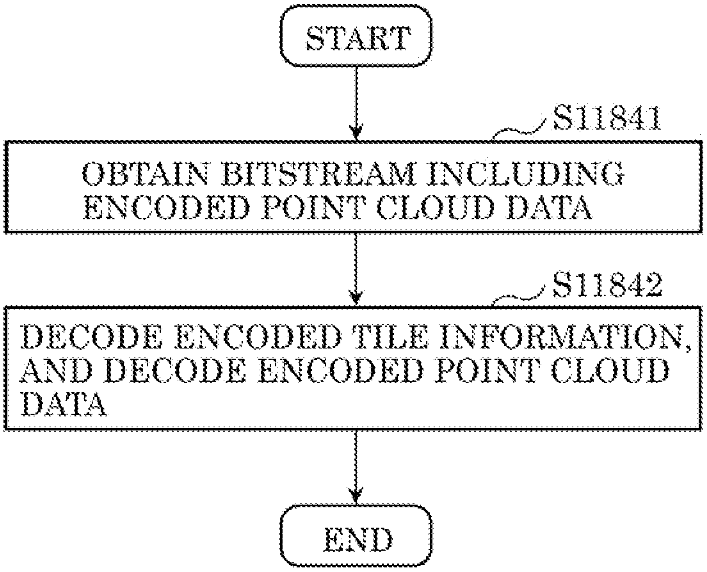
FIG. 108 is a flowchart illustrating a processing procedure of the three-dimensional data decoding device according to Embodiment 9.

FIG. 108 is a flowchart illustrating a processing procedure of the three-dimensional data decoding device according to Embodiment 9.

First, the three-dimensional data decoding device obtains a bitstream including encoded point cloud data of three-dimensional points (S11841).

Next, the three-dimensional data decoding device decodes tile information which is encoded and includes information on N (N is an integer greater than or equal to 0) subspaces which are at least part of a target space in which the three-dimensional points are included, and decodes the encoded point cloud data based on the tile information (S11842).

The tile information includes N items of subspace coordinate information indicating coordinates of the N subspaces. Furthermore, the N items of subspace coordinate information each include three items of coordinate information each indicating a coordinate in a different one of three axial directions in a three-dimensional orthogonal coordinate system.

When N is greater than or equal to 1, (i) in the obtaining of the bitstream (S11841), the three-dimensional data decoding device obtains the bitstream which includes the N items of subspace coordinate information which are encoded and first fixed length information indicating the first fixed length. Furthermore, in this case (i.e., when N is greater than or equal to 1), (ii) in the decoding of the tile information which is encoded (S11482), the three-dimensional data decoding device decodes, using the first fixed length, each of the three items of coordinate information which are encoded and included in each of the N items of subspace coordinate information which are encoded.

Note that decoding based on tile information means, for example, confirming that the information on a subspace is not included in a bitstream and performing decoding when N is 0, and decoding based on the information on the subspace when N is greater than or equal to 1. Additionally, decoding based on tile information means, for example, decoding one or more point cloud data on which slice dividing has been performed, based on the tile information for each point cloud data.

Accordingly, since each of the three items of coordinate information of each of the encoded N items of subspace coordinate information included in the tile information is decoded using the first fixed length, the processing amount in the decoding can be reduced compared to when decoding is performed using a variable length, for example.

Furthermore, for example, the tile information includes at least one item of size information indicating a size of at least one subspace among the N subspaces. In this case, for example, in the obtaining of the bitstream (S11841), the three-dimensional data decoding device obtains the bitstream which includes the at least one item of size information which is encoded and second fixed length information indicating the second fixed length. Furthermore, in this case, in the decoding of the tile information which is decoded (S11842), the three-dimensional data decoding device decodes, using the second fixed length, each of the at least one item of size information which is encoded.

Accordingly, since the encoded size information included in the tile information is decoded using the second fixed length, the processing amount in the decoding can be reduced compared to when decoding is performed using a variable length, for example.

Furthermore, for example, in the obtaining of the bitstream (S11841), the three-dimensional data decoding device obtains the bitstream which includes common flag information indicating whether a size of each of the N subspaces matches a predetermined size. Furthermore, in this case, for example, subsequent to step S11841, the three-dimensional data decoding device further determines whether the size of each of the N subspaces matches the predetermined size based on the common flag information. Furthermore, in this case, in the decoding of the tile information which is encoded (S11482), the three-dimensional data decoding device decodes, using the second fixed length, encoded size information indicating a size of a subspace that does not match the predetermined size among the N subspaces, as the at least one item of size information which is encoded.

More specifically, for example, in the above-described obtaining of a bitstream (S11841), the three-dimensional data decoding device obtains, for each of N subspaces, a bitstream including either of the first common flag information indicating that the size of the subspace does not match the predetermined size, and the second common flag information indicating that the size of the subspace matches the predetermined size. In this case, for example, the three-dimensional data encoding device further determines, for each of N subspaces, whether or not the size of the subspace matches the predetermined size based on either of the first common flag information and the second common flag information. For example, when the size of the subspace does not match the predetermined size, the three-dimensional data decoding device decodes the size information indicating the size of the subspace with the second fixed length as one of at least one item of encoded size information. On the other hand, for example, when the size of the subspace matches the predetermined size, i.e., when the second common flag information is included in a bitstream as the information indicating the size of the subspace, the three-dimensional data decoding device determines the size of the subspace as the predetermined size.

Accordingly, in a case the size of a subspace matches the predetermined size, even if size information indicating the size is not included in the encoded bitstream, as long as common size information, which indicates whether the subspace matches the predetermined size, is included in the bitstream, the size of the subspace can be appropriately determined. For this reason, for example, when many subspaces have sizes matching the predetermined size, the data amount of the bitstream to be obtained can be reduced, and the processing amount in the decoding of size information can be reduced.

It should be noted that the common size information may be set in advance (for example, the common size information may be stored in advance in a memory, or the like, included in the three-dimensional data decoding device), or may be included in the bitstream.

Furthermore, for example, the first fixed length and the second fixed length are of the same length (i.e., the same bit count).

Accordingly, since the information indicating each of the first fixed length and the second fixed length can be a single item of information, the data amount of the bitstream to be obtained can be reduced.

Furthermore, for example, the tile information includes common origin information indicating coordinates of an origin of the target space. In this case, for example, in the obtaining of the bitstream (S11841, the three-dimensional data decoding device obtains the bitstream which includes the common origin information.

Accordingly, even if the coordinates of the origin of the target space is not set in advance for example, the encoded point cloud data can be appropriately decoded based on the information included in the bitstream.

Furthermore, for example, in the obtaining of the bitstream (S11841), when N is 0, the three-dimensional data decoding device obtains the bitstream that does not include the information on the N subspaces.

Accordingly, the data amount of the bitstream to be obtained can be reduced.

Furthermore, for example, the three-dimensional data decoding device includes a processor and memory, and the processor performs the above process using the memory. A control program for performing the above process may be stored in the memory.

Embodiment 10

Figure 109:
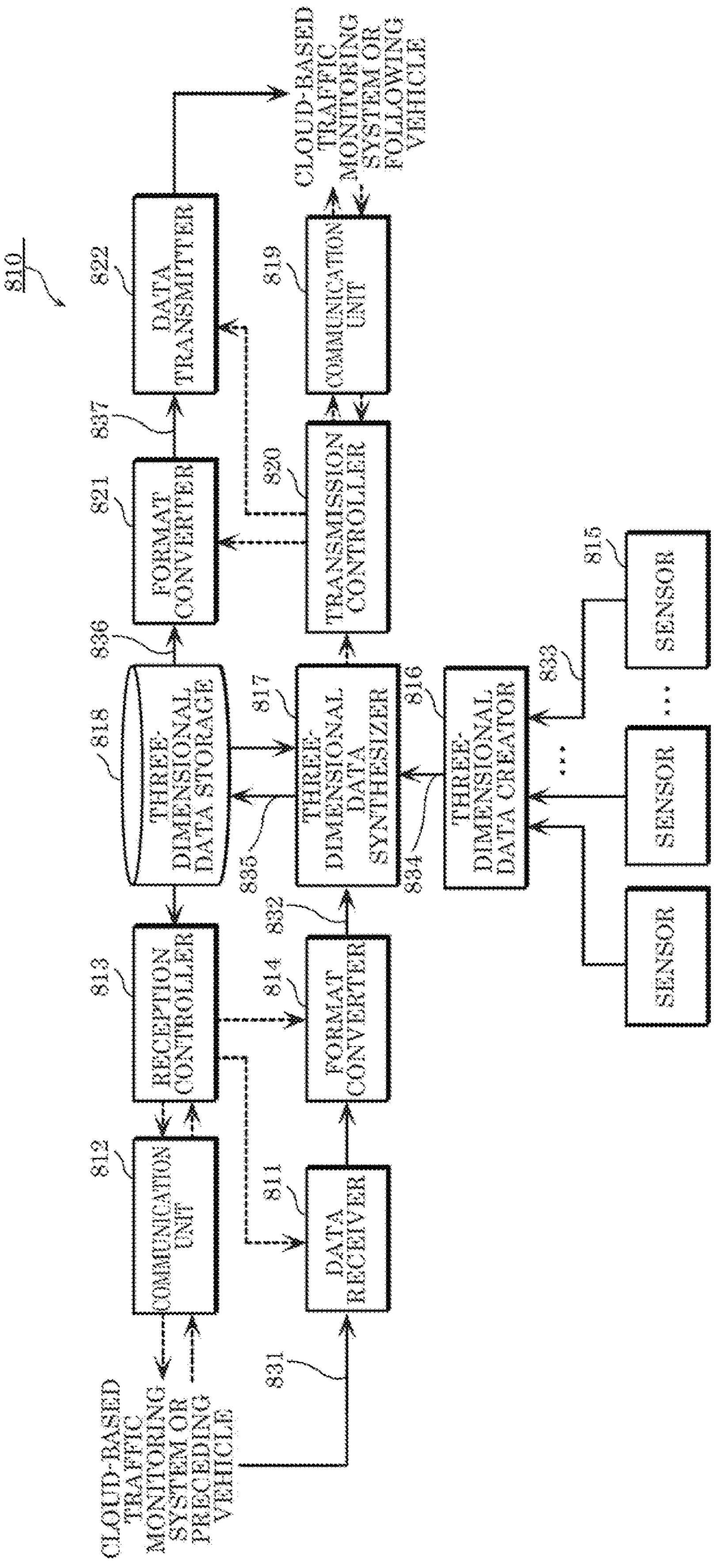
FIG. 109 is a block diagram of a three-dimensional data creation device according to Embodiment 10.

The following describes the structure of three-dimensional data creation device 810 according to the present embodiment. FIG. 109 is a block diagram of an exemplary structure of three-dimensional data creation device 810 according to the present embodiment. Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point group data), when sensors 815 are laser sensors such as LiDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Figure 110:
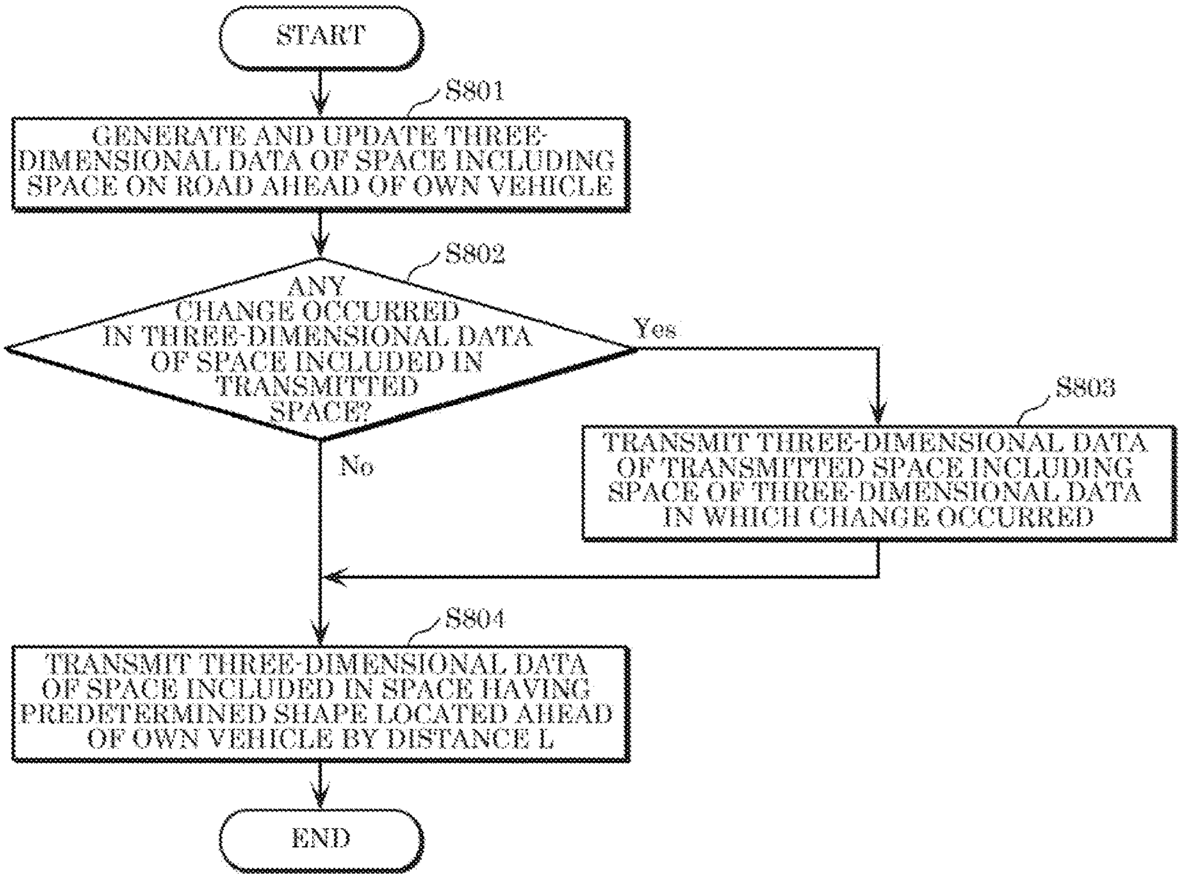
FIG. 110 is a flowchart of a three-dimensional data creation method according to Embodiment 10.

The following describes the steps performed by three-dimensional data creation device 810 of transmitting three-dimensional data to a following vehicle. FIG. 110 is a flowchart showing exemplary steps performed by three-dimensional data creation device 810 of transmitting three-dimensional data to a cloud-based traffic monitoring system or a following vehicle.

First, three-dimensional data creation device 810 generates and updates three-dimensional data 835 of a space that includes space on the road ahead of the own vehicle (S801). More specifically, three-dimensional data creation device 810 synthesizes three-dimensional data 834 created on the basis of sensor information 833 of the own vehicle with three-dimensional data 831 created by the cloud-based traffic monitoring system or the preceding vehicle, etc., for example, thereby forming three-dimensional data 835 of a space that also includes the space ahead of the preceding vehicle undetectable by sensors 815 of the own vehicle.

Three-dimensional data creation device 810 then judges whether any change has occurred in three-dimensional data 835 of the space included in the space already transmitted (S802).

When a change has occurred in three-dimensional data 835 of the space included in the space already transmitted due to, for example, a vehicle or a person entering such space from outside (Yes in S802), three-dimensional data creation device 810 transmits, to the cloud-based traffic monitoring system or the following vehicle, the three-dimensional data that includes three-dimensional data 835 of the space in which the change has occurred (S803).

Three-dimensional data creation device 810 may transmit three-dimensional data in which a change has occurred, at the same timing of transmitting three-dimensional data that is transmitted at a predetermined time interval, or may transmit three-dimensional data in which a change has occurred soon after the detection of such change. Stated differently, three-dimensional data creation device 810 may prioritize the transmission of three-dimensional data of the space in which a change has occurred to the transmission of three-dimensional data that is transmitted at a predetermined time interval.

Also, three-dimensional data creation device 810 may transmit, as three-dimensional data of a space in which a change has occurred, the whole three-dimensional data of the space in which such change has occurred, or may transmit only a difference in the three-dimensional data (e.g., information on three-dimensional points that have appeared or vanished, or information on the displacement of three-dimensional points).

Three-dimensional data creation device 810 may also transmit, to the following vehicle, meta-data on a risk avoidance behavior of the own vehicle such as hard breaking warning, before transmitting three-dimensional data of the space in which a change has occurred. This enables the following vehicle to recognize at an early stage that the preceding vehicle is to perform hard braking, etc., and thus to start performing a risk avoidance behavior at an early stage such as speed reduction.

When no change has occurred in three-dimensional data 835 of the space included in the space already transmitted (No in S802), or after step S803, three-dimensional data creation device 810 transmits, to the cloud-based traffic monitoring system or the following vehicle, three-dimensional data of the space included in the space having a predetermined shape and located ahead of the own vehicle by distance L (S804).

The processes of step S801 through step S804 are repeated, for example at a predetermined time interval.

When three-dimensional data 835 of the current space to be transmitted includes no difference from the three-dimensional map, three-dimensional data creation device 810 may not transmit three-dimensional data 837 of the space.

In the present embodiment, a client device transmits sensor information obtained through a sensor to a server or another client device.

Figure 111:
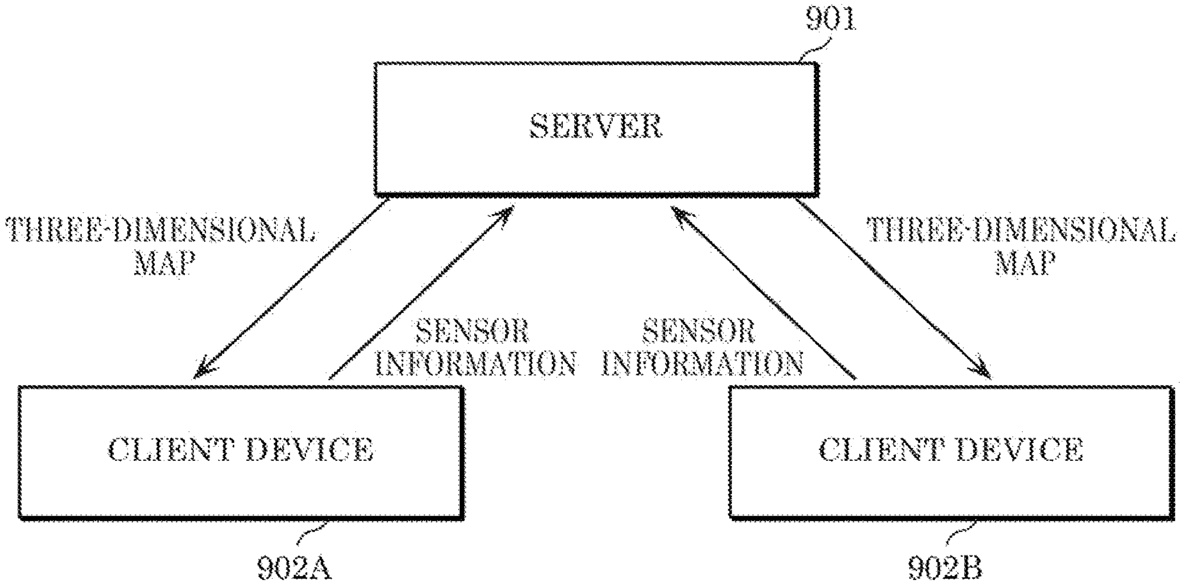
FIG. 111 is a diagram showing a structure of a system according to Embodiment 10.

A structure of a system according to the present embodiment will first be described. FIG. 111 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 112:
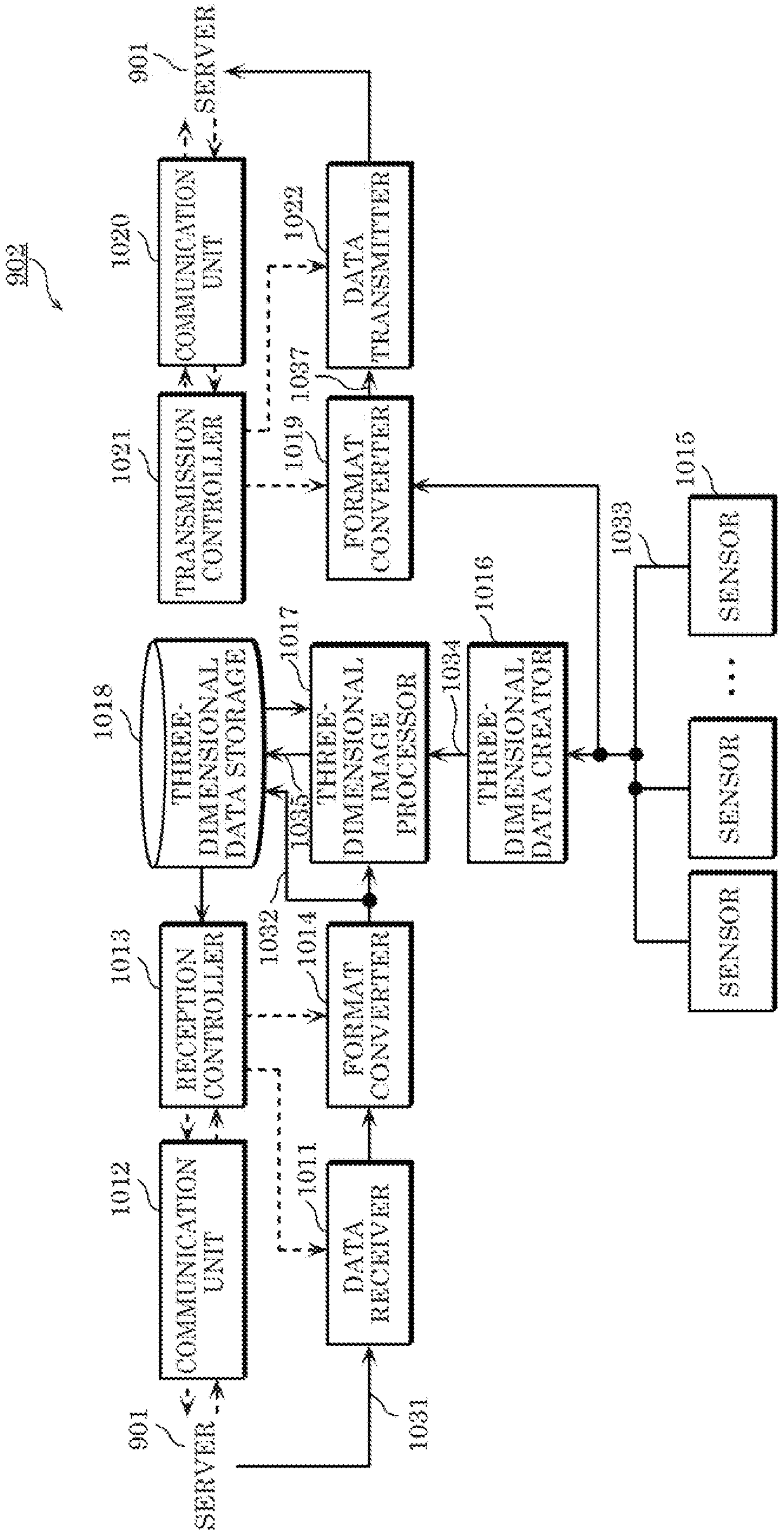
FIG. 112 is a block diagram of a client device according to Embodiment 10.

FIG. 112 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g. transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 1015 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LiDAR, a luminance image obtained by a visible light camera, an infrared image obtained by an infrared camera, a depth image obtained by a depth sensor, sensor position information, and sensor speed information.

Figure 113:
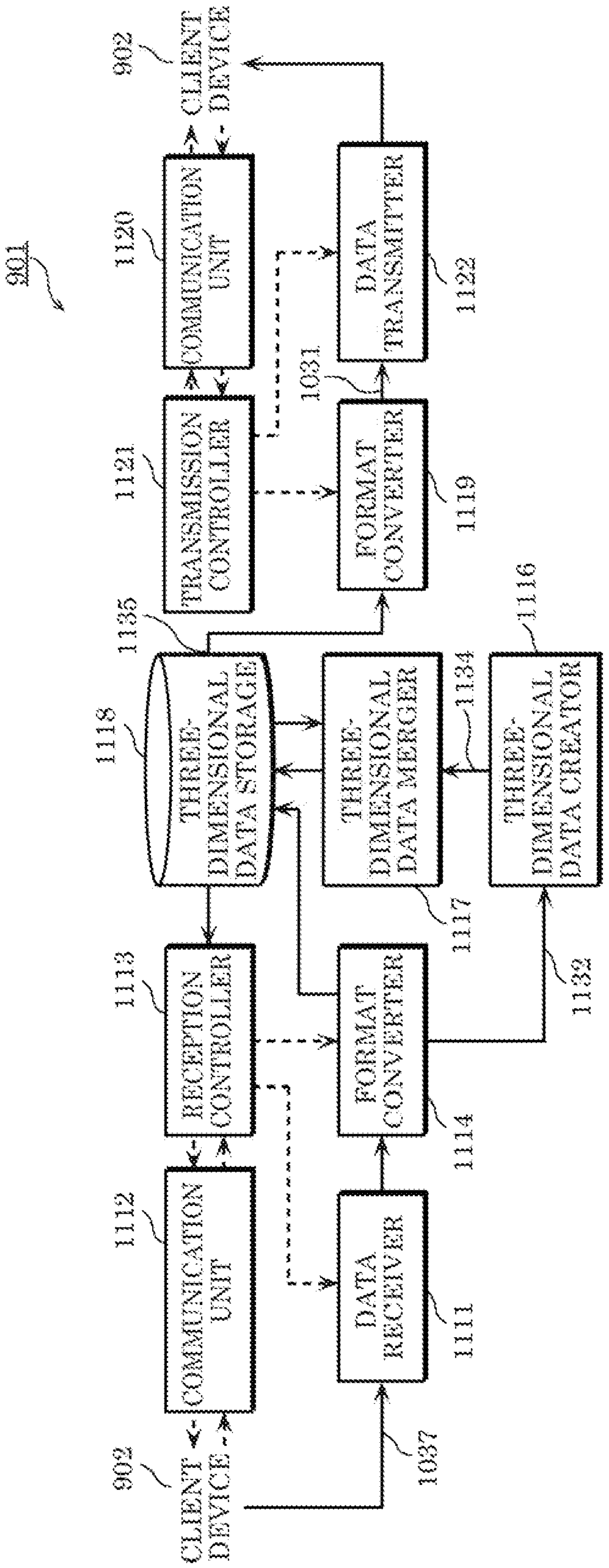
FIG. 113 is a block diagram of a server according to Embodiment 10.

A structure of server 901 will be described next. FIG. 113 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g. transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

Figure 114:
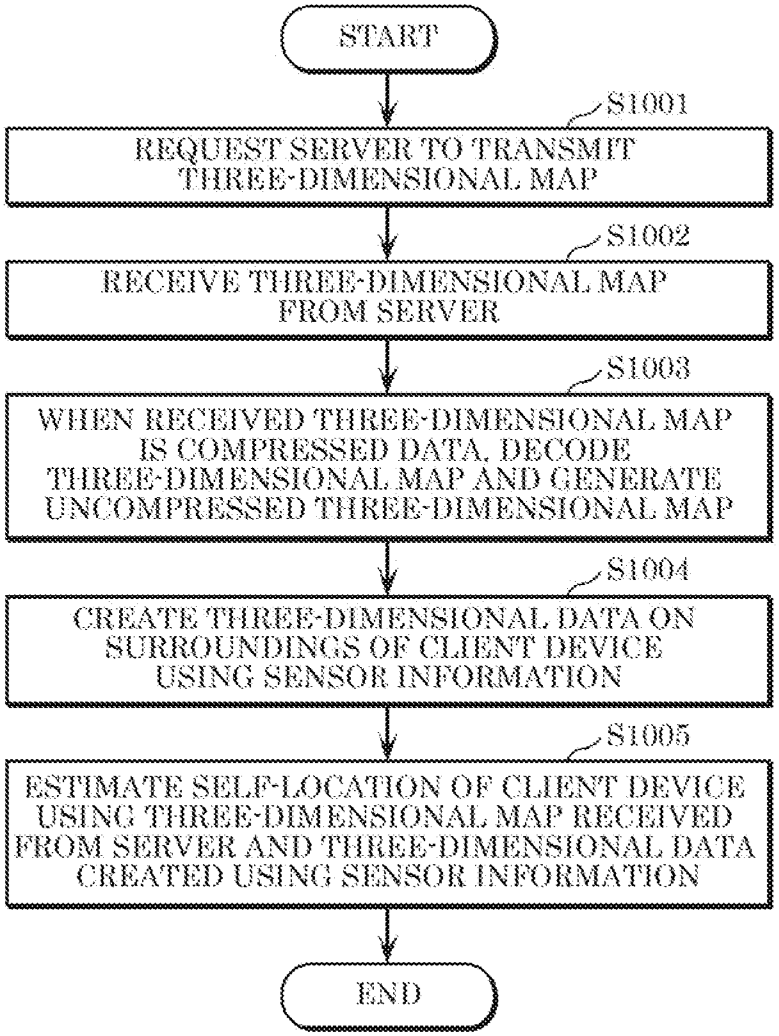
FIG. 114 is a flowchart of a three-dimensional data creation process performed by the client device according to Embodiment 10.

An operational flow of client device 902 will be described next. FIG. 114 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

Figure 115:
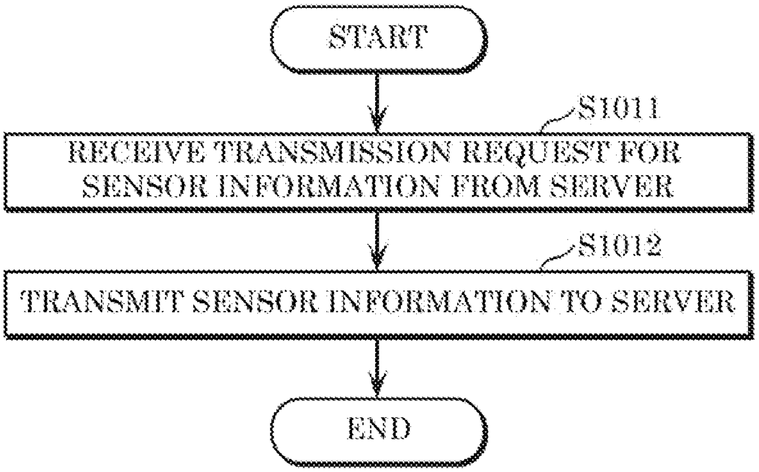
FIG. 115 is a flowchart of a sensor information transmission process performed by the client device according to Embodiment 10.

FIG. 115 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

Figure 116:
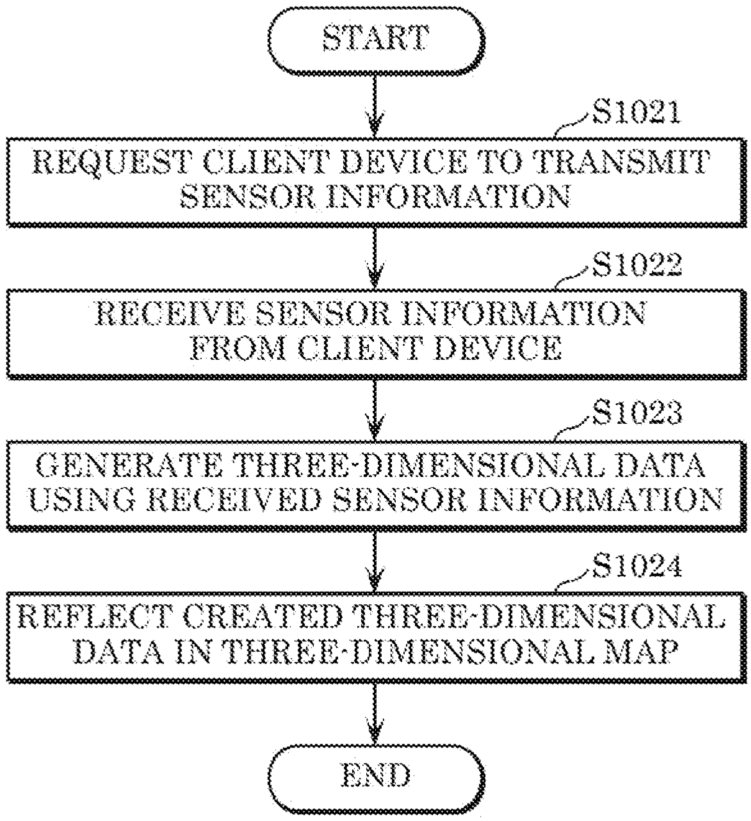
FIG. 116 is a flowchart of a three-dimensional data creation process performed by the server according to Embodiment 10.

An operational flow of server 901 will be described next. FIG. 116 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

Figure 117:
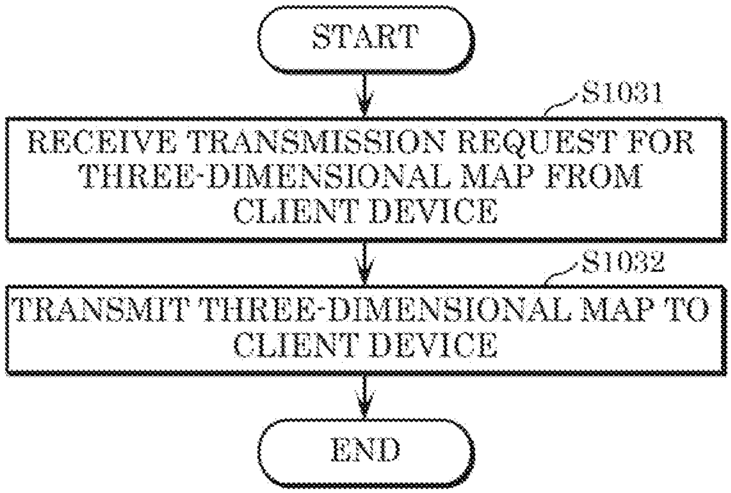
FIG. 117 is a flowchart of a three-dimensional map transmission process performed by the server according to Embodiment 10.

FIG. 117 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

The following describes variations of the present embodiment.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LiDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Figure 118:
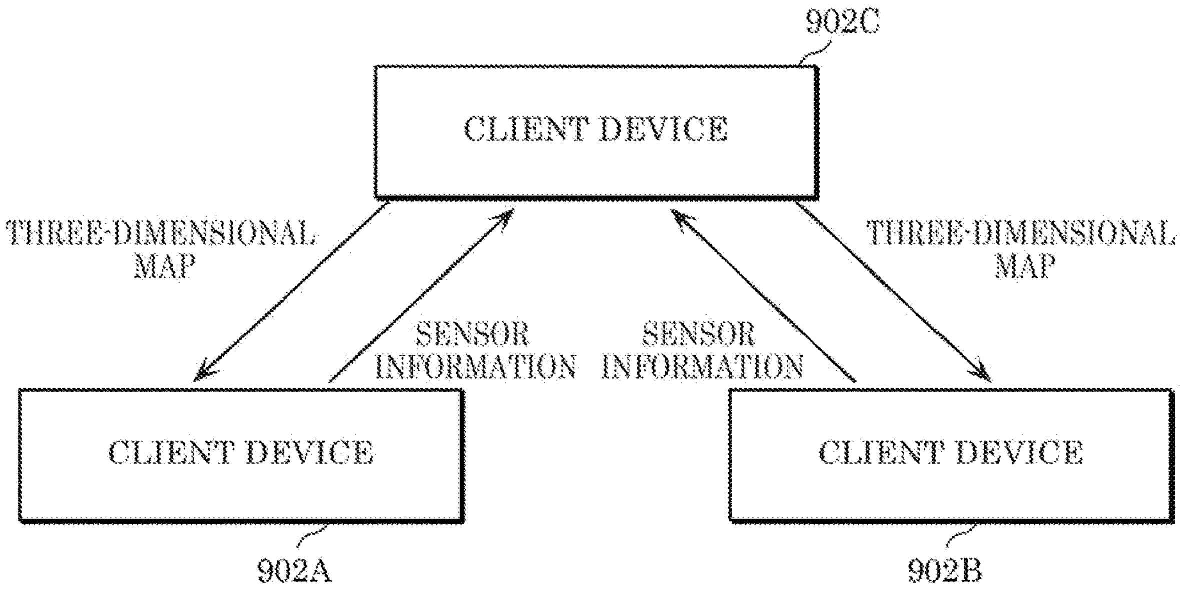
FIG. 118 is a diagram showing a structure of a variation of the system according to Embodiment 10.

Server 901 is not limited to only being a server such as a cloud-based traffic monitoring system, and may also be another (vehicle-mounted) client device. FIG. 118 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

Figure 119:
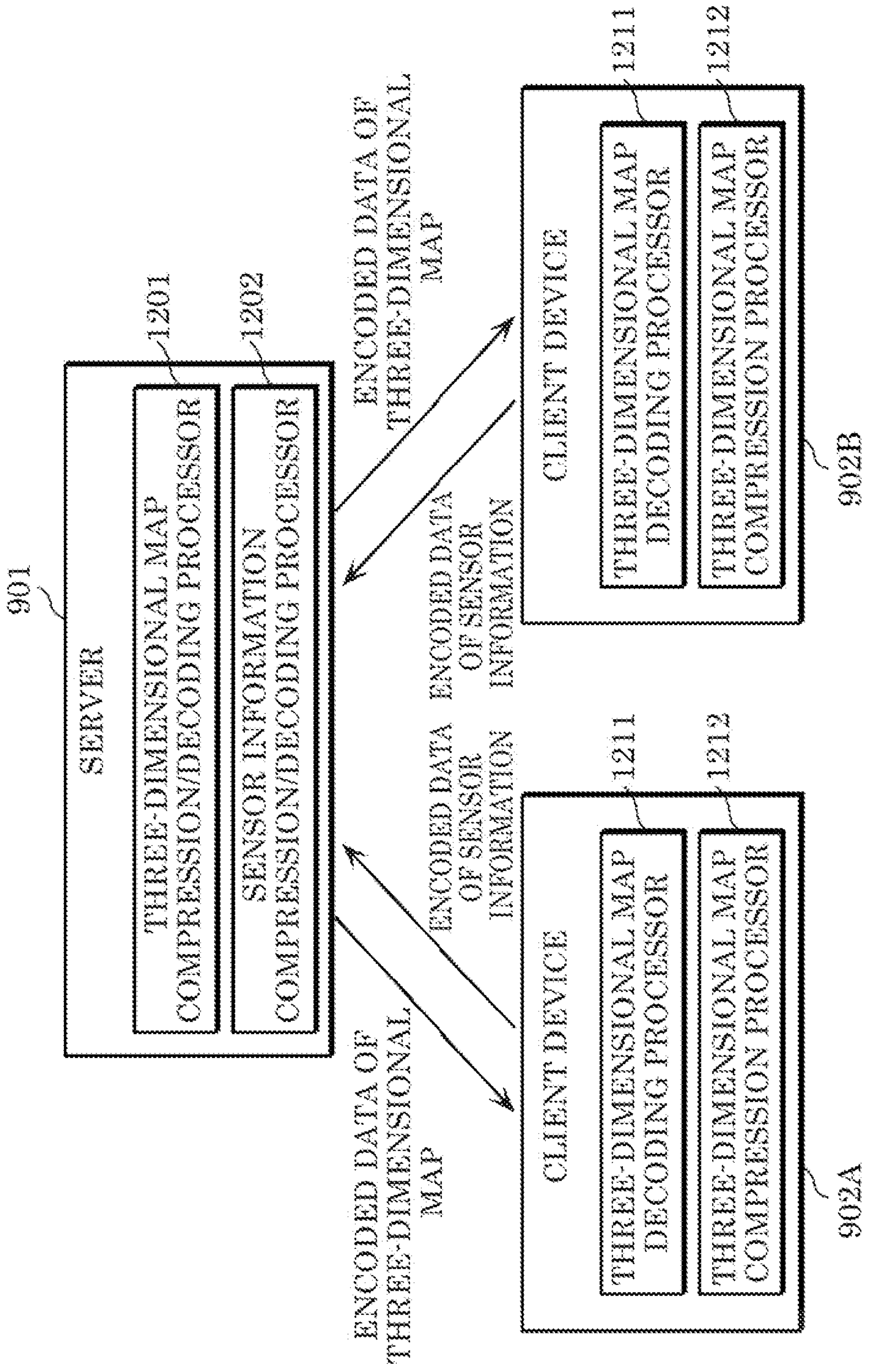

FIG. 119 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits obtained sensor information 1033 to server 901 or another client device 902.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1033 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another client device 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Figure 120:
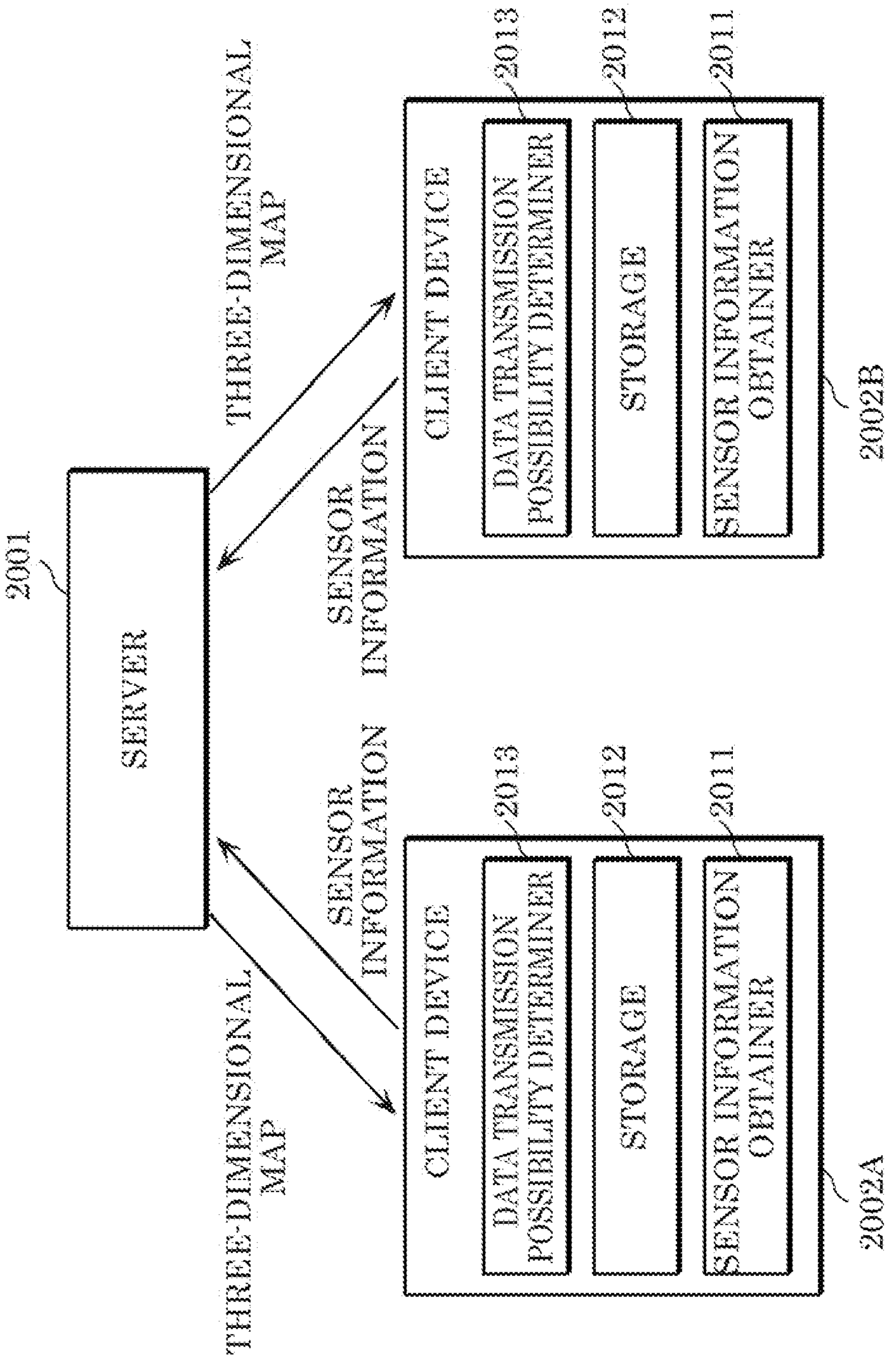

The following will describe a variation of the present embodiment. FIG. 120 is a diagram illustrating a configuration of a system according to the present embodiment. The system illustrated in FIG. 120 includes server 2001, client device 2002A, and client device 2002B.

Client device 2002A and client device 2002B are each provided in a mobile object such as a vehicle, and transmit sensor information to server 2001. Server 2001 transmits a three-dimensional map (a point cloud) to client device 2002A and client device 2002B.

Client device 2002A includes sensor information obtainer 2011, storage 2012, and data transmission possibility determiner 2013. It should be noted that client device 2002B has the same configuration. Additionally, when client device 2002A and client device 2002B are not particularly distinguished below, client device 2002A and client device 2002B are also referred to as client device 2002.

Figure 121:
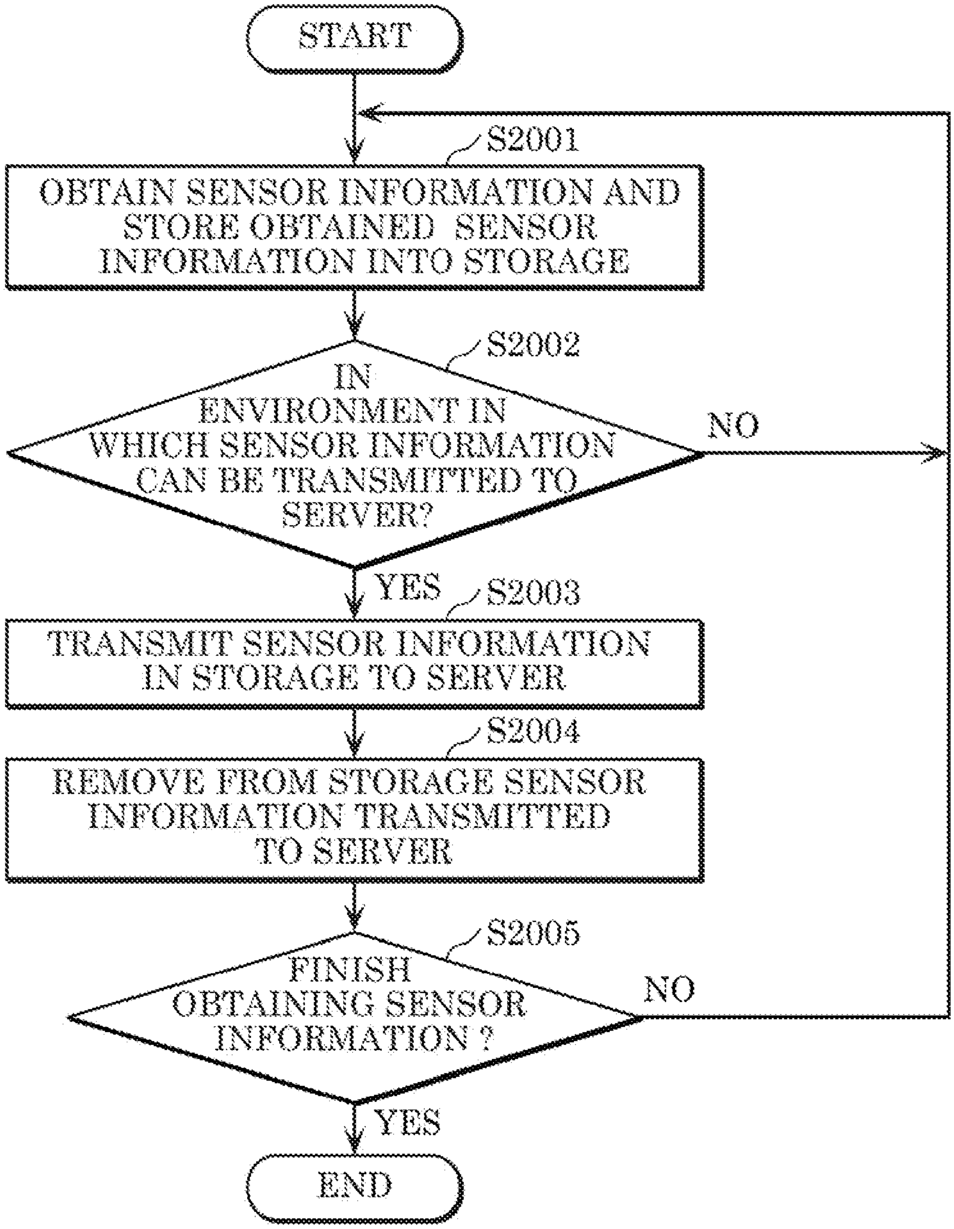

FIG. 121 is a flowchart illustrating operation of client device 2002 according to the present embodiment.

Sensor information obtainer 2011 obtains a variety of sensor information using sensors (a group of sensors) provided in a mobile object. In other words, sensor information obtainer 2011 obtains sensor information obtained by the sensors (the group of sensors) provided in the mobile object and indicating a surrounding state of the mobile object. Sensor information obtainer 2011 also stores the obtained sensor information into storage 2012. This sensor information includes at least one of information obtained by LiDAR, a visible light image, an infrared image, or a depth image. Additionally, the sensor information may include at least one of sensor position information, speed information, obtainment time information, or obtainment location information. Sensor position information indicates a position of a sensor that has obtained sensor information. Speed information indicates a speed of the mobile object when a sensor obtained sensor information. Obtainment time information indicates a time when a sensor obtained sensor information. Obtainment location information indicates a position of the mobile object or a sensor when the sensor obtained sensor information.

Next, data transmission possibility determiner 2013 determines whether the mobile object (client device 2002) is in an environment in which the mobile object can transmit sensor information to server 2001 (S2002). For example, data transmission possibility determiner 2013 may specify a location and a time at which client device 2002 is present using GPS information etc., and may determine whether data can be transmitted. Additionally, data transmission possibility determiner 2013 may determine whether data can be transmitted, depending on whether it is possible to connect to a specific access point.

When client device 2002 determines that the mobile object is in the environment in which the mobile object can transmit the sensor information to server 2001 (YES in S2002), client device 2002 transmits the sensor information to server 2001 (S2003). In other words, when client device 2002 becomes capable of transmitting sensor information to server 2001, client device 2002 transmits the sensor information held by client device 2002 to server 2001. For example, an access point that enables high-speed communication using millimeter waves is provided in an intersection or the like. When client device 2002 enters the intersection, client device 2002 transmits the sensor information held by client device 2002 to server 2001 at high speed using the millimeter-wave communication.

Next, client device 2002 deletes from storage 2012 the sensor information that has been transmitted to server 2001 (S2004). It should be noted that when sensor information that has not been transmitted to server 2001 meets predetermined conditions, client device 2002 may delete the sensor information. For example, when an obtainment time of sensor information held by client device 2002 precedes a current time by a certain time, client device 2002 may delete the sensor information from storage 2012. In other words, when a difference between the current time and a time when a sensor obtained sensor information exceeds a predetermined time, client device 2002 may delete the sensor information from storage 2012. Besides, when an obtainment location of sensor information held by client device 2002 is separated from a current location by a certain distance, client device 2002 may delete the sensor information from storage 2012. In other words, when a difference between a current position of the mobile object or a sensor and a position of the mobile object or the sensor when the sensor obtained sensor information exceeds a predetermined distance, client device 2002 may delete the sensor information from storage 2012. Accordingly, it is possible to reduce the capacity of storage 2012 of client device 2002.

When client device 2002 does not finish obtaining sensor information (NO in S2005), client device 2002 performs step S2001 and the subsequent steps again. Further, when client device 2002 finishes obtaining sensor information (YES in S2005), client device 2002 completes the process.

Client device 2002 may select sensor information to be transmitted to server 2001, in accordance with communication conditions. For example, when high-speed communication is available, client device 2002 preferentially transmits sensor information (e.g., information obtained by LiDAR) of which the data size held in storage 2012 is large. Additionally, when high-speed communication is not readily available, client device 2002 transmits sensor information (e.g., a visible light image) which has high priority and of which the data size held in storage 2012 is small. Accordingly, client device 2002 can efficiently transmit sensor information held in storage 2012, in accordance with network conditions Client device 2002 may obtain, from server 2001, time information indicating a current time and location information indicating a current location. Moreover, client device 2002 may determine an obtainment time and an obtainment location of sensor information based on the obtained time information and location information. In other words, client device 2002 may obtain time information from server 2001 and generate obtainment time information using the obtained time information. Client device 2002 may also obtain location information from server 2001 and generate obtainment location information using the obtained location information.

For example, regarding time information, server 2001 and client device 2002 perform clock synchronization using a means such as the Network Time Protocol (NTP) or the Precision Time Protocol (PTP). This enables client device 2002 to obtain accurate time information. What's more, since it is possible to synchronize clocks between server 2001 and client devices 2002, it is possible to synchronize times included in pieces of sensor information obtained by separate client devices 2002. As a result, server 2001 can handle sensor information indicating a synchronized time. It should be noted that a means of synchronizing clocks may be any means other than the NTP or PTP. In addition, GPS information may be used as the time information and the location information.

Server 2001 may specify a time or a location and obtain pieces of sensor information from client devices 2002. For example, when an accident occurs, in order to search for a client device in the vicinity of the accident, server 2001 specifies an accident occurrence time and an accident occurrence location and broadcasts sensor information transmission requests to client devices 2002. Then, client device 2002 having sensor information obtained at the corresponding time and location transmits the sensor information to server 2001. In other words, client device 2002 receives, from server 2001, a sensor information transmission request including specification information specifying a location and a time. When sensor information obtained at a location and a time indicated by the specification information is stored in storage 2012, and client device 2002 determines that the mobile object is present in the environment in which the mobile object can transmit the sensor information to server 2001, client device 2002 transmits, to server 2001, the sensor information obtained at the location and the time indicated by the specification information. Consequently, server 2001 can obtain the pieces of sensor information pertaining to the occurrence of the accident from client devices 2002, and use the pieces of sensor information for accident analysis etc.

It should be noted that when client device 2002 receives a sensor information transmission request from server 2001, client device 2002 may refuse to transmit sensor information. Additionally, client device 2002 may set in advance which pieces of sensor information can be transmitted. Alternatively, server 2001 may inquire of client device 2002 each time whether sensor information can be transmitted.

A point may be given to client device 2002 that has transmitted sensor information to server 2001. This point can be used in payment for, for example, gasoline expenses, electric vehicle (EV) charging expenses, a highway toll, or rental car expenses. After obtaining sensor information, server 2001 may delete information for specifying client device 2002 that has transmitted the sensor information. For example, this information is a network address of client device 2002. Since this enables the anonymization of sensor information, a user of client device 2002 can securely transmit sensor information from client device 2002 to server 2001. Server 2001 may include servers. For example, by servers sharing sensor information, even when one of the servers breaks down, the other servers can communicate with client device 2002. Accordingly, it is possible to avoid service outage due to a server breakdown.

A specified location specified by a sensor information transmission request indicates an accident occurrence location etc., and may be different from a position of client device 2002 at a specified time specified by the sensor information transmission request. For this reason, for example, by specifying, as a specified location, a range such as within XX meters of a surrounding area, server 2001 can request information from client device 2002 within the range. Similarly, server 2001 may also specify, as a specified time, a range such as within N seconds before and after a certain time. As a result, server 2001 can obtain sensor information from client device 2002 present for a time from t-N to t+N and in a location within XX meters from absolute position S. When client device 2002 transmits three-dimensional data such as LiDAR, client device 2002 may transmit data created immediately after time t.

Server 2001 may separately specify information indicating, as a specified location, a location of client device 2002 from which sensor information is to be obtained, and a location at which sensor information is desirably obtained. For example, server 2001 specifies that sensor information including at least a range within YY meters from absolute position S is to be obtained from client device 2002 present within XX meters from absolute position S. When client device 2002 selects three-dimensional data to be transmitted, client device 2002 selects one or more pieces of three-dimensional data so that the one or more pieces of three-dimensional data include at least the sensor information including the specified range. Each of the one or more pieces of three-dimensional data is a random-accessible unit of data. In addition, when client device 2002 transmits a visible light image, client device 2002 may transmit pieces of temporally continuous image data including at least a frame immediately before or immediately after time t.

When client device 2002 can use physical networks such as 5G, Wi-Fi, or modes in 5G for transmitting sensor information, client device 2002 may select a network to be used according to the order of priority notified by server 2001. Alternatively, client device 2002 may select a network that enables client device 2002 to ensure an appropriate bandwidth based on the size of transmit data. Alternatively, client device 2002 may select a network to be used, based on data transmission expenses etc. A transmission request from server 2001 may include information indicating a transmission deadline, for example, performing transmission when client device 2002 can start transmission by time t. When server 2001 cannot obtain sufficient sensor information within a time limit, server 2001 may issue a transmission request again.

Sensor information may include header information indicating characteristics of sensor data along with compressed or uncompressed sensor data. Client device 2002 may transmit header information to server 2001 via a physical network or a communication protocol that is different from a physical network or a communication protocol used for sensor data. For example, client device 2002 transmits header information to server 2001 prior to transmitting sensor data. Server 2001 determines whether to obtain the sensor data of client device 2002, based on a result of analysis of the header information. For example, header information may include information indicating a point cloud obtainment density, an elevation angle, or a frame rate of LiDAR, or information indicating, for example, a resolution, an SN ratio, or a frame rate of a visible light image. Accordingly, server 2001 can obtain the sensor information from client device 2002 having the sensor data of determined quality.

As stated above, client device 2002 is provided in the mobile object, obtains sensor information that has been obtained by a sensor provided in the mobile object and indicates a surrounding state of the mobile object, and stores the sensor information into storage 2012. Client device 2002 determines whether the mobile object is present in an environment in which the mobile object is capable of transmitting the sensor information to server 2001, and transmits the sensor information to server 2001 when the mobile object is determined to be present in the environment in which the mobile object is capable of transmitting the sensor information to server 2001.

Additionally, client device 2002 further creates, from the sensor information, three-dimensional data of a surrounding area of the mobile object, and estimates a self-location of the mobile object using the three-dimensional data created.

Besides, client device 2002 further transmits a transmission request for a three-dimensional map to server 2001, and receives the three-dimensional map from server 2001. In the estimating, client device 2002 estimates the self-location using the three-dimensional data and the three-dimensional map.

It should be noted that the above process performed by client device 2002 may be realized as an information transmission method for use in client device 2002.

In addition, client device 2002 may include a processor and memory. Using the memory, the processor may perform the above process.

Figure 122:
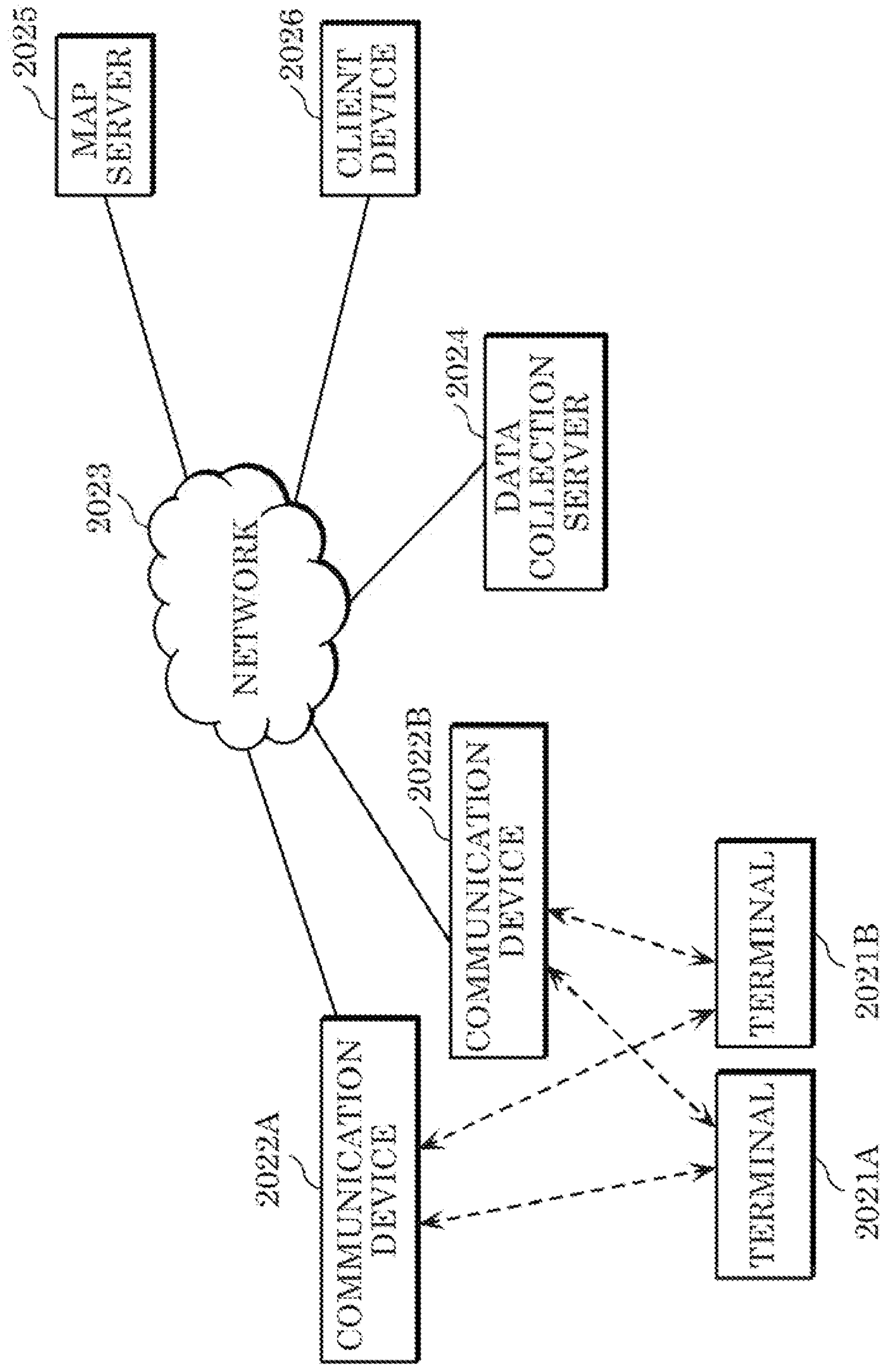

Next, a sensor information collection system according to the present embodiment will be described. FIG. 122 is a diagram illustrating a configuration of the sensor information collection system according to the present embodiment. As illustrated in FIG. 122, the sensor information collection system according to the present embodiment includes terminal 2021A, terminal 2021B, communication device 2022A, communication device 2022B, network 2023, data collection server 2024, map server 2025, and client device 2026. It should be noted that when terminal 2021A and terminal 2021B are not particularly distinguished, terminal 2021A and terminal 2021B are also referred to as terminal 2021. Additionally, when communication device 2022A and communication device 2022B are not particularly distinguished, communication device 2022A and communication device 2022B are also referred to as communication device 2022.

Data collection server 2024 collects data such as sensor data obtained by a sensor included in terminal 2021 as position-related data in which the data is associated with a position in a three-dimensional space.

Sensor data is data obtained by, for example, detecting a surrounding state of terminal 2021 or an internal state of terminal 2021 using a sensor included in terminal 2021. Terminal 2021 transmits, to data collection server 2024, one or more pieces of sensor data collected from one or more sensor devices in locations at which direct communication with terminal 2021 is possible or at which communication with terminal 2021 is possible by the same communication system or via one or more relay devices.

Data included in position-related data may include, for example, information indicating an operating state, an operating log, a service use state, etc. of a terminal or a device included in the terminal. In addition, the data include in the position-related data may include, for example, information in which an identifier of terminal 2021 is associated with a position or a movement path etc. of terminal 2021.

Information indicating a position included in position-related data is associated with, for example, information indicating a position in three-dimensional data such as three-dimensional map data. The details of information indicating a position will be described later.

Position-related data may include at least one of the above-described time information or information indicating an attribute of data included in the position-related data or a type (e.g., a model number) of a sensor that has created the data, in addition to position information that is information indicating a position. The position information and the time information may be stored in a header area of the position-related data or a header area of a frame that stores the position-related data. Further, the position information and the time information may be transmitted and/or stored as metadata associated with the position-related data, separately from the position-related data.

Map server 2025 is connected to, for example, network 2023, and transmits three-dimensional data such as three-dimensional map data in response to a request from another device such as terminal 2021. Besides, as described in the aforementioned embodiments, map server 2025 may have, for example, a function of updating three-dimensional data using sensor information transmitted from terminal 2021.

Data collection server 2024 is connected to, for example, network 2023, collects position-related data from another device such as terminal 2021, and stores the collected position-related data into a storage of data collection server 2024 or a storage of another server. In addition, data collection server 2024 transmits, for example, metadata of collected position-related data or three-dimensional data generated based on the position-related data, to terminal 2021 in response to a request from terminal 2021.

Network 2023 is, for example, a communication network such as the Internet. Terminal 2021 is connected to network 2023 via communication device 2022. Communication device 2022 communicates with terminal 2021 using one communication system or switching between communication systems.

Communication device 2022 is a communication satellite that performs communication using, for example, (1) a base station compliant with Long-Term Evolution (LTE) etc., (2) an access point (AP) for Wi-Fi or millimeter-wave communication etc., (3) a low-power wide-area (LPWA) network gateway such as SIGFOX, LoRaWAN, or Wi-SUN, or (4) a satellite communication system such as DVB-S2.

It should be noted that a base station may communicate with terminal 2021 using a system classified as an LPWA network such as Narrowband Internet of Things (NB IoT) or LTE-M, or switching between these systems. Here, although, in the example given, terminal 2021 has a function of communicating with communication device 2022 that uses two types of communication systems, and communicates with map server 2025 or data collection server 2024 using one of the communication systems or switching between the communication systems and between communication devices 2022 to be a direct communication partner; a configuration of the sensor information collection system and terminal 2021 is not limited to this. For example, terminal 2021 need not have a function of performing communication using communication systems, and may have a function of performing communication using one of the communication systems. Terminal 2021 may also support three or more communication systems. Additionally, each terminal 2021 may support a different communication system.

Terminal 2021 includes, for example, the configuration of client device 902 illustrated in FIG. 112. Terminal 2021 estimates a self-location etc. using received three-dimensional data. Besides, terminal 2021 associates sensor data obtained from a sensor and position information obtained by self-location estimation to generate position-related data.

Position information appended to position-related data indicates, for example, a position in a coordinate system used for three-dimensional data. For example, the position information is coordinate values represented using a value of a latitude and a value of a longitude. Here, terminal 2021 may include, in the position information, a coordinate system serving as a reference for the coordinate values and information indicating three-dimensional data used for location estimation, along with the coordinate values. Coordinate values may also include altitude information.

The position information may be associated with a data unit or a space unit usable for encoding the above three-dimensional data. Such a unit is, for example, WLD, GOS, SPC, VLM, or VXL. Here, the position information is represented by, for example, an identifier for identifying a data unit such as the SPC corresponding to position-related data. It should be noted that the position information may include, for example, information indicating three-dimensional data obtained by encoding a three-dimensional space including a data unit such as the SPC or information indicating a detailed position within the SPC, in addition to the identifier for identifying the data unit such as the SPC. The information indicating the three-dimensional data is, for example, a file name of the three-dimensional data.

As stated above, by generating position-related data associated with position information based on location estimation using three-dimensional data, the system can give more accurate position information to sensor information than when the system appends position information based on a self-location of a client device (terminal 2021) obtained using a GPS to sensor information. As a result, even when another device uses the position-related data in another service, there is a possibility of more accurately determining a position corresponding to the position-related data in an actual space, by performing location estimation based on the same three-dimensional data.

It should be noted that although the data transmitted from terminal 2021 is the position-related data in the example given in the present embodiment, the data transmitted from terminal 2021 may be data unassociated with position information. In other words, the transmission and reception of three-dimensional data or sensor data described in the other embodiments may be performed via network 2023 described in the present embodiment.

Next, a different example of position information indicating a position in a three-dimensional or two-dimensional actual space or in a map space will be described. The position information appended to position-related data may be information indicating a relative position relative to a keypoint in three-dimensional data. Here, the keypoint serving as a reference for the position information is encoded as, for example, SWLD, and notified to terminal 2021 as three-dimensional data.

The information indicating the relative position relative to the keypoint may be, for example, information that is represented by a vector from the keypoint to the point indicated by the position information, and indicates a direction and a distance from the keypoint to the point indicated by the position information. Alternatively, the information indicating the relative position relative to the keypoint may be information indicating an amount of displacement from the keypoint to the point indicated by the position information along each of the x axis, the y axis, and the z axis. Additionally, the information indicating the relative position relative to the keypoint may be information indicating a distance from each of three or more keypoints to the point indicated by the position information. It should be noted that the relative position need not be a relative position of the point indicated by the position information represented using each keypoint as a reference, and may be a relative position of each keypoint represented with respect to the point indicated by the position information. Examples of position information based on a relative position relative to a keypoint include information for identifying a keypoint to be a reference, and information indicating the relative position of the point indicated by the position information and relative to the keypoint. When the information indicating the relative position relative to the keypoint is provided separately from three-dimensional data, the information indicating the relative position relative to the keypoint may include, for example, coordinate axes used in deriving the relative position, information indicating a type of the three-dimensional data, and/or information indicating a magnitude per unit amount (e.g., a scale) of a value of the information indicating the relative position.

The position information may include, for each keypoint, information indicating a relative position relative to the keypoint. When the position information is represented by relative positions relative to keypoints, terminal 2021 that intends to identify a position in an actual space indicated by the position information may calculate candidate points of the position indicated by the position information from positions of the keypoints each estimated from sensor data, and may determine that a point obtained by averaging the calculated candidate points is the point indicated by the position information. Since this configuration reduces the effects of errors when the positions of the keypoints are estimated from the sensor data, it is possible to improve the estimation accuracy for the point in the actual space indicated by the position information. Besides, when the position information includes information indicating relative positions relative to keypoints, if it is possible to detect any one of the keypoints regardless of the presence of keypoints undetectable due to a limitation such as a type or performance of a sensor included in terminal 2021, it is possible to estimate a value of the point indicated by the position information.

A point identifiable from sensor data can be used as a keypoint. Examples of the point identifiable from the sensor data include a point or a point within a region that satisfies a predetermined keypoint detection condition, such as the above-described three-dimensional feature or feature of visible light data is greater than or equal to a threshold value.

Moreover, a marker etc. placed in an actual space may be used as a keypoint. In this case, the maker may be detected and located from data obtained using a sensor such as LiDER or a camera. For example, the marker may be represented by a change in color or luminance value (degree of reflection), or a three-dimensional shape (e.g., unevenness). Coordinate values indicating a position of the marker, or a two-dimensional bar code or a bar code etc. generated from an identifier of the marker may be also used.

Furthermore, a light source that transmits an optical signal may be used as a marker. When a light source of an optical signal is used as a marker, not only information for obtaining a position such as coordinate values or an identifier but also other data may be transmitted using an optical signal. For example, an optical signal may include contents of service corresponding to the position of the marker, an address for obtaining contents such as a URL, or an identifier of a wireless communication device for receiving service, and information indicating a wireless communication system etc. for connecting to the wireless communication device. The use of an optical communication device (a light source) as a marker not only facilitates the transmission of data other than information indicating a position but also makes it possible to dynamically change the data.

Terminal 2021 finds out a correspondence relationship of keypoints between mutually different data using, for example, a common identifier used for the data, or information or a table indicating the correspondence relationship of the keypoints between the data. When there is no information indicating a correspondence relationship between keypoints, terminal 2021 may also determine that when coordinates of a keypoint in three-dimensional data are converted into a position in a space of another three-dimensional data, a keypoint closest to the position is a corresponding keypoint.

When the position information based on the relative position described above is used, terminal 2021 that uses mutually different three-dimensional data or services can identify or estimate a position indicated by the position information with respect to a common keypoint included in or associated with each three-dimensional data. As a result, terminal 2021 that uses the mutually different three-dimensional data or the services can identify or estimate the same position with higher accuracy.

Even when map data or three-dimensional data represented using mutually different coordinate systems are used, since it is possible to reduce the effects of errors caused by the conversion of a coordinate system, it is possible to coordinate services based on more accurate position information.

Hereinafter, an example of functions provided by data collection server 2024 will be described. Data collection server 2024 may transfer received position-related data to another data server. When there are data servers, data collection server 2024 determines to which data server received position-related data is to be transferred, and transfers the position-related data to a data server determined as a transfer destination.

Data collection server 2024 determines a transfer destination based on, for example, transfer destination server determination rules preset to data collection server 2024. The transfer destination server determination rules are set by, for example, a transfer destination table in which identifiers respectively associated with terminals 2021 are associated with transfer destination data servers.

Terminal 2021 appends an identifier associated with terminal 2021 to position-related data to be transmitted, and transmits the position-related data to data collection server 2024. Data collection server 2024 determines a transfer destination data server corresponding to the identifier appended to the position-related data, based on the transfer destination server determination rules set out using the transfer destination table etc.; and transmits the position-related data to the determined data server. The transfer destination server determination rules may be specified based on a determination condition set using a time, a place, etc. at which position-related data is obtained. Here, examples of the identifier associated with transmission source terminal 2021 include an identifier unique to each terminal 2021 or an identifier indicating a group to which terminal 2021 belongs.

The transfer destination table need not be a table in which identifiers associated with transmission source terminals are directly associated with transfer destination data servers. For example, data collection server 2024 holds a management table that stores tag information assigned to each identifier unique to terminal 2021, and a transfer destination table in which the pieces of tag information are associated with transfer destination data servers. Data collection server 2024 may determine a transfer destination data server based on tag information, using the management table and the transfer destination table. Here, the tag information is, for example, control information for management or control information for providing service assigned to a type, a model number, an owner of terminal 2021 corresponding to the identifier, a group to which terminal 2021 belongs, or another identifier. Moreover, in the transfer destination able, identifiers unique to respective sensors may be used instead of the identifiers associated with transmission source terminals 2021. Furthermore, the transfer destination server determination rules may be set by client device 2026.

Data collection server 2024 may determine data servers as transfer destinations, and transfer received position-related data to the data servers. According to this configuration, for example, when position-related data is automatically backed up or when, in order that position-related data is commonly used by different services, there is a need to transmit the position-related data to a data server for providing each service, it is possible to achieve data transfer as intended by changing a setting of data collection server 2024. As a result, it is possible to reduce the number of steps necessary for building and changing a system, compared to when a transmission destination of position-related data is set for each terminal 2021.

Data collection server 2024 may register, as a new transfer destination, a data server specified by a transfer request signal received from a data server; and transmit position-related data subsequently received to the data server, in response to the transfer request signal.

Data collection server 2024 may store position-related data received from terminal 2021 into a recording device, and transmit position-related data specified by a transmission request signal received from terminal 2021 or a data server to request source terminal 2021 or the data server in response to the transmission request signal.

Data collection server 2024 may determine whether position-related data is suppliable to a request source data server or terminal 2021, and transfer or transmit the position-related data to the request source data server or terminal 2021 when determining that the position-related data is suppliable.

When data collection server 2024 receives a request for current position-related data from client device 2026, even if it is not a timing for transmitting position-related data by terminal 2021, data collection server 2024 may send a transmission request for the current position-related data to terminal 2021, and terminal 2021 may transmit the current position-related data in response to the transmission request.

Although terminal 2021 transmits position information data to data collection server 2024 in the above description, data collection server 2024 may have a function of managing terminal 2021 such as a function necessary for collecting position-related data from terminal 2021 or a function used when collecting position-related data from terminal 2021.

Data collection server 2024 may have a function of transmitting, to terminal 2021, a data request signal for requesting transmission of position information data, and collecting position-related data.

Management information such as an address for communicating with terminal 2021 from which data is to be collected or an identifier unique to terminal 2021 is registered in advance in data collection server 2024. Data collection server 2024 collects position-related data from terminal 2021 based on the registered management information. Management information may include information such as types of sensors included in terminal 2021, the number of sensors included in terminal 2021, and communication systems supported by terminal 2021.

Data collection server 2024 may collect information such as an operating state or a current position of terminal 2021 from terminal 2021.

Registration of management information may be instructed by client device 2026, or a process for the registration may be started by terminal 2021 transmitting a registration request to data collection server 2024. Data collection server 2024 may have a function of controlling communication between data collection server 2024 and terminal 2021.

Communication between data collection server 2024 and terminal 2021 may be established using a dedicated line provided by a service provider such as a mobile network operator (MNO) or a mobile virtual network operator (MVNO), or a virtual dedicated line based on a virtual private network (VPN). According to this configuration, it is possible to perform secure communication between terminal 2021 and data collection server 2024.

Data collection server 2024 may have a function of authenticating terminal 2021 or a function of encrypting data to be transmitted and received between data collection server 2024 and terminal 2021. Here, the authentication of terminal 2021 or the encryption of data is performed using, for example, an identifier unique to terminal 2021 or an identifier unique to a terminal group including terminals 2021, which is shared in advance between data collection server 2024 and terminal 2021. Examples of the identifier include an international mobile subscriber identity (IMSI) that is a unique number stored in a subscriber identity module (SIM) card. An identifier for use in authentication and an identifier for use in encryption of data may be identical or different.

The authentication or the encryption of data between data collection server 2024 and terminal 2021 is feasible when both data collection server 2024 and terminal 2021 have a function of performing the process. The process does not depend on a communication system used by communication device 2022 that performs relay. Accordingly, since it is possible to perform the common authentication or encryption without considering whether terminal 2021 uses a communication system, the user's convenience of system architecture is increased. However, the expression "does not depend on a communication system used by communication device 2022 that performs relay" means a change according to a communication system is not essential. In other words, in order to improve the transfer efficiency or ensure security, the authentication or the encryption of data between data collection server 2024 and terminal 2021 may be changed according to a communication system used by a relay device.

Data collection server 2024 may provide client device 2026 with a User Interface (UI) that manages data collection rules such as types of position-related data collected from terminal 2021 and data collection schedules. Accordingly, a user can specify, for example, terminal 2021 from which data is to be collected using client device 2026, a data collection time, and a data collection frequency. Additionally, data collection server 2024 may specify, for example, a region on a map from which data is to be desirably collected, and collect position-related data from terminal 2021 included in the region.

When the data collection rules are managed on a per terminal 2021 basis, client device 2026 presents, on a screen, a list of terminals 2021 or sensors to be managed. The user sets, for example, a necessity for data collection or a collection schedule for each item in the list.

When a region on a map from which data is to be desirably collected is specified, client device 2026 presents, on a screen, a two-dimensional or three-dimensional map of a region to be managed. The user selects the region from which data is to be collected on the displayed map. Examples of the region selected on the map include a circular or rectangular region having a point specified on the map as the center, or a circular or rectangular region specifiable by a drag operation. Client device 2026 may also select a region in a preset unit such as a city, an area or a block in a city, or a main road, etc. Instead of specifying a region using a map, a region may be set by inputting values of a latitude and a longitude, or a region may be selected from a list of candidate regions derived based on inputted text information. Text information is, for example, a name of a region, a city, or a landmark.

Moreover, data may be collected while the user dynamically changes a specified region by specifying one or more terminals 2021 and setting a condition such as within 100 meters of one or more terminals 2021.

When client device 2026 includes a sensor such as a camera, a region on a map may be specified based on a position of client device 2026 in an actual space obtained from sensor data. For example, client device 2026 may estimate a self-location using sensor data, and specify, as a region from which data is to be collected, a region within a predetermined distance from a point on a map corresponding to the estimated location or a region within a distance specified by the user. Client device 2026 may also specify, as the region from which the data is to be collected, a sensing region of the sensor, that is, a region corresponding to obtained sensor data. Alternatively, client device 2026 may specify, as the region from which the data is to be collected, a region based on a location corresponding to sensor data specified by the user. Either client device 2026 or data collection server 2024 may estimate a region on a map or a location corresponding to sensor data.

When a region on a map is specified, data collection server 2024 may specify terminal 2021 within the specified region by collecting current position information of each terminal 2021, and may send a transmission request for position-related data to specified terminal 2021. When data collection server 2024 transmits information indicating a specified region to terminal 2021, determines whether terminal 2021 is present within the specified region, and determines that terminal 2021 is present within the specified region, rather than specifying terminal 2021 within the region, terminal 2021 may transmit position-related data.

Data collection server 2024 transmits, to client device 2026, data such as a list or a map for providing the above-described User Interface (UI) in an application executed by client device 2026. Data collection server 2024 may transmit, to client device 2026, not only the data such as the list or the map but also an application program. Additionally, the above UI may be provided as contents created using HTML displayable by a browser. It should be noted that part of data such as map data may be supplied from a server, such as map server 2025, other than data collection server 2024.

When client device 2026 receives an input for notifying the completion of an input such as pressing of a setup key by the user, client device 2026 transmits the inputted information as configuration information to data collection server 2024. Data collection server 2024 transmits, to each terminal 2021, a signal for requesting position-related data or notifying position-related data collection rules, based on the configuration information received from client device 2026, and collects the position-related data.

Next, an example of controlling operation of terminal 2021 based on additional information added to three-dimensional or two-dimensional map data will be described.

In the present configuration, object information that indicates a position of a power feeding part such as a feeder antenna or a feeder coil for wireless power feeding buried under a road or a parking lot is included in or associated with three-dimensional data, and such object information is provided to terminal 2021 that is a vehicle or a drone.

A vehicle or a drone that has obtained the object information to get charged automatically moves so that a position of a charging part such as a charging antenna or a charging coil included in the vehicle or the drone becomes opposite to a region indicated by the object information, and such vehicle or a drone starts to charge itself. It should be noted that when a vehicle or a drone has no automatic driving function, a direction to move in or an operation to perform is presented to a driver or an operator by using an image displayed on a screen, audio, etc. When a position of a charging part calculated based on an estimated self-location is determined to fall within the region indicated by the object information or a predetermined distance from the region, an image or audio to be presented is changed to a content that puts a stop to driving or operating, and the charging is started.

Object information need not be information indicating a position of a power feeding part, and may be information indicating a region within which placement of a charging part results in a charging efficiency greater than or equal to a predetermined threshold value. A position indicated by object information may be represented by, for example, the central point of a region indicated by the object information, a region or a line within a two-dimensional plane, or a region, a line, or a plane within a three-dimensional space.

According to this configuration, since it is possible to identify the position of the power feeding antenna unidentifiable by sensing data of LiDER or an image captured by the camera, it is possible to highly accurately align a wireless charging antenna included in terminal 2021 such as a vehicle with a wireless power feeding antenna buried under a road. As a result, it is possible to increase a charging speed at the time of wireless charging and improve the charging efficiency.

Object information may be an object other than a power feeding antenna. For example, three-dimensional data includes, for example, a position of an AP for millimeter-wave wireless communication as object information. Accordingly, since terminal 2021 can identify the position of the AP in advance, terminal 2021 can steer a directivity of beam to a direction of the object information and start communication. As a result, it is possible to improve communication quality such as increasing transmission rates, reducing the duration of time before starting communication, and extending a communicable period.

Object information may include information indicating a type of an object corresponding to the object information. In addition, when terminal 2021 is present within a region in an actual space corresponding to a position in three-dimensional data of the object information or within a predetermined distance from the region, the object information may include information indicating a process to be performed by terminal 2021.

Object information may be provided by a server different from a server that provides three-dimensional data. When object information is provided separately from three-dimensional data, object groups in which object information used by the same service is stored may be each provided as separate data according to a type of a target service or a target device.

Three-dimensional data used in combination with object information may be point cloud data of WLD or keypoint data of SWLD.

In the three-dimensional data encoding device, when attribute information of a current three-dimensional point to be encoded is layer-encoded using Levels of Detail (LoDs), the three-dimensional data decoding device may decode the attribute information in layers down to LoD required by the three-dimensional data decoding device and need not decode the attribute information in layers not required. For example, when the total number of LoDs for the attribute information in a bitstream generated by the three-dimensional data encoding device is N, the three-dimensional data decoding device may decode M LoDs (M<N), i.e., layers from the uppermost layer LoD0 to LoD(M−1), and need not decode the remaining LoDs, i.e., layers down to LoD(N−1). With this, while reducing the processing load, the three-dimensional data decoding device can decode the attribute information in layers from LoD0 to LoD(M−1) required by the three-dimensional data decoding device.

Figure 123:
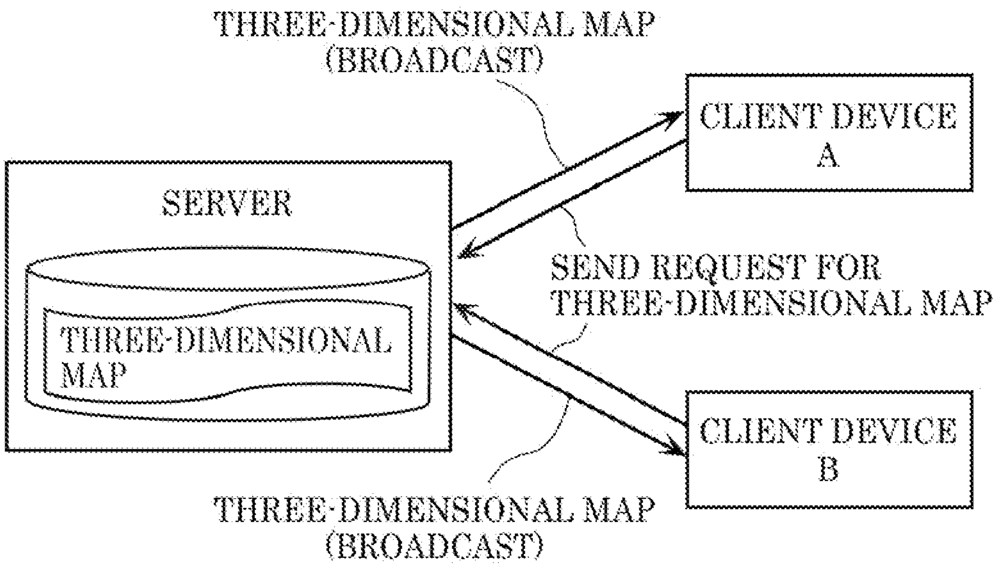

FIG. 123 is a diagram illustrating the foregoing use case. In the example shown in FIG. 123, a server stores a three-dimensional map obtained by encoding three-dimensional geometry information and attribute information. The server (the three-dimensional data encoding device) broadcasts the three-dimensional map to client devices (the three-dimensional data decoding devices: for example, vehicles, drones, etc.) in an area managed by the server, and each client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure or the like. Then, the sever layer-encodes the attribute information of the three-dimensional map using N LoDs established based on the geometry information. The server stores a bitstream of the three-dimensional map obtained by the layer-encoding.

Next, in response to a send request for the map information from the client device in the area managed by the server, the server sends the bitstream of the encoded three-dimensional map to the client device.

The client device receives the bitstream of the three-dimensional map sent from the server, and decodes the geometry information and the attribute information of the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and decodes all the information in the bitstream.

Moreover, when the client device displays the three-dimensional map information to a user or the like, the client device determines that a decoding result to the sparse three-dimensional points is necessary as the attribute information, and decodes the geometry information and the attribute information in M LoDs (M<N) starting from an upper layer LoD0.

In this way, the processing load of the client device can be reduced by changing LoDs for the attribute information to be decoded in accordance with the intended use of the client device.

In the example shown in FIG. 123, for example, the three-dimensional map includes geometry information and attribute information. The geometry information is encoded using the octree. The attribute information is encoded using N LoDs.

Client device A performs highly accurate estimation of the self-position. In this case, client device A determines that all the geometry information and all the attribute information are necessary, and decodes all the geometry information and all the attribute information constructed from N LoDs in the bitstream.

Client device B displays the three-dimensional map to a user. In this case, client device B determines that the geometry information and the attribute information in M LoDs (M<N) are necessary, and decodes the geometry information and the attribute information constructed from M LoDs in the bitstream.

It is to be noted that the server may broadcast the three-dimensional map to the client devices, or multicast or unicast the three-dimensional map to the client devices.

The following describes a variation of the system according to the present embodiment. In the three-dimensional data encoding device, when attribute information of a current three-dimensional point to be encoded is layer-encoded using LoDs, the three-dimensional data encoding device may encode the attribute information in layers down to LoD required by the three-dimensional data decoding device and need not encode the attribute information in layers not required. For example, when the total number of LoDs is N, the three-dimensional data encoding device may generate a bitstream by encoding M LoDs (M<N), i.e., layers from the uppermost layer LoD0 to LoD(M−1), and not encoding the remaining LoDs, i.e., layers down to LoD(N−1). With this, in response to a request from the three-dimensional data decoding device, the three-dimensional data encoding device can provide a bitstream in which the attribute information from LoD0 to LoD(M−1) required by the three-dimensional data decoding device is encoded.

Figure 124:
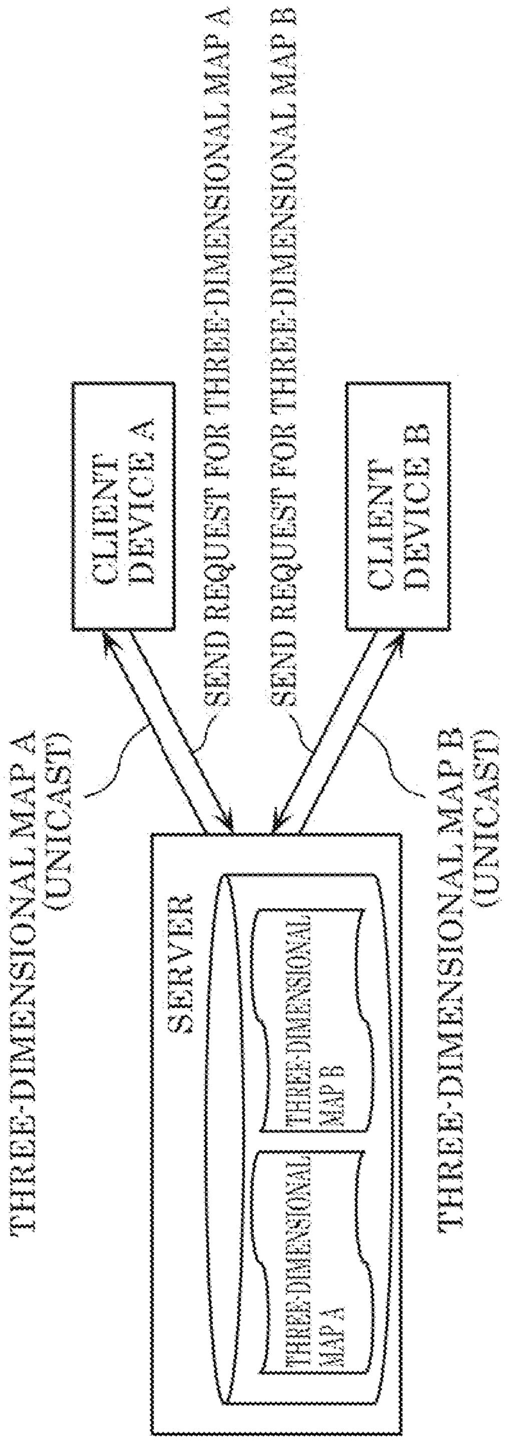

FIG. 124 is a diagram illustrating the foregoing use case. In the example shown in FIG. 124, a server stores a three-dimensional map obtained by encoding three-dimensional geometry information and attribute information. The server (the three-dimensional data encoding device) unicasts, in response to a request from the client device, the three-dimensional map to a client device (the three-dimensional data decoding device: for example, a vehicle, a drone, etc.) in an area managed by the server, and the client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure, or the like. Then, the sever generates a bitstream of three-dimensional map A by layer-encoding the attribute information of the three-dimensional map using N LoDs established based on the geometry information, and stores the generated bitstream in the server. The sever also generates a bitstream of three-dimensional map B by layer-encoding the attribute information of the three-dimensional map using M LoDs (M<N) established based on the geometry information, and stores the generated bitstream in the server.

Next, the client device requests the server to send the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and requests the server to send the bitstream of three-dimensional map A. Moreover, when the client device displays the three-dimensional map information to a user or the like, the client device determines that a decoding result to the sparse three-dimensional points is necessary as the attribute information, and requests the server to send the bitstream of three-dimensional map B including the geometry information and the attribute information in M LoDs (M<N) starting from an upper layer LoD0. Then, in response to the send request for the map information from the client device, the server sends the bitstream of encoded three-dimensional map A or B to the client device.

The client device receives the bitstream of three-dimensional map A or B sent from the server in accordance with the intended use of the client device, and decodes the received bitstream. In this way, the server changes a bitstream to be sent, in accordance with the intended use of the client device. With this, it is possible to reduce the processing load of the client device.

In the example shown in FIG. 124, the server stores three-dimensional map A and three-dimensional map B. The server generates three-dimensional map A by encoding the geometry information of the three-dimensional map using, for example, an octree structure, and encoding the attribute information of the three-dimensional map using N LoDs. In other words, NumLoD included in the bitstream of three-dimensional map A indicates N.

The server also generates three-dimensional map B by encoding the geometry information of the three-dimensional map using, for example, an octree structure, and encoding the attribute information of the three-dimensional map using M LoDs. In other words, NumLoD included in the bitstream of three-dimensional map B indicates M.

Client device A performs highly accurate estimation of the self-position. In this case, client device A determines that all the geometry information and all the attribute information are necessary, and requests the server to send three-dimensional map A including all the geometry information and the attribute information constructed from N LoDs. Client device A receives three-dimensional map A, and decodes all the geometry information and the attribute information constructed from N LoDs.

Client device B displays the three-dimensional map to a user. In this case, client device B determines that all the geometry information and the attribute information in M LoDs (M<N) are necessary, and requests the server to send three-dimensional map B including all the geometry information and the attribute information constructed from M LoDs. Client device B receives three-dimensional map B, and decodes all the geometry information and the attribute information constructed from M LoDs.

It is to be noted that in addition to three-dimensional map B, the server (the three-dimensional data encoding device) may generate three-dimensional map C in which attribute information in the remaining N-M LoDs is encoded, and send three-dimensional map C to client device B in response to the request from client device B. Moreover, client device B may obtain the decoding result of N LoDs using the bitstreams of three-dimensional maps B and C.

Figure 125:
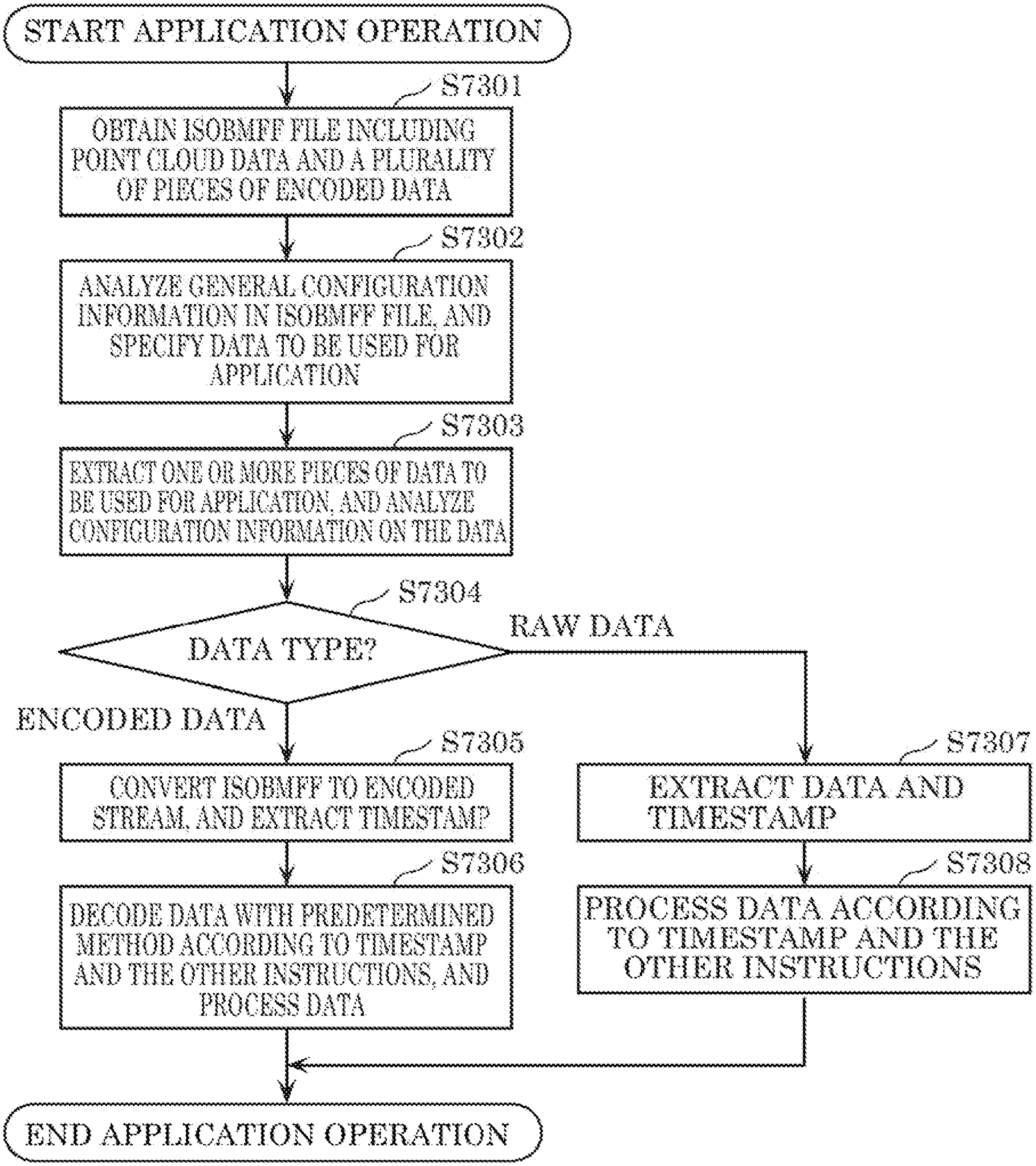

Hereinafter, an example of an application process will be described. FIG. 125 is a flowchart illustrating an example of the application process. When an application operation is started, a three-dimensional data demultiplexing device obtains an ISOBMFF file including point cloud data and a plurality of pieces of encoded data (S7301). For example, the three-dimensional data demultiplexing device may obtain the ISOBMFF file through communication, or may read the ISOBMFF file from the accumulated data.

Next, the three-dimensional data demultiplexing device analyzes the general configuration information in the ISOBMFF file, and specifies the data to be used for the application (S7302). For example, the three-dimensional data demultiplexing device obtains data that is used for processing, and does not obtain data that is not used for processing.

Next, the three-dimensional data demultiplexing device extracts one or more pieces of data to be used for the application, and analyzes the configuration information on the data (S7303).

When the type of the data is encoded data (encoded data in S7304), the three-dimensional data demultiplexing device converts the ISOBMFF to an encoded stream, and extracts a timestamp (S7305). Additionally, the three-dimensional data demultiplexing device refers to, for example, the flag indicating whether or not the synchronization between data is aligned to determine whether or not the synchronization between data is aligned, and may perform a synchronization process when not aligned.

Next, the three-dimensional data demultiplexing device decodes the data with a predetermined method according to the timestamp and the other instructions, and processes the decoded data (S7306).

On the other hand, when the type of the data is RAW data (RAW data in S7304), the three-dimensional data demultiplexing device extracts the data and timestamp (S7307). Additionally, the three-dimensional data demultiplexing device may refer to, for example, the flag indicating whether or not the synchronization between data is aligned to determine whether or not the synchronization between data is aligned, and may perform a synchronization process when not aligned. Next, the three-dimensional data demultiplexing device processes the data according to the timestamp and the other instructions (S7308).

Figure 126:
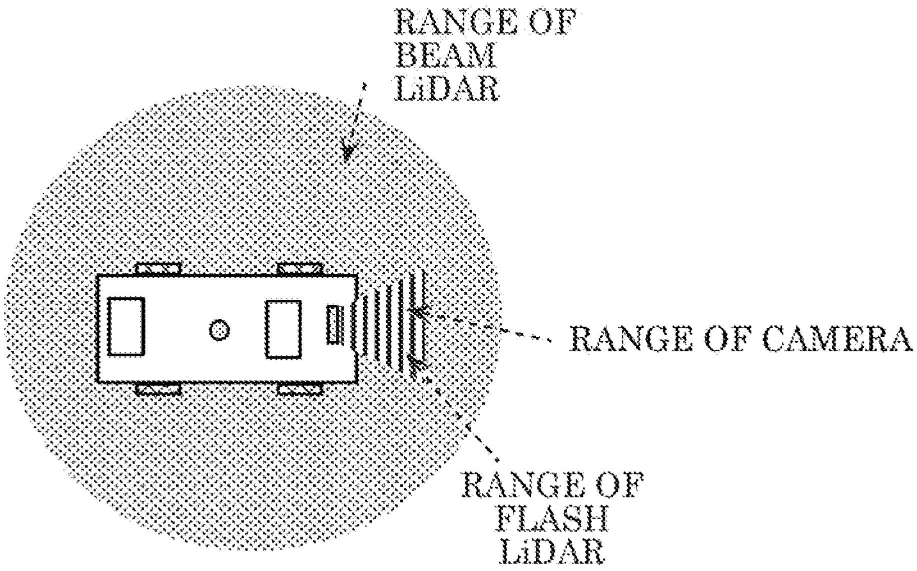

For example, an example will be described in which the sensor signals obtained by a beam LiDAR, a FLASH LiDAR, and a camera are encoded and multiplexed with respective different encoding schemes. FIG. 126 is a diagram illustrating examples of the sensor ranges of a beam LiDAR, a FLASH LiDAR, and a camera. For example, the beam LiDAR detects all directions in the periphery of a vehicle (sensor), and the FLASH LiDAR and the camera detect the range in one direction (for example, the front) of the vehicle.

In the case of an application that integrally handles a LiDAR point cloud, the three-dimensional data demultiplexing device refers to the general configuration information, and extracts and decodes the encoded data of the beam LiDAR and the FLASH LiDAR. Additionally, the three-dimensional data demultiplexing device does not extract camera images.

According to the timestamps of the beam LiDAR and the FLASH LiDAR, the three-dimensional data demultiplexing device simultaneously processes the respective encoded data of the time of the same timestamp.

For example, the three-dimensional data demultiplexing device may present the processed data with a presentation device, may synthesize the point cloud data of the beam LiDAR and the FLASH LiDAR, or may perform a process such as rendering.

Additionally, in the case of an application that performs calibration between data, the three-dimensional data demultiplexing device may extract sensor geometry information, and use the sensor geometry information in the application.

For example, the three-dimensional data demultiplexing device may select whether to use beam LiDAR information or FLASH LiDAR information in the application, and may switch the process according to the selection result.

In this manner, since it is possible to adaptively change the obtaining of data and the encoding process according to the process of the application, the processing amount and the power consumption can be reduced.

Figure 127:
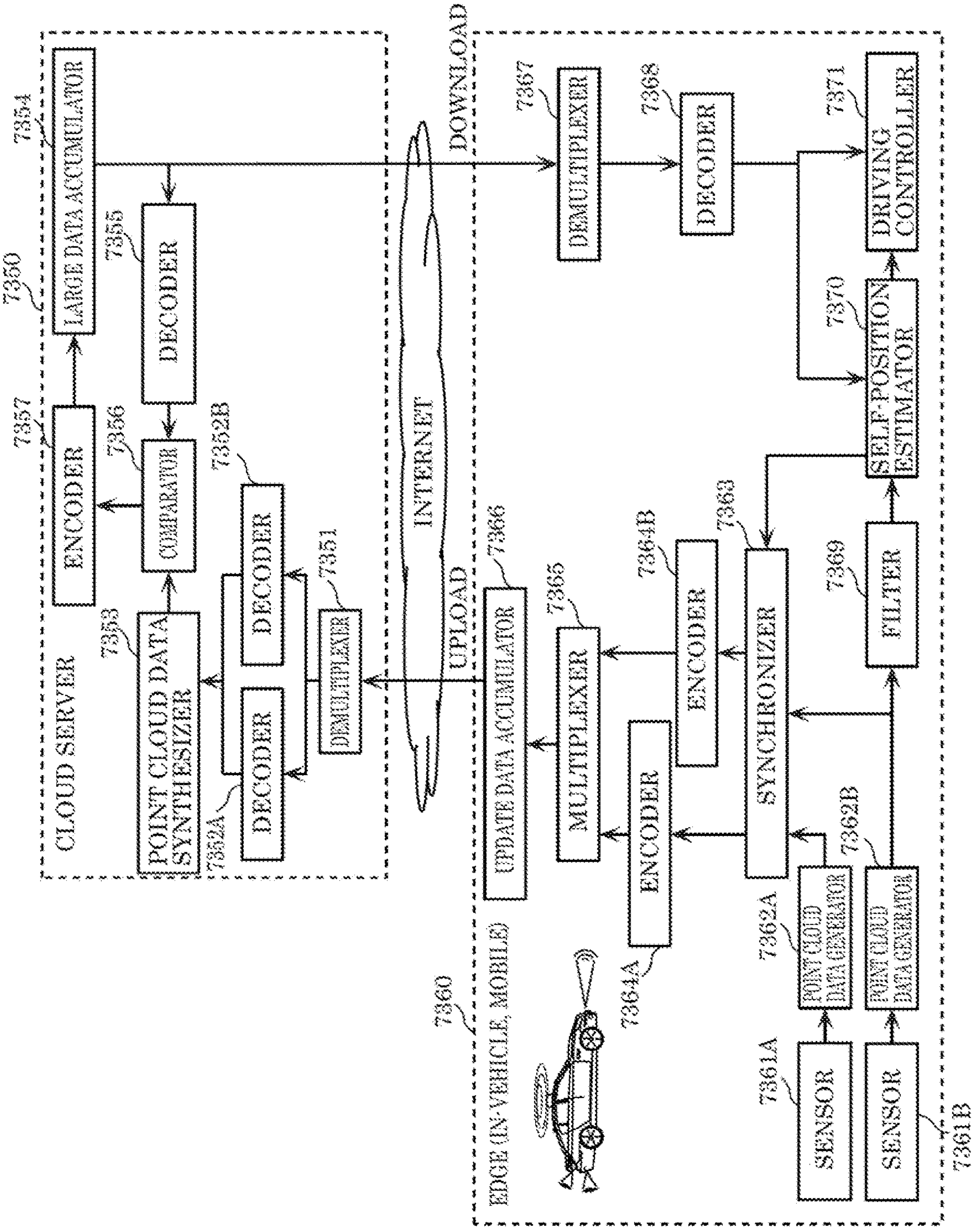

Hereinafter, a use case in automated driving will be described. FIG. 127 is a diagram illustrating a configuration example of an automated driving system. This automated driving system includes cloud server 7350, and edge 7360 such as an in-vehicle device or a mobile device. Cloud server 7350 includes demultiplexer 7351, decoders 7352A, 7352B, and 7355, point cloud data synthesizer 7353, large data accumulator 7354, comparator 7356, and encoder 7357. Edge 7360 includes sensors 7361A and 7361B, point cloud data generators 7362A and 7362B, synchronizer 7363, encoders 7364A and 7364B, multiplexer 7365, update data accumulator 7366, demultiplexer 7367, decoder 7368, filter 7369, self-position estimator 7370, and driving controller 7371.

In this system, edge 7360 downloads large data, which is large point-cloud map data accumulated in cloud server 7350. Edge 7360 performs a self-position estimation process of edge 7360 (a vehicle or a terminal) by matching the large data with the sensor information obtained by edge 7360. Additionally, edge 7360 uploads the obtained sensor information to cloud server 7350, and updates the large data to the latest map data.

Additionally, in various applications that handle point cloud data in the system, point cloud data with different encoding methods are handled.

Cloud server 7350 encodes and multiplexes large data. Specifically, encoder 7357 performs encoding by using a third encoding method suitable for encoding a large point cloud. Additionally, encoder 7357 multiplexes encoded data. Large data accumulator 7354 accumulates the data encoded and multiplexed by encoder 7357.

Edge 7360 performs sensing. Specifically, point cloud data generator 7362A generates first point cloud data (geometry information (geometry) and attribute information) by using the sensing information obtained by sensor 7361A. Point cloud data generator 7362B generates second point cloud data (geometry information and attribute information) by using the sensing information obtained by sensor 7361B. The generated first point cloud data and second point cloud data are used for the self-position estimation or vehicle control of automated driving, or for map updating. In each process, a part of information of the first point cloud data and the second point cloud data may be used.

Edge 7360 performs the self-position estimation. Specifically, edge 7360 downloads large data from cloud server 7350. Demultiplexer 7367 obtains encoded data by demultiplexing the large data in a file format. Decoder 7368 obtains large data, which is large point-cloud map data, by decoding the obtained encoded data.

Self-position estimator 7370 estimates the self-position in the map of a vehicle by matching the obtained large data with the first point cloud data and the second point cloud data generated by point cloud data generators 7362A and 7362B. Additionally, driving controller 7371 uses the matching result or the self-position estimation result for driving control.

Note that self-position estimator 7370 and driving controller 7371 may extract specific information, such as geometry information, of the large data, and may perform processes by using the extracted information. Additionally, filter 7369 performs a process such as correction or decimation on the first point cloud data and the second point cloud data. Self-position estimator 7370 and driving controller 7371 may use the first point cloud data and second point cloud data on which the process has been performed. Additionally, self-position estimator 7370 and driving controller 7371 may use the sensor signals obtained by sensors 7361A and 7361B.

Synchronizer 7363 performs time synchronization and geometry correction between a plurality of sensor signals or the pieces of data of a plurality of pieces of point cloud data. Additionally, synchronizer 7363 may correct the geometry information on the sensor signal or point cloud data to match the large data, based on geometry correction information on the large data and sensor data generated by the self-position estimation process.

Note that synchronization and geometry correction may be performed not by edge 7360, but by cloud server 7350. In this case, edge 7360 may multiplex the synchronization information and the geometry information to transmit the synchronization information and the geometry information to cloud server 7350.

Edge 7360 encodes and multiplexes the sensor signal or point cloud data. Specifically, the sensor signal or point cloud data is encoded by using a first encoding method or a second encoding method suitable for encoding each signal. For example, encoder 7364A generates first encoded data by encoding first point cloud data by using the first encoding method. Encoder 7364B generates second encoded data by encoding second point cloud data by using the second encoding method.

Multiplexer 7365 generates a multiplexed signal by multiplexing the first encoded data, the second encoded data, the synchronization information, and the like. Update data accumulator 7366 accumulates the generated multiplexed signal. Additionally, update data accumulator 7366 uploads the multiplexed signal to cloud server 7350.

Cloud server 7350 synthesizes the point cloud data. Specifically, demultiplexer 7351 obtains the first encoded data and the second encoded data by demultiplexing the multiplexed signal uploaded to cloud server 7350. Decoder 7352A obtains the first point cloud data (or sensor signal) by decoding the first encoded data. Decoder 7352B obtains the second point cloud data (or sensor signal) by decoding the second encoded data.

Point cloud data synthesizer 7353 synthesizes the first point cloud data and the second point cloud data with a predetermined method. When the synchronization information and the geometry correction information are multiplexed in the multiplexed signal, point cloud data synthesizer 7353 may perform synthesis by using these pieces of information.

Decoder 7355 demultiplexes and decodes the large data accumulated in large data accumulator 7354. Comparator 7356 compares the point cloud data generated based on the sensor signal obtained by edge 7360 with the large data held by cloud server 7350, and determines the point cloud data that needs to be updated. Comparator 7356 updates the point cloud data that is determined to need to be updated of the large data to the point cloud data obtained from edge 7360.

Encoder 7357 encodes and multiplexes the updated large data, and accumulates the obtained data in large data accumulator 7354.

As described above, the signals to be handled may be different, and the signals to be multiplexed or encoding methods may be different, according to the usage or applications to be used. Even in such a case, flexible decoding and application processes are enabled by multiplexing data of various encoding schemes by using the present embodiment. Additionally, even in a case where the encoding schemes of signals are different, by conversion to an encoding scheme suitable for demultiplexing, decoding, data conversion, encoding, and multiplexing processing, it becomes possible to build various applications and systems, and to offer of flexible services.

Figure 128:
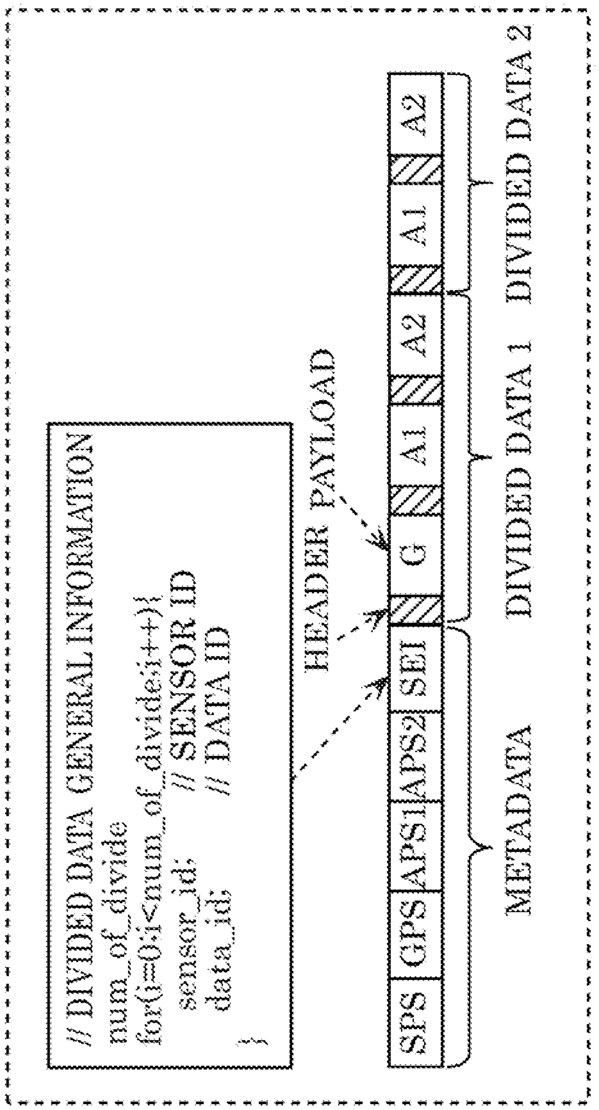

Hereinafter, an example of decoding and application of divided data will be described. First, the information on divided data will be described. FIG. 128 is a diagram illustrating a configuration example of a bitstream. The general information of divided data indicates, for each divided data, the sensor ID (sensor id) and data ID (data id) of the divided data. Note that the data ID is also indicated in the header of each encoded data.

Note that the general information of divided data illustrated in FIG. 128 includes, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly, the three-dimensional data decoding device can obtain the information on various sensors from the configuration information.

The general information of divided data may be stored in SPS, GPS, or APS, which is the metadata, or may be stored in SEI, which is the metadata not required for encoding. Additionally, at the time of multiplexing, the three-dimensional data encoding device stores the SEI in a file of ISOBMFF. The three-dimensional data decoding device can obtain desired divided data based on the metadata.

In FIG. 128, SPS is the metadata of the entire encoded data, GPS is the metadata of the geometry information, APS is the metadata for each attribute information, G is encoded data of the geometry information for each divided data, and A1, etc. are encoded data of the attribute information for each divided data.

Figure 129:
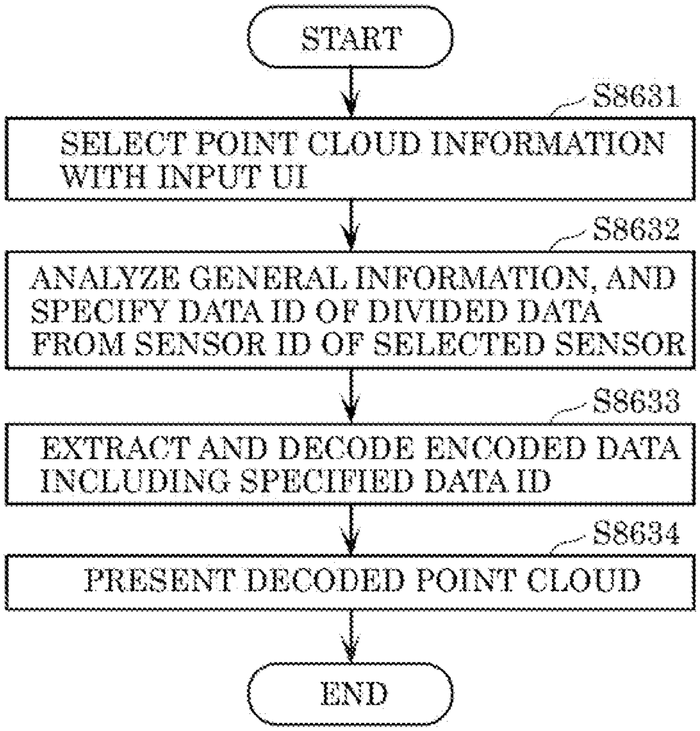
Figure 130:
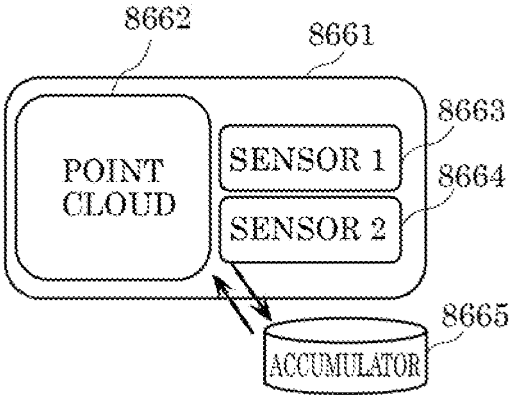

Next, an application example of divided data will be described. An example of application will be described in which an arbitrary point cloud is selected, and the selected point cloud is presented. FIG. 129 is a flowchart of a point cloud selection process performed by this application. FIG. 130 to FIG. 132 are diagrams illustrating screen examples of the point cloud selection process.

As illustrated in FIG. 130, the three-dimensional data decoding device that performs the application includes, for example, a UI unit that displays an input UI (user interface) 8661 for selecting an arbitrary point cloud. Input UI 8661 includes presenter 8662 that presents the selected point cloud, and an operation unit (buttons 8663 and 8664) that receives operations by a user. After a point cloud is selected in UI 8661, the three-dimensional data decoding device obtains desired data from accumulator 8665.

First, based on an operation by the user on input UI 8661, the point cloud information that the user wants to display is selected (S8631). Specifically, by selecting button 8663, the point cloud based on sensor 1 is selected. By selecting button 8664, the point cloud based on sensor 2 is selected. Alternatively, by selecting both button 8663 and button 8664, the point cloud based on sensor 1 and the point cloud based on sensor 2 are selected. Note that it is an example of the selection method of point cloud, and it is not limited to this.

Next, the three-dimensional data decoding device analyzes the general information of divided data included in the multiplexed signal (bitstream) or encoded data, and specifies the data ID (data_id) of the divided data constituting the selected point cloud from the sensor ID (sensor_id) of the selected sensor (S8632). Next, the three-dimensional data decoding device extracts, from the multiplexed signal, the encoded data including the specified and desired data ID, and decodes the extracted encoded data to decode the point cloud based on the selected sensor (S8633). Note that the three-dimensional data decoding device does not decode the other encoded data. Lastly, the three-dimensional data decoding device presents (for example, displays) the decoded point cloud (S8634). FIG. 131 illustrates an example in the case where button 8663 for sensor 1 is pressed, and the point cloud of sensor 1 is presented. FIG. 132 illustrates an example in the case where both button 8663 for sensor 1 and button 8664 for sensor 2 are pressed, and the point clouds of sensor 1 and sensor 2 are presented.

Although a three-dimensional data encoding device, a three-dimensional data decoding device, and the like, according to exemplary embodiments of the present disclosure have been described above, the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

What is claimed is:

1. A three-dimensional data encoding method comprising:

encoding tile information including information on N subspaces which are at least part of a target space in which three-dimensional points are included, and encoding point cloud data of the three-dimensional points based on the tile information, N being an integer greater than or equal to 0; and generating a bitstream including the point cloud data encoded, wherein the tile information includes N items of subspace coordinate information indicating coordinates of the N subspaces, the N items of subspace coordinate information each include three items of coordinate information each indicating a coordinate in a different one of three axial directions in a three-dimensional orthogonal coordinate system, when N is greater than or equal to 1:

(i) in the encoding of the tile information, each of the three items of coordinate information included in each of the N items of subspace coordinate information is information indicating an origin in a different one of the three axial directions of a subspace corresponding to the item of subspace coordinate information, and each of the three items of coordinate information is encoded using a first fixed length that is common to the three items of coordinate information; and (ii) in the generating of the bitstream, the bitstream which includes the N items of subspace coordinate information encoded and first fixed length information indicating the first fixed length is generated, the tile information includes at least one item of size information indicating a size of at least one subspace among the N subspaces, in the encoding of the tile information, each of the at least one item of size information is encoded using a second fixed length, in the generating of the bitstream, the bitstream which includes the at least one item of size information encoded and second fixed length information indicating the second fixed length is generated, the three-dimensional data encoding method further comprises determining whether a size of each of the N subspaces matches a predetermined size, in the encoding of the tile information, size information indicating a size of a subspace that does not match the predetermined size among the N subspaces is encoded as the at least one item of size information, using the second fixed length, and in the generating of the bitstream, the bitstream which includes common flag information indicating whether the size of each of the N subspaces matches the predetermined size is generated.

2. The three-dimensional data encoding method according to claim 1, wherein the first fixed length and the second fixed length are of same length.

3. The three-dimensional data encoding method according to claim 1, wherein the tile information includes common origin information indicating coordinates of an origin of the target space, and in the generating of the bitstream, the bitstream which includes the common origin information is generated.

4. The three-dimensional data encoding method according to claim 1, wherein in the generating of the bitstream, when Nis 0, the bitstream that does not include the information on the N subspaces is generated.

5. A three-dimensional data decoding method comprising:

obtaining a bitstream including encoded point cloud data of three-dimensional points; and decoding tile information which is encoded and includes information on N subspaces which are at least part of a target space in which the three-dimensional points are included, and decoding the encoded point cloud data based on the tile information, N being an integer greater than or equal to 0, wherein the tile information includes N items of subspace coordinate information indicating coordinates of the N subspaces, the N items of subspace coordinate information each include three items of coordinate information each indicating a coordinate in a different one of three axial directions in a three-dimensional orthogonal coordinate system, when N is greater than or equal to 1:

(i) in the obtaining of the bitstream, the bitstream which includes the N items of subspace coordinate information which are encoded and first fixed length information indicating the first fixed length is obtained; and (ii) in the decoding of the tile information which is encoded, each of the three items of coordinate information which are encoded and included in each of the N items of subspace coordinate information which are encoded is information indicating an origin in a different one of the three axial directions of a subspace corresponding to the item of subspace coordinate information, and each of the three items of coordinate information is decoded using the first fixed length that is common to the three items of coordinate information, the tile information includes at least one item of size information indicating a size of at least one subspace among the N subspaces, in the obtaining of the bitstream, the bitstream which includes the at least one item of size information which is encoded and second fixed length information indicating the second fixed length is obtained, and in the decoding of the tile information which is encoded, each of the at least one item of size information which are encoded is decoded using the second fixed length, in the obtaining of the bitstream, the bitstream which includes common flag information indicating whether a size of each of the N subspaces matches a predetermined size is obtained, the three-dimensional data decoding method further comprises determining whether the size of each of the N subspaces matches the predetermined size based on the common flag information, and in the decoding of the tile information which is encoded, encoded size information indicating a size of a subspace that does not match the predetermined size among the N subspaces is decoded as the at least one item of size information which is encoded, using the second fixed length.

6. The three-dimensional data decoding method according to claim 5, wherein the first fixed length and the second fixed length are of same length.

7. The three-dimensional data decoding method according to claim 5, wherein the tile information includes common origin information indicating coordinates of an origin of the target space, and in the obtaining of the bitstream, the bitstream which includes the common origin information is obtained.

8. The three-dimensional data decoding method according to claim 5, wherein in the obtaining of the bitstream, when N is 0, the bitstream that does not include the information on the N subspaces is obtained.

9. A three-dimensional data encoding device comprising:

a processor; and memory, wherein using the memory, the processor:

encodes tile information including information on N subspaces which are at least part of a target space in which three-dimensional points are included, and encoding point cloud data of the three-dimensional points based on the tile information, N being an integer greater than or equal to 0; and generates a bitstream including the point cloud data encoded, wherein the tile information includes N items of subspace coordinate information indicating coordinates of the N subspaces, the N items of subspace coordinate information each include three items of coordinate information each indicating a coordinate in a different one of three axial directions in a three-dimensional orthogonal coordinate system, when N is greater than or equal to 1:

(i) in the encoding of the tile information, each of the three items of coordinate information included in each of the N items of subspace coordinate information is information indicating an origin in a different one of the three axial directions of a subspace corresponding to the item of subspace coordinate information, and the processor encodes each of the three items of coordinate information using a first fixed length that is common to the three items of coordinate information; and (ii) in the generating of the bitstream, the processor generates the bitstream which further includes the N items of subspace coordinate information encoded and first fixed length information indicating the first fixed length, the tile information includes at least one item of size information indicating a size of at least one subspace among the N subspaces, in the encoding of the tile information, the processor encodes each of the at least one item of size information using a second fixed length, in the generating of the bitstream, the processor generates the bitstream which includes the at least one item of size information encoded and second fixed length information indicating the second fixed length, the processor determines whether a size of each of the N subspaces matches a predetermined size, in the encoding of the tile information, the processor encodes size information indicating a size of a subspace that does not match the predetermined size among the N subspaces as the at least one item of size information, using the second fixed length, and in the generating of the bitstream, the processor generates the bitstream which includes common flag information indicating whether the size of each of the N subspaces matches the predetermined size.

10. A three-dimensional data decoding device comprising:

a processor; and memory, wherein using the memory, the processor:

obtains a bitstream including encoded point cloud data of three-dimensional points; and decodes tile information which is encoded and includes information on N subspaces which are at least part of a target space in which the three-dimensional points are included, and decoding the encoded point cloud data based on the tile information, N being an integer greater than or equal to 0, wherein the tile information includes N items of subspace coordinate information indicating coordinates of the N subspaces, the N items of subspace coordinate information each include three items of coordinate information each indicating a coordinate in a different one of three axial directions in a three-dimensional orthogonal coordinate system, when N is greater than or equal to 1:

(i) in the obtaining of the bitstream, the processor obtains the bitstream which includes the N items of subspace coordinate information which are encoded and first fixed length information indicating the first fixed length; and (ii) in the decoding of the tile information which is encoded, each of the three items of coordinate information which are encoded and included in each of the N items of subspace coordinate information which are encoded is information indicating an origin in a different one of the three axial directions of a subspace corresponding to the item of subspace coordinate information, and the processor decodes each of the three items of coordinate information using the first fixed length that is common to the three items of coordinate information, the tile information includes at least one item of size information indicating a size of at least one subspace among the N subspaces, in the obtaining of the bitstream, the bitstream which includes the at least one item of size information which is encoded and second fixed length information indicating the second fixed length is obtained, and in the decoding of the tile information which is encoded, the processor decodes, using the second fixed length, each of the at least one item of size information which are encoded, in the obtaining of the bitstream, the processor obtains the bitstream which includes common flag information indicating whether a size of each of the N subspaces matches a predetermined size, the processor determines whether the size of each of the N subspaces matches the predetermined size based on the common flag information, and in the decoding of the tile information which is encoded, the processor decodes encoded size information indicating a size of a subspace that does not match the predetermined size among the N subspaces as the at least one item of size information which is encoded, using the second fixed length.

* * * * *